United States Patent
Riley et al.

(10) Patent No.: US 7,587,542 B2
(45) Date of Patent: Sep. 8, 2009

(54) DEVICE ADAPTED TO SEND INFORMATION IN ACCORDANCE WITH A COMMUNICATION PROTOCOL

(75) Inventors: Dwight Riley, Houston, TX (US); Christopher J. Pettey, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 221 days.

(21) Appl. No.: 11/193,590

(22) Filed: Jul. 28, 2005

(65) Prior Publication Data

US 2006/0031621 A1 Feb. 9, 2006

Related U.S. Application Data

(63) Continuation of application No. 10/945,003, filed on Sep. 20, 2004, now Pat. No. 7,099,986, which is a continuation of application No. 10/424,896, filed on Apr. 28, 2003, now Pat. No. 6,816,934, which is a continuation of application No. 09/747,422, filed on Dec. 22, 2000, now Pat. No. 6,557,068, which is a continuation of application No. 09/148,042, filed on Sep. 3, 1998, now Pat. No. 6,266,731.

(51) Int. Cl.
*G06F 13/36* (2006.01)
(52) U.S. Cl. .................. 710/113; 710/110; 710/305
(58) Field of Classification Search ......... 710/305–315, 710/8–19, 106–110, 240–244, 118–119
See application file for complete search history.

(56) References Cited

U.S. PATENT DOCUMENTS

| | | | |
|---|---|---|---|
| 4,006,466 | A | 2/1977 | Patterson et al. |
| 4,218,739 | A | 8/1980 | Negi et al. |
| 4,232,366 | A | 11/1980 | Levy et al. |
| 4,261,034 | A | 4/1981 | Saccomano |

(Continued)

OTHER PUBLICATIONS

PCI Bridges—Bridge Products 21554 Embedded PCI-to-PCI Bridge, Intel Corporation, http://developer.intel.com/design/dcs-21554.htm. 3 pages (Aug. 19, 1999).

(Continued)

*Primary Examiner*—Raymond N Phan

(57) ABSTRACT

A multiple use core logic chip set is provided in a computer system that may be configured either as a bridge between an accelerated graphics port ("AGP") bus and host and memory buses, as a bridge between an additional registered peripheral component interconnect ("RegPCI") bus and the host and memory buses, or as a bridge between a primary PCI bus and an additional RegPCI bus. The function of the multiple use chip set is determined at the time of manufacture of the computer system or in the field whether an AGP bus bridge or an additional registered PCI bus bridge is to be implemented. The multiple use core logic chip set has an arbiter having Request ("REQ") and Grant ("GNT") signal lines for each PCI device utilized on the additional registered PCI bus. Selection of the type of bus bridge (AGP or RegPCI) in the multiple use core logic chip set may be made by a hardware signal input, or by software during computer system configuration or power on self test ("POST"). Software configuration may also be determined upon detection of either an AGP or a RegPCI device connected to the common AGP/RegPCI bus.

31 Claims, 78 Drawing Sheets

U.S. PATENT DOCUMENTS

| | | | |
|---|---|---|---|
| 4,271,468 A | 6/1981 | Christensen et al. | |
| 4,429,360 A | 1/1984 | Hoffman | |
| 4,504,903 A | 3/1985 | Dickman | |
| 4,523,277 A | 6/1985 | Schrathorst | |
| 4,596,390 A | 6/1986 | Studley | |
| 4,638,432 A | 1/1987 | Niblock | |
| 4,665,481 A | 5/1987 | Stonier | |
| 4,719,565 A | 1/1988 | Moller | |
| 4,719,622 A | 1/1988 | Whipple et al. | |
| 4,750,168 A | 6/1988 | Trevitt | |
| 4,761,800 A | 8/1988 | Lese et al. | |
| 4,769,768 A | 9/1988 | Bomba et al. | |
| 4,870,704 A | 9/1989 | Matelan et al. | |
| 4,945,548 A | 7/1990 | Iannarone et al. | |
| 4,979,100 A | 12/1990 | Makris et al. | |
| 5,043,882 A | 8/1991 | Ikeno | |
| 5,072,365 A | 12/1991 | Burgess et al. | |
| 5,125,093 A | 6/1992 | McFarland | |
| 5,148,544 A | 9/1992 | Cutler | |
| 5,150,465 A | 9/1992 | Bush et al. | |
| 5,161,228 A | 11/1992 | Yasui et al. | |
| 5,185,877 A | 2/1993 | Bissett et al. | |
| 5,202,904 A | 4/1993 | Kamada | |
| 5,218,703 A | 6/1993 | Fleck | |
| 5,241,630 A | 8/1993 | Lattin, Jr. et al. | |
| 5,249,271 A | 9/1993 | Hopkinson et al. | |
| 5,249,279 A | 9/1993 | Schmenk et al. | |
| 5,253,347 A | 10/1993 | Bagnoli et al. | |
| 5,311,511 A | 5/1994 | Reilly et al. | |
| 5,323,426 A | 6/1994 | James et al. | |
| 5,327,430 A | 7/1994 | Urbansky | |
| 5,333,276 A | 7/1994 | Solari | |
| 5,345,562 A | 9/1994 | Chen | |
| 5,353,415 A | 10/1994 | Wolford et al. | |
| 5,353,416 A | 10/1994 | Olson | |
| 5,359,605 A | 10/1994 | Urbansky et al. | |
| 5,404,464 A | 4/1995 | Bennett | |
| 5,416,910 A | 5/1995 | Moyer et al. | |
| 5,434,860 A | 7/1995 | Riddle | |
| 5,434,891 A | 7/1995 | Mery et al. | |
| 5,448,571 A | 9/1995 | Hong et al. | |
| 5,448,703 A | 9/1995 | Amini et al. | |
| 5,448,709 A | 9/1995 | Chandler et al. | |
| 5,469,548 A | 11/1995 | Callison et al. | |
| 5,497,494 A | 3/1996 | Combs et al. | |
| 5,504,757 A | 4/1996 | Cook et al. | |
| 5,507,002 A | 4/1996 | Heil | |
| 5,511,204 A | 4/1996 | Crump et al. | |
| 5,533,204 A | 7/1996 | Tipley | |
| 5,535,209 A | 7/1996 | Glaser et al. | |
| 5,543,853 A | 8/1996 | Haskell et al. | |
| 5,544,324 A | 8/1996 | Edem et al. | |
| 5,563,890 A | 10/1996 | Freitas | |
| 5,598,445 A | 1/1997 | Castano Pinto et al. | |
| 5,603,038 A | 2/1997 | Crump et al. | |
| 5,630,142 A | 5/1997 | Crump et al. | |
| 5,640,388 A | 6/1997 | Woodhead et al. | |
| 5,647,057 A * | 7/1997 | Roden et al. | 712/200 |
| 5,651,137 A * | 7/1997 | MacWilliams et al. | 711/141 |
| 5,689,660 A | 11/1997 | Johnson et al. | |
| 5,694,583 A | 12/1997 | Williams et al. | |
| 5,717,954 A | 2/1998 | Grieff et al. | |
| 5,737,744 A | 4/1998 | Callison et al. | |
| 5,768,622 A | 6/1998 | Lory et al. | |
| 5,778,218 A | 7/1998 | Gullick | |
| 5,796,961 A | 8/1998 | O'Brien | |
| 5,799,196 A | 8/1998 | Flannery | |
| 5,809,291 A | 9/1998 | Munoz-Bustamante | |
| 5,818,948 A | 10/1998 | Gulick | |
| 5,819,087 A | 10/1998 | Le et al. | |
| 5,838,932 A * | 11/1998 | Alzien | 710/314 |
| 5,870,567 A | 2/1999 | Hausauer et al. | |
| 5,878,237 A * | 3/1999 | Olarig | 710/309 |
| 5,918,026 A | 6/1999 | Melo et al. | |
| 5,940,493 A | 8/1999 | Williams | |
| 5,956,493 A | 9/1999 | Hewitt et al. | |
| 5,959,869 A | 9/1999 | Miller et al. | |
| 5,978,869 A | 11/1999 | Guthrie et al. | |
| 5,983,024 A * | 11/1999 | Fye | 710/36 |
| 5,996,036 A * | 11/1999 | Kelly | 710/110 |
| 5,999,533 A | 12/1999 | Peres et al. | |
| 6,018,810 A * | 1/2000 | Olarig | 714/43 |
| 6,052,754 A * | 4/2000 | Anand | 710/305 |
| 6,112,265 A * | 8/2000 | Harriman et al. | 710/40 |
| 6,266,731 B1 | 7/2001 | Riley et al. | |
| 6,557,068 B2 | 4/2003 | Riley et al. | |

OTHER PUBLICATIONS

21050 PCI-to-PCI Bridge, Brief Datasheet, Intel Corporation, 5 pages (Oct. 1998).
Peripherals: 82357 Integrated System Peripheral (ISP), Preliminary, Intel Corporation, cover page and pp. 1-207 through 1-290 (1990).
Universal Host Controller Interface (UHCI) Design Guide, Revision 1.1, Intel Corporation, pp. i through iv and pp. 1 through 42 (Mar. 1996).
Universal Serial Bus Specification, Revision 0.9, Compaq, Digital Equipment Corporation, IBM PC Company, Intel, Microsoft, NEC and Northern Telecom, pp. i through viii and pp. 1 through 111 (Apr. 13, 1995).
Universal Serial Bus Device Class Definition for Human Interface Devices, 0.99a Draft Revision, USB Implementers Forum, pp. i through vii and pp. 1 through 76 (Apr. 22, 1996).
PCI Local Bus Specification, Production Version, Revision 2.0, 1993 PCI Special Interest Group, pp. i through x and pp. 1 through 198 (Apr. 30, 1993).
Standards Project: P1394 IEEE Draft Standard for a High Performance Serial Bus, P1394, D8.Ov2, Institute of Electronics Engineers, Inc. (IEEE), pp. i through xxx and pp. 1 through 384 (Jul. 1995).
PCI-X Addendum to the PCI Local Bus Specification, Revision 1.0, 1999 PCI Special Interest Group, pp. 1 through 222 (Sep. 22, 1999).
PCI Bios Specification, Revision 2.1, PCI Special Interest Group, pp. 1 through iii and pp. 1 through 24 (Aug. 26, 1994).
PCI Mobile Design Guide, Version 1.1, 1994, 1998 PCI Special Interest Group, pp. 1 through 40, (Dec. 18, 1999).
PCI Local Bus Specification, Revision 2.2, 1992, 1993, 1995, 1998, Special Interest Group, pp. i through xx and pp. 1 through 302 (Dec. 18, 1998).
PCI Hot-Plug Specification, Revision 1.0, 1997 PCI Special Interest Group, pp. 1 through 38 (Oct. 6, 1997).
PCI Bus Power Management Interface Specification, Revision 1.1, 1997, 1998 PCI Special Interest Group, pp. 1 through 71 (Dec. 18, 1998).
Small PCI Specification, Version 1.5a Final, 1995, 1996 PCI Special Interest Group, pp. 1 through 56 (Dec. 23, 1996).
PCI-to-PCI Bridge Architecture Specification, Revision 1.1, 1994, 1998 PCI Special Interest Group, pp. 1 through 148 (Dec. 18, 1998).
Peripheral Component Interconnect (PCI), Revision 1.0 Specification, Intel Corporation, PCI Special Interest Group, 2 cover pages, pp. i through iii, and pp. 1 through 94 (Jun. 22, 1992).
PCI Specification, Ver. 2.1 (Jun. 1995).

* cited by examiner

Interoperability Matrix for Frequency and I/O Voltage

| Systems | | Conventional PCI Cards | | | Reg PCI Cards |
|---|---|---|---|---|---|
| | | 33 MHz (5V I/O) | 33 MHz (3.3V I/O or Universal) | 66 MHz (3.3V I/O or Universal) | 133 MHz (3.3V I/O or Universal) |
| Conventional. System | 33 MHz 10ns[2,3] | 33 (5V I/O) | 33 (5V I/O) | 33 (5V I/O) | 33 (5V I/O) |
| | 66 MHz 10ns[2,3] | | 33 | 66 | a)33[5] b)66 |
| Registered PCI System | 100 MHz 4ns[2] | | 33 | 66[4] | 100 |
| | 133 MHz 1.5ns[2] | | 33 | 66[4] | 133 |

Legend

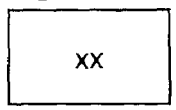
Conventional PCI system or expansion card operating in conventional mode.
xx = nominal clock frequency in MHz.

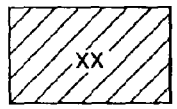
Registered PCI system and expansion card operating in Registered PCI mode.
xx = nominal clock frequency in MHz.

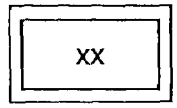
Most popular cases.

Fig. 53

Registered PCI Bridge Control Register

| Bit Location | Description |
|---|---|
| 0 | Enter Registered PCI Mode. (read/write)<br>The bridge controls whether the secondary bus goes into conventional or Registered PCI mode based on the state of this bit and the primary RST# and DEVSEL# pins. If primary RST# is asserted, the bridge asserts secondary RST#. If this bit is set and primary DEVSEL# is asserted while the primary bus is idle, the bridge asserts DEVSEL# on its secondary interface. At the rising edge of RST# the primary and secondary interfaces of the bridge enter conventional or Registered PCI mode based on the state of the associated DEVSEL#. If DEVSEL# is deasserted the interface enters conventional mode. If DEVSEL# is asserted, the interface enters PCI mode. If all devices on the secondary bus support Registered PCI System, configuration software sets this bit and then asserts RST#. See Section 6.3.2.<br><br>If software sets the Secondary Bus Reset bit in the bridge Control register (*see PCI-to-PCI Bridge Architecture specification*) and this bit is set, the bridge must keep secondary DELSEL# asserted before and after secondary RST# is asserted, according to the timing for mode switching described in Section 6.3. This bit in the bridge is cleared when primary RST# is asserted and primary DEVSEL# is deasserted. The bit is not affected if both primary RST# and primary DEVSEL# are asserted. An equivalent feature is required for host bridges. |
| 3-1 | Registered PCI Secondary Clock Frequency. (read-only)<br>This register allows configuration software to determine what frequency the bridge set the secondary bus to the last time RST# was asserted. This is the same information the bridge used to assert or float IRDY#, TRDY#, and STOP# the last time RST# and DEVSEL# were asserted to place the bus in Registered PCI mode.<br><br>Reg    Nominal Max Clock Frequency (MHz)    Minimum Clock Period (ns)<br>0    conventional mode<br>1    66    15<br>2    100    10<br>3    133    7.5<br>4    reserved    reserved<br>5    reserved    reserved<br>6    reserved    reserved<br>7    reserved    reserved<br>An equivalent feature is required for host bridges. |
| 4 | 32-bit Attribute Alias Protection. (read-only)<br>This bit is set by the bridge if it converts attributes from 32-bit devices on the secondary side of the bus to 64-bit attributes on the primary side. System configuration software uses this information to determine which 64-bit devices must have their Use 32-bit. Attribute bit set in the Registered PCI Command register. |
| 15-5 | Reserved |

Fig. 54

Registered PCI Command Register

| Bit Location | Description |
|---|---|
| 0 | Data Parity Error Recovery Enable. (read/write)<br>The device driver sets this bit to enable the device to attempt to recover from data parity errors. (See Section 5). If this bit is reset, the device asserts SERR# (if enabled) whenever the Master Data Parity Error bit (Status register, bit 8) is a 1.<br>State after RST# is 0. |
| 1 | Use Dual Address Cycle. (read/write)<br>If this bit is set and this device initiates a transaction with an address greater than 4 GB, this device will use a dual address cycle. If this bit is cleared, the device will use a single address cycle for all addresses. Necessary when addressing a device with a 32-bit bus. System configuration software sets this bit in all devices that reside on a bus containing at least one 32-bit device. See Section 2.14.2 for more details. If 32-bit devices are allowed by future versions of this specification, those devices must implement this bit as a read/write bit in configuration space, but ignore its value.<br>State after RST# is 0. |
| 2 | Use 32-bit Attribute. (read-only)<br>If this bit is set the device must set the upper 32-bits of all attributes to 0, when initiating a transaction. System configuration software sets this bit to prevent 64-bit attributes from aliasing in 32-bit devices. See Section 2.14.1 for more details.<br>State after RST# is 0. |
| 5-3 | Maximum Memory-Read Byte Count. (read/write)<br>This register limits the maximum byte count an initiator can request in a single memory-read transaction. It can be used to tune system performance. For example the size of Split Completion transactions can be limited to match the size of buffers in the host bridge or PCI-to-PCI bridges. For another example, the of byte-count memory-read transactions addressing a conventional device on the other side of a Registered PCI-to-PCI bridge can be limited to optimize prefetch behavior of the bridge.<br><br>Register Maximum Byte Count<br>0    128<br>1    256<br>2    512<br>3    1024<br>4    2048<br>5    4096<br>6    reserved<br>7    reserved<br><br>When RST# is asserted the device initializes this register to indicate the maximum byte count the device will use. |

Fig. 55a

Registered PCI Command Register

| Bit Location | Description |
|---|---|
| 8-6 | Maximum Outstanding Byte-Count Memory-Read Transactions. (read/write) This register limits the maximum number of byte-count memory-read transactions the device can have outstanding at one time. The count includes transactions terminated with Retry (possible outstanding Delayed Completion) and Split Response (outstanding Split Completion). It can be used to tune system performance.<br><br>Register    Maximum Outstanding<br>0    1<br>1    2<br>2    4<br>3    8<br>4    16<br>5    reserved<br>6    reserved<br>7    reserved<br><br>When RST# is asserted the device initializes this register to indicate maximum number of byte-count memory-read transactions the device will have outstanding. |
| 14-9 | Initiator Number. (read/write)<br>When a device initiates a transaction using Registered PCI protocol, the contents of this 6-bit register are inserted into the Initiator Number field in the transaction attributes. The initiator uses the Initiator Number and the Initiator Bus Number to associate a Split Completion on the bus with a Split Request from this initiator. (See Section 2.5 for a description of the attribute field).<br><br>Targets may optionally use the Initiator Number along with Initiator Bus Number and Sequence Number to optimize buffer management algorithms.<br><br>State after RST# is 0. |
| 23-15 | Reserved |
| 31-24 | Initiator Bus Number. (read/write)<br>When a device initiates a transaction using Registered PCI protocol, the contents of this 8-bit register are inserted into the Initiator Bus Number field in the transaction attributes. (See Section 2.5). An initiator uses the Initiator Number and Initiator Bus Number to associate a Split Completion on the bus with a Split Request from this initiator. PCI-to-PCI bridges also use them to determine whether to forward a Split Completion. (See the Section 2.12.1 for more information.)<br><br>Targets may optionally use the Initiator Bus Number along with Initiator Number and Sequence Number to optimize buffer management algorithms.<br><br>State after RST# is 0. |

Fig. 55b

Registered PCI Status Register

| Bit Location | Description |
|---|---|
| 3-0 | Registered PCI Version. (read/write)<br>This field indicates the revision of the Registered PCI Spec that was used to design the device.<br><br>Register Value      Registered PCI Spec version<br>0h                       1.0<br>1h-Fh               reserved |
| 4 | 64-bit Device. (read/write)<br>This bit is and indicates the size of the device's data bus. This version of the specification requires all devices to have a 64-bit data bus. Future versions of this specifications may allow 32-bit data buses. See Section 2.14 for a discussion of the use of this bit.<br>        0 = This device has a 32-bit data bus.<br>        1 = This device has a 64-bit data bus. |
| 5 | Split Completion Discarded. (read-only)<br>This bit is set if the device discards a Split Completion because the requester would not accept it. See Section 2.12.3 for details. Once set this bit will remain set until software writes a 1 to this location. State after RST# is 0<br>        0 = no transaction has been discarded.<br>        1 = a split completion has been discarded. |
| 6 | Unexpected Split Completion<br>This bit is set if unexpected Split Completion with the requester's Initiator Bus Number and Initiator Number is received. The requester identifies this exception when the Split Completion Sequence Number does not match any outstanding sequence number. The requester can optionally further qualify this exception by comparing the Byte-Count attribute or the transaction address. On the detection of an unexpected Split Completion, the requester must notify its device driver for service, if the devices driver can not be notified, then assert SERR#. Once set this bit will remain set until software writes a 1 to this location. State after RST# is 0<br>        0 = no lost Split Completion has been discarded<br>        1 = a lost Split Completion has been discarded, |
| 23-7 | Reserved |

Fig. 56

DEVICE ADAPTED TO SEND INFORMATION IN ACCORDANCE WITH A COMMUNICATION PROTOCOL

CROSS REFERENCE TO RELATED APPLICATION

This is a continuation of application Ser. No. 10/945,003 filed Sep. 20, 2004 and issued on Aug. 29, 2006 as U.S. Pat. No. 7,099,986 entitled High Speed Peripheral Interconnect Apparatus, Method and System, which is a continuation of application Ser. No. 10/424,896 filed Apr. 28, 2003 and issued on Nov. 9, 2004 as U.S. Pat. No. 6,816,934 entitled "COMPUTER SYSTEM WITH REGISTERED PERIPHERAL COMPONENT INTERCONNECT DEVICE FOR PROCESSING EXTENDED COMMANDS AND ATTRIBUTES ACCORDING TO A REGISTERED PERIPHERAL COMPONENT INTERCONNECT PROTOCOL", which is a continuation of application Ser. No. 09/747,422 filed on Dec. 22, 2000 and issued on Apr. 29, 2003 as U.S. Pat. No. 6,557,068 entitled "HIGH SPEED PERIPHERAL INTERCONNECT APPARATUS, METHOD AND SYSTEM", which is a continuation of application Ser. No. 09/148,042 filed on Sep. 3, 1998 and issued on Jul. 24, 2001 as U.S. Pat. No. 6,266,731 entitled "HIGH SPEED PERIPHERAL INTERCONNECT APPARATUS, METHOD AND SYSTEM."

This patent application is related to commonly owned U.S. patent application Ser. No. 08/873,636 filed on Jun. 12, 1997 and issued on May 23, 2000 as U.S. Pat. No. 6,067,590, entitled "DATA BUS AGENT INCLUDING A STORAGE MEDIUM BETWEEN A DATA BUS AND THE BUS AGENT DEVICE" by Dwight Riley and Christopher J. Pettey; and Ser. No. 08/873,420, filed on Jun. 12, 1997 and issued on Aug. 10, 1999 as U.S. Pat. No. 5,937,173, entitled "DUAL PURPOSE COMPUTER BRIDGE INTERFACE FOR ACCELERATED GRAPHICS PORT OR REGISTERED PERIPHERAL COMPONENT INTERCONNECT DEVICES" by Sompong Paul Olarig, Dwight D. Riley, and Ronald T. Horan, and are hereby incorporated by reference for all purposes.

TABLE OF CONTENTS

Background of the Invention
   Field of the Invention
   Description of the Related Technology Summary of the Invention Brief Description of the Drawings Detailed Description of the Preferred Embodiments
   I. Registered PCI Transaction Protocol
      A. Overview of Registered PCI
      B. Transaction Comparison Between Registered PCI and Conventional PCI
      C. Registered PCI Transaction Protocol
         1. Transaction Sequences
         2. Allowable Disconnect Boundaries (ADB) and Buffer Size
         3. Wait States
         4. Addressing, Byte-Enables, and Alignment
         5. Split Transactions
         6. Bus Width
         7. Source Sampling
         8. Compatibility and System Initialization
      D. Summary of Protocol Rules
         1. Basic Initiator Rules
         2. Basic Target Rules
         3. Bus Arbitration Rules
         4. Configuration Transaction Rules
         5. Parity Error Rules
         6. Bus Width Rules
      E. Registered PCI Command Encoding
      F. Registered PCI Extended Command Encoding
         1. Validated Extended Command
         2. Immediate Extended Command
      G. Registered PCI Attributes
      H. Byte-Count Transactions
         1. Writes
         2. Reads
      I. Byte-Enable Transactions
         1. Writes
         2. Reads
      J. Device Select Timing
         1. Writes
         2. Reads
      K. Wait States
         1. Writes
         2. Reads
      L. Configuration Transactions
      M. Delayed Transactions
      N. Split Transactions
         1. Basic Split Transaction Requirements
         2. Requirements for Accepting Split Completions
         3. Split Completion Exception Message
         4. Unexpected Split Completion Exceptions
      O. Transaction Termination
         1. Disconnect With Data
            a. Initiator Termination and Disconnection
            b. Target Disconnection
         2. Target Retry Termination
            a. Byte-Count Transactions
            b. Byte-Enable Transactions
         3. Split Response Termination
         4. Master-Abort Termination
            a. Byte-Count Transactions
            b. Byte-Enable Transactions
         5. Target-Abort Termination
            a. Byte-Count Transactions
            b. Byte-Enable Transactions
      P. Bus Width
         1. Data Transfer Width
         2. Address Width
      Q. Transaction Ordering and Deadlock-Avoidance
         1. Ordering and Passing Rules
         2. Required Acceptance Rules
      R. Transaction Sequence Combining and Re-ordering
   II. Arbitration
      A. Arbitration Signaling Protocol
         1. Starting a New Transaction
         2. REQ# and GNT# Requirements
      B. Arbitration Parking
   III. Registered PCI Bridge Design Issues
      A. Design Requirements for a Registered-PCI-to-Registered PCI Bridge
      B. Design Requirements for a Registered-PCI-to-Conventional PCI Bridge
      C. Bridge Error Handling
   IV. Error Functions
      A. Parity Generation
      B. Parity Checking C. Error Handling and Fault Tolerance
   1. Data Parity Exception
   2. Split Transaction Exceptions
V. Compatibility and System Initialization
  A. Device Requirements
  B. System Requirements
  C. Frequency and Mode Initialization Sequence
    1. Frequency and Mode Initialization Sequence in a Host Bridge
    2. Frequency and Mode Initialization Sequence in a PCI-to-PCI Bridge
    3. Hardware-Only Mode Switching Model
  D. Interoperability Matrix
  E. Hot Plug Events in a Registered PCI System
VI. Configuration Space
  A. Registered PCI ID
  B. Next Capabilities Pointer
  C. Registered PCI Bridge Control
  D. Registered PCI Command Register
  E. Registered PCI Status Register
  F. Memory Base Upper 32-Bits
  G. Memory Base Limit Upper 32-Bits
VII. Electrical Specification
  A. DC Specifications
  B. AC Specifications
  C. Maximum AC Ratings and Device Protection
  D. Timing Specification
    1. Clock Specifications
    2. Timing Parameters
    3. Measurement and Test Conditions
    4. Device Internal Timing Examples
  E. Clock Uncertainty
  F. Reset
  G. Pull-ups
  H. Noise Budget
    1. DC Noise Budget
    2. Transient Noise Budget
  I. System Timing
    1. Timing Budget
  J. Connector Pin Assignments
  K. Power
    1. Power Requirements
    2. Sequencing
    3. Decoupling
  L. Expansion Board Trace Length and Signal Loading
  M. Transmission Line Characteristics
VIII. Conventional PCI versus AGP 1.0 versus Registered PCI Protocol Rule Comparison
IX. Relaxed Ordering Rules
  A. Background
  B. System Topologies
    1. Data and Trigger Near Writer
    2. Data Near Writer, Trigger Near Reader
    3. Data and Trigger Near Reader
    4. Data Near Reader, Trigger Near Writer
  C. $I_2O$ Usage Models
    1. $I_2O$ Messaging Protocol Operation
    2. Message Delivery with the Push Model
    3. Message Delivery with the Pull Model
    4. Message Delivery with the Outbound Option
    5. Message Delivery with Peer to Peer
  D. Rule Summary and Simplification

BACKGROUND OF THE INVENTION

1. Field of the Invention

The present invention relates to computer systems using a bus bridge(s) to interface a central processor(s), memory and computer peripherals together, and more particularly, in utilizing a registered peripheral component interconnect bus, logic circuits therefor and signal protocols thereof.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("e-mail"), document databases, video teleconferencing, whiteboarding, integrated enterprise calendar, virtual engineering design and the like. Multiple network servers may also be interconnected by local area networks ("LAN") and wide area networks ("WAN").

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Digital Equipment Corporation, Cyrix, IBM and Motorola. These sophisticated microprocessors have, in turn, made possible running more complex application programs that require higher speed data transfer rates between the central processor(s), main system memory and the computer peripherals.

Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "peripheral Component Interconnect" or "PCI." A more complete definition of the PCI local bus may be found in the PCI Local Bus Specification, revision 2.1; PCI/PCI Bridge Specification, revision 1.0; the disclosures of which are hereby incorporated by reference. These PCI specifications are available from the PCI Special Interest Group, 2575 NE Kathryn St #17, Hillsboro, Oreg. 97124.

The PCI version 2.1 Specification allows for a 33 MHz or 66 MHz, 32 bit PCI bus; and a 33 MHz or 66 MHz, 64 bit PCI bus. The 33 MHz, 32 bit PCI is capable of up to 133 megabytes per second ("MB/s") peak and 50 MB/s typical; and the 66 MHz, 32 bit PCI bus, as well as the 33 MHz 64 bit PCI bus, are capable of up to 266 MB/s peak. The PCI version 2.1 Specification, however, only allows two PCI device cards (two PCI connectors) on a 66 MHz PCI bus because of timing constraints such as clock skew, propagation delay, input setup time and valid output delay. Typically, the 66 MHz PCI version 2.1 Specification requires the sourcing agent to use a late-arriving signal with a setup time of only 3 nanoseconds ("ns") to determine whether to keep the same data on the bus or advance to the next data, with a 6 ns maximum output delay. Current state of the art Application Specific Integrated Circuits ("ASIC") using 0.5 micron technology have difficulty meeting the aforementioned timing requirements. Even using the newer and more expensive 0.35 micron ASIC technology may be marginal in achieving the timing requirements for the 66 MHz PCI bus.

Since the introduction of the 66 MHz timing parameters of the PCI Specification in 1994, bandwidth requirements of peripheral devices have steadily grown. Devices are beginning to appear on the market that support either a 64-bit bus, 66 MHz clock frequency or both, with peak bandwidth capabilities up to 533 Mbytes/s. Because faster I/O technologies such as Gigabit Ethernet and Fiberchannel are on the horizon, faster system-interconnect buses will be required in the future.

When an industry outgrows a widely accepted standard, that industry must decide whether to replace the standard or to enhance it. Since the release of the first PCI Specification in 1992, the PCI bus has become ubiquitous in the consumer, workstation, and server markets. Its success has been so great that other markets such as industrial controls, telecommunications, and high-reliability systems have leveraged the specification and the wide availability of devices into specialty applications. Clearly, the preferred approach to moving beyond today's PCI Local Bus Specification is to enhance it.

What is needed is an apparatus, method, and system for a personal computer that provides increased data throughput between the personal computer system central processing unit(s), memory and peripherals that can operate at speeds significantly higher than today's PCI Specification allows. In addition, the present invention shall still be compatible with and be able to operate at conventional PCI speeds and modes when installed in conventional computer systems or when interfacing with a conventional PCI device(s) or card(s).

SUMMARY OF THE INVENTION

The present invention overcomes the above-identified problems as well as other shortcomings and deficiencies of existing technologies by providing in a computer system a registered peripheral component interconnect bus, logic circuits therefor and signal protocols thereof. In the present invention, hereinafter referenced as Registered PCI ("RegPCI"), all signals are sampled on the rising edge of the PCI bus clock and only the registered version of these signals are used inside the RegPCI devices. In the current PCI 2.1 Specification, there are many cases where the state of an input signal setting up to a particular clock edge affects the state of an output signal after that same clock edge. This type of input-output signal behavior is not possible in a registered interface, thus RegPCI introduces the concept of a clock-pair boundary which replaces some single-clock-edges where control signals change. Timing on the RegPCI bus is not as critical as the aforementioned 66 MHz PCI 2.1 Specification, even when the RegPCI bus runs faster than 133 MHz. The RegPCI allows PCI bus operation with more than two PCI device cards.

RegPCI allows for higher clock frequencies such as, for example, 133 MHz in a fully backward-compatible way. RegPCI devices may be designed to meet Registered PCI requirements and still operate as conventional 33 MHz and 66 MHz PCI devices when installed in legacy computer systems. Similarly, if conventional PCI devices are installed in a RegPCI bus, the clock remains at a frequency acceptable to the conventional device, and other devices are restricted to using conventional protocol when communicating with the conventional device. It is expected that this high degree of backward compatibility will enable the gradual migration of systems and devices to bandwidths in excess of 1 Gbyte/s.

In the present invention, numerous combinations in control fields are reserved for new features. One such feature, Double Data Rate, has important application for the embedded controller designs and small slot-based systems. For that reason, control fields and signal protocols have been reserved for its implementation.

In the present invention, the peripheral component interconnect (PCI) specification is used as a baseline for an extended set of commands and attributes. As with conventional PCI, a command is issued on a given clock cycle on the C/BE# portion of the PCI bus. The extended command and the attribute are issued on the PCI bus during the clock cycle immediately after the clock cycle when the initial command was issued. The second (extended) command is issued on the C/BE# portion of the PCI bus. The attribute is issued on the AD portion of the PCI bus. The extended commands and attributes utilize the standard pin connections of conventional PCI devices and buses making the present invention backward-compatible with existing (conventional) PCI devices and legacy computer systems.

The conventional PCI command encoding is modified and the extended command is used to qualify the type of transaction and the attributes being used by the initiator of the transaction. The extended commands are divided into four groups based upon the transaction type and the extended command type. Transactions are either byte count or byte-enable transaction types. Extended command types are either validated or immediate. Extended command types define a path for the addition of new extended commands in the future. The extended commands establish a behavior for current devices when they encounter a reserved extended command. Reserved extended command encodings can be assigned in the future to new extended commands that will behave predictably with legacy devices. The attribute field is a 64-bit field that further defines and describes the transaction. The attributes appear in the clock following the address phase on the AD bus, contemporaneous with the issuance of the second (extended) command.

An embodiment of the invention contemplates a multiple use core logic chip set which may be one or more integrated circuit devices such as an Application Specific Integrated Circuit ("ASIC"), Programmable Logic Array ("PLA") and the like. RegPCI device(s) may be embedded on the computer system motherboard, or may be on a separate card(s) which plugs into a corresponding card edge connector(s) attached to the system motherboard and connected to the core logic chip set through the RegPCI bus.

According to the PCI specification, including Registered PCI, all PCI devices shall implement a base set of configuration registers. The PCI device may also implement other required or optional configuration registers defined in the PCI specification. The PCI specification also defines configuration registers and information to be contained therein for a PCI compliant device so as to indicate its capabilities and system requirements. Once the information for all of the bus devices are determined, the core logic may be configured as an additional RegPCI bus interface by the startup software. This software also determines whether the PCI devices operate at 33 MHz or 66 MHz, have a 64 bit or 32 bit address and data bus, and if the PCI devices are RegPCI compliant.

Other and further features and advantages will be apparent from the following description of presently preferred embodiments of the invention, given for the purpose of disclosure and taken in conjunction with the accompanying drawings.

BRIEF DESCRIPTION OF THE DRAWINGS

FIG. 5, comprising

FIG. 6, comprising

FIG. 7, comprising

FIG. 8, comprising FIGS. 8 and 8b, is a schematic timing diagram of a Byte-Count Memory-Read Transaction with Target Initial Wait States according to the present invention.

FIG. 53 is a table of the Interoperability Matrix for Frequency and II/O Voltage according to the present invention;

FIG. 54 is a table of the Registered PCI Bridge Control Register according to the present invention;

FIG. 55a and FIG. 55b are tables of the Registered PCI Command Register according to the present invention;

FIG. 56 is a table of the Registered PCI Status Register according to the present invention;

DETAILED DESCRIPTION OF THE PREFERRED EMBODIMENTS

Figure 1:
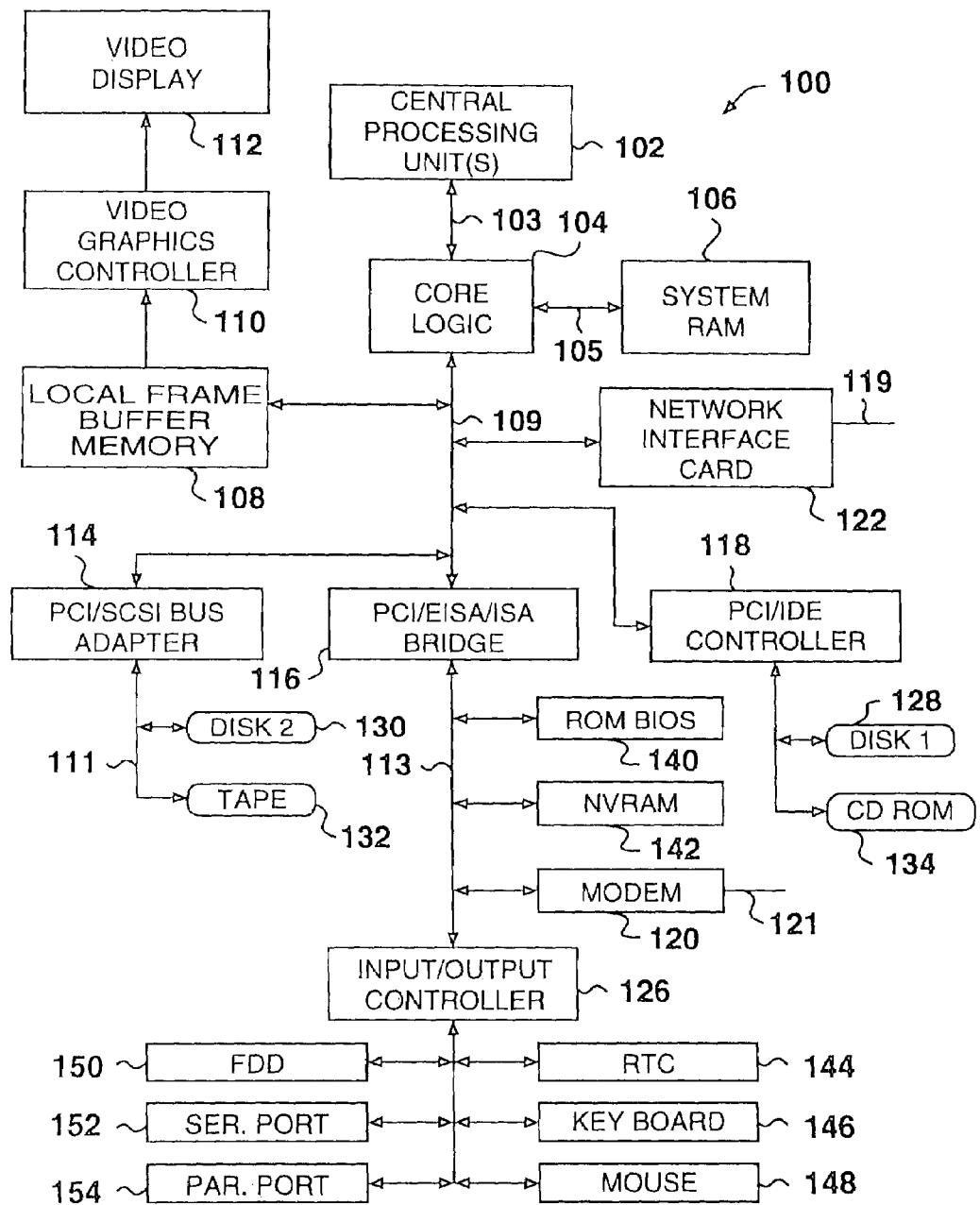
FIG. 1 is a schematic block diagram of a computer system.

The present invention is an apparatus, method and system for providing in a computer system a registered peripheral component interconnect (hereinafter "Registered PCI" or "RegPCI") bus(es), logic circuits therefor and signal protocols thereof.

For illustrative purposes, the preferred embodiments of the present invention are described hereinafter for computer systems utilizing the Intel x86 microprocessor architecture and certain terms and references will be specific to that processor platform. RegPCI, however, is hardware independent and may be utilized with any host computer designed for this interface standard. It will be appreciated by those skilled in the art of computer systems that the present invention may be adapted and applied to any computer platform utilizing the RegPCI interface standard.

Referring to the drawings, the details of preferred embodiments of the present invention are schematically illustrated. Like elements in the drawings will be represented by like numbers, and similar elements will be represented by like numbers with a different lower case letter suffix.

Referring to FIG. 1, a schematic block diagram of a computer system according to the present invention is illustrated. The computer system is generally indicated by the numeral 100 and comprises a central processing unit(s) ("CPU") 102, core logic 104, system random access memory ("RAM") 106, a video graphics controller 110, a local frame buffer 108, a video display 112, a RegPCI/SCSI bus adapter 114, a Reg-PCI/EISA/ISA bridge 116, a PCI/IDE controller 118, and, optionally, a network interface card ("NIC") 122. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

The CPU(s) 102 is connected to the core logic 104 through a CPU host bus 103. The system RAM 106 is connected to the core logic 104 through a memory bus 105. The core logic 104 includes a host-to-PCI bridge between the host bus 103, the memory bus 105 and a RegPCI bus 109. More than one RegPCI bus is contemplate herein as well as RegPCI-to-RegPCI bridges (not illustrated), and is within the scope and intent of the present invention. The local frame buffer 108 is connected between the video graphics controller 110 and the RegPCI bus 109. The RegPCI/SCSI bus adapter 114, RegPCI/EISA/ISA bridge 116, RegPCI/IDE controller 118 and the NIC 122 are connected to the RegPCI bus 109. Some of the RegPCI devices such as the Video controller 110 and NIC 122 may plug into PCI connectors on the computer system 100 motherboard (FIG. 2).

Hard disk 130 and tape drive 132 are connected to the RegPCI/SCSI bus adapter 114 through a SCSI bus 111. The NIC 122 may be connected to a local area network 119. The RegPCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, serial port 152, and parallel port 154. The EISA/ISA bus 113 is a slower information bus than the RegPCI bus 109, but it costs less to interface with the EISA/ISA bus 113.

When the computer system 100 is first turned on, start-up information stored in the ROM BIOS 140 is used to begin operation thereof. Basic setup instructions are stored in the ROM BIOS 140 so that the computer system 100 can load more complex operating system software from a memory storage device such as the disk 130. Before the operating system software can be loaded, however, certain hardware in the computer system 100 shall be configured to properly transfer information from the disk 130 to the CPU 102. In the computer system 100 illustrated in FIG. 1, the RegPCI/SCSI bus adapter 114 shall be configured to respond to commands from the CPU 102 over the RegPCI bus 109 and transfer information from the disk 130 to the CPU 102 via buses 109 and 103. The RegPCI/SCSI bus adapter 114 is a RegPCI device and remains platform independent. Therefore, separate hardware independent commands are used to setup and control any RegPCI device in the computer system 100. These hardware independent commands, however, are located in a RegPCI BIOS contained in the computer system ROM BIOS 140. The RegPCI BIOS is firmware that is hardware specific but meets the general PCI specification incorporated by reference herein. Plug and play, and PCI devices (both PCI and RegPCI) in the computer system are detected and configured when a system configuration program is executed. The results of the plug and play, and RegPCI device configurations are stored in the NVRAM 142 for later use by the startup programs in the ROM BIOS 140 and PCI BIOS which configure the necessary computer system 100 devices during startup. Also during startup a "built-in-self-test" (BIST) may do diagnostic testing of components, such as RegPCI devices, in the computer system.

Figure 2:
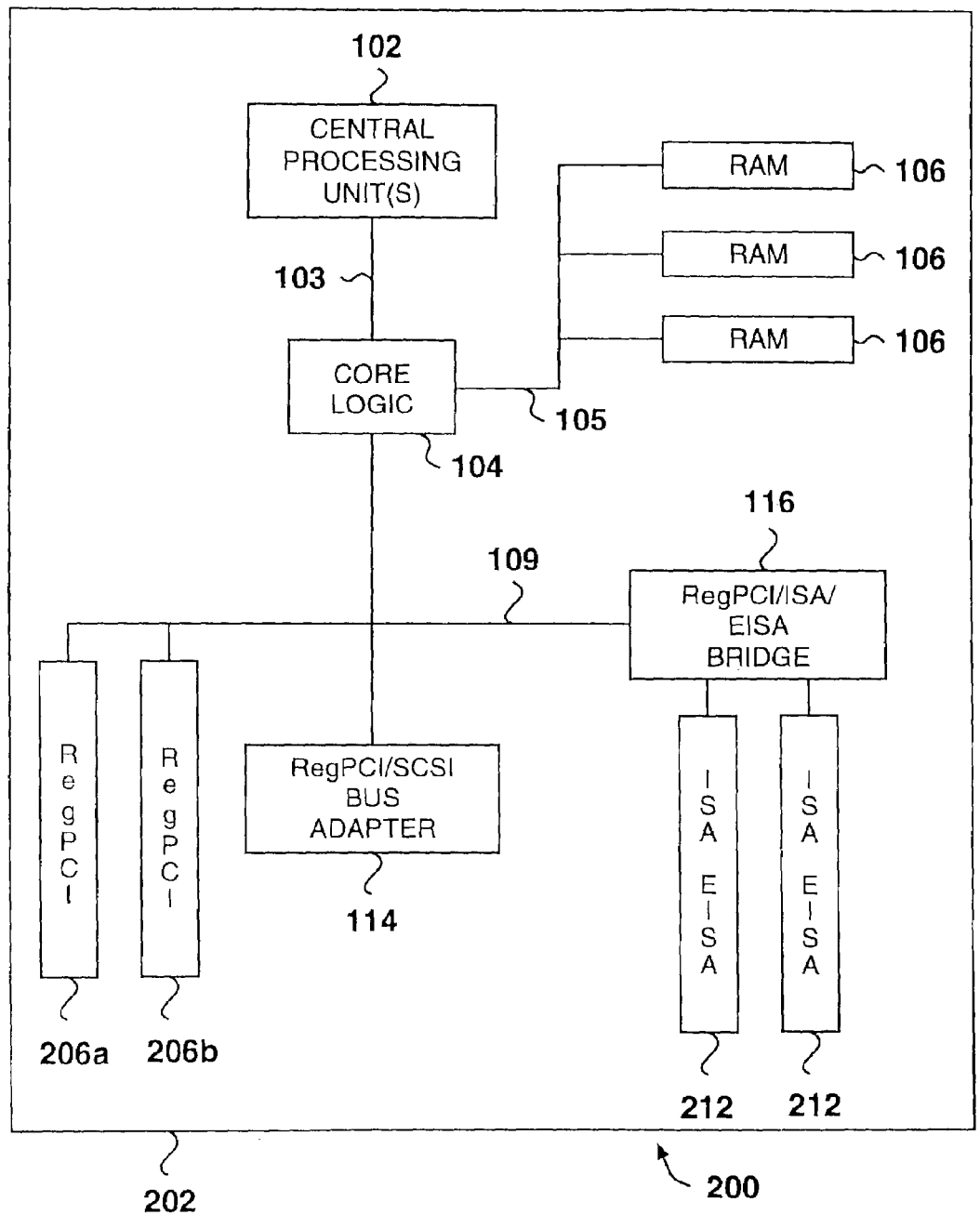
FIG. 2 is a schematic diagram in plan view of a printed circuit motherboard of the computer system of FIG. 1.

Referring now to FIG. 2, a schematic diagram of a computer system motherboard according to FIG. 1 is illustrated in plan view. The computer system motherboard 200 comprises printed circuit board 202, on which components and connectors are mounted thereto. The printed circuit board 202 comprises conductive printed wiring which is used to interconnect the components and connectors thereon. The conductive printed wiring (illustrated as buses 103, 105 and 109) may be arranged into signal buses having controlled impedance characteristics. Illustrated on the printed circuit board are the core logic 104, CPU(s) 102, RAM 106, embedded RegPCI/ISA/EISA bridge 116, ISA/EISA connectors 312, embedded RegPCI/SCSI bus adapter 114, and PCI connectors 206a, 206b. The motherboard 200 may be assembled into a case with a power supply, disk drives, etc., (not illustrated) which comprise the computer system 100 of FIG. 1.

I. Registered PCI Transaction Protocol

A. Overview of Registered PCI

According to the present invention, Registered PCI introduces several major enhancements to the PCI Specification as follows:

1. Higher clock frequencies such as, for example, 133 MHz.
2. Signaling protocol changes to enable registered outputs and inputs, that is, device outputs that are clocked directly out of a register and device inputs that are clocked directly into a register. Signal switching is generally restricted such that devices can signal 2 clocks before an expected response from other devices with the least impact to bus performance.
3. New information passed with each transaction that enables more efficient buffer 2a, management schemes.
    Each new transaction identifies the total number of bytes that will be read or written, even if the transaction is disconnected and continued later.
    Each transaction includes the identity of the initiator (Initiator Number), the initiator's bus segment (Bus Number) and transaction sequence (or "thread") to which it belongs (Sequence Number).
    An extended command field further qualifies each transaction.
4. Restricted wait state and disconnection rules optimized for more efficient use of the bus and memory resources. For example:
    Initiators are not permitted to insert wait states
    Targets are not permitted to insert wait states after the initial data phase.
    Both initiators and targets are permitted to disconnect transactions only on naturally aligned boundaries such as, for example, 128-byte boundaries. This encourages longer bursts and enables more efficient use of cacheline-based resources such as the host bus and main memory.
5. Memory read transactions can be completed using Split Transaction protocol. The target of the transaction terminates the request with a special Split Response Termination, executes the command, and initiates its own Split Completion transaction to send the data back to the original initiator. Initiators are required to support Split Transactions on all memory reads that use byte-count protocol. A Split Transaction is a new transaction type, more fully described hereinbelow, that enables memory-read transactions to use the bus almost as efficiently as memory-write transactions. It also enables more efficient data buffer management by reserving buffer space in the requester rather than in the completer of a memory-read transaction. Targets have the option of supporting Split Transactions.

Each Registered PCI transaction may include, for example but not limitation, a 4-bit extended command and a 64-bit attribute that carry additional information about the transaction. This information includes:

The byte count of an entire initiator operation. An initiator operation may span multiple bus transactions. The initial transaction of each operation is marked so the target knows when to flush buffers containing state data. Target devices of read operations can use this information to optimize prefetch and buffer management algorithms.

Initiator and Operation ID. Each initiator identifies its bus operations (transactions) so complex target devices (such as host bridges) can utilize their buffer management algorithms to optimize the service to individual streams of operations from each master.

Split Transaction information. If the initiator requests a long read from memory and the target is capable of splitting the transaction, the target will terminate the transaction in a special way, fetch the requested read data, and initiate its own Split Completion transaction to transfer the data back to the original initiator. Split transactions are optional on all other transactions except memory writes, which are posted.

The disclosure of the present invention includes a detailed specification of the Registered PCI enhancements to the PCI Local Bus as specified in the PCI Specification, Revision 2.1 incorporated by reference herein. The PCI specification Rev. 2.1 is available from the PCI Special Interest Group, 2575 NE Kathryn St #17, Hillsboro, Oreg. 97124. Requirements of RegPCI that are the same as the conventional PCI Specification, Revision 2.1, are generally not discussed herein.

The following terms and abbreviations disclosed in Table 1 below are generally used hereinafter.

TABLE 1

Terms and Abbreviations

| Term | Definition |
| --- | --- |
| Allowable Disconnect Boundary (ADB) | The initiator and target are permitted to disconnect byte-count transactions only on naturally aligned 128-byte boundaries called Allowable Disconnect Boundaries. |
| attribute | The 64-bit field asserted on AD[63:0] during the attribute phase of a Registered PCI transaction. Used for further definition of the transaction. |
| byte-count transaction | A memory-read or memory-write transaction using a byte-count extended command. As the name implies, byte-count transactions use the byte-count field in the attributes. The byte-enable bus is reserved during byte-count transactions. Byte-count transactions contain one or more data phases, and FRAME# remains asserted after IRDY# asserts. The target of a byte-count memory-read transaction shall complete it in one of five ways: Retry (temporarily), immediate completion, Delayed Transaction, Split Transaction, or Target Abort. The target of a byte-count memory-write transaction is permitted to complete it in one of three ways: Retry (temporarily) immediate completion (posting), or Target Abort. Byte-count transactions shall address prefetchable memory locations. |
| byte-enable transaction | A transaction that uses a byte-enable extended command. Byte-enable transactions are limited to 32-bit data transfers. Transactions using the Configuration Read, Configuration Write, I/O Read and I/O Write commands always use the Byte Enable extended command. Transactions using Memory Read and Memory Write commands optionally use a byte-enable extended command if the transaction affects only a single DWORD. As the name implies, byte-enable transactions use the byte enable bus to control addressing within a single DWORD. The byte-count field in the attributes is reserved during byte-enable transactions. Byte-enable transactions always contain a single data phase, and FRAME# always deasserts when IRDY# asserts. The target of all byte-enable transaction except memory writes shall complete the transaction in one of four ways: Retry (temporarily), immediate completion, Delayed Transaction, or Target-Abort. The target of a byte-enable memory-write transaction is permitted to complete it in one of three ways: Retry (temporarily), immediate completion (posting), or Target-Abort. Byte-enable transactions may not be completed as Split Transactions. |
| completer | The target of a byte-count memory read transaction that is terminated with a Split Response. The completer becomes the initiator of the subsequent Split Completion. A PCI-to-PCI bridge that uses Split Transactions to forward a byte-count memory read acts as a completer on the originating bus and a requester on the destination bus. |
| device | A component of a PCI system that connects to a PCI bus. As defined by the PCI Specification, a device can be a single function or a multifunction device. All devices shall be capable of responding as a target to some transactions on the bus. Many devices are also capable of initiating transactions on the bus. All Registered PCI devices shall support the 64-bit AD bus. |
| extended command | The 4-bit field asserted on C/BE#[3:0] during the attribute phase of a Registered PCI transaction. This is used for further qualification of the type of command the initiator is attempting. |
| initiator | A device that initiates a transaction on the bus by requesting the bus, asserting FRAME#, and asserting the command and address. A bridge forwarding a transaction will be an initiator on the destination bus. |
| Sequence | One or more transactions that result from a single byte-count transaction being disconnected (either by the initiator or target) and later continued. |

TABLE 1-continued

Terms and Abbreviations

| | |
|---|---|
| | The initiator marks the first transaction of a Sequence by setting the Initial Sequence Request attribute bit. Each transaction in the same Sequence carries the same Sequence ID. Data for an entire read Sequence are guaranteed to be valid at the time the initiator issues the original byte-count memory-read transaction. Hardware buffer management algorithms are permitted to prefetch read data up to the byte count and hold it indefinitely (not flush buffers) until accepted by the initiator. (See Section I. (C)(1), Transaction Sequences hereinbelow for more details.) |
| Sequence ID | The combination of the Initiator Bus Number, Initiator Number, and Sequence Number attributes. This combination uniquely identifies a transaction that resulted from the disconnection of a single byte-count transaction. Used in buffer-management algorithms and some ordering rules. |
| requester | Initiator of a byte-count memory read transaction that is terminated with a Split Response. The requester becomes the target of the subsequent Split Completion. When servicing a Split Transactions a PCI-to-PCI bridge acts as a completer on the originating bus and a requester on the destination bus. |
| Split Completion | When used in the context of the bus protocol, this term refers to a special transaction, by which the completer writes the requested data back to the requester. The Split Completion begins with the same address, command, attributes, and byte count as the corresponding Split Request, and changes the extended command to Split Completion. The completer is permitted to set or clear the Disconnect on First ADB attribute bit, regardless of the state of the bit in the Split Request. If the Split Completion is disconnected before the byte count is satisfied, the completer adjusts the address and byte count for the data already transferred, when the Split Completion continues. When used in the context of transaction ordering and the transaction queues inside the requester and completer, the term refers to a queue entry corresponding to a Split Completion transaction on the bus. |
| Split Request | When used in the context of the bus protocol, this term refers to a byte-count memory read transaction terminated with a Split Response. When used in the context of transaction ordering and the transaction queues inside the requester and completer, the term refers to a queue entry corresponding to a Split Request transaction on the bus. When the completer executes the Split Request it becomes a Split Completion. |
| Split Response | Special protocol for terminating a byte-count memory read transaction, whereby the target indicates that it will complete the transaction as a Split Transaction. |
| Split Transaction: | A byte-count memory read transaction terminated by the target with a Split Response, and later completed with a Split Completion. |
| Target | A device that responds to bus transactions. A bridge forwarding a transaction will be the target on the originating bus. |
| Transaction | A single sequence of address and data phases associated with a single assertion of FRAME#. |

B. Transaction Comparison Between Registered PCI and Conventional PCI

Figure 3:
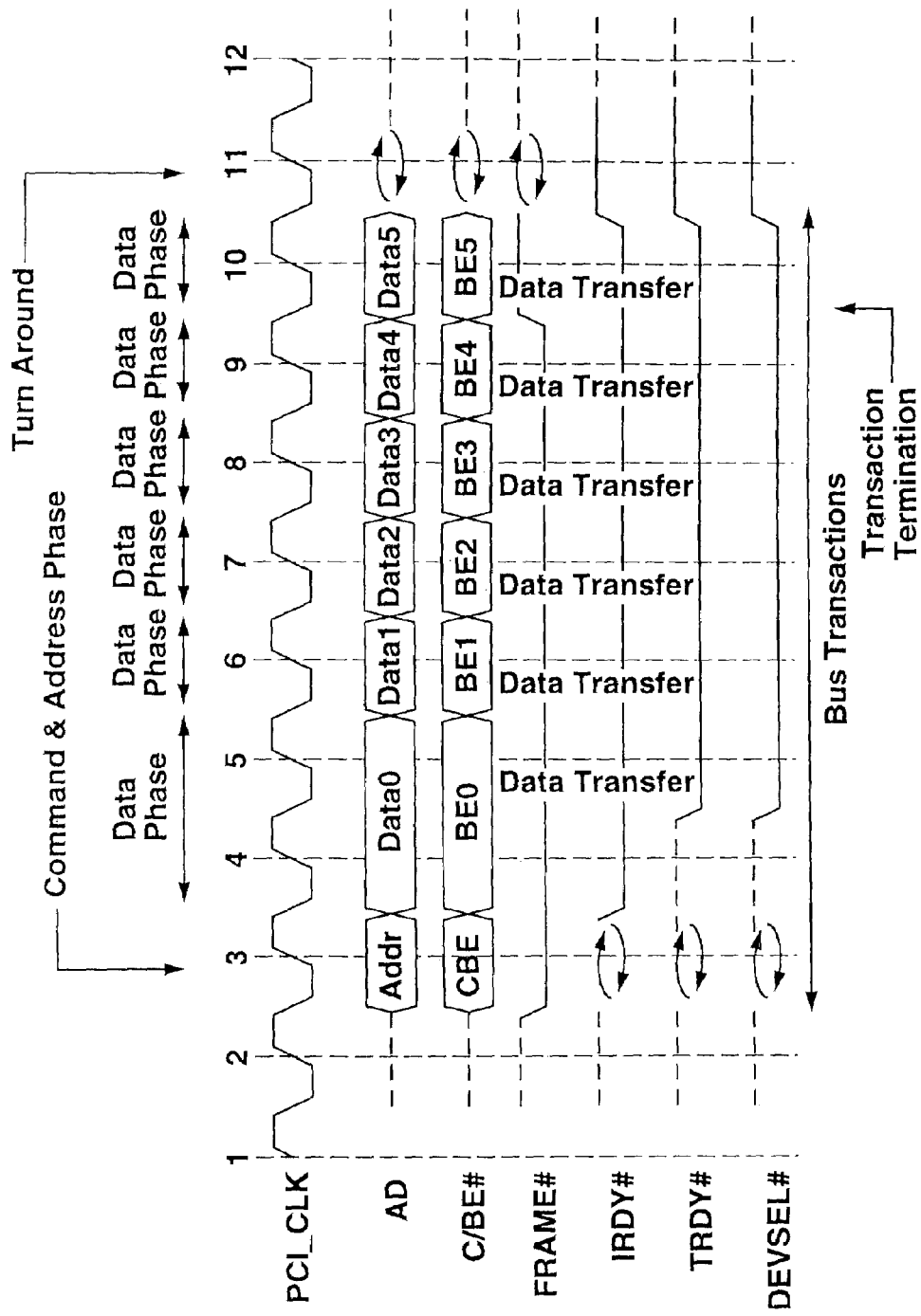
FIG. 3 is a schematic timing diagram of a conventional (prior art) PCI write transaction.
Figure 4:
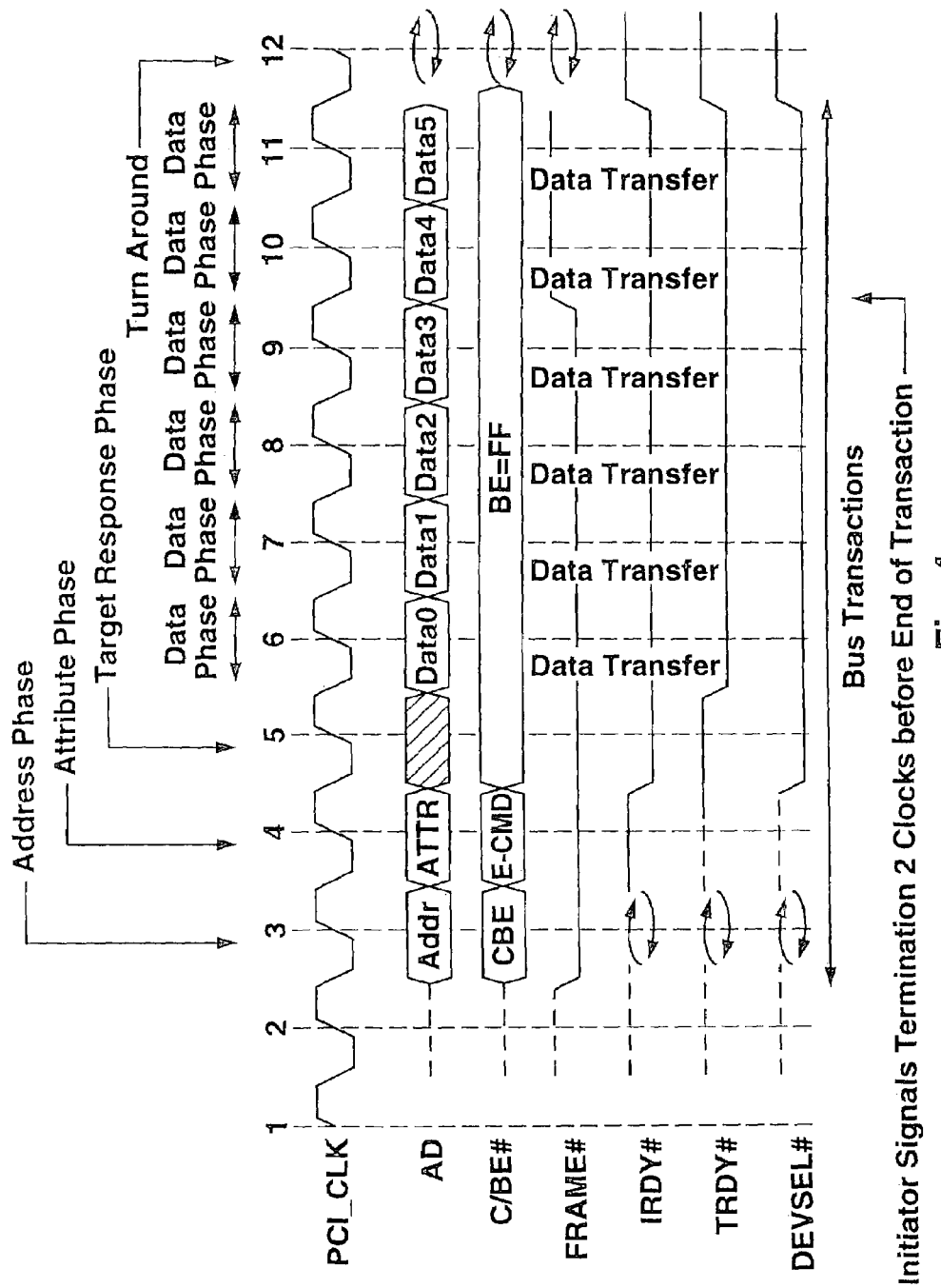
FIG. 4 is a schematic timing diagram of a Registered PCI write transaction according to the present invention.

Referring now to FIGS. 3 and 4, a typical conventional PCI write transaction (FIG. 3) and a typical Registered PCI write transaction (FIG. 4) are compared. Both FIGS. 3 and 4 illustrate a write transaction with identical device selection timing and wait states, and six data phases.

FIG. 3 illustrates a typical conventional PCI write transaction with six data phases. The initiator and target do not insert any wait states, and the transaction completes in 9 clocks, including the bus turn-around. Table 2 lists the phase definitions for the conventional PCI bus transactions as illustrated in FIG. 3.

TABLE 2

Conventional PCI Bus Transactions Phase Definitions

| Conventional PCI Phases | Description |
|---|---|
| Address & Command Phase | 1 clock for SAC, 2 clocks for DAC. |
| Data Phase | The clocks (after the address phase) where data transfer takes place. |
| Turn-Around | Idle clock for changing from one bus owner to another. |

FIG. 4 illustrates a Registered PCI write transaction with six data phases, according to the present invention. The initiator and target do not insert wait states, and the transaction completes in 10 clocks, including the bus turn-around. FIGS. 3 and 4 illustrate the similarities between conventional PCI and Registered PCI. The protocol differences have been kept to a minimum to lessen the effect of the change on designs and on tools for designing and debugging.

FIGS. 3 and 4 also illustrate the effect of Registered PCI protocol on the length of the transaction. Both transactions show the target responding by asserting DEVSEL# two clocks after FRAME and moving a total of six data phases.

The transaction takes 9 clocks for conventional PCI and 10 clocks for Registered PCI. Table 3 lists the transaction phases of Registered PCI as illustrated in FIG. 4.

TABLE 3

Registered PCI Bus Transactions Phase Definitions

| Registered PCI Transaction Phases | Description |
| --- | --- |
| Address Phase | 1 clock. See Section I. (C)(6), Bus Width hereinbelow for dual address support in Registered PCI |
| Attribute Phase | 1 clock phase. This phase is required for all Registered PCI transactions and is used for further qualification of the type of transaction in progress. |
| Target Response Phase | 1 or more clock phases when the target claims the transaction by asserting DEVSEL# (also used but not named in conventional PCI). |
| Data Phase | The clock phases where data transfer takes place. Once the Target Response Phase has been negotiated and data transfer starts, data is transferred until either the byte count is satisfied or either the target or the initiator signals Disconnect-with-data to terminate the transaction early. |
| Turn-Around | Idle clock between transactions for changing from one bus driver to another. |

C. Registered PCT Transaction Protocol

According to the present invention, Registered PCI includes two basic transaction types, byte-enable transactions and byte-count transactions. Byte-enable transactions are limited to a single data phase, use the AD bus during the address phase and the byte enable bus during the data phase to control which bytes in the AD bus are part of the transaction. The initiator always deasserts FRAME# and asserts IRDY# one clock after the attribute phase for byte-enable transactions.

Byte-count transactions include one or more data phases and use the address bus during the address phase and byte count during the attribute phase to control which bytes in the AD bus are part of the transaction. The initiator leaves FRAME# asserted and asserts IRDY# one clock after the attribute phase for byte-count transactions.

Only memory transactions use byte-count transactions. All other transactions shall use byte-enable rules. Table 4 lists performance enhancements of byte-count transactions compared to byte-enable transactions.

TABLE 4

Comparison of Byte-Count Transactions over Byte-Enable Transactions

| Byte Count | Byte Enable |
| --- | --- |
| Starting address specified on AD bus down to a byte address (includes AD[2:0]). | Starting address specified on AD bus down to a byte address (includes AD[2:0]). |
| Supports only sequential burst order. | Supports only single data phase transactions. |
| Byte count in the attribute field determines how many bytes to transfer. Byte enable bus is not used (reserved) during data phases. All bytes from the starting address through the byte count shall be transferred. | Byte enables identify which bytes to transfer (same as conventional PCI). |
| The initiator shall permit memory-read transactions to be completed as a Split Transaction. (Optional for targets.) | Split Transactions not allowed. |
| 64-bit data transfers | 32-bit data transfers |
| Memory commands only | All commands |

1. Transaction Sequences

A Sequence is one or more transactions that result from a single byte-count transaction being disconnected (either by the initiator or target) and later continued. Both the target and the initiator are permitted to disconnect a byte-count transaction, resulting in its being broken into multiple transactions. (See Section I. (C)(2), Allowable Disconnect Boundaries (ADB) and Buffer Size hereinbelow.) When the initiator begins a new Sequence, it sets the Initial Sequence Request attribute in the first transaction.

Each transaction in the same Sequence carries the same unique Sequence ID (i.e. same Initiator Number, Initiator Bus Number, and Sequence Number). If an initiator issues a second byte-count memory-read transaction before a previous one has been completed, the initiator is required to use a different Sequence Number. (The target might terminate any byte-count memory-read transaction with Split Response and complete the transaction as a Split Transaction.)

Data for an entire read Sequence are guaranteed to be valid at the time the initiator issues the original byte-count memory-read transaction. If a target uses Delayed Transactions to execute a byte-count memory read transaction, the targets hardware buffer management algorithms are permitted to prefetch read data up to the byte count and hold it indefinitely (not flush buffers) until accepted by the initiator. (See Section I. (C)(2), Allowable Disconnect Boundaries (ADB) and Buffer Size hereinbelow for more details.) Registered PCI initiators are required to repeat transactions terminated with Retry until the entire byte count is taken. An initiator cannot be reset by its device driver if an incomplete Sequence is outstanding.

2. Allowable Disconnect Boundaries (ADB) and Buffer Size

Registered PCI defines an Allowable Disconnect Boundary (ADB) as a naturally aligned 128-byte address; that is, an address whose lower 7 bits are zeros. After a byte-count data transfer starts, it can only be stopped in one of the following ways: a target or initiator disconnection at an ADB, or the transaction byte count is satisfied.

If a device operation is prematurely disconnected (that is, a transaction stops on an ADB before moving the entire requested byte count), a subsequent transaction shall be generated to complete the device operation. (A subsequent transaction is a transaction with the Initial Sequence Request bit, AD Bus Bit Position AD[0]) cleared in the attribute field, more fully described in Section I. (G), Registered PCI Attributes hereinbelow.)

Registered PCI protocol allows a transaction to start on any byte address. Both the initiator and the target are permitted to disconnect a byte-count transaction on any ADB. Therefore the minimum buffer size that both the initiator and target shall use is 128 bytes. Less data may be transferred on any particular transaction if the starting address is between two ADBs, or if the byte count is satisfied between two ADBs.

3. Wait States

Registered PCI initiators are not permitted to insert wait states on any data phase. Registered PCI targets are permitted to insert initial wait states in pairs of clocks (up to a maximum). No wait states are allowed on subsequent data phases. See Section I. (K), Wait States hereinbelow for details.

4. Addressing, Byte-Enables, and Alignment Registered PCI allows transactions to begin and end on any byte address. As in conventional PCI, transactions are naturally aligned to byte lanes. That is, any address for which AD[2:0] is 0 uses byte lane 0. Any address for which AD[2:0] is 1 uses byte lane 1, etc.

Byte-enable transactions are similar to conventional PCI in that the byte enables indicate which bytes in the AD bus are included in the transactions. Like conventional PCI I/O transactions, the AD bus (including AD[1:0]) for all byte-enable transactions address the starting byte of the transaction.

For byte-count transactions the initiator uses the full address bus to indicate the starting byte address (including AD[2:0]). The initiator also includes the Operation Byte Count in the attribute field. The byte enables are reserved and deasserted (logic level high) throughout a byte-count transaction. All bytes from the starting address through the end of the byte count are included in the transaction or subsequent continuations of the transaction. (The byte count will sometimes span more that one transaction. See Section I. (G), Registered PCI Attributes hereinbelow.)

5. Split Transactions

Split Transactions enable byte-count memory-read transactions to use the bus almost as efficiently as byte-count memory-write transactions. Byte-count memory-read transactions are the only transactions that can be completed using Split Transactions. Byte-count memory-write transactions are posted. Byte-enable transactions cannot be split; they use Delayed Transactions (if not completed immediately).

A Split Transaction starts when an initiator (called the requester) initiates a memory-read transaction (called the Split Request) using the a byte-count extended command. If a target that supports Split Transactions (called the completer) is addressed by such a transaction, it signals a Split Response termination by using a special signaling handshake more fully described under Section I. (O)(1)(c), Split Response Termination hereinbelow. The completer then fetches the number of bytes specified by the byte count in the Split Request, or fetches up to a convenient ADB before reaching the byte count. The completer then asserts its REQ# signal to request the bus. When the arbiter asserts GNT# to the completer, the completer initiates a Split Completion transaction to send the requested read data to the requester. Notice that for a Split Completion transaction the requester and the completer switch roles. The completer becomes the initiator of the Split Completion transaction, and the requester becomes the target.

6. Bus Width

According to the present invention, all Registered PCI devices are required to support the 64-bit address and data bus. However, it is contemplated and within the scope of the present invention to implement and support the 32-bit address and data bus.

Conventional PCI includes requirements to enable 32-bit and 64-bit devices to operate together. Since Registered PCI devices shall operate as conventional devices when installed in conventional systems, and to minimize changes when converting a conventional PCI design to Registered PCI, most of the bus-width rules are the same for conventional and Registered PCI. For example, only memory transactions use 64-bit data transfers. All other transactions use 32-bit data transfers.

Requirements stated herein generally assume all devices support a 64-bit bus. It is contemplated and within the scope of the invention, as more fully disclosed under Section I. (P), Bus Width hereinbelow, that 32-bit extensions to the Registered PCI specification could be incorporated into the invention for example, more cost-sensitive applications. Registered PCI devices not needing interoperability with future 32-bit devices need not comply with the requirements described under Section I. (P), Bus Width.

7. Source Sampling

Like conventional PCI, Registered PCI devices are permitted to drive and receive the same bus signal at the same time. Registered PCI requires the designer to insert a means for multiplexing on the input path for any signal that the device needs to monitor while the device is driving the signal. This multiplexing means shall receive on one input the registered input signal from the input-output (I/O) connection, and on the other an internal equivalent of the signal being sourced onto the bus with the proper registered delays. The multiplexing means control shall then be a registered delayed version of the output enable or a sourcing flag which will automatically switch the multiplexing means to use the internal equivalent net.

8. Compatibility and System Initialization

Registered PCI devices operate in conventional or Registered PCI mode depending on the state of DEVSEL# at the rising edge of RST#, as more fully described in Section V., Compatibility and System Initialization hereinbelow. If DEVSEL# is deasserted at the rising edge of RST#, the device shall operate in conventional mode. If DEVSEL# is asserted at the rising edge of RST#, the device shall operate in Registered PCI mode.

The source bridge for each bus and the pull-up resistor on DEVSEL# provided by the central resource determine the state of DEVSEL# during RST#. The host bridge that begins a PCI bus hierarchy and a PCI-to-PCI bridge that extends it have slightly different requirements, and are described in Section V. (C)(1), Frequency and Mode Initialization Sequence in a Host Bridge, and Section V. (C)(2), Frequency and Mode Initialization Sequence in a PCI-to-PCI Bridge, respectively, hereinbelow.

D. Summary of Protocol Rules

Protocol rules, according to the present invention, may be divided into the following categories: basic initiator rules, basic target rules, bus arbitration rules, configuration transaction rules, parity error rules and bus width rules. The following summarizes the protocol rules for Registered PCI transactions. A more detailed description of these rules will be made hereinbelow.

1. Basic Initiator Rules

The following rules control the way a device initiates a transaction.

1. As in conventional PCI protocol, an initiator begins a transaction by asserting FRAME#. The first clock in which FRAME# is asserted is the address and command phase. (See Section I. (P)(2), Address Width hereinbelow for dual address cycles.)
2. There are no address alignment requirements for beginning a Registered PCI transaction (both byte-count and byte-enable transactions).
3. The attribute phase clock follows the address phase. The attributes include information useful for data-buffer management by the target.
4. Initiator wait states are not permitted. The initiator shall assert IRDY# one clock after the attribute phase. The initiator shall not deassert IRDY# until the end of the transaction or at an ADB boundary. Therefore, data stepping is not possible on write transactions.
5. For write transactions, the initiator shall assert write data on the AD bus no later than 1 clock after it asserts IRDY#.
6. If the transaction is a byte-enable transaction (that is, if it uses an extended command that is designated for byte-enable transactions), the initiator intends to transfer data in only a single data phase. During the address phase the full AD bus indicates the starting byte address of the transaction. The initiator deasserts FRAME# when it asserts IRDY# and uses the byte enables to indicate which bytes of the AD bus are affected by the transaction. (The Operation Byte Count field is reserved.) Byte enables shall be asserted 1 clock after the attribute phase for both reads and writes. Byte-enable transactions are limited to 32-bit data phases.

7. If the transaction is a byte-count transaction (that is, if it uses an extended command that is designated for byte-count transactions), the following rules apply:
   a. The transaction address a prefetchable memory location.
   b. The AD bus specifies the starting byte address of the transaction (including AD[2:0]).
   C. The byte count for the operation is included in the attribute field.
   d. Byte enables are reserved and deasserted (high logic voltage) throughout the transaction. All bytes are included in the transaction from the starting address through the byte count.
   e. The initiator keeps FRAME# asserted after it asserts IRDY#.
   f. The initiator is limited to terminating the transaction only on naturally aligned 128-byte boundaries called Allowable Disconnect Boundaries (unless the byte count is satisfied sooner).
   g. A transaction will have less than 4 data phases in the following two cases: 1) The byte count is satisfied in less than 4 data phases, or 2) The transaction starts less than 4 data phases from an ADB and the Disconnect on ADB attribute bit is set. In both of these cases the initiator shall deassert FRAME# two clock after TRDY# asserts for transactions with 3 data phases. If the transaction has 2 or 1 data phases the initiator shall deassert FRAME# with the IRDY# deassertion. If the transaction has 3 or 2 data phases, the initiator shall deassert IRDY# one clock after the last data phase. If the transaction has 1 data phase, the initiator shall deassert IRDY# 2 clocks after the data phase.
   h. If the byte-count transaction requires 4 or more data phases, the initiator shall terminate the transfer when the byte count is satisfied. The initiator is also permitted to terminate the transaction on any ADB. To terminate the transfer, the initiator deasserts FRAME# 1 clock before the last data phase (the last data phase is the clock in which the byte count is satisfied, or the last data phase before crossing the ADB), and deasserts IRDY# 1 clock after the last data phase.
   i. If the target asserts STOPS 4 clocks before an ADB, the initiator will deassert FRAME# 2 clocks later, and terminate the transaction on the ADB.
   j. If the transaction is a write and the target inserts wait states, the initiator shall toggle between its first and second data transfers until the target asserts TRDY#.

8. A Registered PCI initiator is required to repeat all transactions terminated with Retry. There is no exception (as in conventional PCI) for the device being reset. The device driver is not permitted to reset the device, if the device has issued a request that was terminated with Retry or Split Response and that request has not completed (entire byte count transferred).

9. Like conventional PCI, no device is permitted to drive and receive a bus signal at the same time.

2. Basic Target Rules

The present invention applies the following rules to the way a target responds to a transaction.

1. The target claims the transaction by asserting DEVSEL# using timing A, B, C or SUB, as given in Table 5 hereinbelow. Conventional DEVSEL# timing is included for reference.

TABLE 5

Registered PCI DEVSEL# Timing

| Decode Speed | Registered PCI | Conventional PCI |
| --- | --- | --- |
| 1 clock after address | Not Supported | Fast |
| 2 clocks after address | Decode A | Medium |
| 3 clocks after address | Decode B | Slow |
| 4 clocks after address | Decode C | SUB |
| 6 clocks after address | SUB | N/A |

2. The target asserts TRDY# an odd number of clocks after it asserts DEVSEL#. The target cannot deassert TRDY# until the end of the transaction. Target wait states are not permitted after the initial data phase. Therefore, data stepping is not possible after the first data phase of read transactions.

3. A Registered PCI target is required to meet the same target initial latency requirements as a conventional target. That is, the target shall assert TRDY# or STOP# within 16 clocks from the assertion of FRAME#. Host bridges are allowed to extended this time in some cases. See Section I. (K), Wait States hereinbelow for details.

4. If the transaction uses a byte-enable extended command, the target shall assert TRDY# an odd number of clocks after it asserts DEVSEL#, and deassert TRDY# and DEVSEL# together one clock later.

5. Targets shall alias reserved command encoding 1100b to Memory Read and 1111b to Memory Write.

6. If the transaction uses a byte-count extended command, the following rules apply:
   a. The target is limited to terminating the transaction only on naturally aligned 128-byte boundaries called Allowable Disconnect Boundaries (ADB) (unless the byte count is satisfied sooner).
   b. If the byte count is satisfied, the target deasserts TRDY# on the clock after the last data phase of the transaction.
   c. To terminate the transaction on an ADB after 4 or more data phases the target asserts STOP# 1 clock before the last data phase (i.e. 2 clocks before crossing the ADB), and deasserts TRDY and STOP# 1 clock after the last data phase.
   d. If the transaction starts 1, 2, or 3 data phases from an ADB, and the target wants to disconnect the transaction on the ADB, the target asserts STOP# when it asserts TRDY#. The target then deasserts STOP# when it deasserts TRDY#.

7. If the transaction is one of the special termination cases that do not transfer data, the target shall assert and deassert DEVSEL#, TRDY# and STOP# according to the following cases:
   a. Target-Abort on the first data phase—The target deasserts DEVSEL# and asserts STOP# together an odd number of clocks after it asserts DEVSEL#. The target deasserts STOP# 1 clock later. TRDY# is not asserted.
   b. Retry termination—The target asserts STOPS an odd number of clocks after it asserts DEVSEL#. The target deasserts STOP# and DEVSEL# 1 clock later. TRDY# is not asserted.
   c. Split Response termination—The target asserts STOP# an odd number of clocks after it asserts DEVSEL#, and asserts TRDY# one clock later with all bits on the AD bus driven high. The target deasserts STOP#, DEVSEL#, and TRDY# together 1 clock after it asserts TRDY#.

8. Like conventional PCI, no device is permitted to drive and receive a bus signal at the same time.

9. Prefetchable memory address ranges for all devices are no smaller than 128 bytes. If an initiator issues a byte-count memory-read to a device starting at an implemented address and proceeding to the next ADB, the device shall return FFh for each unimplemented byte, 3, Bus Arbitration Rules According to the present invention, the following protocol rules apply to bus arbitration.

1. All REQ# and GNT# signals are registered by the arbiter as well as by all initiators.
2. An initiator is permitted to start a new transaction (drive the AD bus, etc.) on any clock N in which the initiator's GNT# was asserted on clock N−2, and any of the following three conditions is true:
   a) The bus was idle (FRAME# and IRDY# were both deasserted) on clock N−2.
   b) The previous transaction was a byte-count transaction, and FRAME# was deasserted on clock N−3.
   c) The previous transaction was a byte-enable transaction, the command was not a reserved command, and TRDY# or STOP# was asserted on clock N−2.
3. An initiator is permitted to start a new transaction on clock N even if GNT# is deasserted on clock N−1 (assuming the requirements of item 2 above are met).
4. An initiator is permitted to assert and deassert REQ# on any clock. There is no requirement to deassert REQ# after a target termination (STOP# asserted). The arbiter is assumed to monitor bus transactions to determine when a transaction has been target terminated.
5. If all the GNT# signals are deasserted, the arbiter is permitted to assert any GNT# on any clock. After the arbiter asserts GNT# the arbiter can deassert it on any clock. However, the arbiter shall fairly provide opportunities for all devices to execute Configuration transactions, which require GNT# to remain asserted for a minimum of five clocks while the bus is idle.
6. If the arbiter deasserts GNT# to one device, it cannot assert GNT# to another device until the next clock.

4. Configuration Transaction Rules

The following protocol rules apply to Configuration transactions.

1. Registered PCI initiators shall provide 4 clocks of address stepping for Configuration transactions when in Registered PCI mode.

5. Parity Error Rules

The following protocol rules apply to exception conditions.

1. If a device receiving data detects a data parity error, it shall assert PERR# on the second clock after PAR is asserted (1 clock later than conventional PCI).
2. During read transactions the target drives PAR on clock N+1 for the read-data it drove on clock N and the byte enables driven by the initiator on clock N−1.
3. All Registered PCI device adapters are required to service PERR# conditions for their transactions. See the section titled "Error Handling and Fault Tolerance."
4. Whether a device decodes it address during the address phase or not, if that device detects a parity error on an attribute phase, the device asserts SERR#. Other SERR# and status bit requirements for address-phase and data-phase errors are the same as for conventional PCI.

6. Bus Width Rules

Preferably, all Registered PCI devices shall have a 64-bit address/data (AD) bus. However, it is contemplated in this specification, and it is within the scope of the invention, to also include 32-bit devices.

The width of the address is independent of the width of the data transfer. All Registered PCI addresses are 64 bits wide (even for 32-bit embodiments of the devices). New registers are defined for Registered PCI-to-PCI bridges to extend the non-prefetchable memory base and limit registers to 64 bits. (See Section VI. (F), Memory Base Upper 32-Bits and Section VI. (G), Memory Limit Upper 32-Bits hereinbelow.) The address phase is generally a single clock long. A new configuration bit is defined for interoperability with future 32-bit devices. If this bit is set and the address is greater than 4 GB, the initiator will use a dual address cycle (like conventional PCI) on all transactions.

The attribute phase is always a single clock long. A configuration bit is defined for interoperability with future 32-bit devices. If this bit is set, the upper 32-bits of the attributes are ignored and assumed to be zero by 64-bit devices.

Only byte-count transactions (memory-read or memory-write) use 64-bit data transfers. (This maximizes similarity with conventional PCI, in which only memory transactions use 64-bit data transfers.) The width of each transaction is determined with a handshake protocol on REQ64# and ACK64#, just like conventional PCI.

E. Registered PCI Command Encoding

Unlike conventional PCI, which has a single command, Registered PCI has two commands performed sequentially. As shown in FIG. 4, the first command, which is analogous to the sole conventional PCI command (CBE on line C/BE#) is first. The Registered PCI extended command (E-CMD on line C/BE#) is second. The extended command is used to qualify the type of transaction and attributes being used by the initiator. The attribute (ATTR on the AD line of FIG. 4 at the same clock cycle as the extended command) is used to further define the transaction. The attribute defines not only the type of transaction. The attribute also defines what is unique to the transaction, such as byte-count, relax ordering, and initial transaction sequence.

In addition to adding a second command cycle, Registered PCI modifies the first set of conventional PCI commands. Table 6 below compares conventional PCI commands with Registered PCI commands. In the preferred embodiment of the present invention, initiators shall not generate reserved commands. Furthermore, targets shall ignore all transactions using a reserved command, except as noted in Table 6 below.

TABLE 6

Registered PCI Command Encoding

| C/BE[3:0]# or C/BE[7:4]# | Conventional PCI Command | Registered PCI Command | Notes 1 |
|---|---|---|---|
| 0000 | Interrupt Acknowledge | Interrupt Acknowledge | |
| 0001 | Special Cycles | Special Cycles | |
| 0010 | I/O Read | I/O Read | |
| 0011 | I/O Write | I/O Write | |
| 0100 | Reserved | Reserved | |
| 0101 | Reserved | Reserved | |
| 0110 | Memory Read | Memory Read | |
| 0111 | Memory Write | Memory Write | |
| 1000 | Reserved | Reserved | |
| 1001 | Reserved | Reserved | |
| 1010 | Configuration Read | Configuration Read | |
| 1011 | Configuration Write | Configuration Write | |
| 1100 | Memory Read Multiple | Reserved, Alias to Memory Read | 2 |
| 1101 | Dual Address Cycle | Dual Address Cycle | |
| 1110 | Memory Read Line | Reserved | |

TABLE 6-continued

Registered PCI Command Encoding

| C/BE[3:0]# or C/BE[7:4]# | Conventional PCI Command | Registered PCI Command | Notes |
|---|---|---|---|
| 1111 | Memory Write and Invalidate | Reserved, Alias to Memory Write | 3 |

Notes:
1. The actual transaction command appears on C/BE[7:4]# only for byte-count memory transactions that have an address greater than 4 GB. In this case C/BE[3:0]# contains the Dual Address Cycle command. For all other transactions the actual command appears on C/BE[3:0]#.
2. This command is reserved for use in future versions of this specification. Current initiators shall not generate this command. Current target shall treat this command as if it were Memory Read.
3. This command is reserved for use in future versions of this specification. Current initiators shall not generate this command. Current target shall treat this command as if it were Memory Write.

F. Registered PCI Extended Command Encoding

Table 7 lists Registered PCI command types.

TABLE 7

Registered PCI Extended Command Encoding

| C/BE[3:0]# | Transaction Type | Extended Command Type | Extended Command |
|---|---|---|---|
| 0000 | Byte enable | Validated | Reserved |
| 0001 | Byte enable | Validated | Reserved |
| 0010 | Byte enable | Validated | Reserved |
| 0011 | Byte enable | Validated | Split Completion Exception Message |
| 0100 | Byte enable | Immediate | Reserved |
| 0101 | Byte enable | Immediate | Reserved |
| 0110 | Byte enable | Immediate | Reserved |
| 0111 | Byte enable | Immediate | Standard Byte-Enable Extended Command |
| 1000 | Byte count | Validated | Reserved |
| 1001 | Byte count | Validated | Reserved |
| 1010 | Byte count | Validated | Reserved |
| 1011 | Byte count | Validated | Split Completion |
| 1100 | Byte count | Immediate | Reserved |
| 1101 | Byte count | Immediate | Reserved |
| 1110 | Byte count | Immediate | Reserved |
| 1111 | Byte count | Immediate | Standard Byte-Count Extended Command |

The extended command is used to qualify the type of transaction and attributes being used by the initiator. The extended command appears on C/BE[3:0]# of the attribute phase for all transactions. C/BE[7:4]# are reserved during the attribute phase and driven to a high logic voltage by the initiator.

The extended commands are divided into four groups based on the transaction type and extended command type. Transactions are either byte-count or byte-enable transaction types and are described in more detail under Section I. (H), Byte-Count Transactions and Section I. (1), Byte-Enable Transactions hereinbelow.

Extended command types are either validated or immediate. Extended command types define a path for the addition of new extended commands in the future. They establish the behavior for current devices when they encounter a reserved extended command. Reserved extended command encodings can be assigned in the future to new extended commands that will behave predictably with current devices.

1. Validated Extended Command

A Registered PCI target that detects a reserved validated extended command shall terminate the transaction with Target-Abort. Table 8 lists the validated extended commands contemplated for the present invention.

TABLE 8

Validated Extended Commands

| Extended Command | Description |
|---|---|
| Split Completion | This is the requested read data being returned as the completion of the Split Request. Refer to Section I. (N), Split Transactions hereinbelow for additional details. |
| Split Completion Exception Message | This extended command functions in a similar fashion to a Split Completion extended command. However, instead of carrying the requested completion data or status, this extended command is used to communicate the cause of an exception condition that occurred while executing the Split Request. Refer to Section I. (N), Split Transactions hereinbelow for additional details. |

2. Immediate Extended Command

A Registered PCI target that detects a reserved immediate extended command shall execute the transaction as if a standard extended command were used. If the reserved extended command is a byte-count extended command, the target shall execute the transaction as if the Standard Byte-Count Extended Command were used. If the reserved extended command is a byte-enable extended command, the target shall execute the transaction as if the Standard Byte-Enable Extended Command were used. It is contemplated herein that initiators will expect targets that do not understand these new extended commands to execute them as if they were the standard extended command for their transaction type. Table 9 lists the Immediate Extended Command definitions.

TABLE 9

Immediate Extended Command Definitions

| Extended Command Fields | Description |
|---|---|
| Standard Byte-Count Extended Command | This is the default extended command for byte-count transactions. |
| Standard Byte-Enable Extended Command | This is the default extended command for byte-enable transactions. |

G. Registered PCI Attributes

The attribute field is a 64-bit field that further defines and describes the transaction. The attributes appear in the clock following the address phase on the AD bus. The following section describes the supported attribute definitions.

Table 10 lists the bit assignments in the PCI AD bus.

TABLE 10

Attribute Bit Positions

| AD Bus Bit Position | Attribute Phase Signal Name |
|---|---|
| AD[0] | Initial Sequence Request |
| AD[1] | Disconnect on first ADB |
| AD[2] | Relaxed Ordering |
| AD[3] | Don't Snoop |
| AD[8:4] | Initiator Bus Number, lower 5 bits |
| AD[13:9] | Initiator Number, lower 5 bits |
| AD[16:14] | Sequence Number, lower 3 bits |
| AD[26:17] | Byte Count, lower 10 bits |
| AD[31:27] | Reserved |
| AD[34:32] | Initiator Bus Number, upper 3 bits |
| AD[35] | Initiator Number, upper 1 bits |
| AD[36] | Sequence Number, upper 1 bits |
| AD[38:37] | Byte Count, upper 2 bits |
| AD[63:39] | Reserved |

Table 11 describes the bit definitions of the attribute fields. All reserved bit fields shall be set to 0.

TABLE 11

Attribute Field Definitions

| Attribute | Function |
|---|---|
| Initial Sequence Request | This bit indicates that the current transaction starts a new initiator Sequence. If the Sequence is divided into multiple transactions as a result of a target or initiator disconnection, the subsequent transactions will not have this bit set.<br>1 - The initiator is starting a new Sequence.<br>0 - This is not the start of the new Sequence.<br>This bit is used for transaction combining and reordering the buffer management. See Section I. (R), Transaction Sequence Combining and Re-ordering hereinbelow for more details.<br>Registered PCI-to-PCI bridges forward this bit unmodified with the transaction, even if the bit is not used by the bridge. |
| Disconnect on First ADB | An initiator sets this bit if its buffer management algorithm requires it to disconnect a byte-count transaction on reaching the first ADB. The initiator shall set this bit if the transaction starts 1, 2, or 3 data phases from the first ADB, and the initiator wants to disconnect there. The initiator may optionally set this bit if the transaction starts 4 or more data phases from the ADB and the initiator wants to disconnect there. (In the second case the initiator shall also deassert FRAME# 1 clock before the last data phase.)<br>The bit is needed because the initiator is unable to respond fast enough in Registered PCI to notify the target of a disconnection request stating 1, 2, or 3 data phase from the first ADB. |
| Relaxed Ordering | An initiator sets this bit on a read transaction if its usage model does not require Delayed Read Completions or Split Read Completions for this transaction to stay in order with respect to posted memory writes moving in the same direction. Delayed Read Requests and Split Read Request are unaffected by this bit.<br>An initiator sets this bit on a memory-write transaction if its usage model does not require this memory-write transaction to stay in order with respect to other memory-write transactions moving in the same direction.<br>This bit is optional for targets. If the target (or an intervening bridge) implements this bit and the bit is set for a read transaction, the target is permitted to allow read-completion data to pass posted-memory-write transactions moving in the same direction. If the bit is set for a memory-write transaction, the target (or intervening bridge) is permitted to allow this memory-write transaction to pass any previously posted memory-write transactions. If the target (or intervening bridge) does not implement this bit or the bit is not set for a transaction, the target shall adhere to conventional PCI ordering rules for this transaction. (See Section IX., Relaxed Ordering Rules hereinbelow for a discussion of usage models for transaction ordering.)<br>Registered PCI-to-PCI bridges forward this bit unmodified with the transaction, even if the bit is not used by the bridge. |
| Don't Snoop | If an initiator sets this bit, the initiator guarantees that caches do not need to snoop this transaction. How the initiator guarantees this is beyond the scope of this specification. Examples of transactions that could benefit from setting this bit are transactions that read or write non-cacheable sections of main memory, or sections that have previously been flushed from the cache through hardware or software means. Note that Registered PCI does not require systems to support coherent caches for addressed accessed by Registered PCI initiators, but for those systems that do, this bit allows device drivers to stop cache snooping on a transaction-by-transaction basis to improve performance.<br>This bit is generally ignored by Registered PCI-to-PCI bridges and forwarded unmodified with the transaction. |
| Initiator Bus Number | This 8-bit field is divided between the upper and lower halves of the attribute field. It is used by initiators of Split Transactions to identify the appropriate Split Completion transaction. It is used by Registered PCI bridges to determine when to forward a Split Completion.<br>The combination of the Initiator Bus Number, Initiator Number, and Sequence Number is referred to as the Sequence ID. |
| Initiator Number | This 6-bit field is divided between the upper and lower halves of the attribute field. For each bus segment system configuration software assigns a unique Initiator Number to each single-function device and to each function within a multifunction device. Initiators of Split Transactions use it to identify the appropriate Split Completion transaction. Targets optionally use it to optimize buffer management. (See Section I. (C)(1), Transaction Sequences hereinabove.) |

TABLE 11-continued

Attribute Field Definitions

| Attribute | Function |
| --- | --- |
| | The combination of the Initiator Bus Number, Initiator Number, and Sequence Number is referred to as the Sequence ID. |
| Sequence Number | This 4-bit field is divided between the upper and lower halves of the attribute field. It uniquely identifies up to 16 bus operations from a single initiator. Initiators of Split Transactions use it to identify the appropriate Split Completion transaction. Targets optionally use it to optimize buffer management. (See Section I. (C)(1), Transaction Sequences hereinabove.) The initiator shall assign a unique Sequence Number to each transaction. How the initiator assign these numbers is not controlled by this specification. The combination of the Initiator Bus Number, Initiator Number, and Sequence Number is referred to as the Sequence ID. |
| Byte Count | This 12-bit field is divided between the upper and lower halves of the attribute field. It indicates the number of bytes the initiator is planning to move in the remainder of this Sequence. There is no guarantee that the initiator will successfully move the entire byte count in a single transaction. If this transaction is disconnected for any reason, the initiator shall adjust the Byte Count in the subsequent transactions of the same Sequence to be the number of bytes remaining in this Sequence. The Byte Count is specified as a binary number, with 0000 0000 0001b indicating 1 byte, 1111 1111 1111b indicating 4095 bytes, and 0000 0000 0000b indicating 4096 bytes. |

H. Byte-Count Transactions

According to the present invention, basic Byte-Count Write and Byte-Count Read transactions are described hereinbelow. All figures illustrate a 64-bit AD bus and 8-bit C/BE# bus. RFQ64# and ACK64# are not illustrated to aid in readability, however, it is contemplated and within the scope of the present invention that REQ64# is asserted by the initiator with FRAME# assertion and ACK64# is asserted by the target with DEVSEL# assertion. See Section I. (D)(6), Bus Width Rules hereinabove for more details on the REQ64# and ACK64# assertions.

1. Writes

Figure 5A:
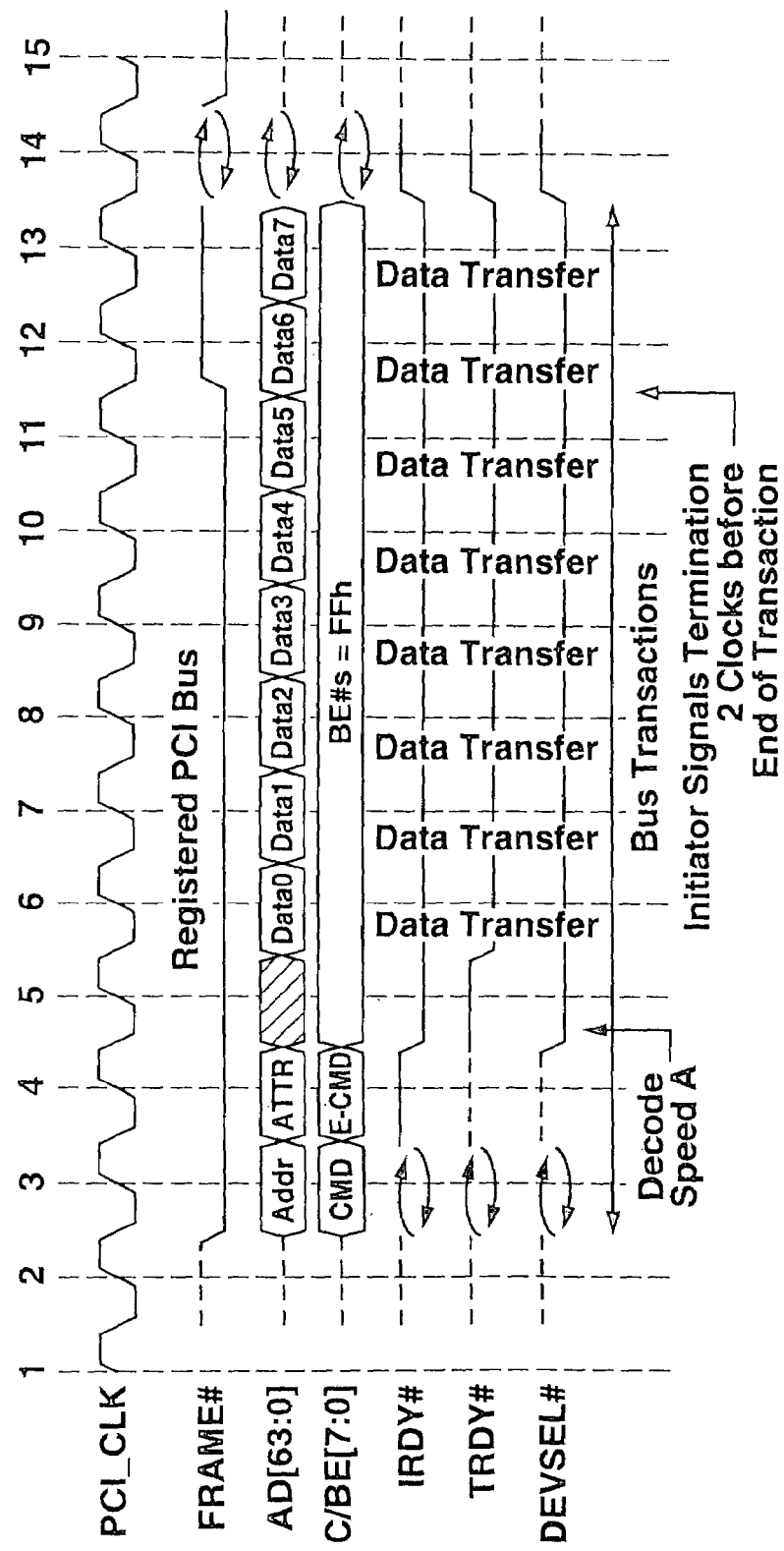
FIGS. 5a and 5b, is a schematic timing diagram of a Byte-Count Write Operation with No Target Initial Wait States according to the present invention.
Figure 5B:
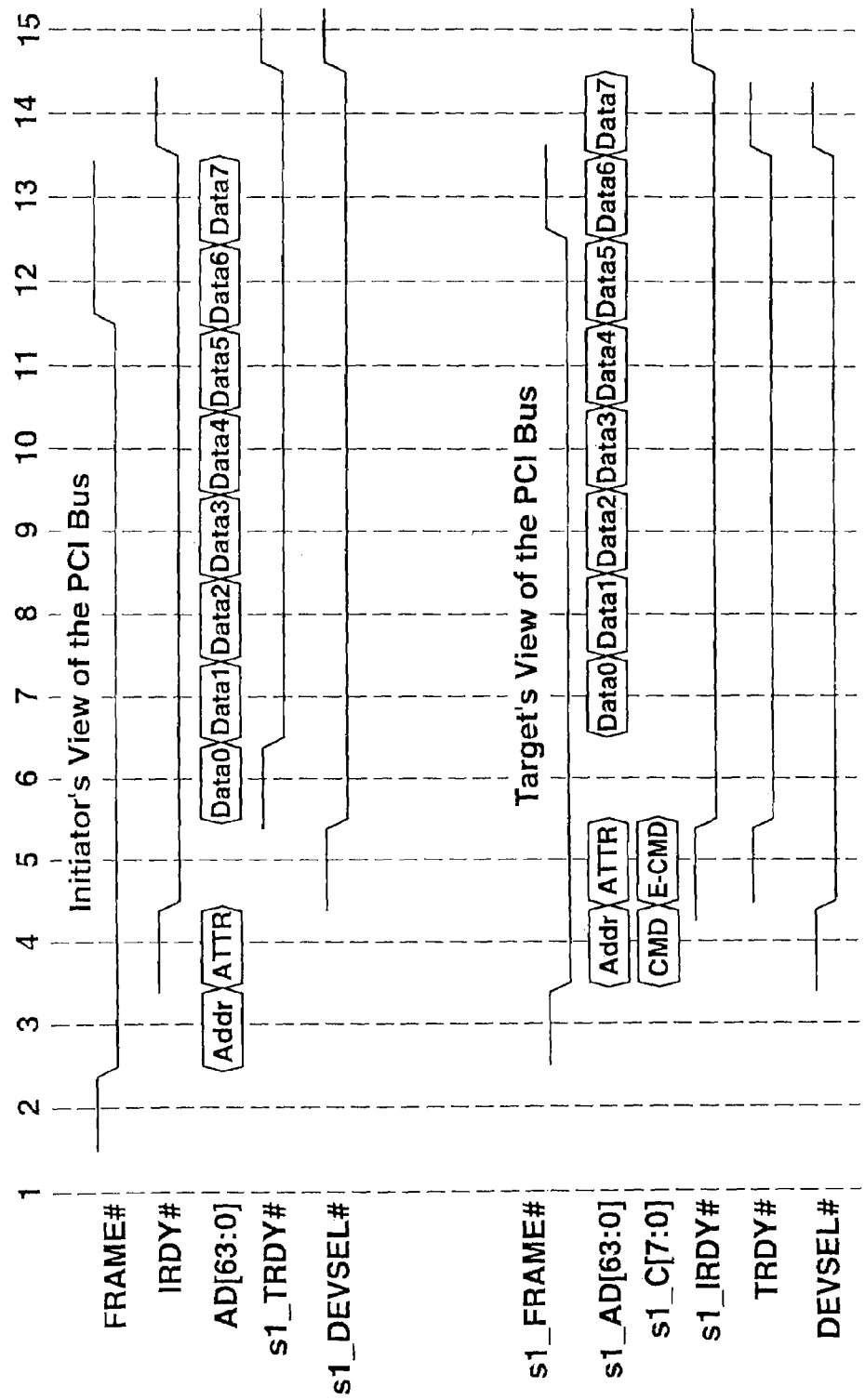
Figure 6A:
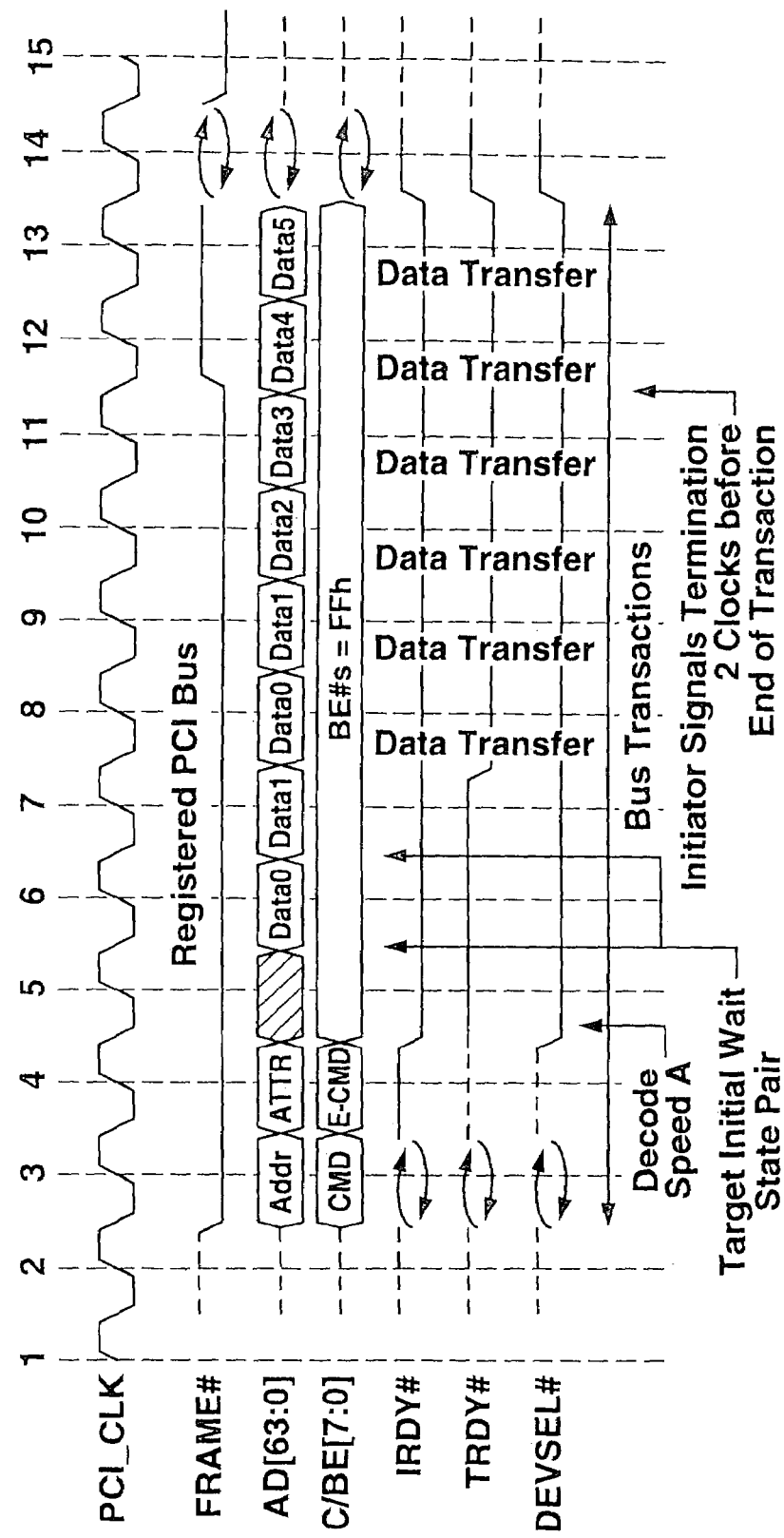
FIGS. 6a and 6b, is a schematic timing diagram of a Byte-Count Write Operation with Target Initial Wait States according to the present invention.
Figure 6B:
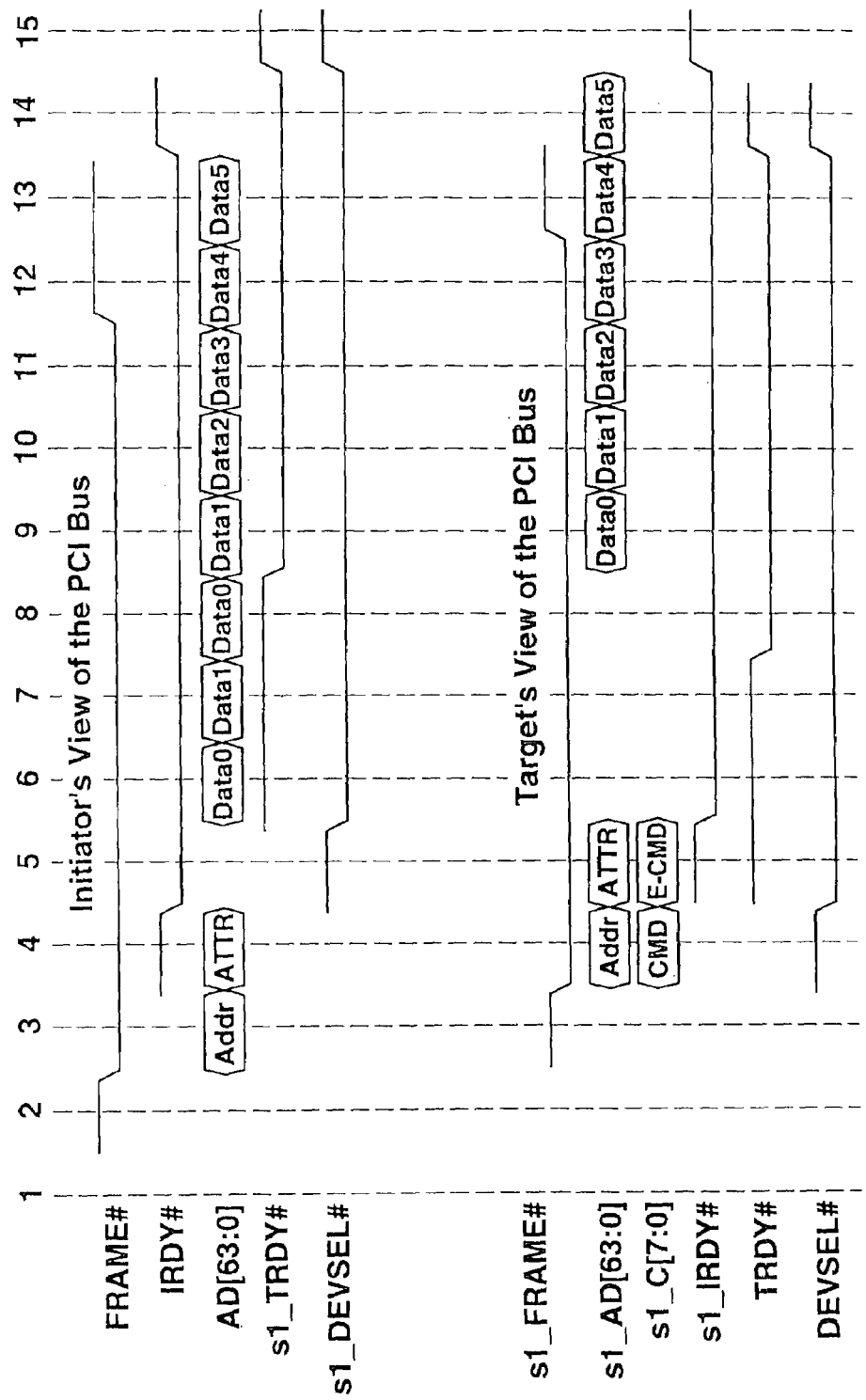

Referring to FIGS. 5 and 6, byte-count write transactions are illustrated. The top portion of FIGS. 5 and 6 illustrate the signals as they appear on the bus. The middle and lower portions of the figure show the view of the PCI bus from the initiator and target, respectively. Signal names preceded by "s1_" indicate a signal that is internal to the device after the bus signal has been sampled. For example, the initiator asserts FRAMES on clock 3. The target samples FRAME#, so s1_FRAME# is asserted on clock 4. According to the present invention, the data is not required to be valid in the clock after the attribute phase of a write transaction (and a Split Completion). This clock could be used as a turn-around clock by multi-package host bridges that source the address from one package and the data from another.

FIG. 5 illustrates the minimum target initial latency of 3 clocks. At clock 5, data is not required to be valid, even with the assertion of IRDY# by the initiator. FIG. 6 illustrates a similar transaction to the one illustrated in FIG. 5, but with only 6 data phases and a target initial latency of 5 clocks. Notice at clocks 6 and 7 the initiator toggling between DATA0 and DATA1. This toggling starts once the initiator detects the target assertion of DEVSEL#, and continues until the initiator detects the target assertion of TRDY#, which does not occur until clock 8.

2. Reads

Figure 7A:
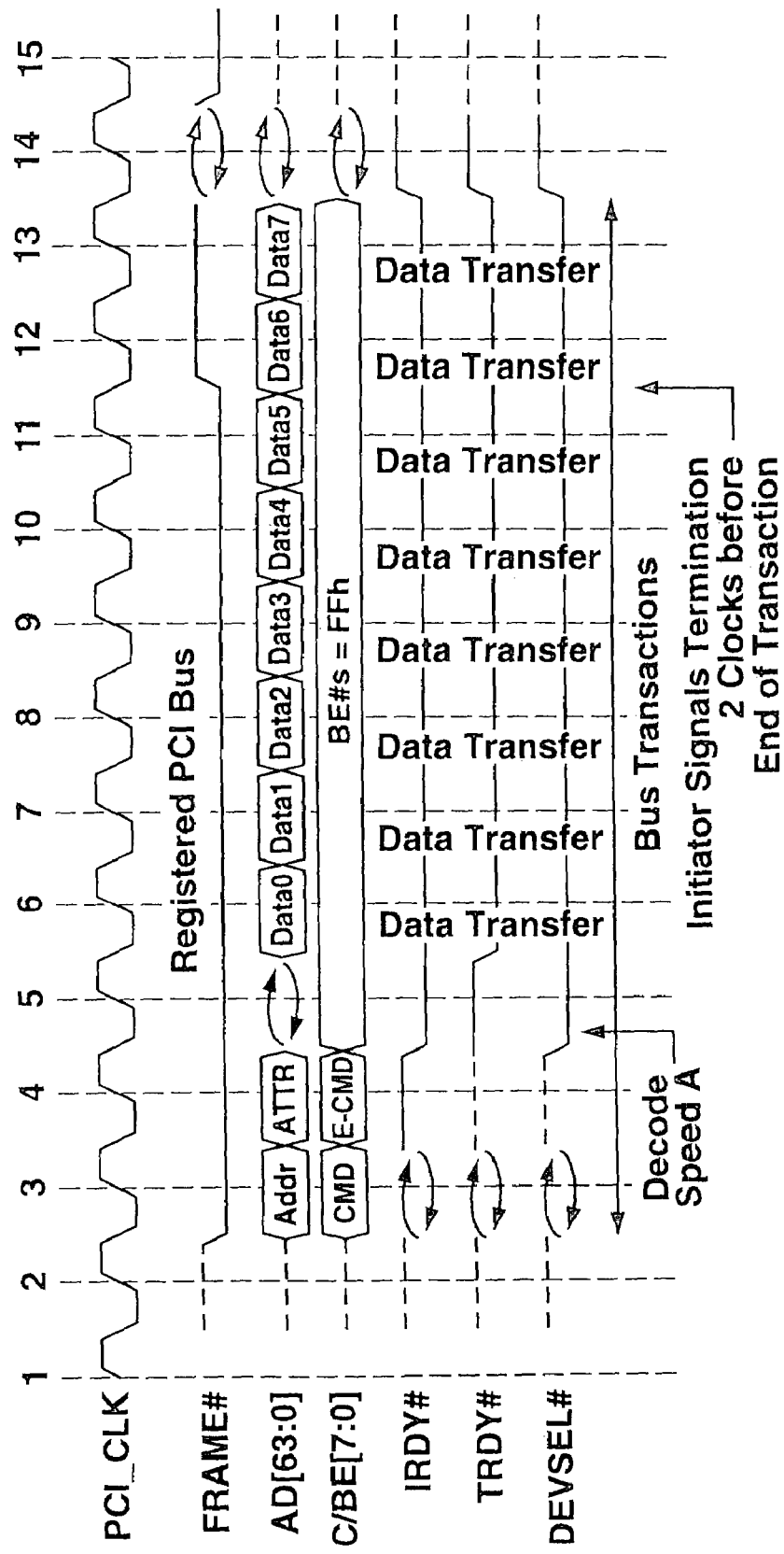
FIGS. 7a and 7b, is a schematic timing diagram of a Byte-Count Write Operation with Target Initial Wait States according to the present invention.
Figure 7B:
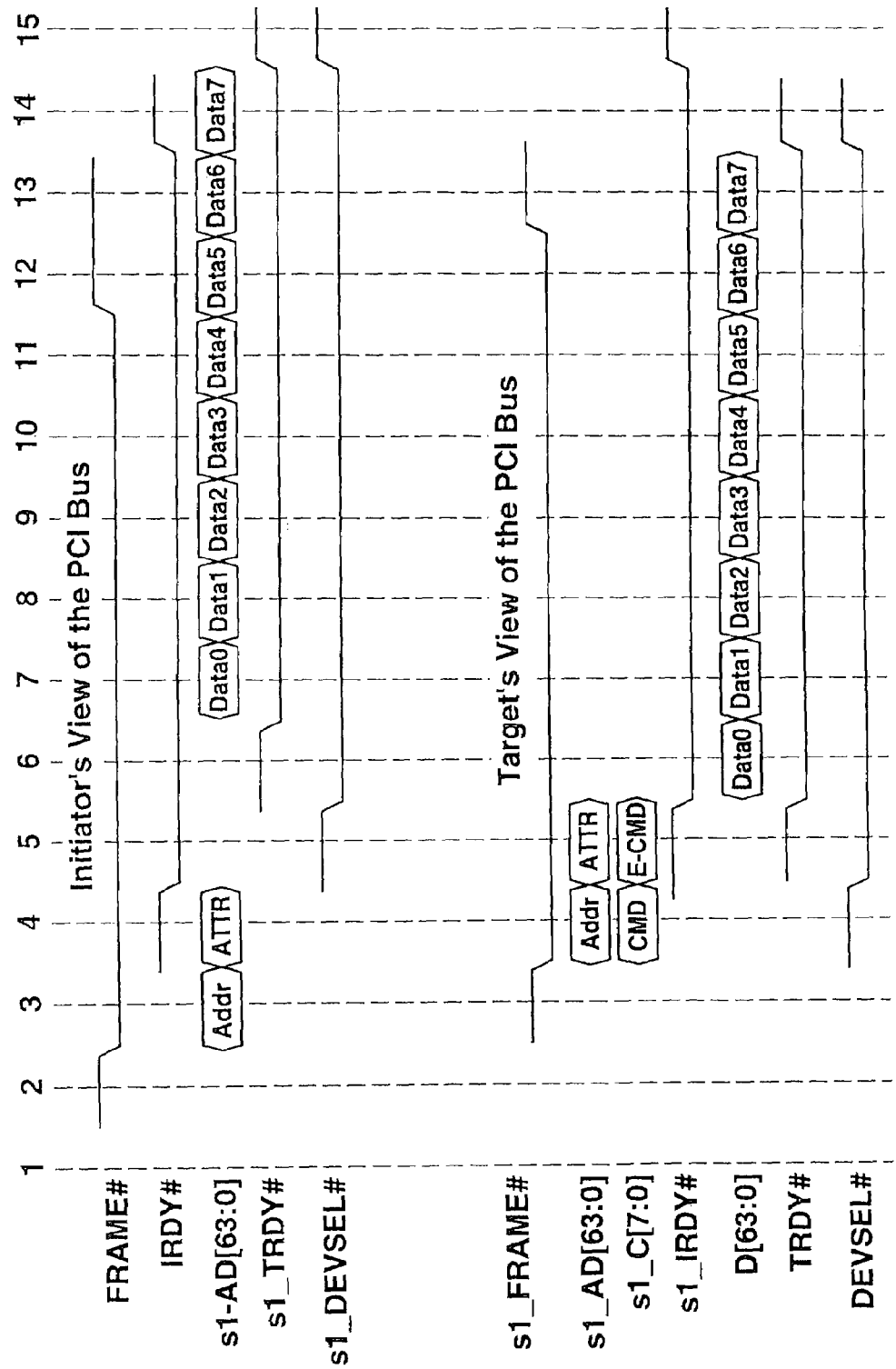
Figure 8A:
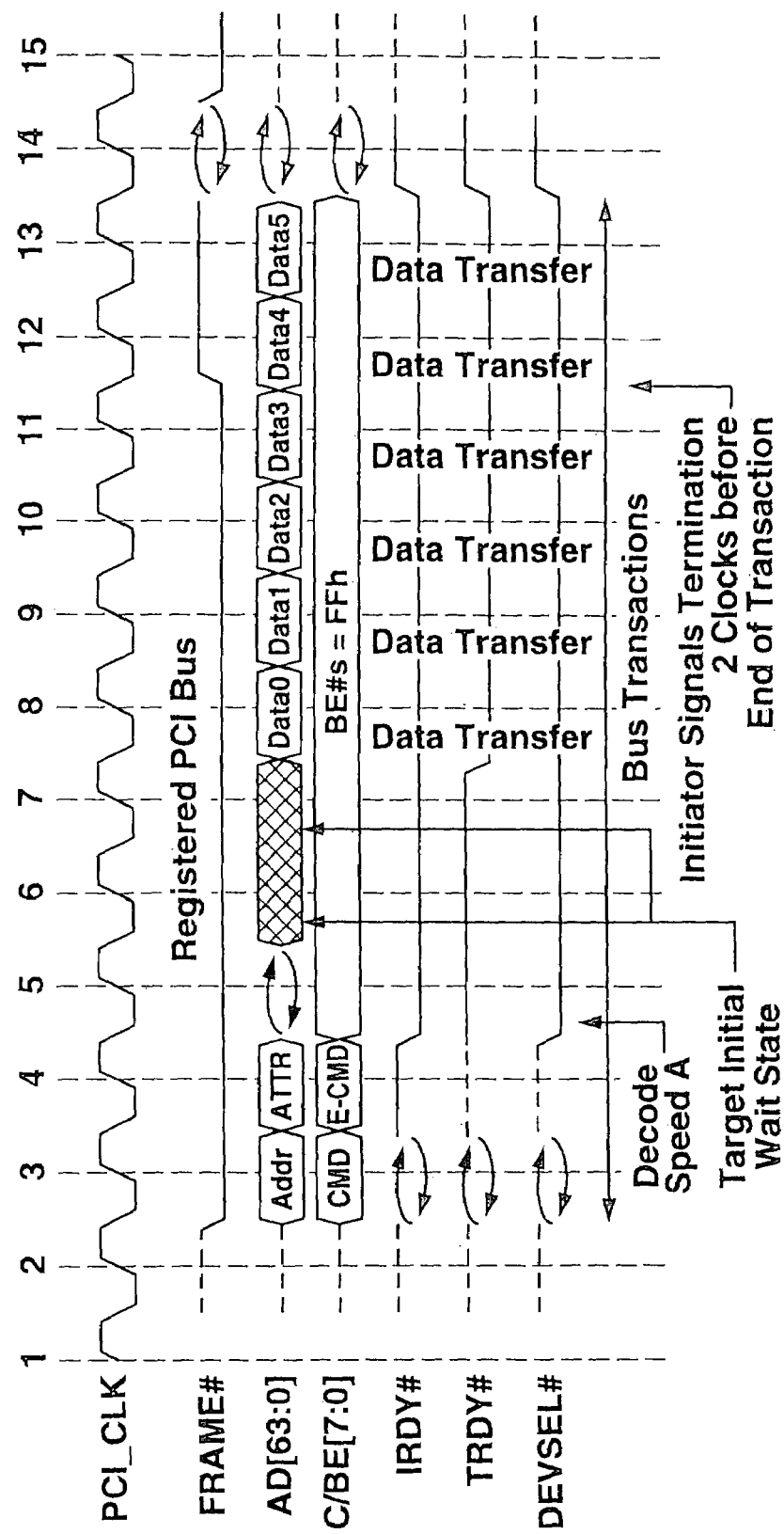
Figure 8B:
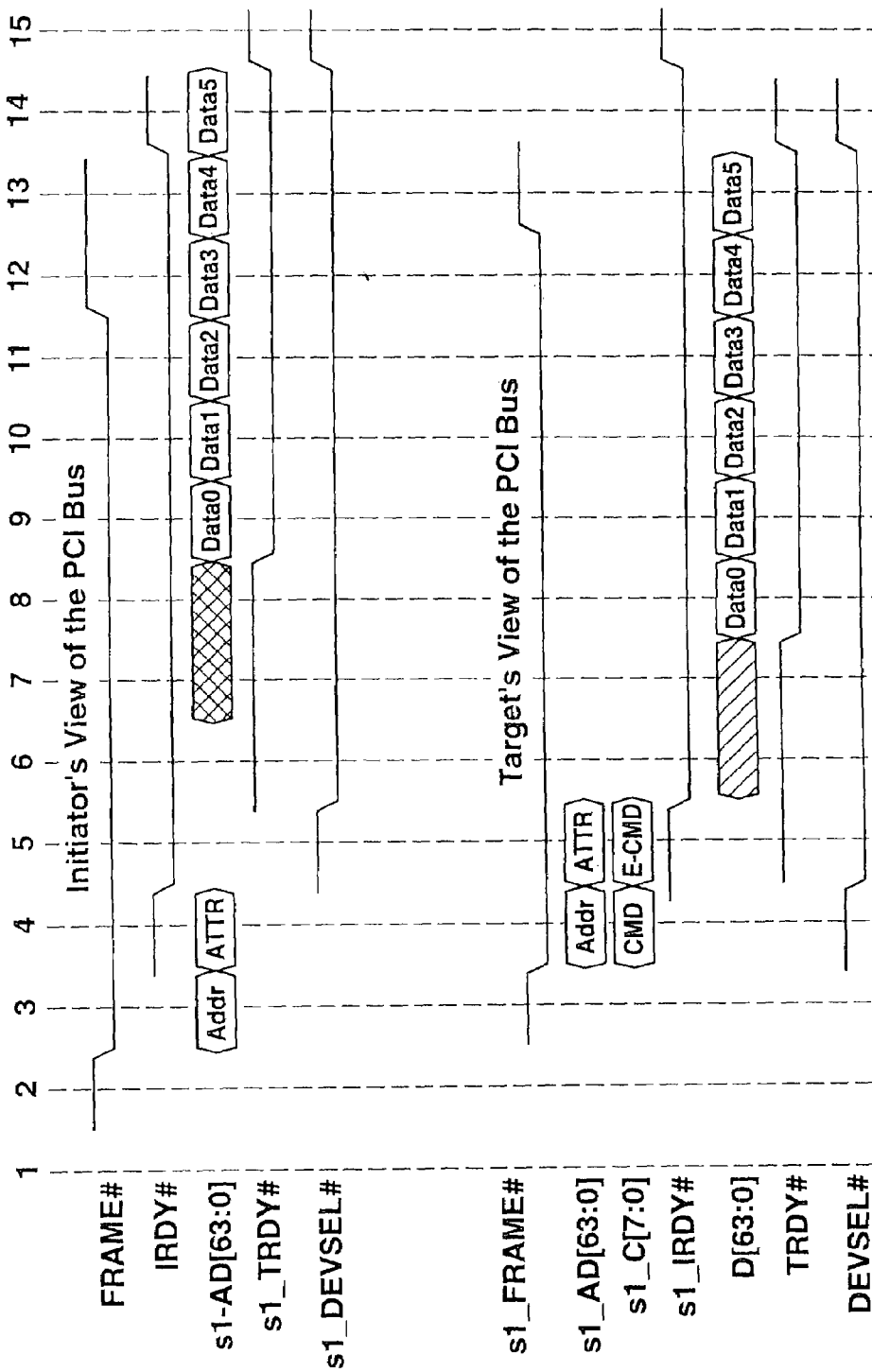

Referring now to FIGS. 7 and 8, schematic timing diagrams of a Byte-Count Memory-Read Transaction with No Target Initial Wait States and a Byte-Count Memory-Read Transaction with Target Initial Wait States, respectively, are illustrated. FIG. 7 illustrates a byte-count read transaction with the minimum target initial latency of 3 clocks. The top portion of the diagram of FIG. 7 illustrates the signals as they appear on the bus. The middle and lower portions of the diagram of FIG. 7 illustrate the view of the PCI bus from the initiator and target, respectively. Signal names preceded by "s1_" indicate a signal that is internal to the device after the bus signal has been sampled. FIG. 8 illustrates a similar transaction to the one illustrated in FIG. 7, but with only 6 data phases and an initial target latency of 5 clocks.

I. Byte-Enable Transactions

According to the present invention, the initiator signals its intention to execute a byte-enable transaction by using a byte-enable extended command. For a byte-enable transaction the initiator deasserts FRAME# on the clock after the attribute phase (the same time it asserts IRDY#). As with byte-count transactions, the target asserts DEVSEL# and then an odd number of clocks later it asserts TRDY#. However for a byte-enable transaction the target leaves TRDY# asserted for only a single clock. The initiator deasserts IRDY# one clock after that.

If the target asserts TRDY# on a byte-enable transaction, the target does not assert STOP#. See Section I. (O)(2)(b), Byte-Enable Transactions associated with FIG. 37 and Section I. (O) (5)(b), Byte-Enable Transactions associated with FIG. 42 hereinbelow for the use of STOP# in Retry and Target-Abort termination of byte-enable transaction.

For Byte-Enable transactions, the Byte-Count attribute filed shall be treated as a reserved field, and as such, shall be set to 0.

1. Writes

Figure 9:
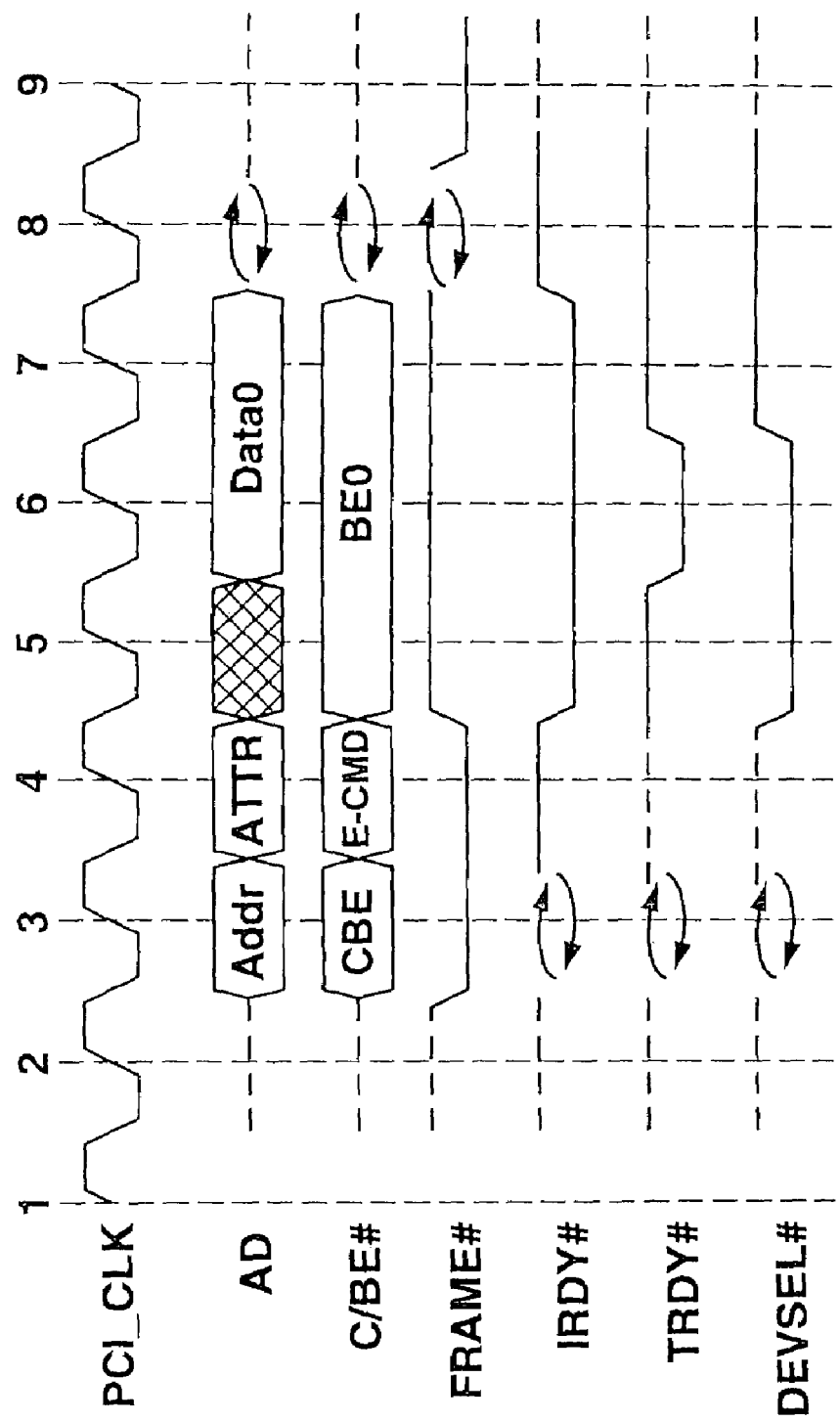
FIG. 9 is a schematic timing diagram of a Byte-Enable Write Transaction with No Wait States according to the present invention.

Referring to FIG. 9, a schematic timing diagram of a Byte-Enable Write Transaction with No Wait States illustrates the initiator executing a byte-enable write. In FIG. 9 the target does not insert any wait states, asserting TRDY# on clock 6. As in conventional PCI, data is transferred when TRDY#, IRDY#, and DEVSEL# are asserted. However, notice the initiator continues driving the bus, and IRDY# remains asserted in clock 7, even though this is one clock past the single clock in which data was transferred (clock 6). According to the present invention the Registered PCI initiator requires two clocks to respond to the assertion of TRDY#.

Figure 10:
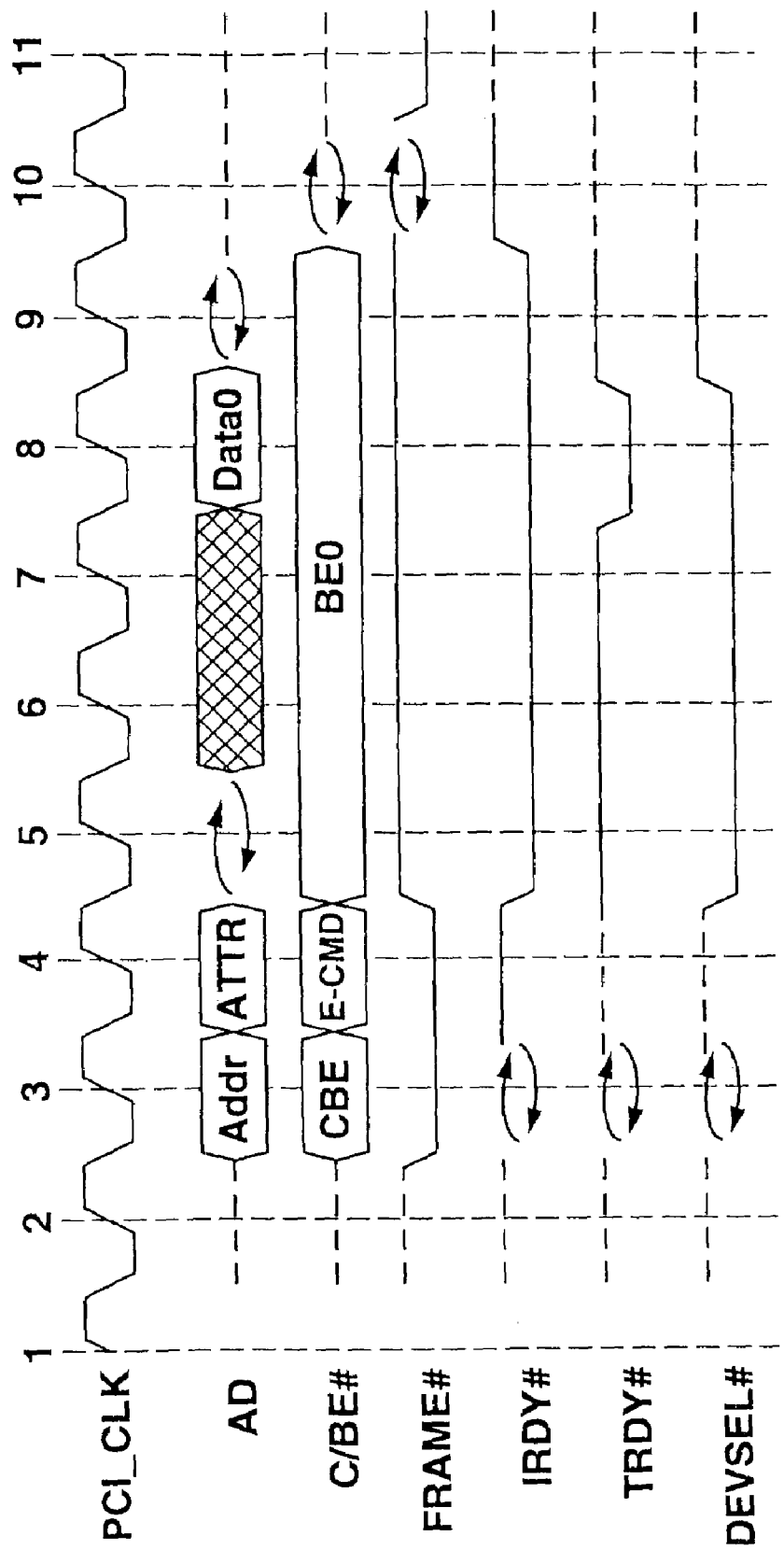
FIG. 10 is a schematic timing diagram of a Byte-Enable Read with Two Target Initial Wait States according to the present invention.

Referring to FIG. 10, a schematic timing diagram of a Byte-Enable Read with Two Target Initial Wait States illustrates an initiator executing a byte-enable read. In FIG. 10 the target inserts two wait states at clocks 6 and 7, then asserts TRDY# for a single clock at clock 8. As in conventional PCI, data is transferred when TRDY#, IRDY#, and DEVSEL# are asserted. However, notice the initiator continues driving the C/BE bus and IRDY# remains asserted in clock 9, even though this is one clock past the single clock in which data was transferred (clock 8).

In an embodiment of the present invention, Byte enables are not valid until the clock after the attribute phase. Preferably, Registered PCI targets with non-prefetchable locations shall not start a destructive read operation until the byte enables are valid. The target may accommodate this by inserting 2 target initial wait states for device select assertion A. If the targeted device has a device select of B or slower, then the target requires no initial wait states. FIG. 10 illustrates a target with a device select assertion of A inserting 2 target initial wait states.

J. Device Select Timing

Registered PCI targets are required to claims transaction by asserting DEVSEL# using timing A, B, C or SUB, this is done by the target asserting DEVSEL# on clock 2, 3, 4 or 6 respectively after the initiator's assertion of FRAME#. The following description hereinbelow illustrates device select timing using four data phase Byte-Count write and read transactions. Notice that the target assertion of DEVSEL# relative to the initiator's assertion of FRAME# remains the same for all legal transaction types, in accordance with the Registered PCI invention.

1. Writes

Figure 11:
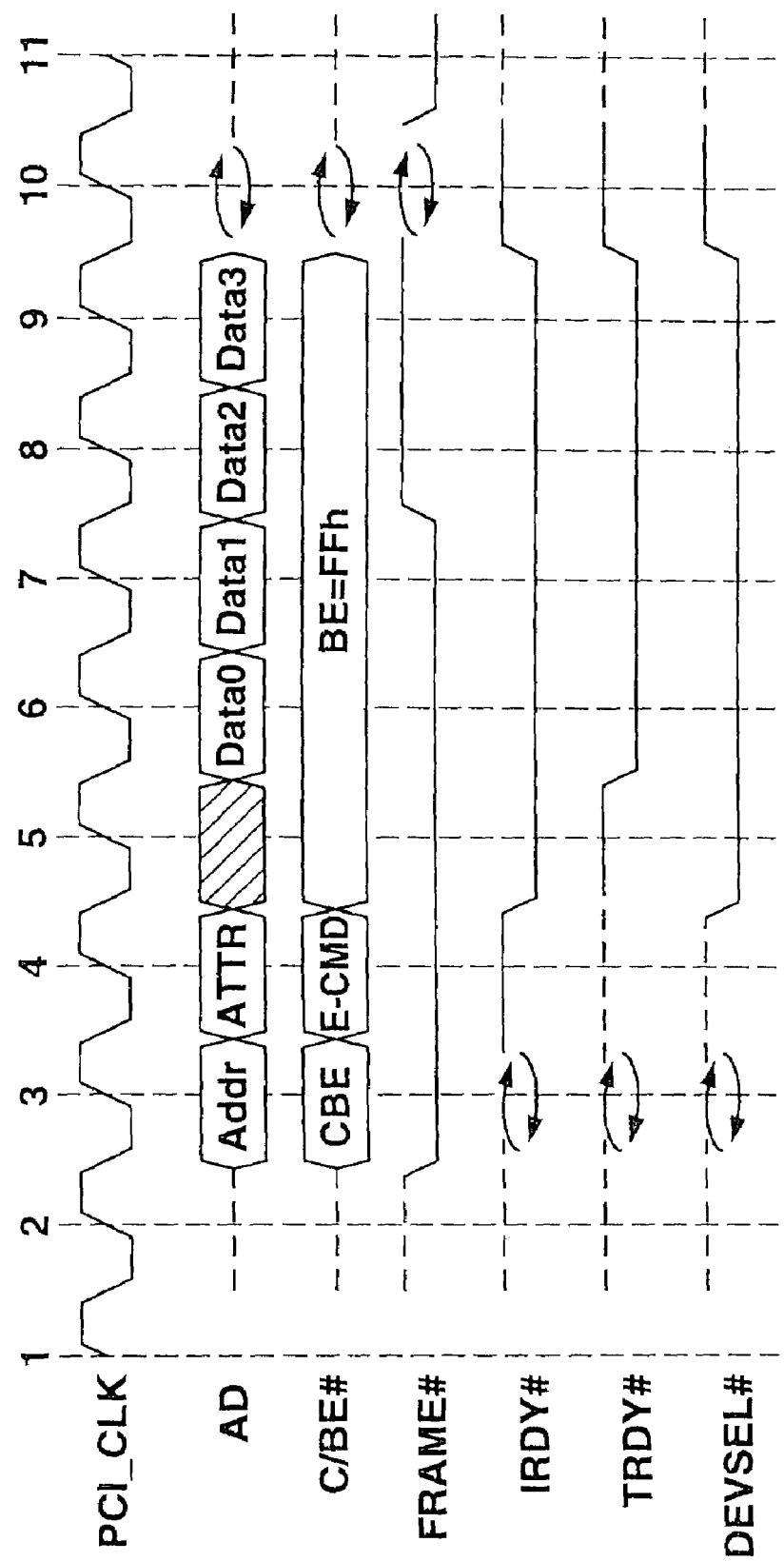
FIG. 11 is a schematic timing diagram of a Four Data Phase Byte-Count Memory-Write Showing Target Decode "A" with 0 Initial Wait States according to the present invention.
Figure 12:
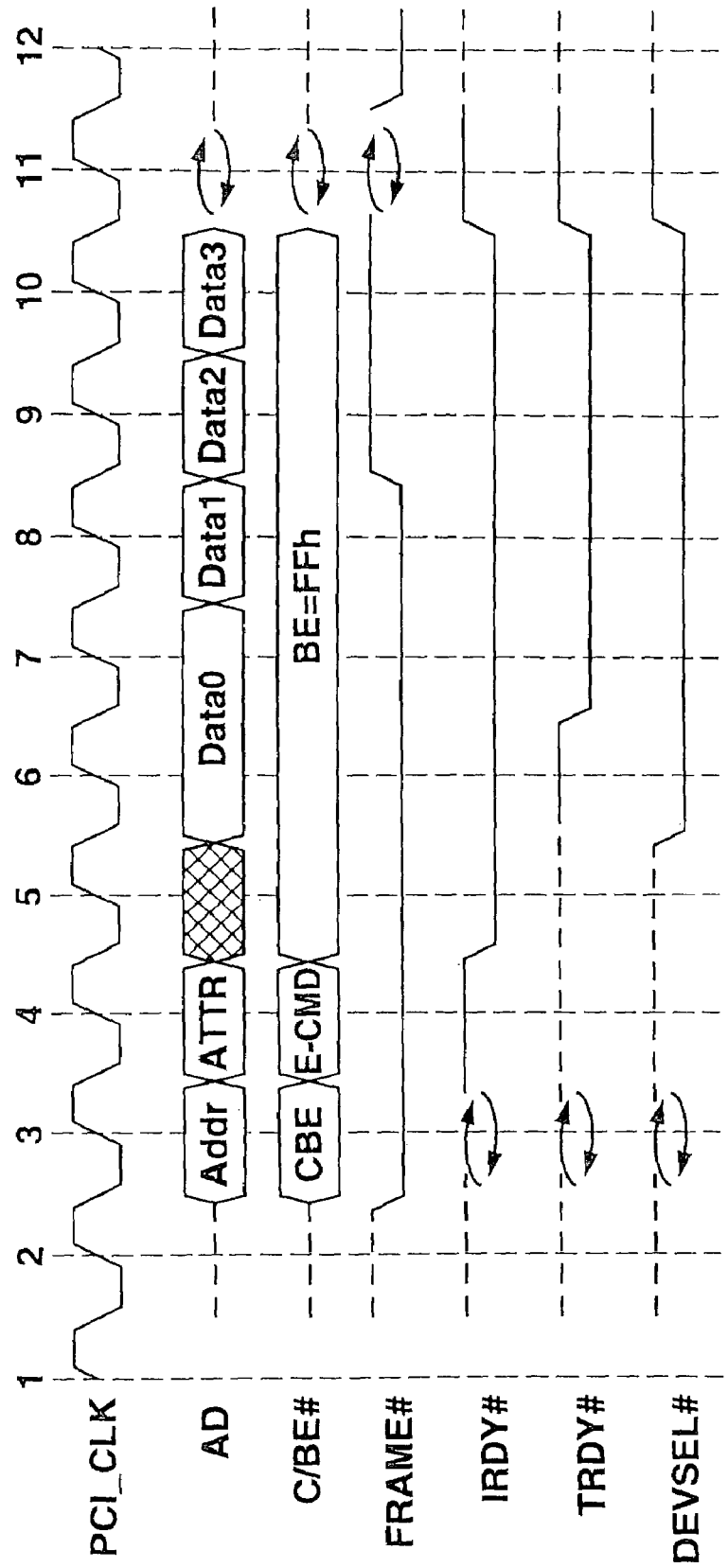
FIG. 12 is a schematic timing diagram of a Four Data Phase Byte-Count Memory-Write Showing Target Decode "B" with 0 Initial Wait States according to the present invention.
Figure 13:
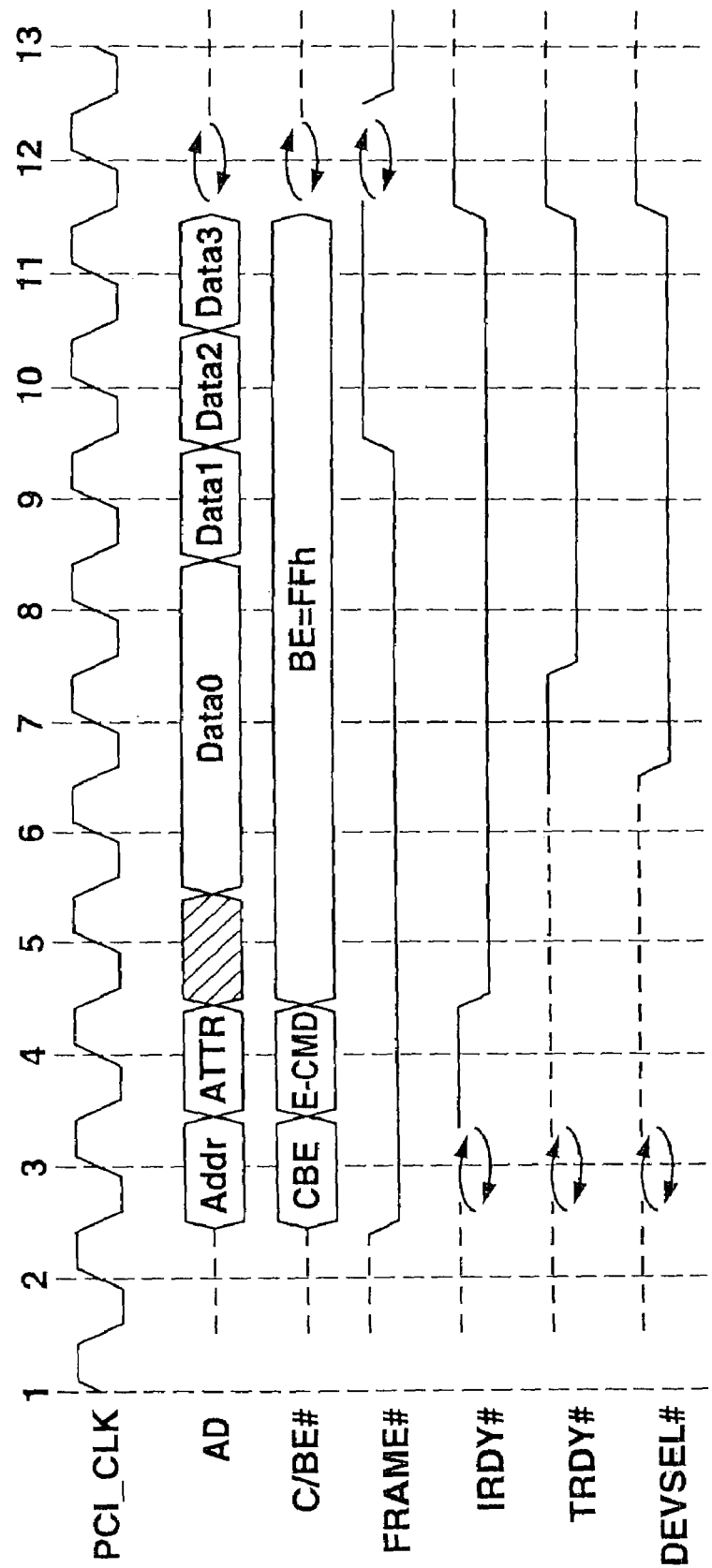
FIG. 13 is a schematic timing diagram of a Four Data Phase Byte-Count Memory-Write Showing Target Decode "C" with 0 Initial Wait States according to the present invention.
Figure 14:
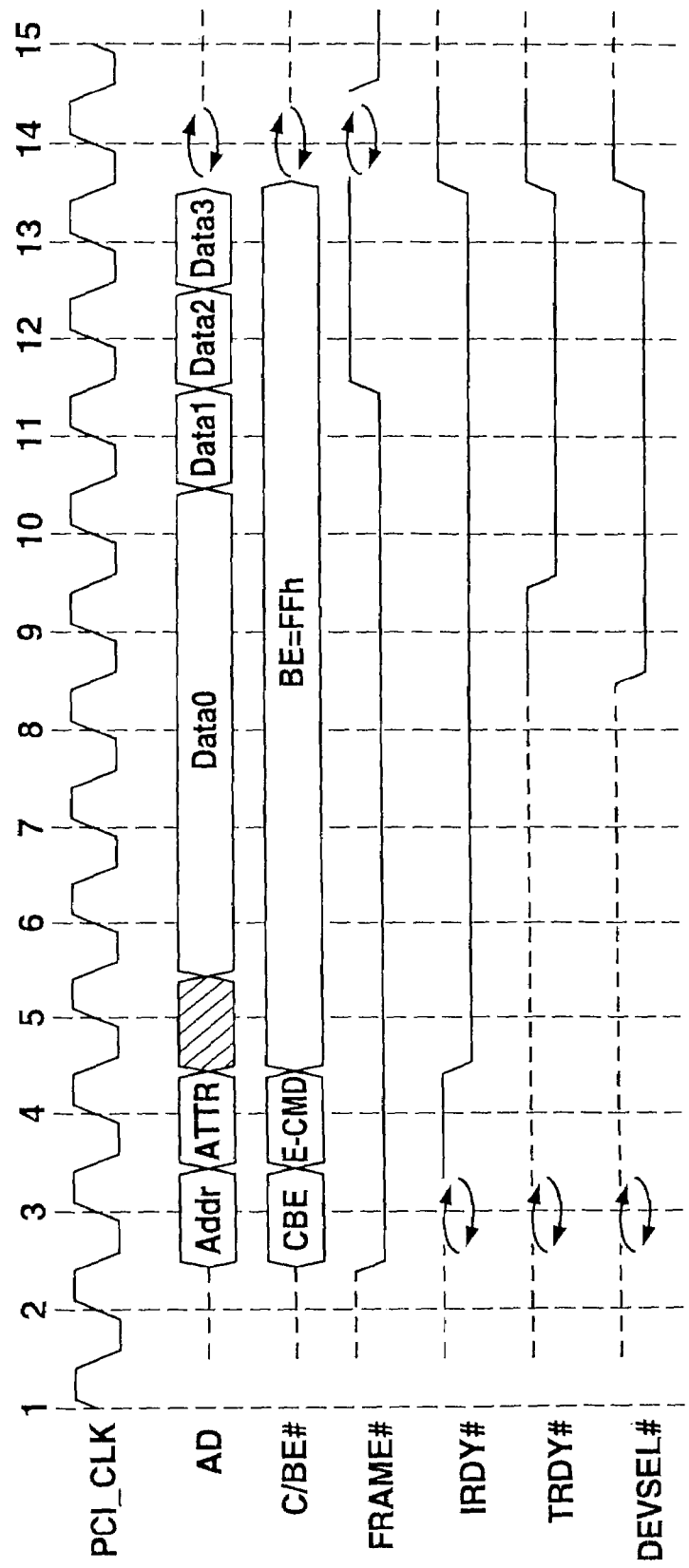
FIG. 14 is a schematic timing diagram of a Four Data Phase Byte-Count Memory-Write Showing Target Decode "Subtractive" with 0 Initial Wait States according to the present invention.

Preferably, a target decode of B with zero initial wait states is faster than a target decode of A with 2 initial wait states, see Section I. (K), Wait States hereinbelow for a more detail description on wait state pairs. FIG. 11 is a schematic timing diagram of a Four Data Phase Byte-Count Memory-Write Showing Target Decode "A" with 0 Initial Wait States. FIG. 12 is a schematic timing diagram of a Four Data Phase Byte-Count Memory-Write Showing Target Decode "B" with 0 Initial Wait States. FIG. 13 is a schematic timing diagram of a Four Data Phase Byte-Count Memory-Write Showing Target Decode "C" with 0 Initial Wait States. FIG. 14 is a schematic timing diagram of a Four Data Phase Byte-Count Memory-Write Showing Target Decode "Subtractive" with 0 Initial Wait States;

2. Reads

Figure 15:
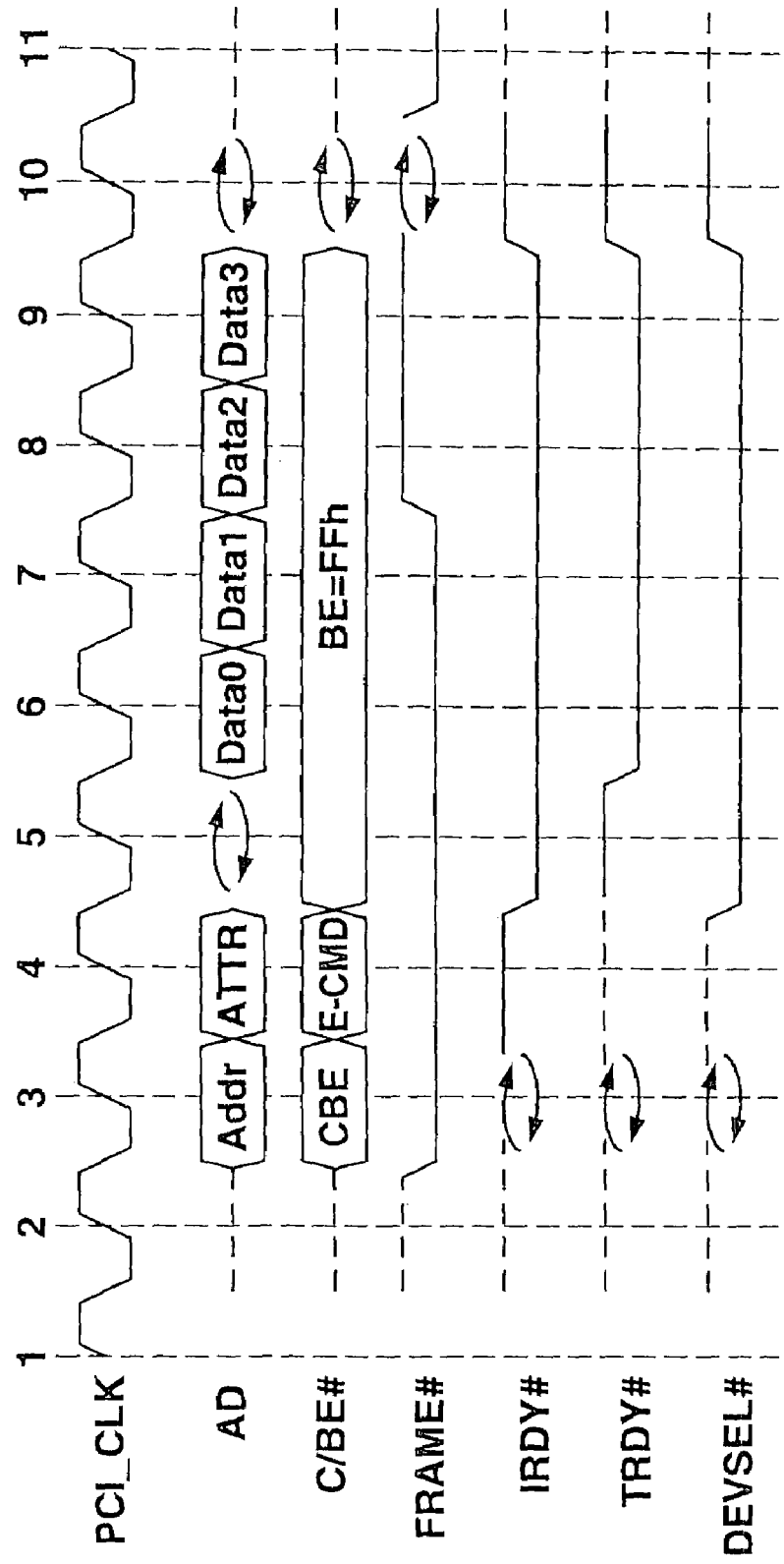
FIG. 15 is a schematic timing diagram of a Four Data Phase Byte-Count Memory-Read Showing Target Decode "A" with 0 Initial Wait States according to the present invention.
Figure 16:
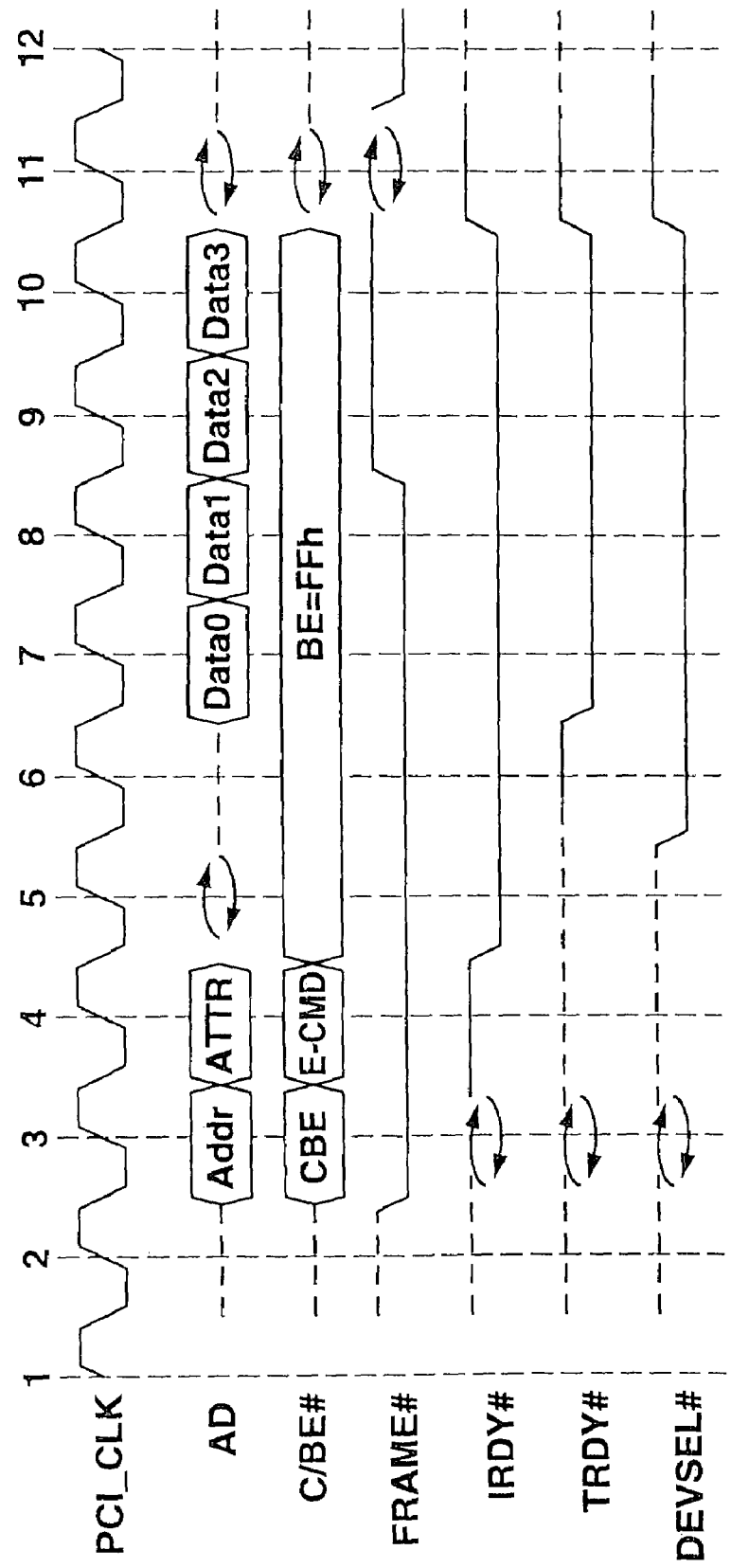
FIG. 16 is a schematic timing diagram of a Four Data Phase Byte-Count Memory-Read Showing Target Decode "B" with 0 Initial Wait States according to the present invention.
Figure 17:
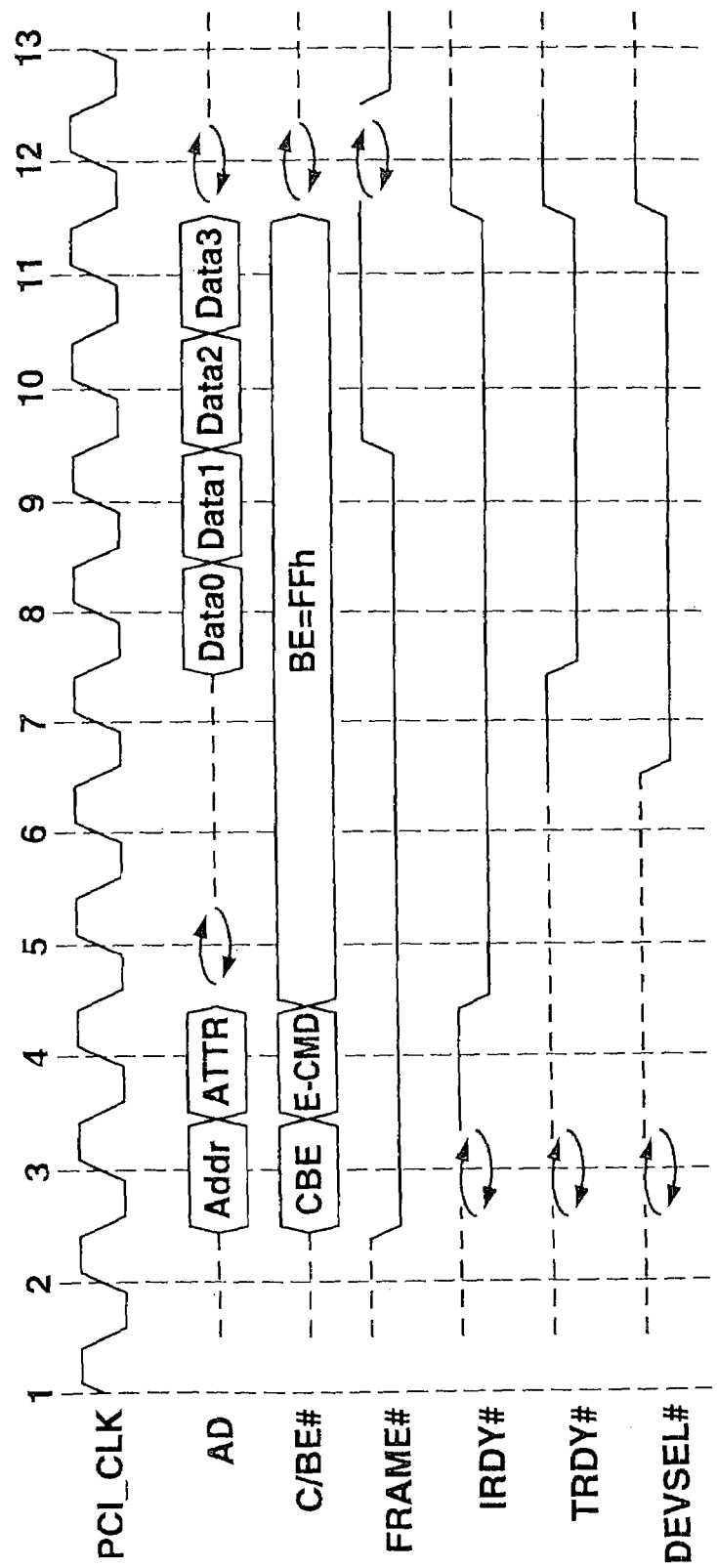
FIG. 17 is a schematic timing diagram of a Four Data Phase Byte-Count Memory-Read Showing Target Decode "C" with 0 Initial Wait States according to the present invention.
Figure 18:
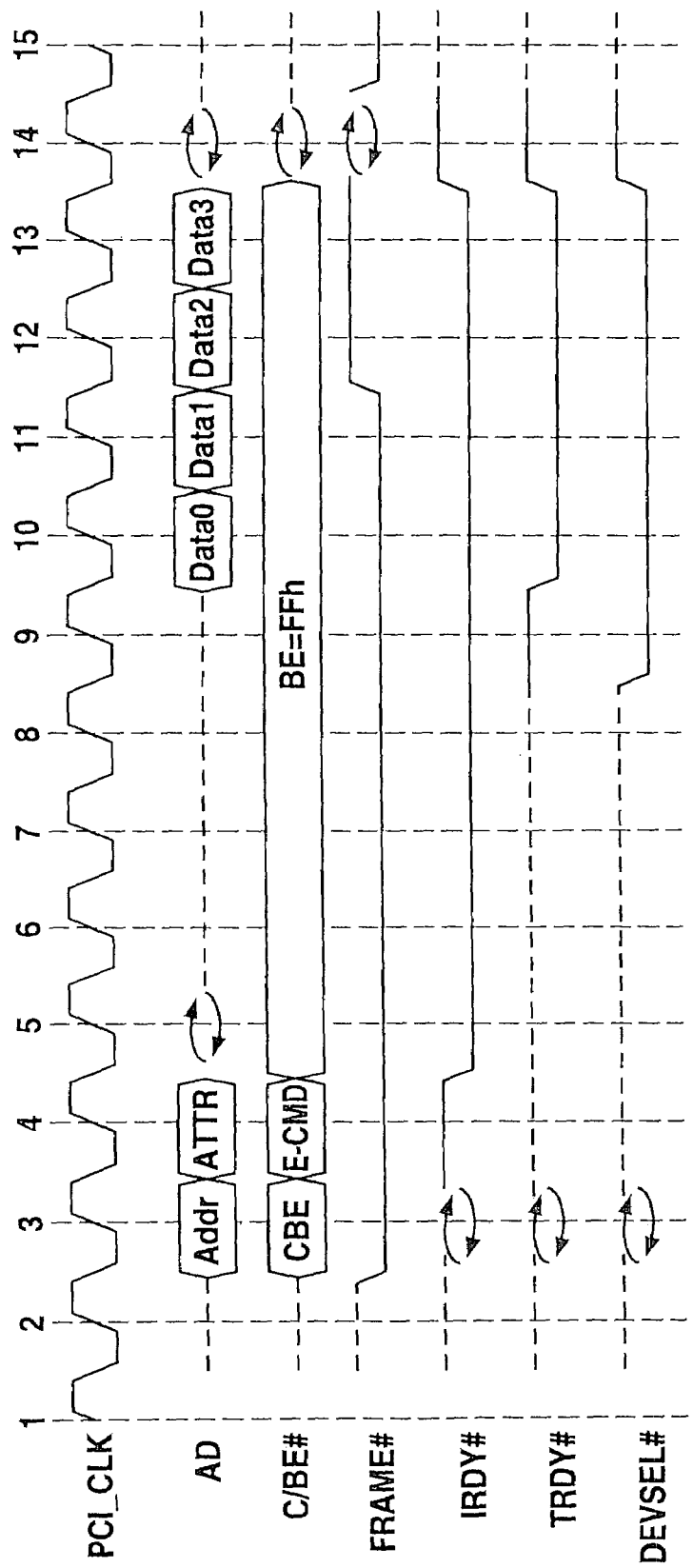
FIG. 18 is a schematic timing diagram of a Four Data Phase Byte-Count Memory-Read Showing Target Decode "Subtractive" with 0 Initial Wait States according to the present invention.

According to the present invention, FIG. 15 is a schematic timing diagram of a Four Data Phase Byte-Count Memory-Read showing Target Decode "A" with 0 Initial Wait States. FIG. 16 is a schematic timing diagram of a Four Data Phase Byte-Count Memory-Read showing Target Decode "B" with 0 Initial Wait States. FIG. 17 is a schematic timing diagram of a Four Data Phase Byte-Count Memory-Read showing Target Decode "C" with 0 Initial Wait States. FIG. 18 is a schematic timing diagram of a Four Data Phase Byte-Count Memory-Read showing Target Decode "Subtractive" with 0 Initial Wait States.

K. Wait States

According to the present invention, Registered PCI initiators do not insert wait states. Initiators are required to assert IRDY# one clock after the attribute phase. The initiator shall drive write data and shall be prepared to accept read data one clock after IRDY# is asserted. After IRDY# is asserts it shall remain asserted until the end of the transaction.

Registered PCI targets are permitted to insert initial wait states in pairs of clocks. The target shall assert TRDY# (or STOP#) an odd number of clocks after it asserts DEVSEL#. A Registered PCI target shall meet the same target initial latency requirements as a conventional target. That is, the target shall assert TRDY# (or STOP#) within 16 clocks from the assertion of FRAME# This rule applies to all devices except host bridges. Host bridges are encouraged to meet the 16 clock target initial latency on most accesses, but are permitted to extend the target initial latency up to the limit shown in Table 12 hereinbelow for typical situations in which meeting the smaller number is not possible.

TABLE 12

Target Initial Latency

| Operating Frequency | Device Target Initial Latency | Host-Bridge Target Initial Latency | Units |
| --- | --- | --- | --- |
| 33 MHz (ref) | 16 | 32 | clocks |
| 66 MHz (ref) | 16 | 32 | clocks |
| 100 MHz | 16 | 48 | clocks |
| 133 MHz | 16 | 64 | clocks |

After TRDY# is asserted it shall remain asserted until the end of the transaction. Preferably, devices should minimize initial latency of the target.

Wait states should not be used, but if necessary, the number of wait states shall be kept to a minimum. Preferably, terminating the transaction with Retry or executing it as a Split Transaction will provide more efficient use of the bus. In many cases the transaction also completes sooner. The use of Retry and Split Transactions is preferred unless there is a high probability that inserting target wait states will be faster. Even in high-frequency systems with few (maybe only one) slots, Retry termination and Split Transactions allow multi-threaded devices (e.g. multiple devices behind a PCI-to-PCI bridge) to issue multiple transactions concurrently.

Detailed timing requirements for target initial wait states are illustrated in FIGS. 19-24.

1. Writes

Figure 19:
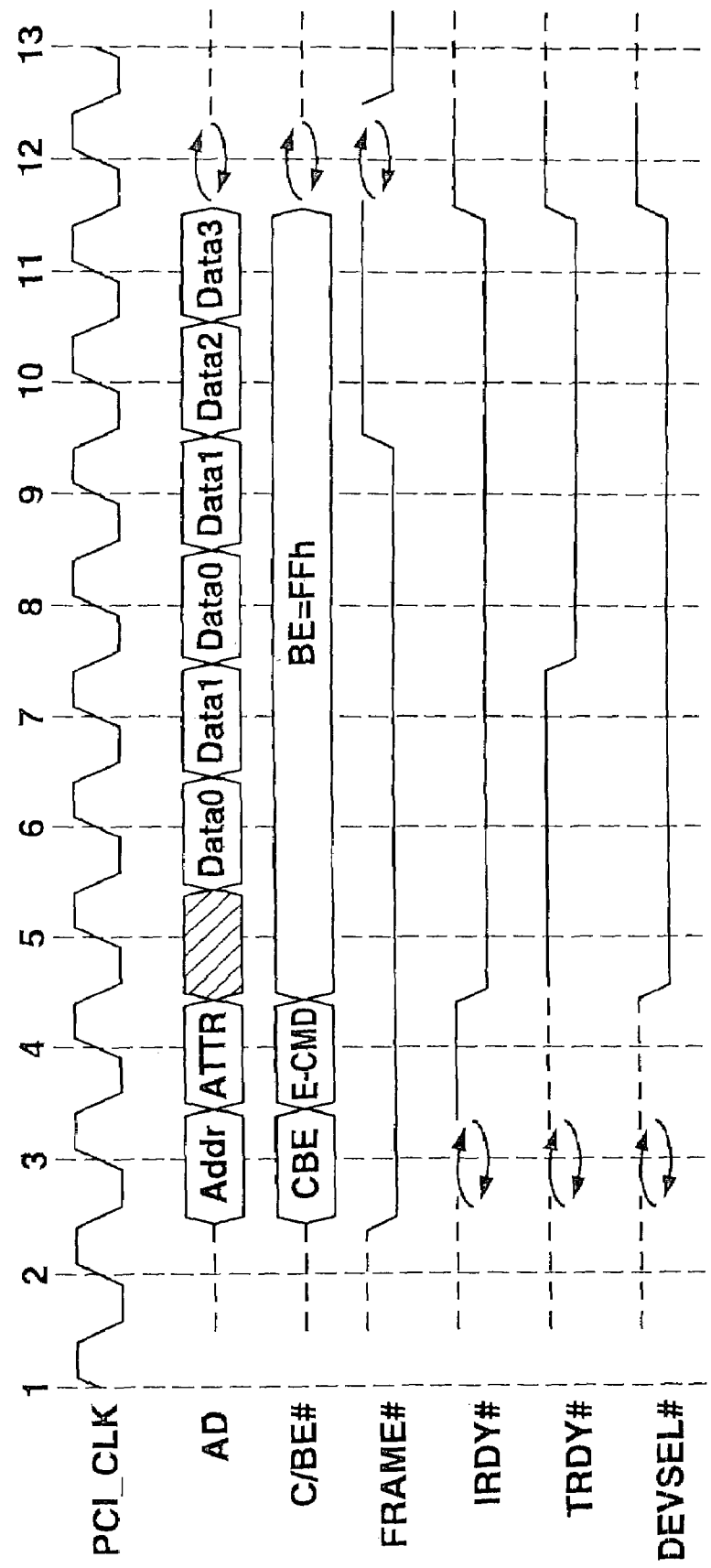
FIG. 19 is a schematic timing diagram of a Four Data Phase Byte-Count Memory-Write Showing Target Decode "A" with 2 Initial Wait States according to the present invention.
Figure 20:
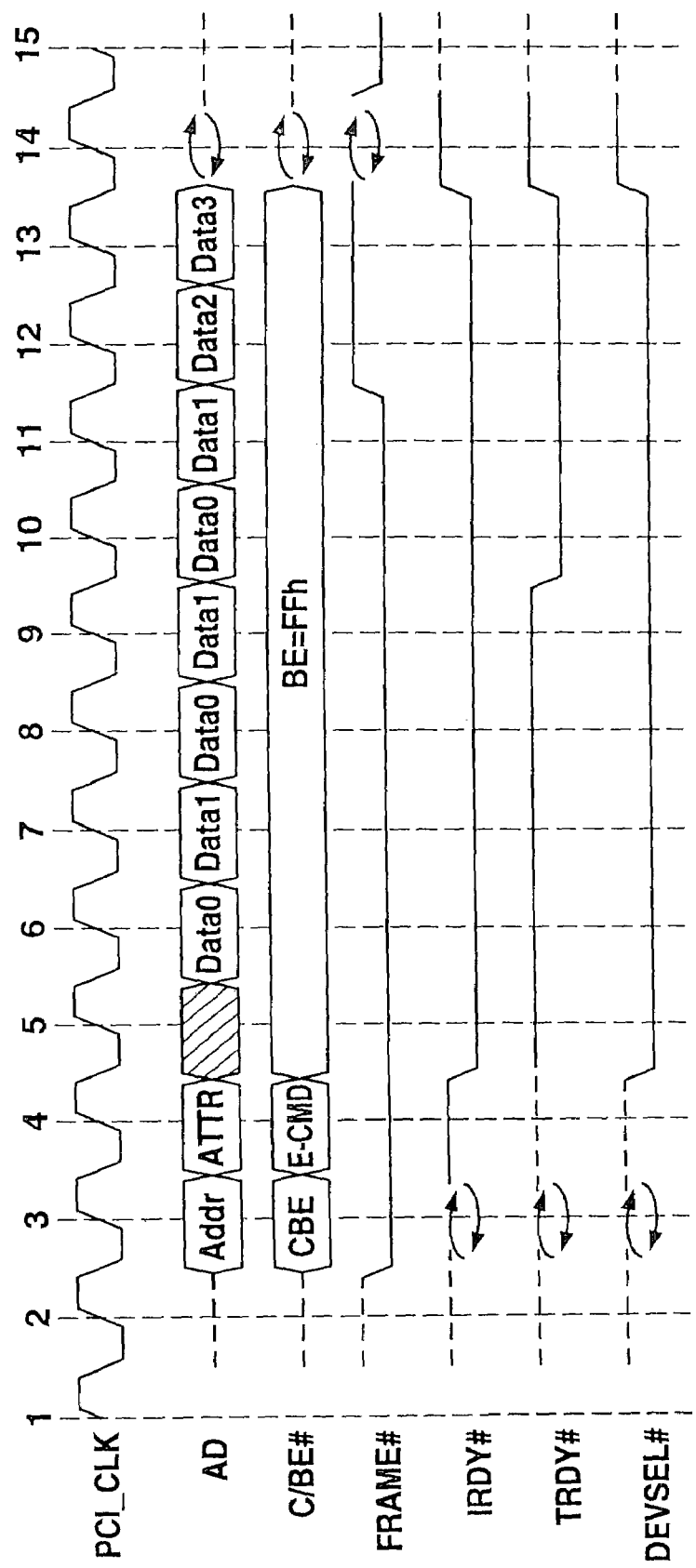
FIG. 20 is a schematic timing diagram of a Four Data Phase Byte-Count Memory-Write Showing Target Decode "A" with 4 Initial Wait States according to the present invention.
Figure 21:
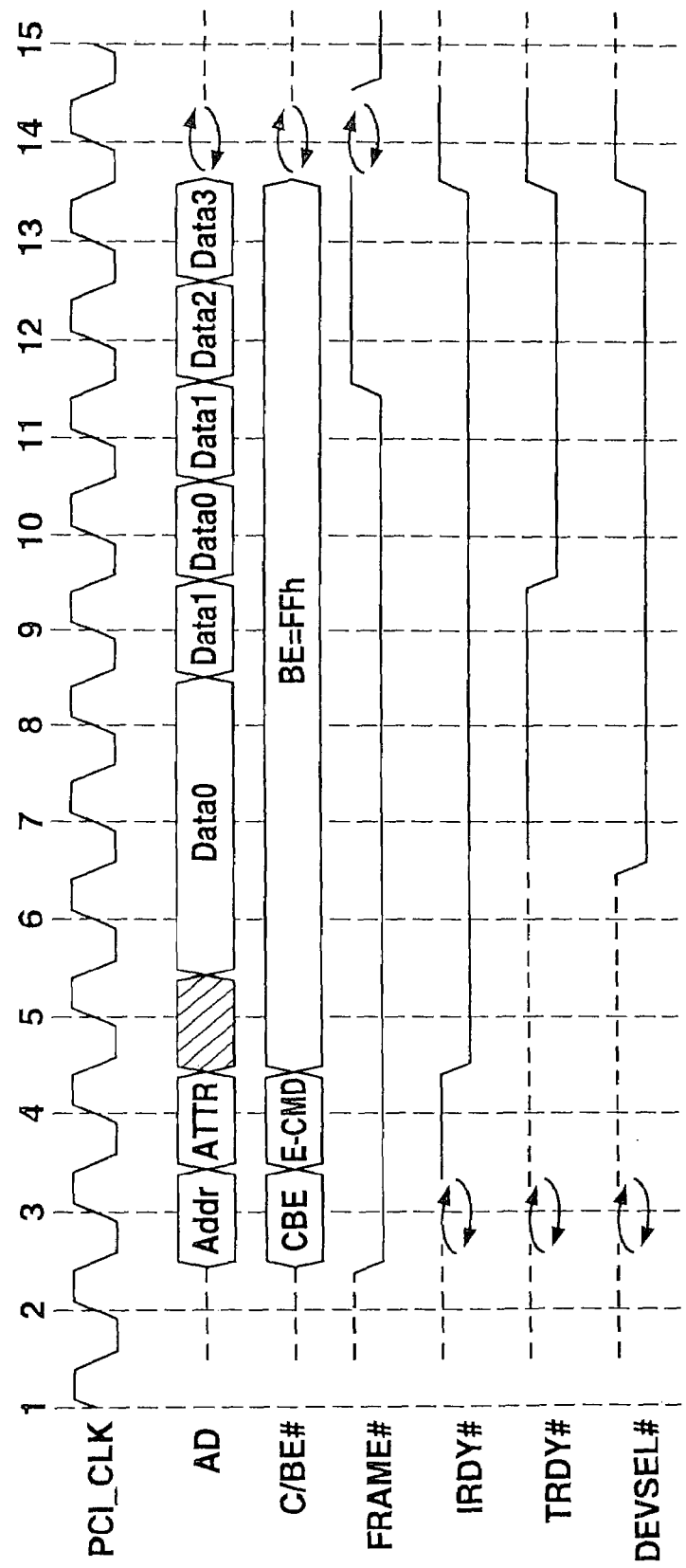
FIG. 21 is a schematic timing diagram of a Four Data Phase Byte-Count Memory-Write Showing Target Decode "C" with 2 Initial Wait States according to the present invention.

Referring now to FIGS. 19-21, FIG. 19 illustrates a Four Data Phase Byte-Count Memory-Write Showing Target Decode "A" with 2 Initial Wait States. FIG. 20 is a schematic timing diagram of a Four Data Phase Byte-Count Memory-Write Showing Target Decode "A" with 4 Initial Wait States. FIG. 21 is a schematic timing diagram of a Four Data Phase Byte-Count Memory-Write Showing Target Decode "C" with 2 Initial Wait States.

FIG. 19 illustrates a write transaction with 4 data phases, at clocks 6 and 7 the initiator toggling between DATA0 and DATA1. This toggling starts once the initiator detects the target assertion of DEVSEL#, and continues until the initiator detects the target assertion of TRDY#, which does not occur until clock 8. FIG. 20 illustrates a similar transaction with 4 target initial wait states, with the initiator toggling DATA0 and DATA1 at clocks 6, 7, 8, and 9, until the initiator detects the targets assertion of TRDY# at clock 10.

2. Reads

Figure 22:
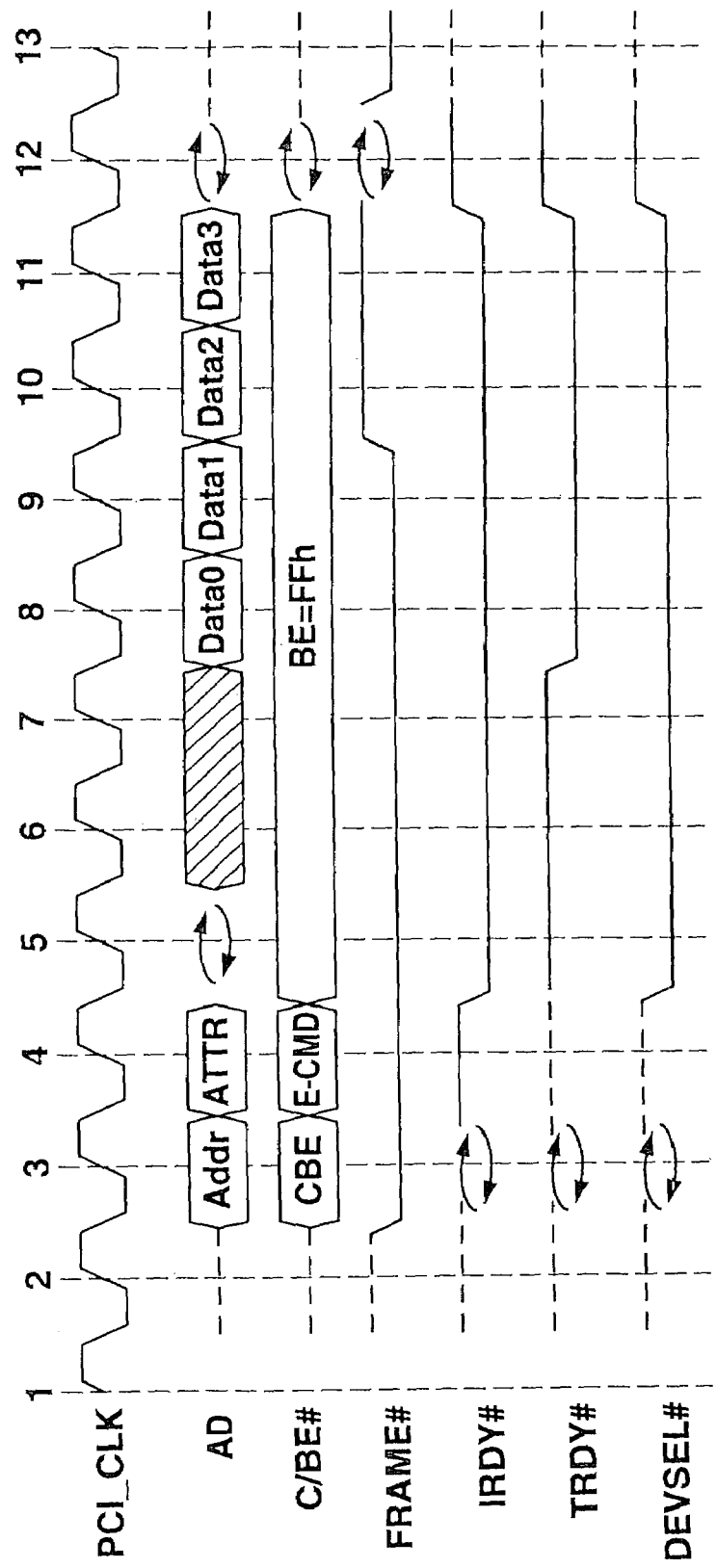
FIG. 22 is a schematic timing diagram of a Four Data Phase Byte-Count Memory-Read Showing Target Decode "A" with 2 Initial Wait States according to the present invention.
Figure 23:
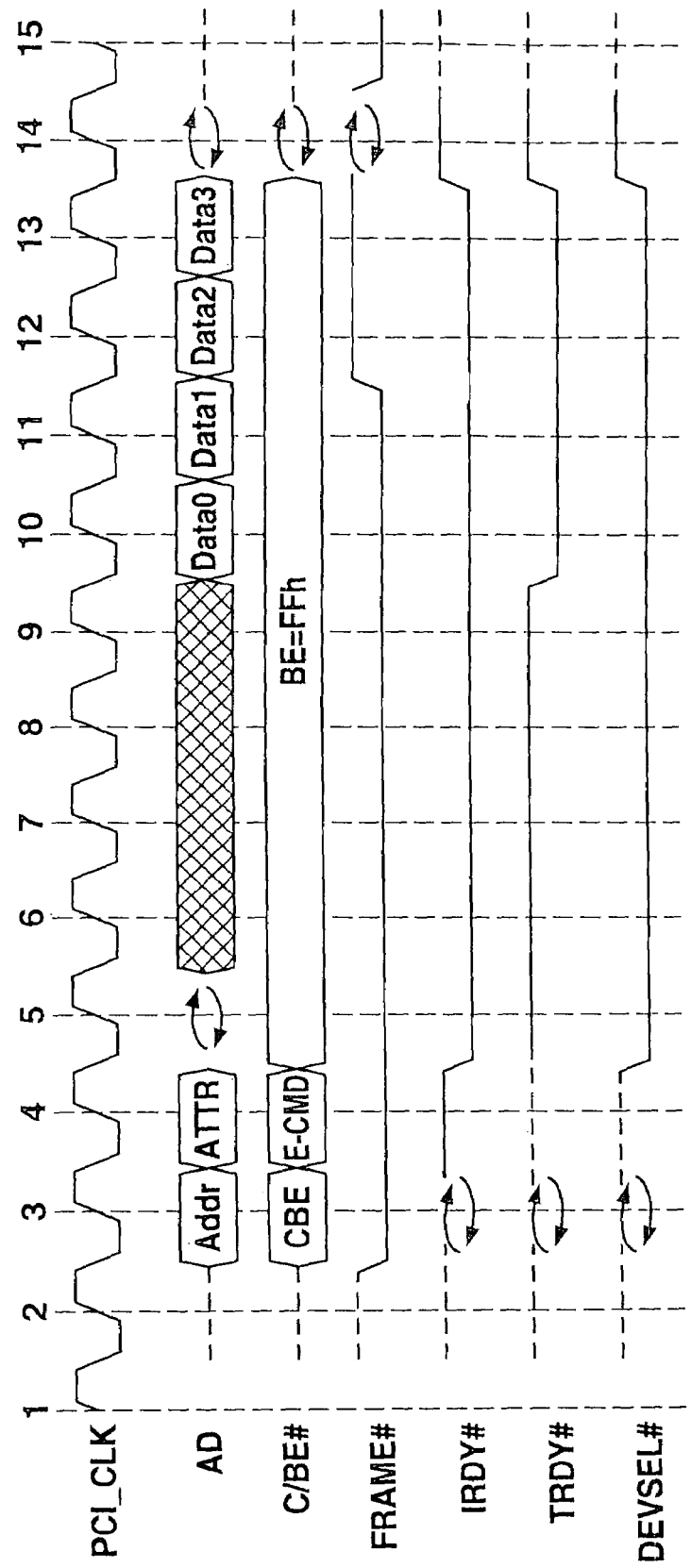
FIG. 23 is a schematic timing diagram of a Four Data Phase Byte-Count Memory-Read Showing Target Decode "A" with 4 Initial Wait States according to the present invention.
Figure 24:
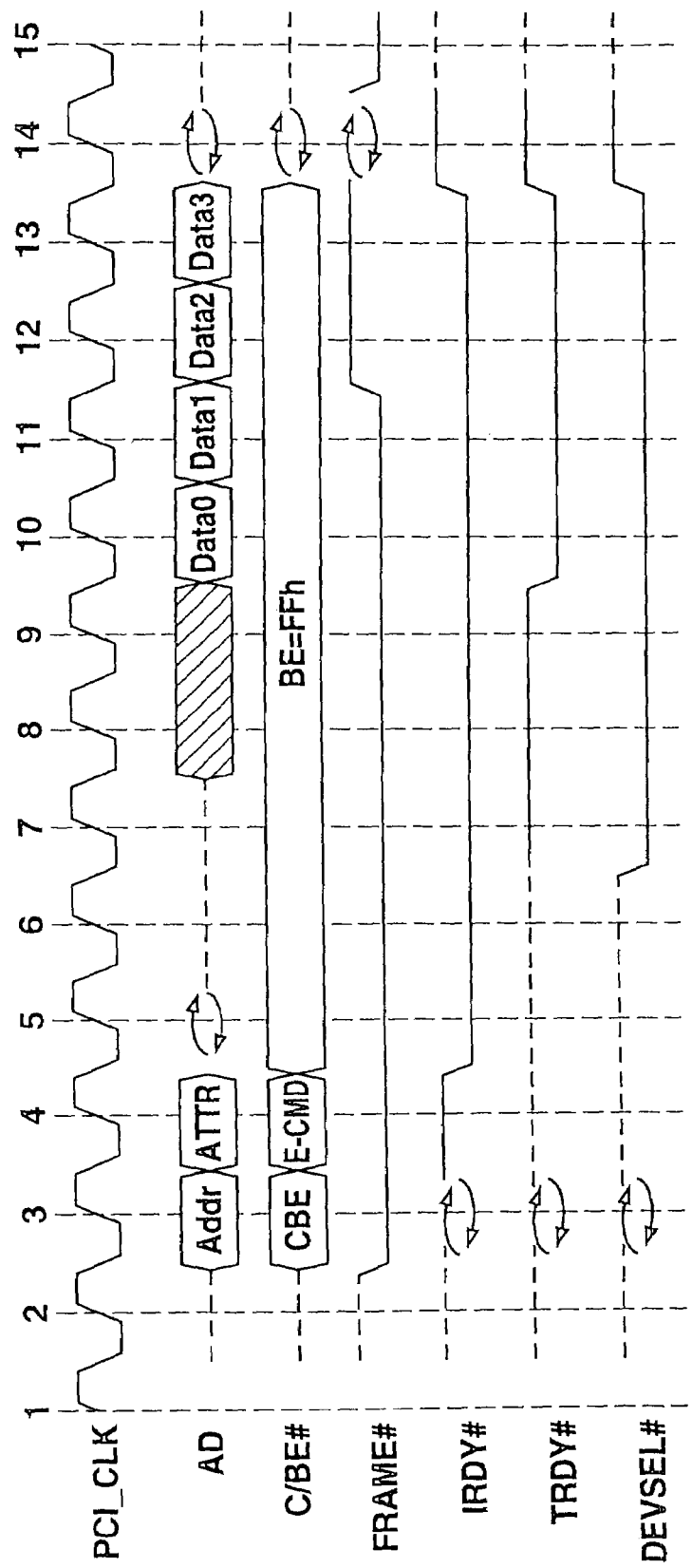
FIG. 24 is a schematic timing diagram of a Four Data Phase Byte-Count Memory-Read Showing Target Decode "C" with 2 Initial Wait States according to the present invention.

Referring now to FIGS. 22-24, FIG. 22 illustrates a schematic timing diagram of a Four Data Phase Byte-Count Memory-Read Showing Target Decode "A" with 2 Initial Wait States. FIG. 23 illustrates a schematic timing diagram of a Four Data Phase Byte-Count Memory-Read Showing Target Decode "A" with 4 Initial Wait States. FIG. 24 illustrates a schematic timing diagram of a Four Data Phase Byte-Count Memory-Read Showing Target Decode "C" with 2 Initial Wait States.

L. Configuration Transactions

Figure 25:
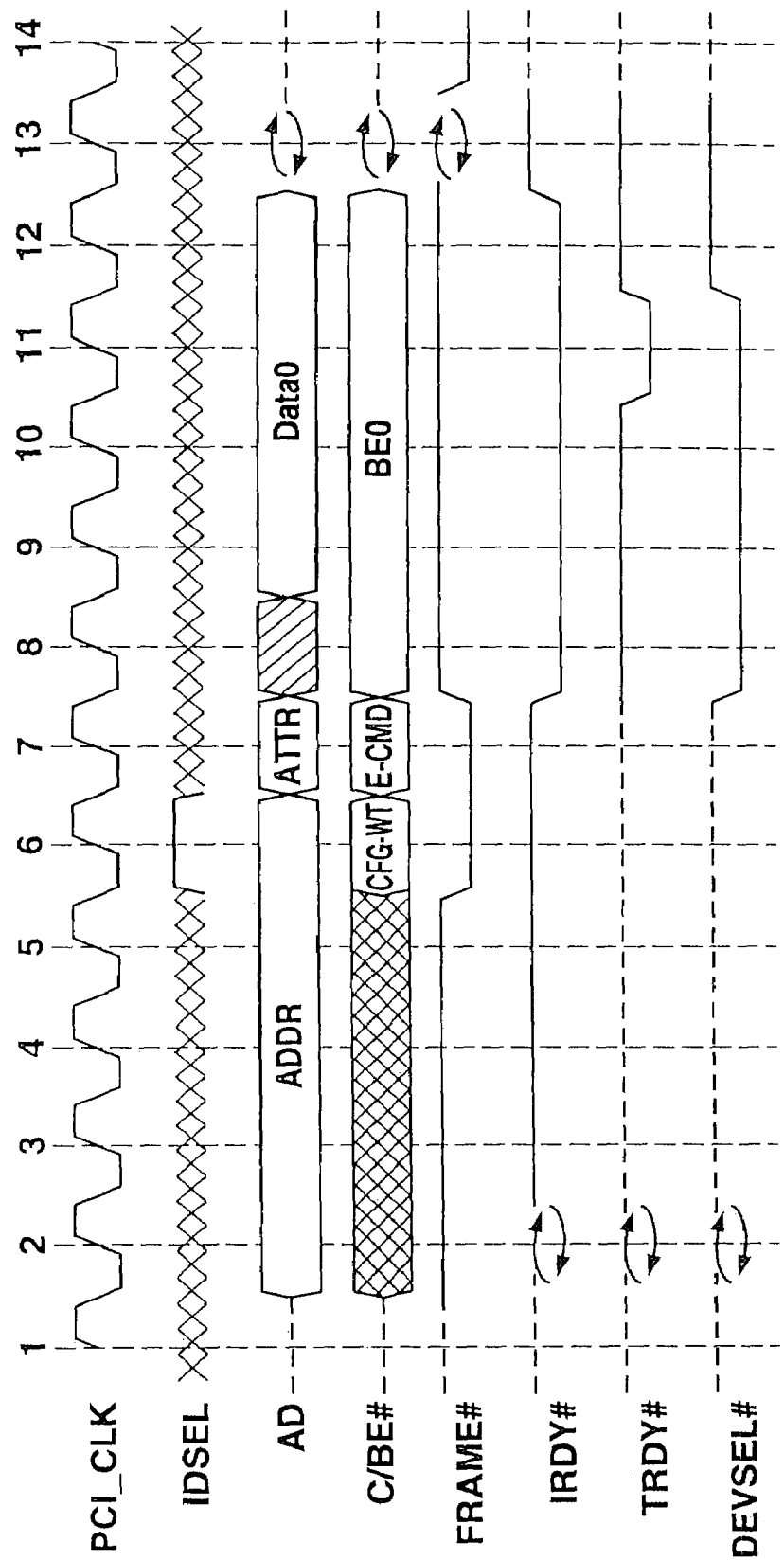
FIG. 25 is a schematic timing diagram of a Registered PCI Configuration-Write Transaction according to the present invention.
Figure 26:
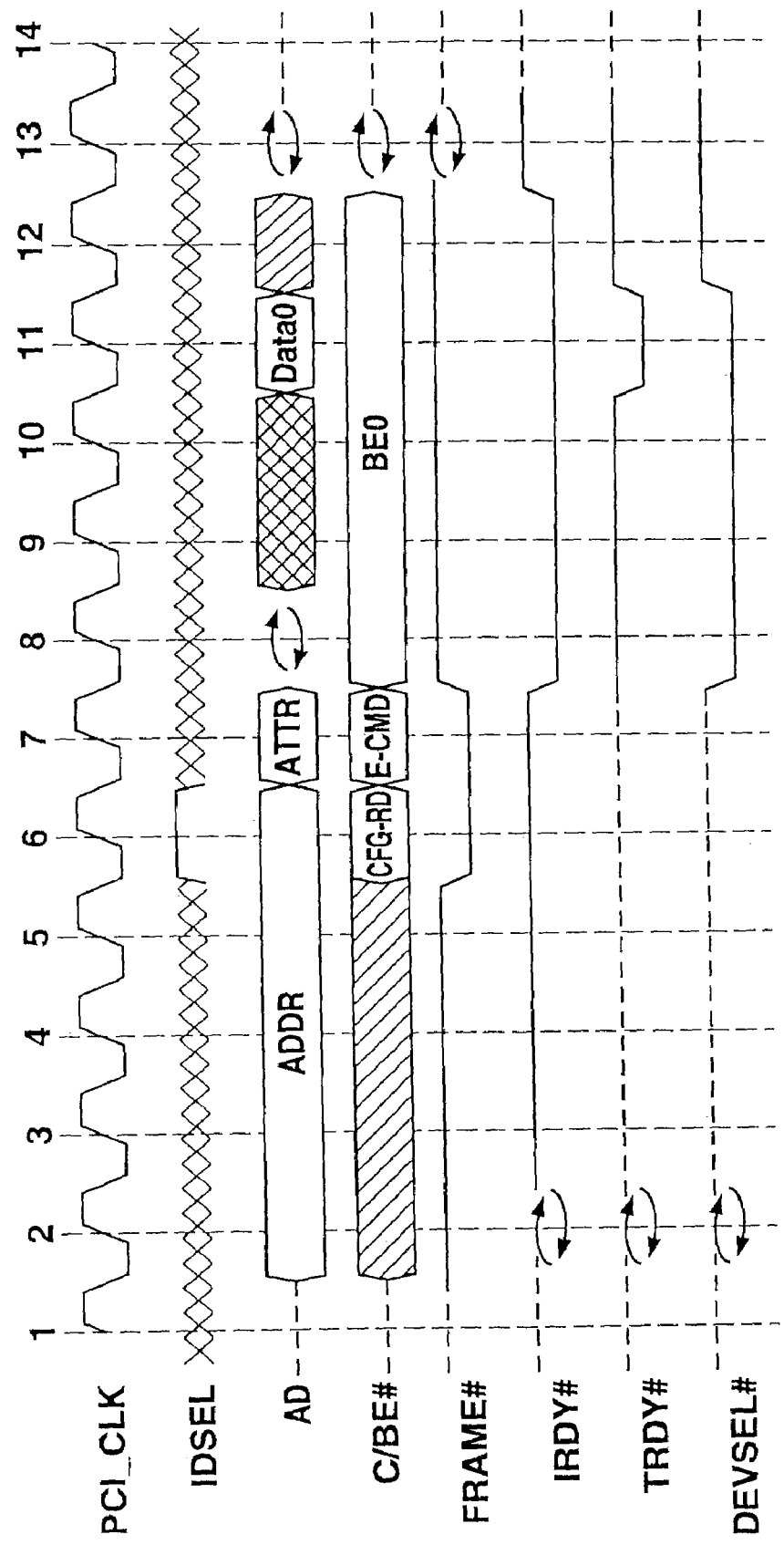
FIG. 26 is a schematic timing diagram of a Registered PCI Configuration-Read Transaction according to the present invention.

Registered PCI initiators shall provide 4 clocks of valid address before asserting FRAME#. This allows time for the IDSEL input signal to rise through a series resistor on the system board. Once FRAME# is asserted, the rest of the transaction proceeds like any other byte-enable transaction. FIGS. 25 and 26 illustrate a Registered PCI configuration-write transaction and a configuration-read transaction, respectively. Both FIGS. 25 and 26 show DEVSEL# timing A with 2 target initial wait states. All legal DEVSEL# timing speeds and initial wait states combinations are valid for configuration transactions as well. Note that DEVSEL# timing B with no initial wait states is actually one clock faster the examples shown in FIGS. 25 and 26.

M. Delayed Transactions

Delayed Transactions are contemplated herein and are within the scope of the Registered PCI invention, however, the use of Delayed Transactions preferably should be minimized. Split Transactions are preferred in place of Delayed Transactions as a Split Transaction generally provides more efficient use of the bus, see Section I. (N), Split Transactions hereinbelow for a more detailed description of Split Transactions. In many cases a Split Transaction also completes sooner in addition to allowing multi-threaded devices (e.g. multiple devices behind a PCI-to-PCI bridge) to issue multiple transactions concurrently. If a Delayed Transaction cannot be avoided, the following rules shall apply.

For the initiator:
1. The initiator is shall repeat the full starting address specified on the AD bus down to the byte, including AD[2:0] for all transaction terminated with Retry.
2. The initiator shall repeat all attributes for all transaction terminated with Retry
3. The initiator shall repeat a transaction terminated with Retry, until the transaction completes. Device drivers are not permitted to reset any device with an outstanding transaction (either Delayed Transaction or Split Transaction)

For the target:
1. The target shall latch and compare a Delayed Transaction just like conventional PCI. Targets are optionally allowed to further identify the transaction using the Initiator Sequence ID and/or Byte-Count.
2. The target is not required to use the Discard Timer like conventional PCI since Registered PCI initiators are required to repeat all Retried transactions.

N. Split Transactions

According to the Registered PCI invention, Split Transactions is a new, novel and non-obvious transaction type that enables memory-read transactions to use the bus almost as efficiently as memory-write transactions.

1. Basic Split Transaction Requirements

Only memory-read transactions that use byte-count protocol use Split Transactions. The target of any byte-count memory-read transaction may optionally complete the transaction as a Split Transaction or may use any other termination method (immediate response, Retry, or Delayed Transaction), as determined by the rules for those termination methods. All of these termination alternatives are available regardless of whether the transaction was previously terminated with Retry, or whether the transaction is the initial transaction of a Sequence (i.e. the Initial Sequence Request attribute bit is set) or a continuation of a Sequence previously disconnected after transferring some data. Once the target terminates a byte-count memory-read transaction with Split Response, the target shall transfer the entire remaining byte count as a Split Completion (except for error conditions described hereinbelow).

A Split Transaction begins when an initiator (called the requester) initiates a memory-read transaction using a byte-count extended command. If a target (called the completer) that supports Split Transactions is addressed by such a transaction, it may optionally signal a Split Response termination by doing the following:
1. Assert DEVSEL# in the response phase to claim the transaction on clock N.
2. Assert STOP# on clock N+1.
3. Assert TRDY# on clock N+2.
4. Deassert TRDY#, STOP#, and DEVSEL# to terminate the transaction on clock N+3.

The above four-step sequence assumes no target initial waits were inserted between steps 1 and 2. If target initial wait states were inserted, steps 2 through 4 shall be adjusted accordingly.

The completer fetches the byte count specified in the Split Request, or fetches up to a convenient ADB before reaching the byte count. The completer then asserts its REQ# signal to request the bus. When the arbiter asserts GNT# to the completer, the completer initiates a Split Completion transaction to send the requested read-data to the requester. Notice that for a Split Completion transaction the requester and the completer switch roles. The completer becomes the initiator of the Split Completion transaction, and the requester becomes the target.

A Split Completion transaction begins with the same command, address, and attributes (unless otherwise indicated) as the original byte-count memory-read transaction (the Split Request). The extended command is Split Completion. The byte count will be the same as the Split Request, except in error conditions described later. The Initial Sequence Request bit is set when the Split Completion begins. The completer is permitted to set or clear the Disconnect on First ADB attribute bit in the Split Completion, regardless of the state of the bit in the Split Request.

The completer and the requester are permitted to disconnect the Split Completion transaction on any ADB, following the same protocol as a memory-write transaction. If a Split Completion is disconnected before all the requested data is sent, the completer continues to request the bus to send the rest of the data. Note that the Completer might delay a similar length of time preparing the continuation of the Split Completion that it did preparing the first part of the Sequence. When the completer is granted the bus, it continues the Split Completion using the same Sequence ID but adjusting the address and byte count for the data already sent, and resetting the Initial Sequence Request attribute. The completer shall keep all Split Completions for a single Split Request (i.e. with the same Sequence ID) in ascending address order. An intervening bridge shall maintain the order of Split Completion transactions with the same Sequence ID.

Requesters and intervening bridges identify individual Split Completions by their Initiator Bus Number and Initiator Number. The requester claims the transaction and accepts the data, using decode timing B or slower. (The requester shall wait for the Split Completion extended command to arrive before it can determine whether or not to claim the transaction.) A PCI-to-PCI bridge forwards a Split Completion based on the Initiator Bus Number in the attribute field. If the Initiator Bus Number is between the bridge's secondary bus number and subordinate bus number, inclusive, the bridge forwards the Split Completion. The bridge ignores the address of Split Completions (since the address is that of the completer not the requester).

A completer is permitted to accept a single Split Request at a time. Such a device is permitted to terminate subsequent byte-count memory-read transactions with Retry until the requester accepts the Split Completion. (Overall system performance will generally be better if completers accept multiple Split Transactions at the same time.)

2. Requirements for Accepting Split Completions

The requester shall accept all Split Completions resulting from Split Requests from that requester. The requester shall assert DEVSEL# on all such Split Completions. The requester shall accept the entire byte count requested. The requester may disconnect a Split Completion on any ADB (within the limits discussed below), but shall continue to accept the continuation of the Split Completion until all bytes are accepted. If the requester no longer needs the Split Completion, the requester shall accept it anyway and then discard it.

If a requester issues more than one Split Request at a time (different Sequence Numbers), the requester shall accept the Split Completions from the separate requests in any order. (Split Completions with the same Sequence number will always occur in ascending address order.)

In general, a requester shall have a buffer ready to receive the entire byte count for all Split Requests it issues. A requester may disconnect a Split Completion transaction or to terminate it with Retry only under unusual circumstances that are guaranteed to resolve in a short period of time. If a requester delays accepting Split Completion data, that data will be stalled in intermediate buffers in the completer and in intervening bridges. Such behavior will prevent other devices from using these buffers and may degrade system performance.

To prevent one requester from consuming more system buffer space than is appropriate, the length of time a requester can hold off accepting Split Completion transactions is limited. Preferably, the requester shall not hold off a Split Completion transaction for more than 1 μs in any 20 μs period. This preferred Split Completion hold-off time is calculated as follows for any 20 μs period:

$$H = \sum_{n=1}^{N} h_n \le 1 \text{ μs, where}$$

H=total hold-off time $h_n = n_{th}$ hold-off time for a Split Completion. $h_n$ is measured from the time the requester asserts STOP# to disconnect or terminate the transaction with Retry, until the requester asserts TRDY# for a subsequent Split Completion transaction.

N=number of Split Completions in the 20 μs period, for all Split Requests from a single requester.

The intent of this requirement is that the device behave well in normal use. The actual hold-off time for a transaction is a function not only of when the requester is ready to accept a transaction, but also when the completer repeats the transaction. The Split Completion hold-off limitation requirements are verified when the bus is idle except for a single requester and completer and when the bus is operating at 100 MHz. It is assumed that if the device meets the maximum hold-off requirement under these test conditions, it will behave well in normal use.

Figure 27:
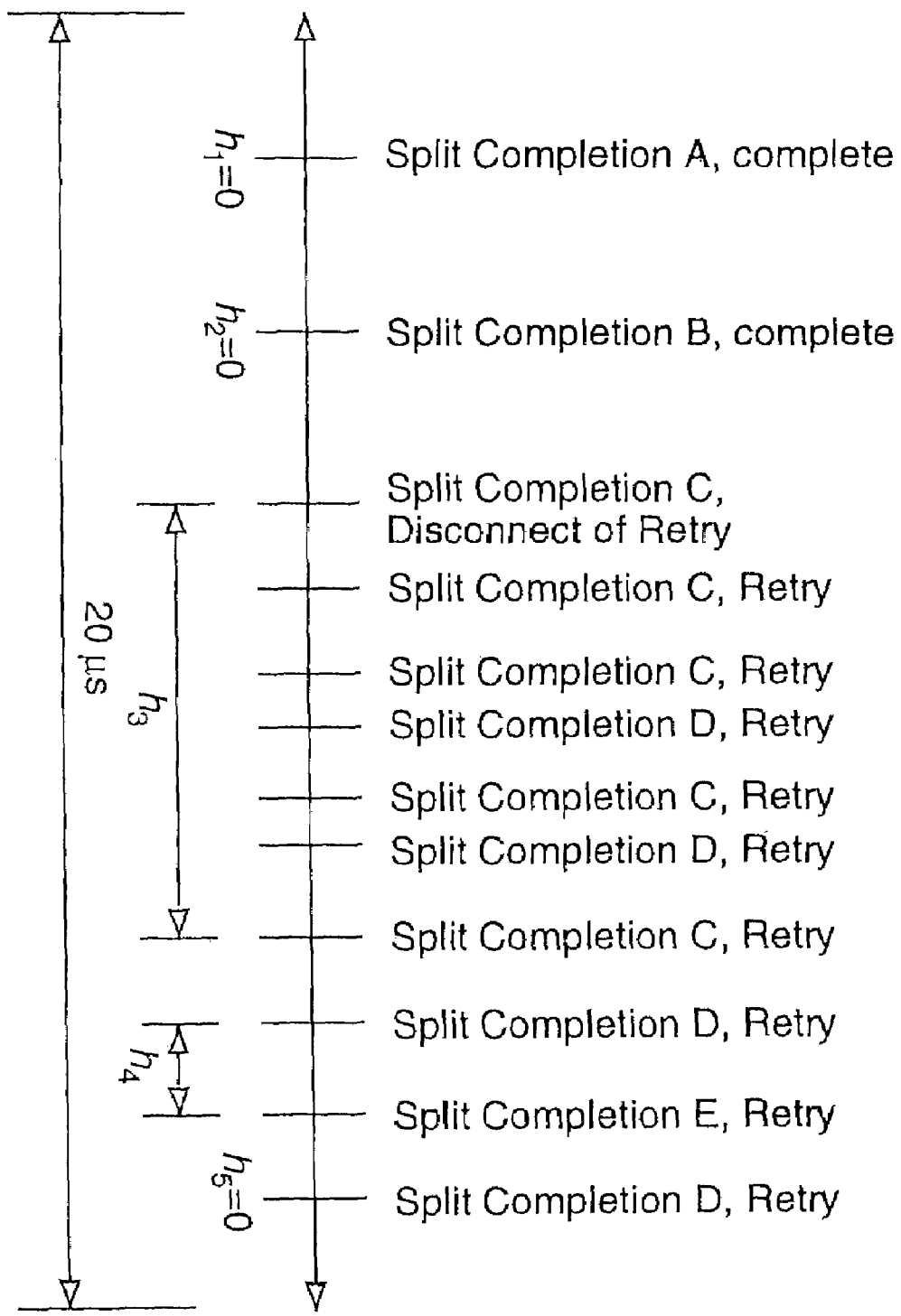
FIG. 27 is a schematic timeline diagram of Calculation of Maximum Retry Time for Split Transactions according to the present invention.

FIG. 27 illustrates how the maximum hold-off time for Split Completions is calculated for one 20 μs period. Split Completions A and B are completed immediately by the requester, so hold-off time $h_1$ and $h_2$ are both zero. Split Completions C and D terminates with Retry several times before the requester is able to accept the Split Completion. Notice the completer issues Split Completion D before the requester accepts Split Completion C, indicating that the two completions are associated with different Split Requests (different Sequence Numbers). The third hold-off time begins when the requester asserts STOP# to disconnect or terminate with Retry Split Completion C. It ends the next time the requester asserts TRDY# to resume accepting Split Completion data ("Split Completion C, completion" in the figure). Hold-off time $h_4$ begins the next time the requester asserts STOP# for a Split Completion and ends the next time it asserts TRDY# for a Split Completion. In FIG. 27 this is illustrated as the next time Split Completion D is terminated with Retry and when Split Completion E completes. Split Completion D then completes without additional hold-off the next time it is repeated by the completer, making $h_5$ zero. (Split Completions D and E shall have different Sequence Numbers, since the completer issued Split Completion E before the requester accepted Split Completion D.) The total of $h_1$ through $h_5$ shall be less than 1 μs.

Any completer that is ready to accept its Split Completion data at least 95% of any 20 μs period automatically meets this hold-off requirement.

Bridges from one Registered PCI bus to another are exempt from these buffering and Retry termination limits. Since they are acting as intermediate agents for other devices that are subject to these limits, Split Completion transactions held in bridge buffers will move quickly through the bridge to the original requester, making room for other Split Completions.

3. Split Completion Exception Message

If an abnormal condition occurs while a completer is executing a Split Transaction, the completer responds by sending a Split Completion Exception Message to the requester. The only abnormal conditions defined herein are error conditions.

Abnormal conditions can occur in three different phases of a Split Transaction: 1) during the Split Request, 2) during the execution of the request by the completer, and 3) during the Split Completion.

There are no special requirements for handling an abnormal condition (that is, an error condition) that occurs during a Split Request. All error conditions are handled as they would be for a conventional transaction.

Abnormal conditions can also occur in the second phase of a Split Transaction, after the completer has terminated a byte-count memory-read transaction with Split Response termination. Such conditions can prevent the completer from executing the request. Examples of such conditions include the following:

1. parity errors internal to the completer.
2. the byte count of the request exceeding the range of the completer.

If such a condition occurs, the completer shall notify the requester of the abnormal condition by sending a Split Completion Exception Message transaction. This transaction uses the address, command, and attributes (except the Byte Count) of the Split Completion it replaces but uses the Split Completion Exception Message extended command. The Split Completion Exception Message is a byte-enable extended command, so the Byte Count is unused and set to 0. The data phase for this transaction indicates the type of exception that occurred, as illustrated in Table 13 hereinbelow.

TABLE 13

Split Completion Exception Message

| AD[31:0] | Split Completion Exception Message |
|---|---|
| 0000 0000h | Other Completer Error. The completer uses this message if it encountered an error that prevents execution of the Split Request, and the error is not indicated by one of the other exception messages. For example, a PCI-to-PCI bridge that encountered a Target-Abort on the destination bus would respond with this message. Note that such an error could occur at the beginning of the Sequence or at any continuation of the Sequence after a disconnection. |
| 0000 0001h | Byte Count Out of Range. The completer uses this message if the sum of the address and the byte count of the Split Request exceeds the address range of the completer. The Completer is permitted either to send this message in lieu of a Split Completion, or to send Split Completion data up to the device boundary, disconnect on the device boundary, and then send this message in lieu of continuing the Sequence. |
| all other values | Reserved. |

If the error occurs at the beginning of the transaction, the completer sends a Split Completion Exception Message in lieu of the initial Split Completion. After a normal disconnection of the Split Completion the completer may send a Split Completion Exception Message in lieu of the continuation of the Split Completion. Once the exception message has been sent, the rest of the Split Completion is discarded, regardless of how many bytes remain to be sent.

A variety of abnormal conditions can occur during the third phase of the Split Transaction, which is the Split Completion transaction. If the Split Completion transaction completes with either Master-Abort or Target-Abort, the requester is indicating a failure condition that prevents it from accepting the data it requested. In this case if the Split Request addresses a prefetchable location, the completer shall discard the Split Completion and take no further action. If the location is not prefetchable, the completer shall discard the Split Completion, set the Split Completion Discarded bit in the Registered PCI Status Register, and assert SERR# (if enabled).

A Split Completion normally will terminate with data transfer or with Retry. The requester is limited as to the length of time it can terminate with Retry before it shall accept the data. The requester is permitted to disconnect the Split Completion but is obligated eventually to take all the data. A properly functioning requester will eventually use some termination other than Retry and will take all the data indicated by the Byte Count of the original Split Request.

For completeness the completer's response to the abnormal terminations, Master-Abort and Target-Abort, is specified. The transaction would terminate with Master-Abort if the requester did not recognize the Sequence ID of the Split Completion. This condition could occur because the requester was reset and is no longer expecting the Split Completion. Such conditions do not occur frequently but sometimes occur when a device driver is manually unloaded, or the device encounters an error that required the driver to reset the device. The Split Completion would terminate with Target-Abort if the address or Byte Count became corrupted, or if the requester encountered an internal error that prevented it from taking the Split Completion.

If the requester detects a data parity error during a Split Completion, it asserts PERR# if enabled and sets bit 15 (Detected Parity Error) in the Status register. The requester also sets bit 8 (Master Data Parity Error) in the Status register, because it was the original initiator of the Sequence (even though the completer is the initiator of the Split Completion).

4. Unexpected Split Completion Exceptions

The requester shall accept all Split Completions transactions with the requester's Bus Number and Initiator Number. If the claimed Split Completion is identified as an unexpected Split Completion by the requester, the requester still shall accept the Split Completion transaction in its entirety and discard the data. In addition to discarding the data the device shall set the Unexpected Split Completion status bit in the Registered PCI Status Register and notify its device driver of the exception. If notification of the device driver is not possible the requester shall assert SERR#, if enabled.

When identifying Split Completions transactions, the requester shall validate the Split Completion transaction Sequence Number against outstanding Split transactions. In addition to is qualifying Split Completion transaction with Sequence Number, the requester can additionally compare address and/or Byte-Count against outstanding Split Request.

O. Transaction Termination

Referring now to FIGS. 28-42, methods by which transactions can be terminated are illustrated in schematic timing diagrams, according to the Registered PCI invention. The following termination methods will be described hereinbelow: 1) Disconnect with Data, 2) Target Retry, 3) Split Response Termination, 4) Master-Abort, and 5) Target-Abort. For simplification in the disclosure of the Registered PCI invention, the FIGS. 28-42 which illustrate transaction termination show DEVSEL# timing A, and no target initial wait states. However it is within the scope of the invention and contemplated herein that all other legal DEVSEL# timings and wait state combinations are also possible.

1. Disconnect With Data a. Initiator Termination and Disconnection

Figure 28:
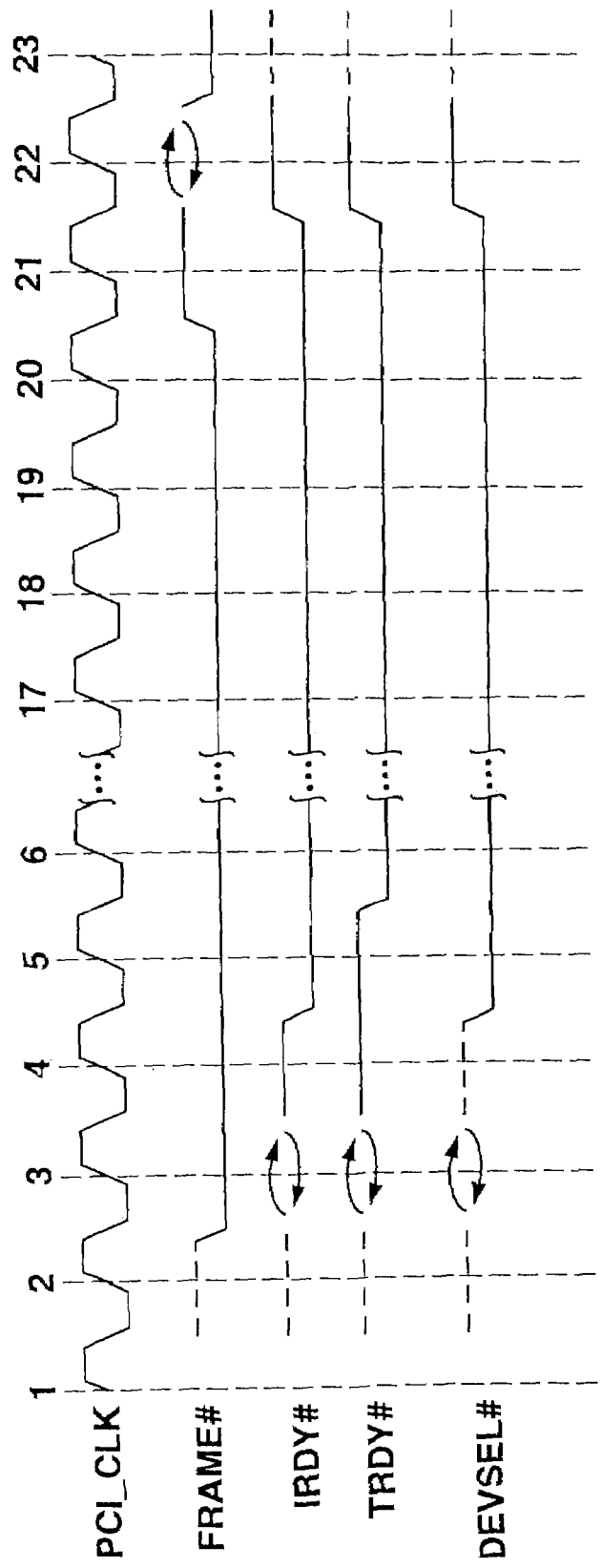
FIG. 28 is a schematic timing diagram of a Byte-Count Transaction with 4 or more Data Phases, Initiator Disconnection at ADB or Termination at Byte Count according to the present invention.
Figure 29:
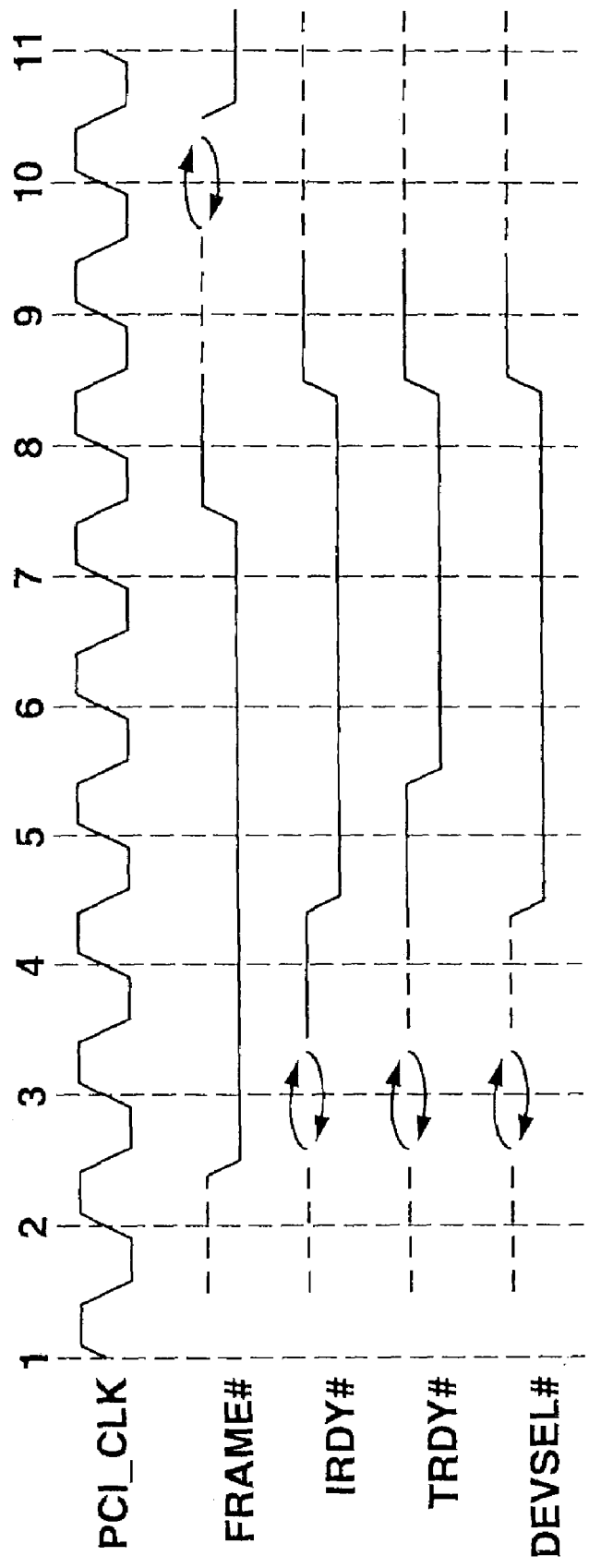
FIG. 29 is a schematic timing diagram of a Byte-Count Transaction Starting 3 Data Phases from ADB, Initiator Disconnection at ADB or Termination at Byte Count according to the present invention.
Figure 30:
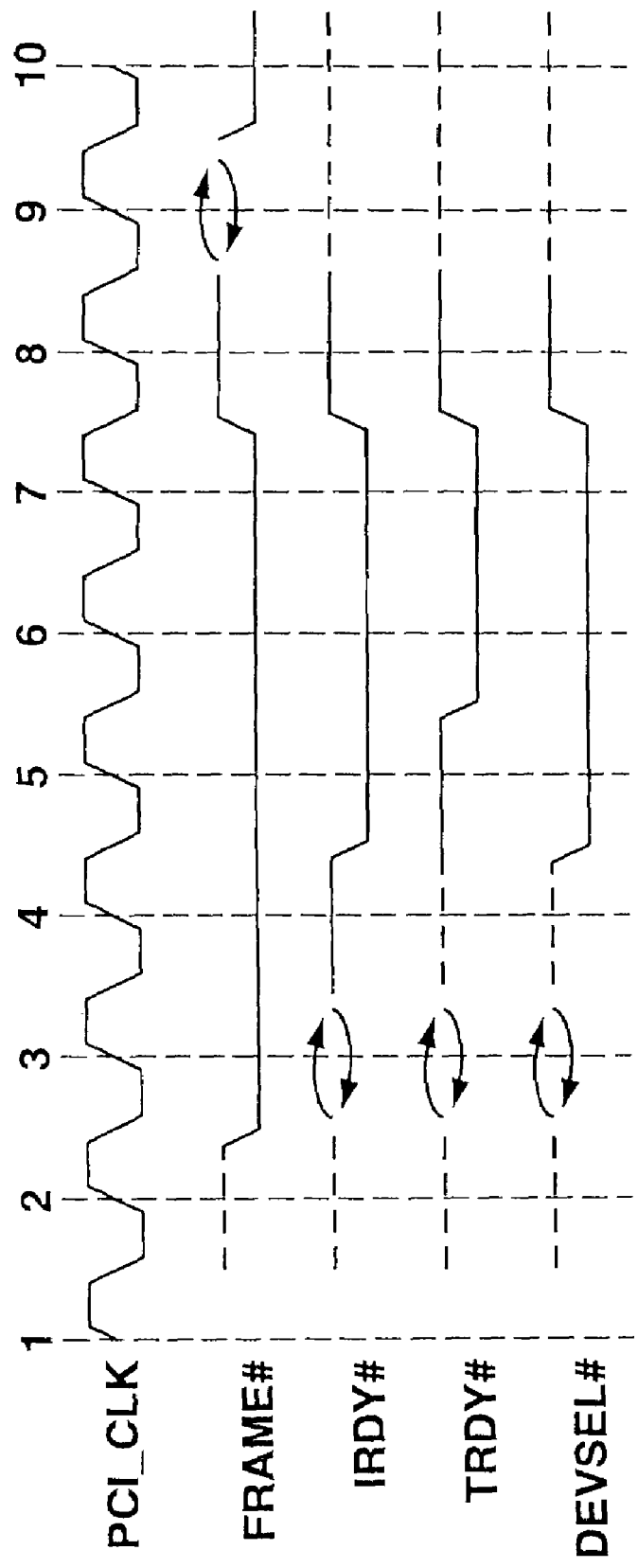
FIG. 30 is a schematic timing diagram of a Byte-Count Transaction Starting 2 Data Phases from ADB, Initiator Disconnection at ADB or Termination at Byte Count according to the present invention.
Figure 31:
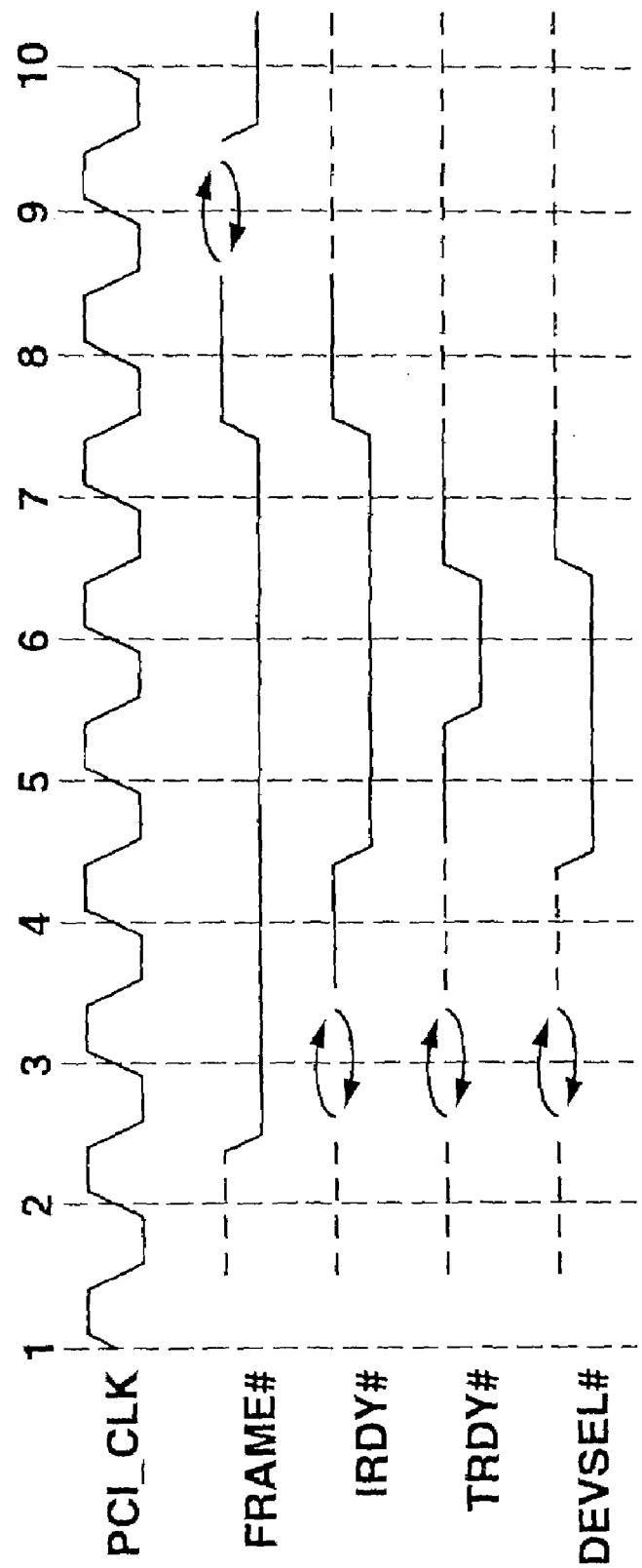
FIG. 31 is a schematic timing diagram of a Byte-Count Transaction Starting 1 Data Phase from ADB, Initiator Disconnection at ADB or Termination at Byte Count according to the present invention.

Referring now to FIGS. 28-31: FIG. 28 illustrates a schematic timing diagram of a Byte-Count Transaction with 4 or more Data Phases, Initiator Disconnection at ADB or Termination at Byte Count. FIG. 29 illustrates a schematic timing diagram of a Byte-Count Transaction Starting 3 Data Phases from ADB, Initiator Disconnection at ADB or Termination at Byte Count. FIG. 30 illustrates a schematic timing diagram of a Byte-Count Transaction Starting 2 Data Phases from ADB. Initiator Disconnection at ADB or Termination at Byte Count. FIG. 31 illustrates a schematic timing diagram of a Byte-Count Transaction Starting 1 Data Phase from ADB, Initiator Disconnection at ADB or Termination at Byte Count.

Transactions that are disconnected by the initiator on an ADB before the byte count has been satisfied and those that terminate at the end of the byte count appear the same on the bus. The following figures illustrate initiator disconnection or termination for transactions with 4 or more data phases and for transactions with less than four data phases. In FIG. 28, the initiator disconnects or terminates after 4 or more data phases. In this case the initiator signals the end of the transaction by deasserting FRAME#1 clock before the last data phase. In FIGS. 29-31, the initiator disconnects or terminates after 3, 2, and 1 data phases, respectively. In this case the initiator signals disconnection by setting the Disconnect on First ADB attribute bit. (Termination occurs at the end of the byte count). In FIG. 29, the initiator deasserts FRAME# for a 3 data phase transaction, 1 clock after the Initiator detects the assertion of the sampled TRDY#. In FIGS. 30 and 31, the initiator deasserts FRAME# for a 2 and a 1 data phase transaction, respectively, showing the FRAME# deassertion occurring with IRDY#.

b. Target Disconnection

Figure 32:
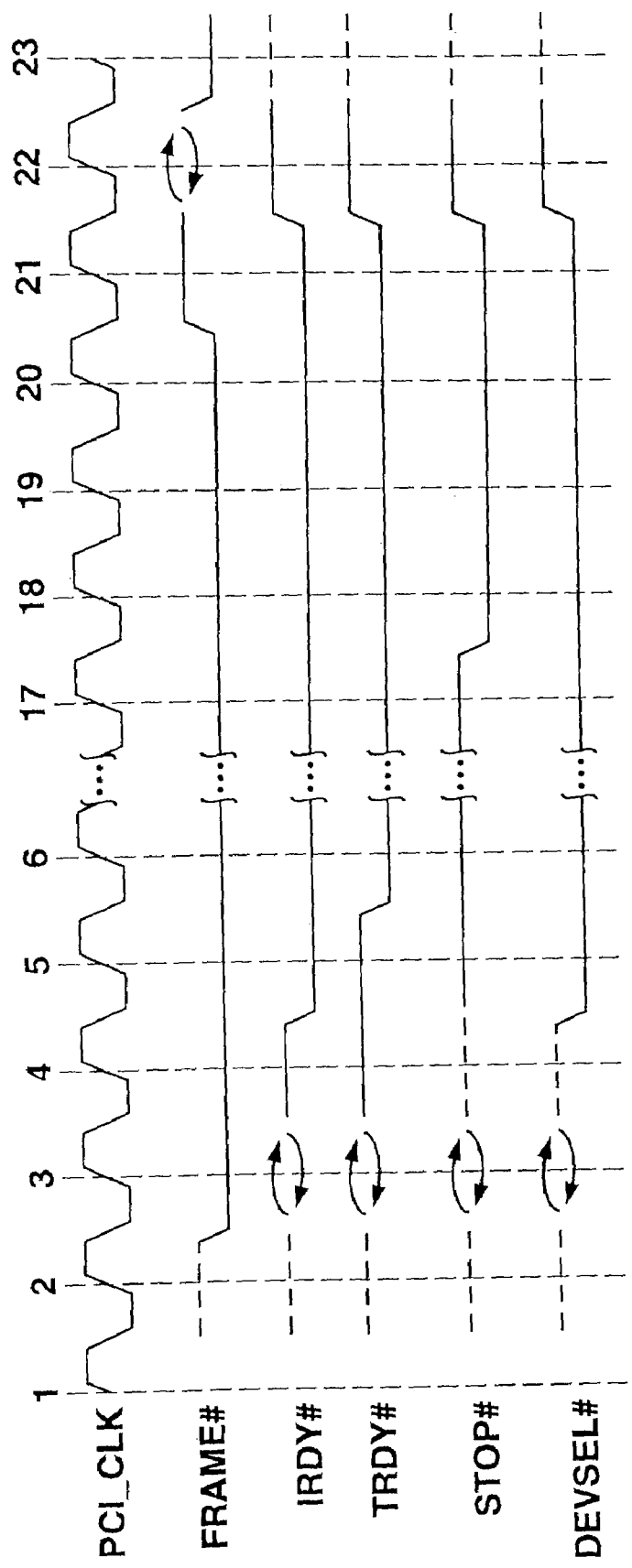
FIG. 32 is a schematic timing diagram of a Byte-Count Transaction with 4 or More Data Phases, Target Disconnect with Data at ADB according to the present invention.

Referring now to FIGS. 32-35, timing diagrams for target disconnection on an ADB for transactions with 4 or more data phases and for transactions with less than four data phases are illustrated.:

FIG. 32 illustrates a schematic timing diagram of a Byte-Count Transaction with 4 or More Data Phases, Target Disconnect with Data at ADB. Shown in FIG. 32 is a target disconnection on an ADB after 4 or more data phases, with the target signaling disconnection by asserting STOP# 3 clock before the last data phase.

Figure 33:
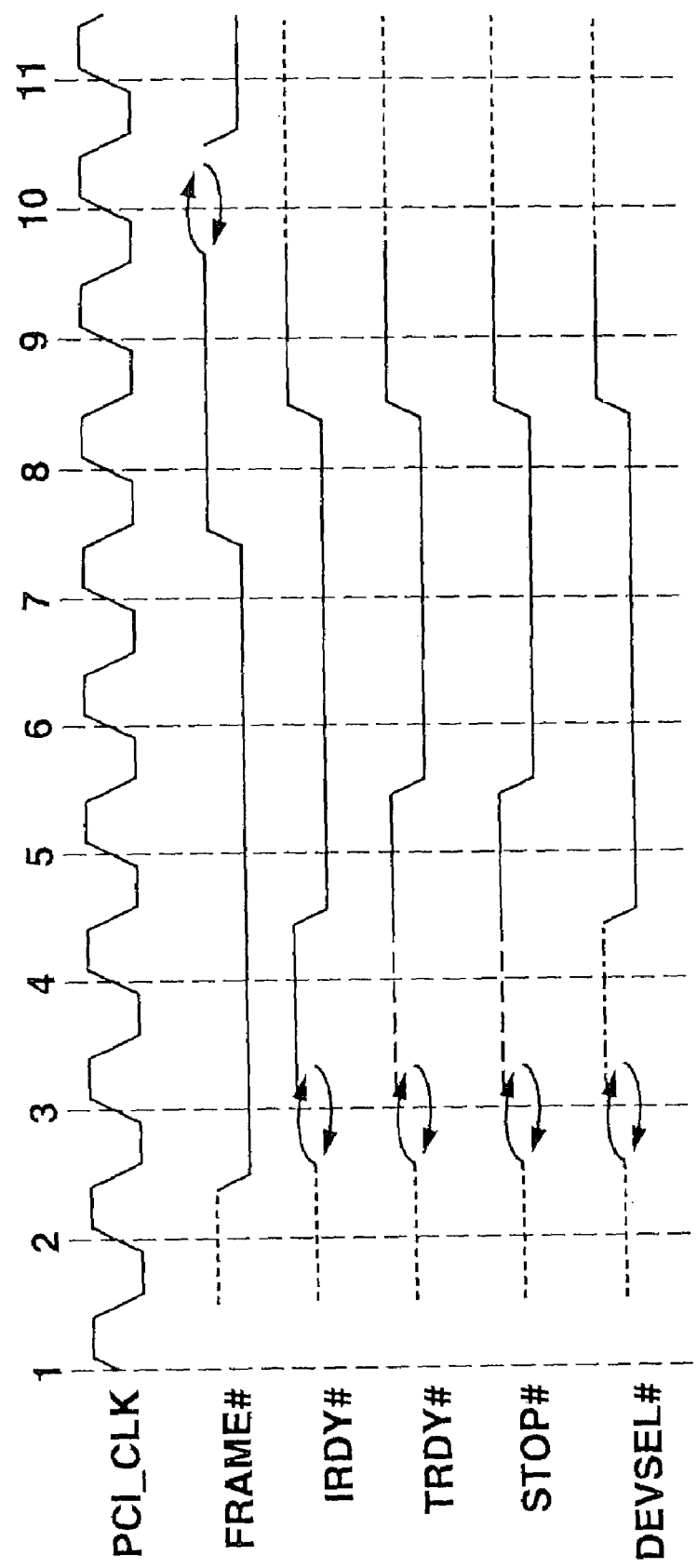
FIG. 33 is a schematic timing diagram of a Byte-Count Transaction Starting 3 Data Phases from ADB, Target Disconnect with Data at ADB, Decode "A," 0 Initial Wait States according to the present invention.
Figure 34:
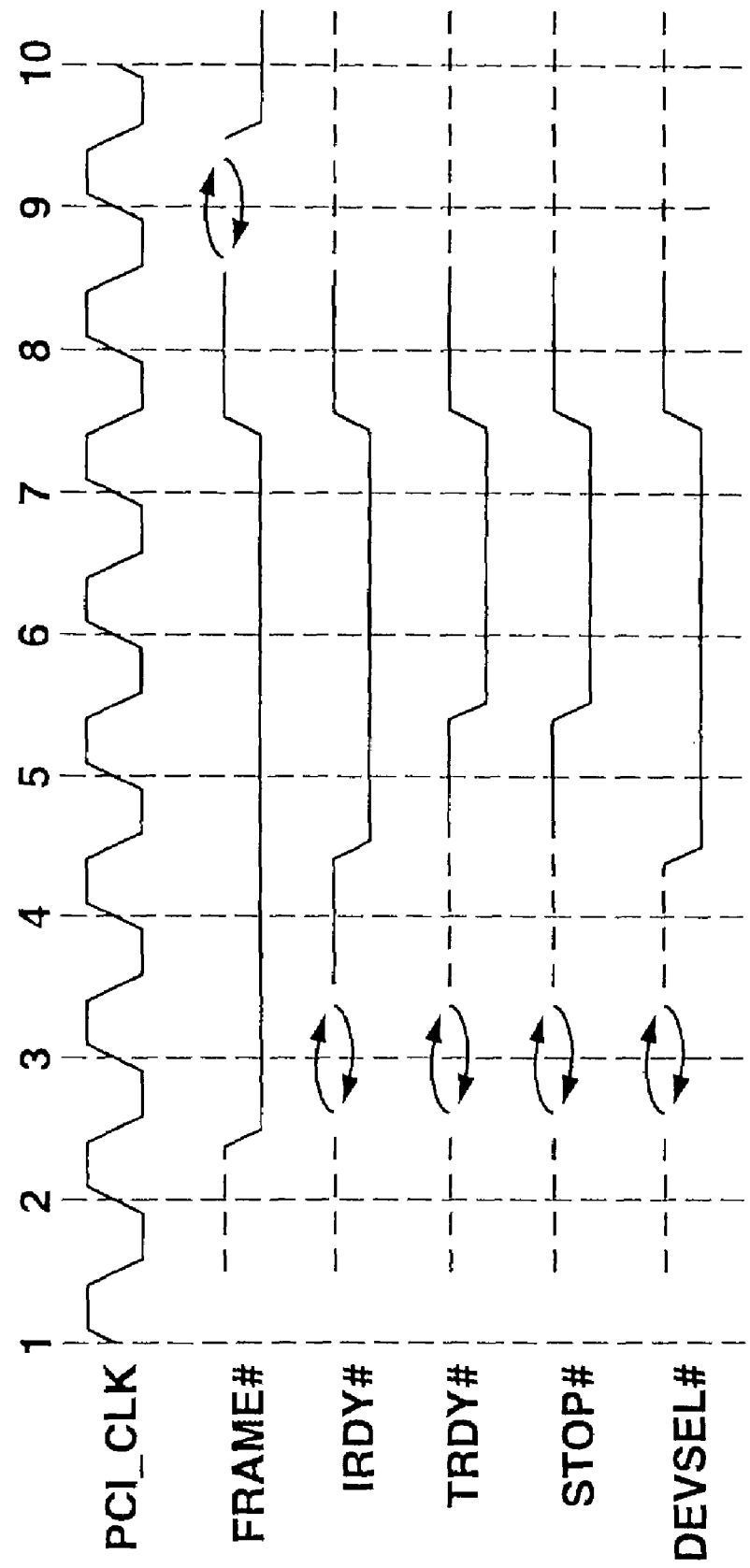
FIG. 34 is a schematic timing diagram of a Byte-Count Transaction Starting 2 Data Phases from ADB, Target Disconnect with Data at ADB, Decode "A," 0 Initial Wait States according to the present invention.
Figure 35:
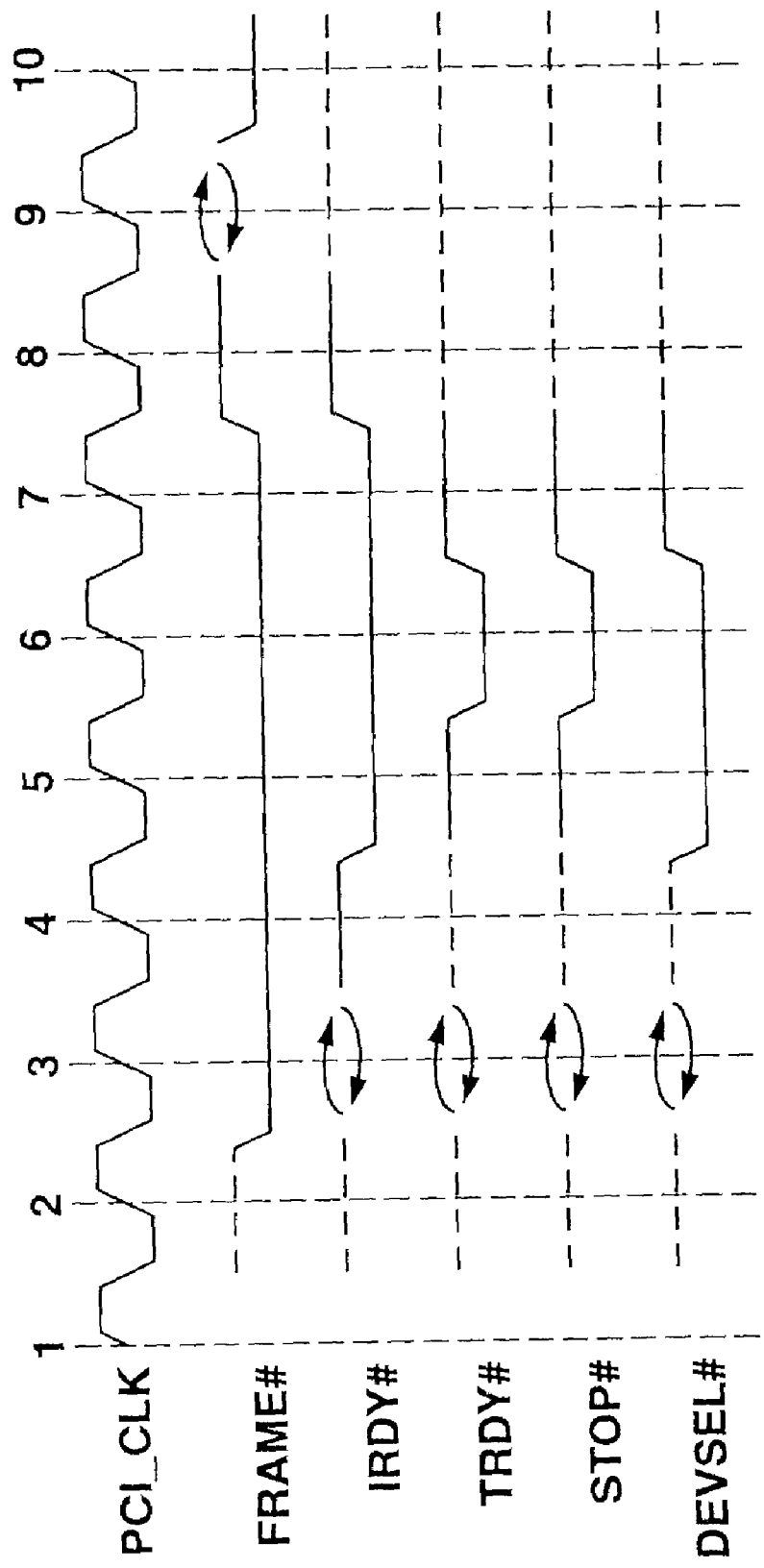
FIG. 35 is a schematic timing diagram of a Byte-Count Transaction Starting 1 Data Phases from ADB, Target Disconnect with Data at ADB, Decode "A," 0 Initial Wait States according to the present invention.

FIG. 33 illustrates a schematic timing diagram of a Byte-Count Transaction Starting 3 Data Phases from ADB, Target Disconnect with Data at ADB, Decode "A," 0 Initial Wait States. FIG. 34 illustrates a schematic timing diagram of a Byte-Count Transaction Starting 2 Data Phases from ADB, Target Disconnect with Data at ADB, Decode "A," 0 Initial Wait States. FIG. 35 illustrates a schematic timing diagram of a Byte-Count Transaction Starting 1 Data Phases from ADB, Target Disconnect with Data at ADB, Decode "A," 0 Initial Wait States. FIGS. 33-35 illustrate target disconnection on an ADB after 3, 2, and 1 data phases, respectively, with the target signaling disconnection by asserting STOP# with TRDY#.

2. Target Retry Termination a. Byte-Count Transactions

Figure 36:
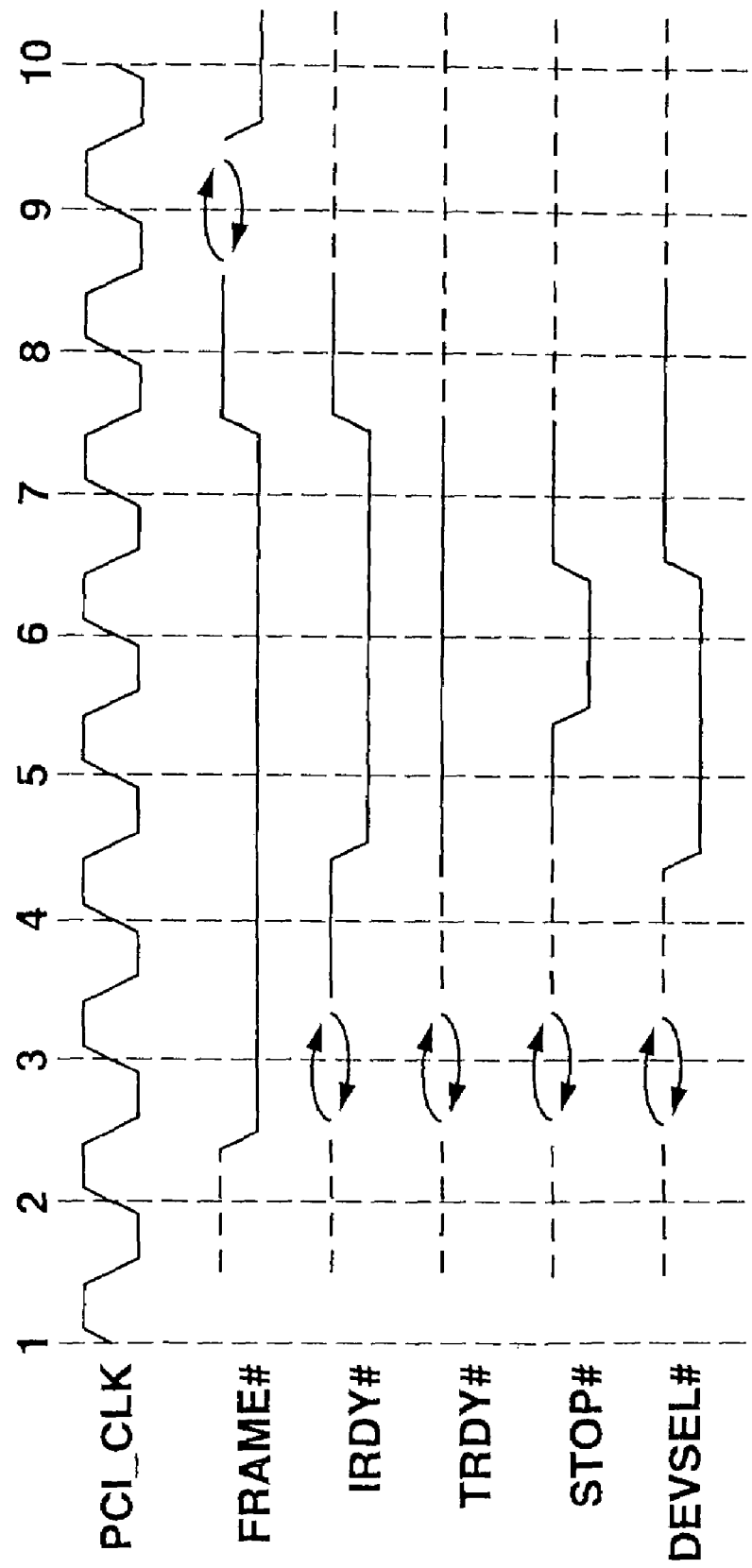
FIG. 36 is a schematic timing diagram of a Byte-Count Transaction Showing Target Retry according to the present invention.

Referring to FIG. 36, a schematic timing diagram of a Byte-Count Transaction Showing Target Retry termination of a byte-count transaction is illustrated.

b. Byte-Enable Transactions

Figure 37:
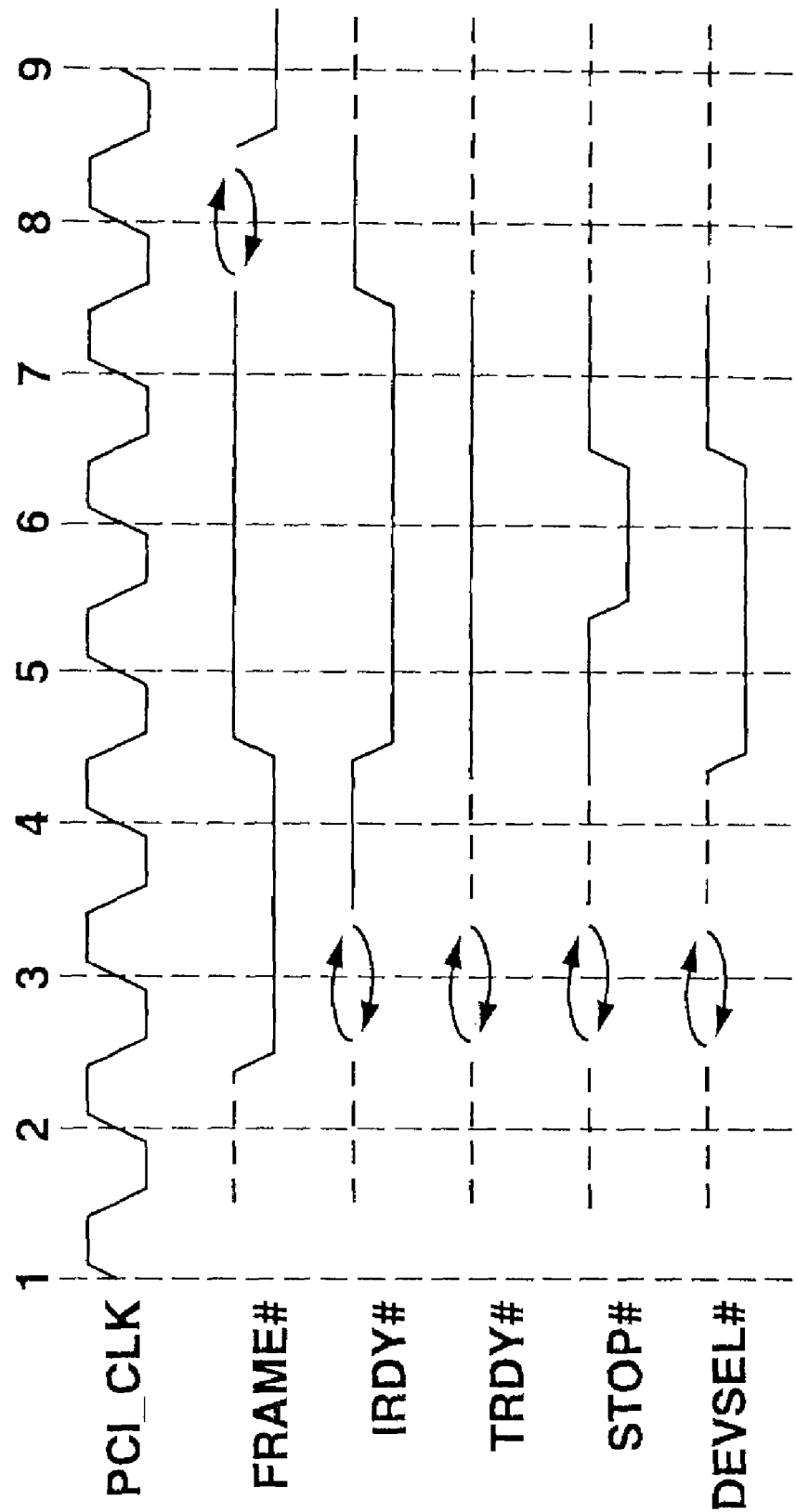
FIG. 37 is a schematic timing diagram of a Byte-Enable Transaction Showing Target Retry according to the present invention.

Referring to FIG. 37, a schematic timing diagram of a Byte-Enable Transaction Showing Target Retry termination of a byte-enable transaction is illustrated.

3. Split Response Termination

Figure 38:
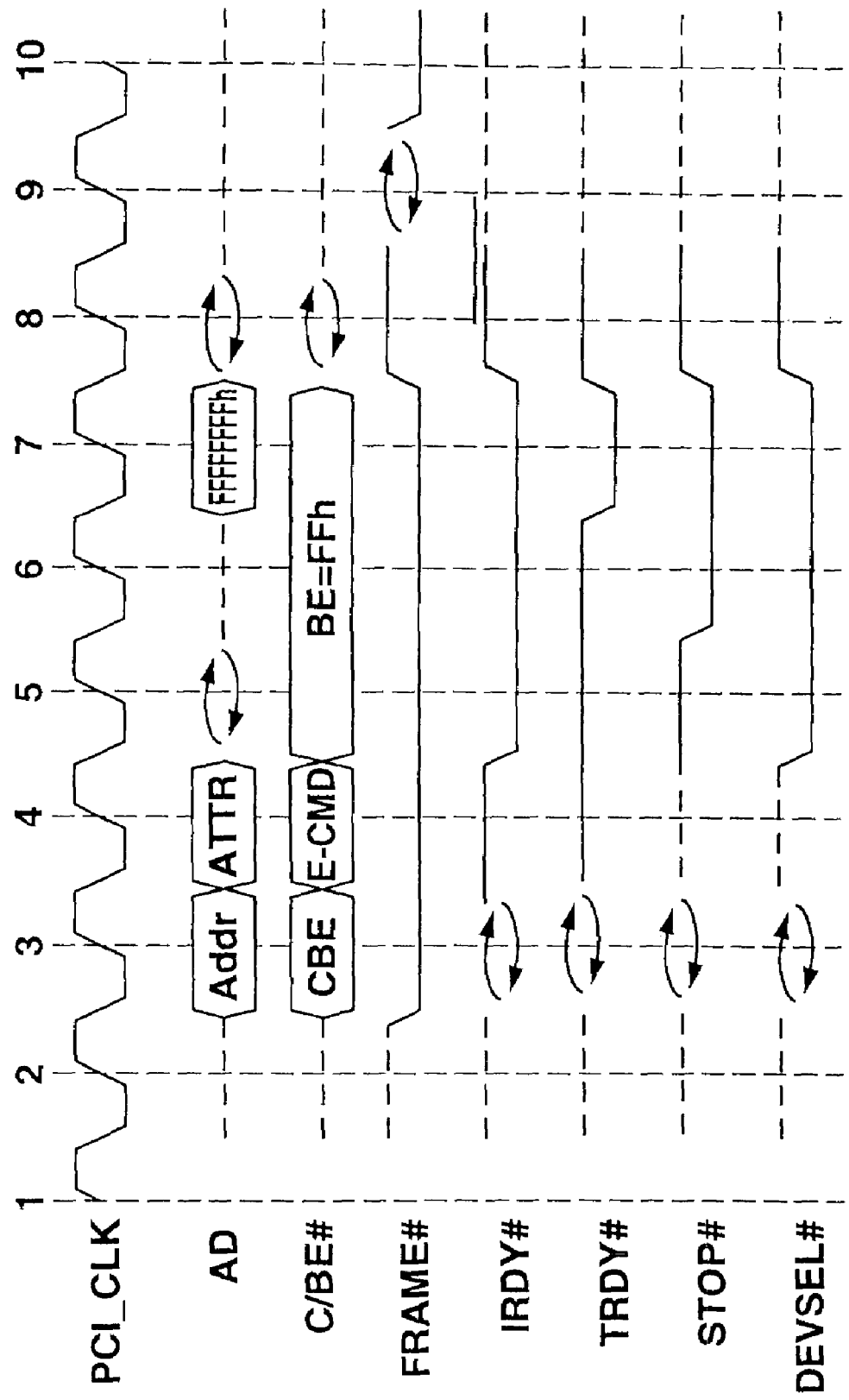
FIG. 38 is a schematic timing diagram of a Split Response Termination of a Byte-Count Memory-Read Transaction according to the present invention.

Referring to FIG. 38, a schematic timing diagram of a Split Response Termination of a Byte-Count Memory-Read Transaction is illustrated.

4. Master-Abort Termination a. Byte-Count Transactions

Figure 39:
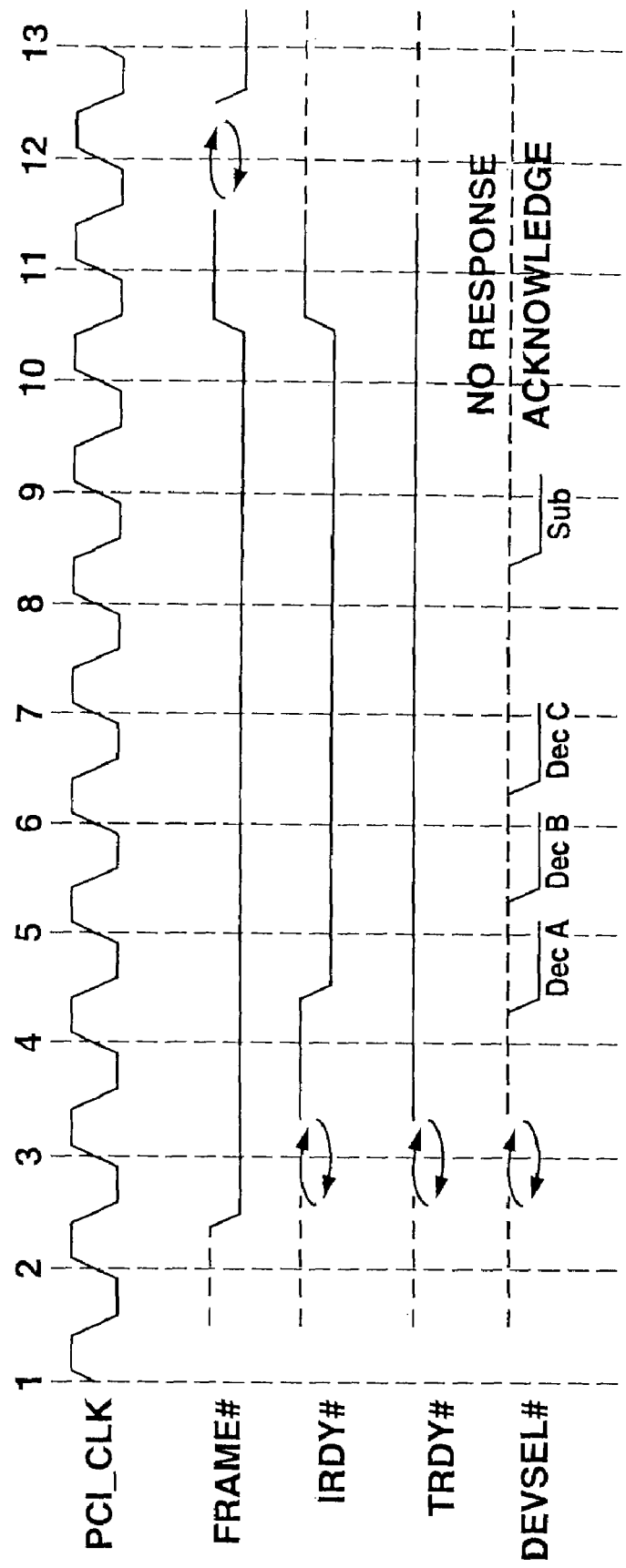
FIG. 39 is a schematic timing diagram of a Master-Abort Termination of a Byte-Count Transaction according to the present invention.

Referring to FIG. 39, a schematic timing diagram of a Master-Abort Termination of a Byte-Count Transaction is illustrated.

b. Byte-Enable Transactions

Figure 40:
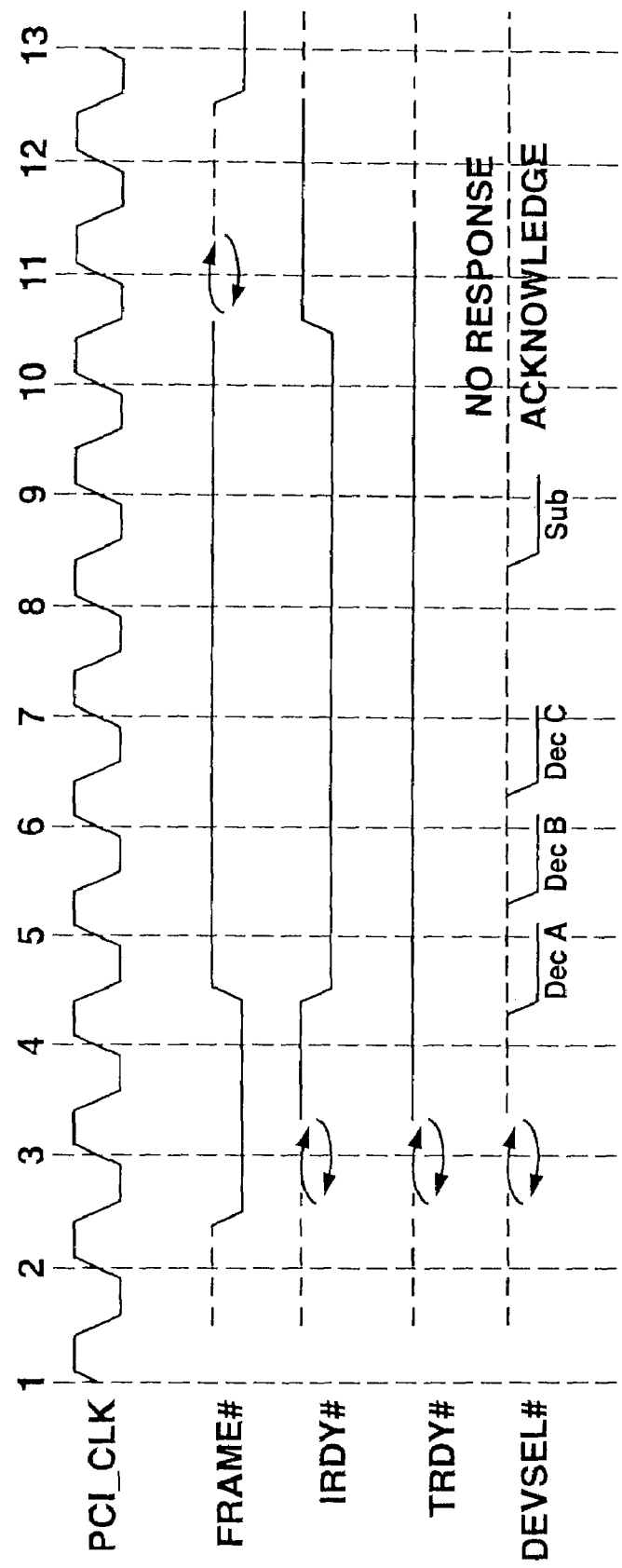
FIG. 40 is a schematic timing diagram of a Master-Abort Termination of a Byte-Enable Transaction according to the present invention.

Referring to FIG. 40, a schematic timing diagram of a Master-Abort Termination of a Byte-Enable Transaction is illustrated.

5. Target-Abort Termination

Figure 41:
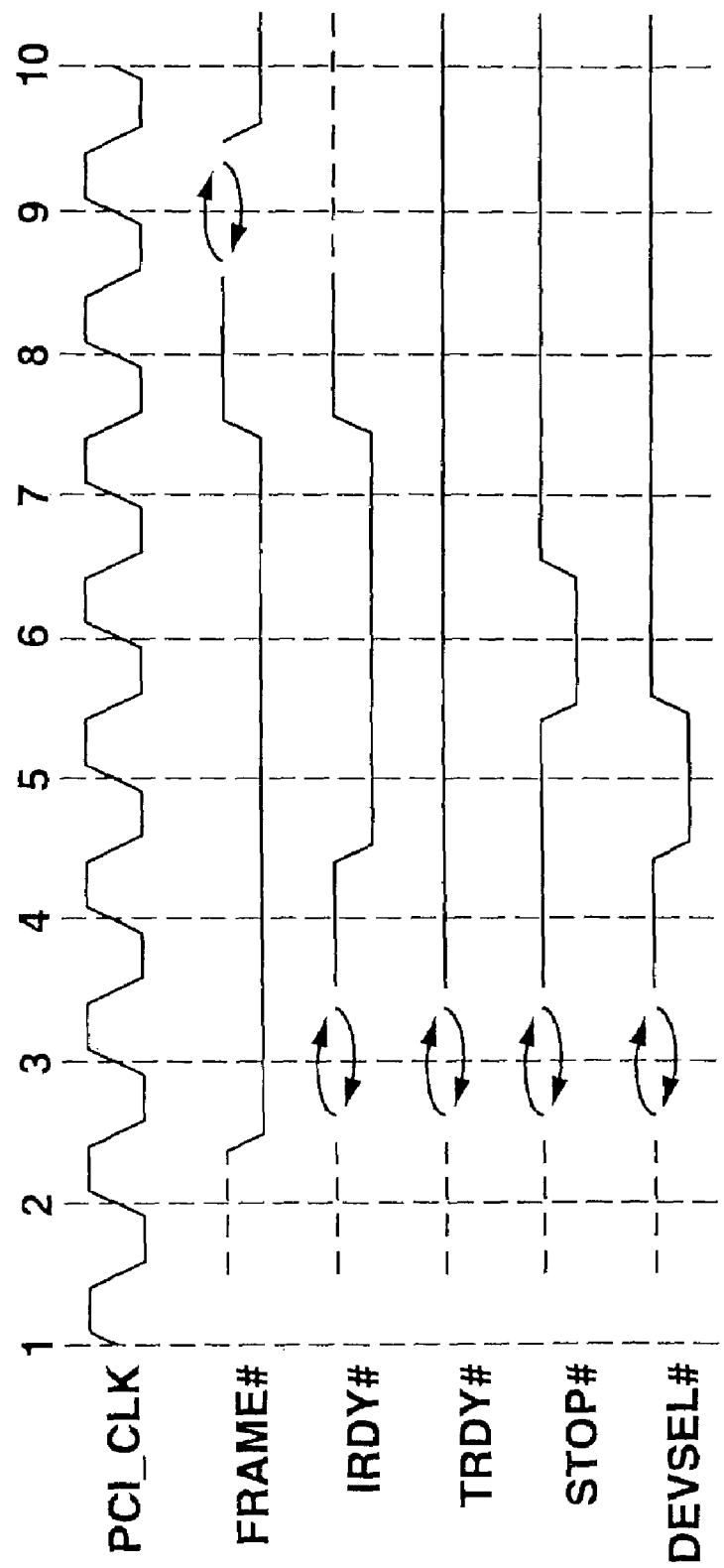
FIG. 41 is a schematic timing diagram of a Target-Abort Termination of a Byte-Count Transaction according to the present invention.
Figure 42:
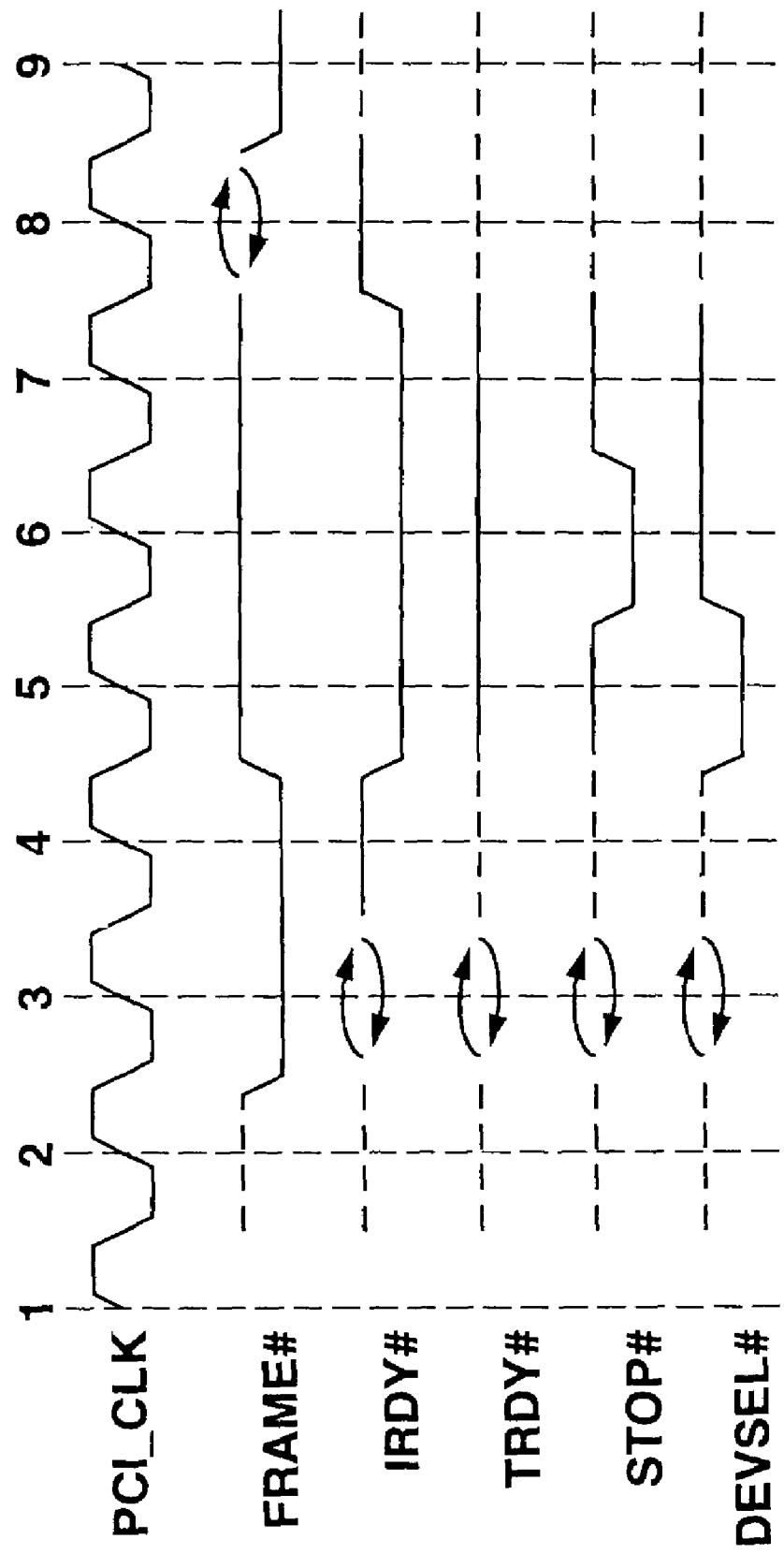
FIG. 42 is a schematic timing diagram of a Target-Abort Termination of a Byte-Enable Transaction according to the present invention.

Referring to FIGS. 41 and 42, schematic timing diagrams for target abort for Byte-Count and Byte-Enable transactions, respectively are illustrated. In FIGS. 41 and 42, the initiator keeps FRAME# and IRDY# asserted 1 clock passed the target signaling termination with the deassertion of DEVSEL# and STOP#, this is called overshoot. Overshoot occurs as a result of the bus protocol requiring devices to sample the bus signal only after the input signal has been flopped through a register. This results in the initiator or target experiencing a 1 clock lag in responding to any signal changes on the bus, see Section I. (O)(2)(a), Byte-Count Transactions hereinabove which shows the Initiator and target views of the bus.

a. Byte-Count Transactions

FIG. 41 illustrates a schematic timing diagram of a Target-Abort termination of a byte-count transaction.

b. Byte-Enable Transactions

FIG. 42 illustrates a schematic timing diagram of a Target-Abort termination of a byte-enable transaction.

P. Bus Width

According to a preferred embodiment of the invention, Registered PCI devices have a 64-bit AD bus. However, it is contemplated and within the scope of the claimed invention that Registered PCI devices may also operate as 32-bit devices. The 32-bit embodiment of the Registered PCI devices are described hereinafter. The 64-bit Registered PCI device embodiments would need to follow the requirements described hereinbelow, i.e., if a 32-bit device addressed a 64-bit device.

In this 32-bit embodiment the requirements that apply only to 32-bit devices or to 64-bit devices that are designed to operate with those 32-bit devices are marked with an asterisk (*) These requirements are optional for devices designed exclusively for 64-bit operation. Requirements not marked with an asterisk are required of all Registered PCI devices.

1. Data Transfer Width

Registered PCI support for varying the width of data transfers minimizes the changes from the corresponding support in conventional PCI. The following requirements for Registered PCI are the same as for conventional PCI:

1. Only memory transactions use 64-bit data transfers. All other transactions use 32-bit data transfers.
2. 64-bit addressing is independent of the width of the data transfers.
3. A 64-bit initiator asserts REQ64# with the same timing as FRAME# to request a 64-bit data transfer. It deasserts REQ64# with FRAME# at the end of the transaction.
4. If a 64-bit target is addressed by a transaction that does not have REQ64# asserted with FRAME#, the target shall not assert ACK64# and shall complete the transaction as a 32-bit target.
5. If a 64-bit target is addressed by a transaction that does have REQ64# asserted with FRAME#, the target asserts ACK64# with DEVSEL# to complete the transaction as a 64-bit target. It deasserts ACK64# with DEVSEL# at the end of the transaction.
6. If the target does not assert ACK64#, the transaction will proceed as a 32-bit transaction. During data phases the initiator is permitted to drive any value on C/BE[7:4] and (for a write transaction) AD[63:32].

The following requirements for Registered PCI are different from conventional PCI:

1. Only byte-count memory transactions use 64-bit transfers. Byte-enable memory transactions use 32-bit transfers.
2. Wait-state requirements and Allowable Disconnect Boundaries are unaffected by the width of the data transfer.
3. The attribute phase is always a single clock, regardless of the size of the initiator or the target. Registered PCI devices shall implement a bit in the Registered PCI Command register called Use 32-bit Attribute. If this bit is set, the initiator will set the upper 32 bits of the attribute to 0 on all transactions. System configuration software will set this bit to prevent aliasing problems when 64-bit attributes are viewed by 32-bit devices.
4. A[2] shall match the starting byte address of the transaction when the initiator requests a 64-bit data transfer. (Conventional PCI requires AD[2] to be zero because the byte enables indicate the actual starting address.)
5. The extended command is always driven on C/BE[3:0]. C/BE[7:4] are reserved during the attribute phase and driven to a high logic voltage by 64-bit initiators.
6. * If a 64-bit initiator is starting a write transaction and AD[2] of the starting byte address is 1 (that is, the first byte of the transaction is in the upper 32-bits of the bus), the 64-bit initiator shall duplicate the write data from the upper 32 bits of the bus onto the lower 32 bits of the bus.

Figure 43:
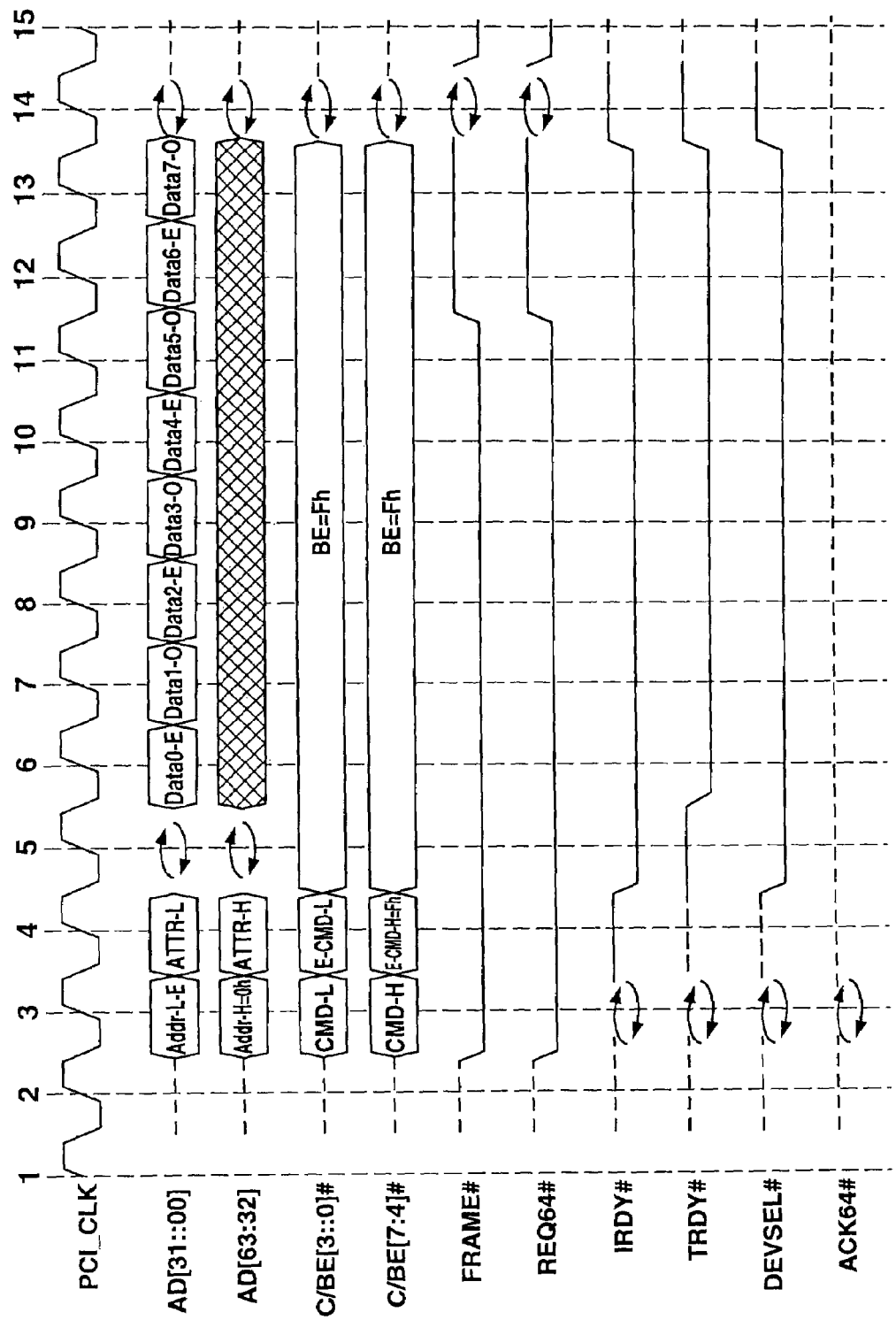
FIG. 43 is a schematic timing diagram of a 64-bit Read Request with 32-bit Transfer Starting on Even DWORD according to the present invention.
Figure 44:
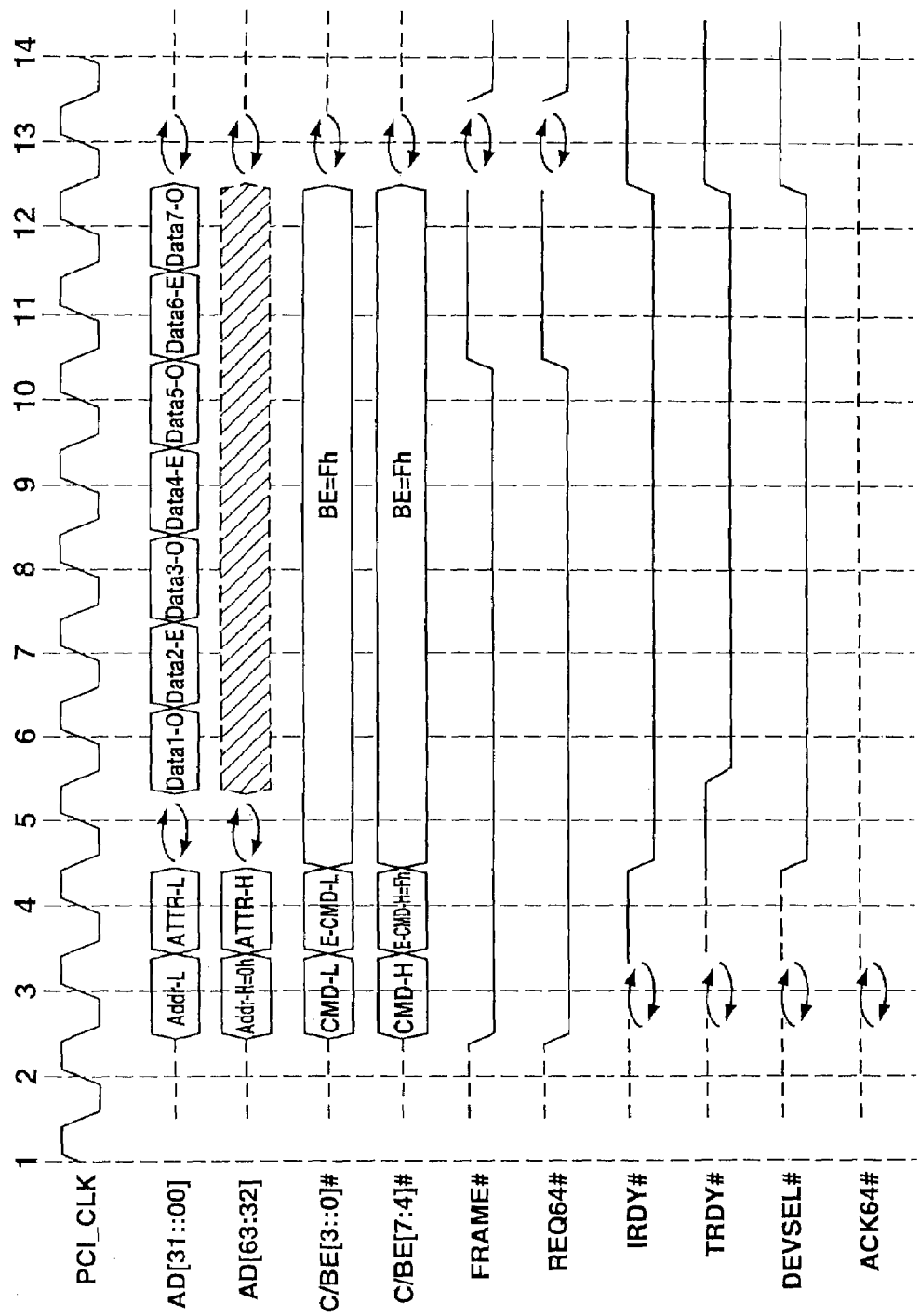
FIG. 44 is a schematic timing diagram of a 64-bit Read Request with 32-bit Transfer Starting on Odd DWORD according to the present invention.
Figure 45:
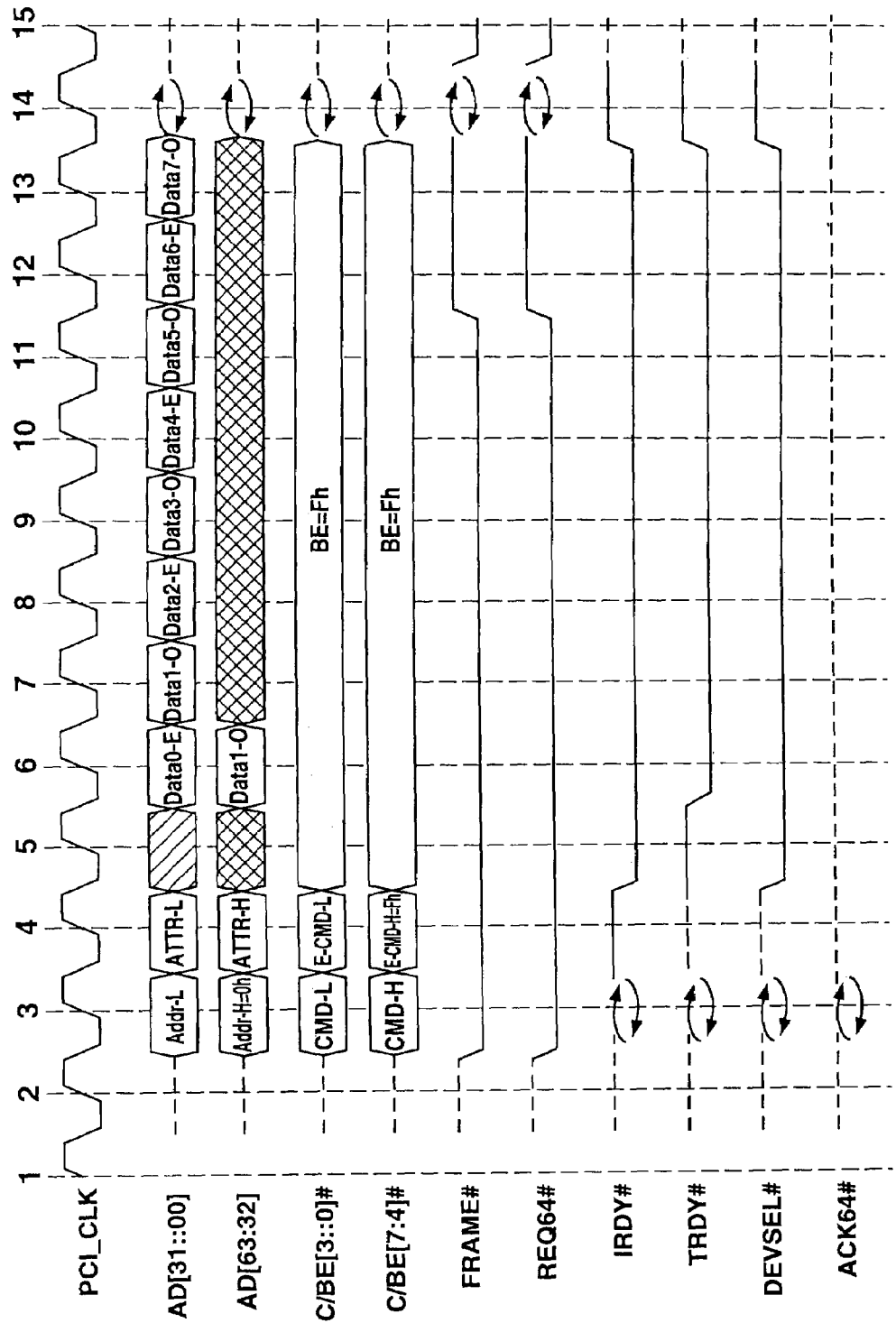
FIG. 45 is a schematic timing diagram of a 64-bit Write Request with 32-bit Transfer Starting on Even DWORD according to the present invention.
Figure 46:
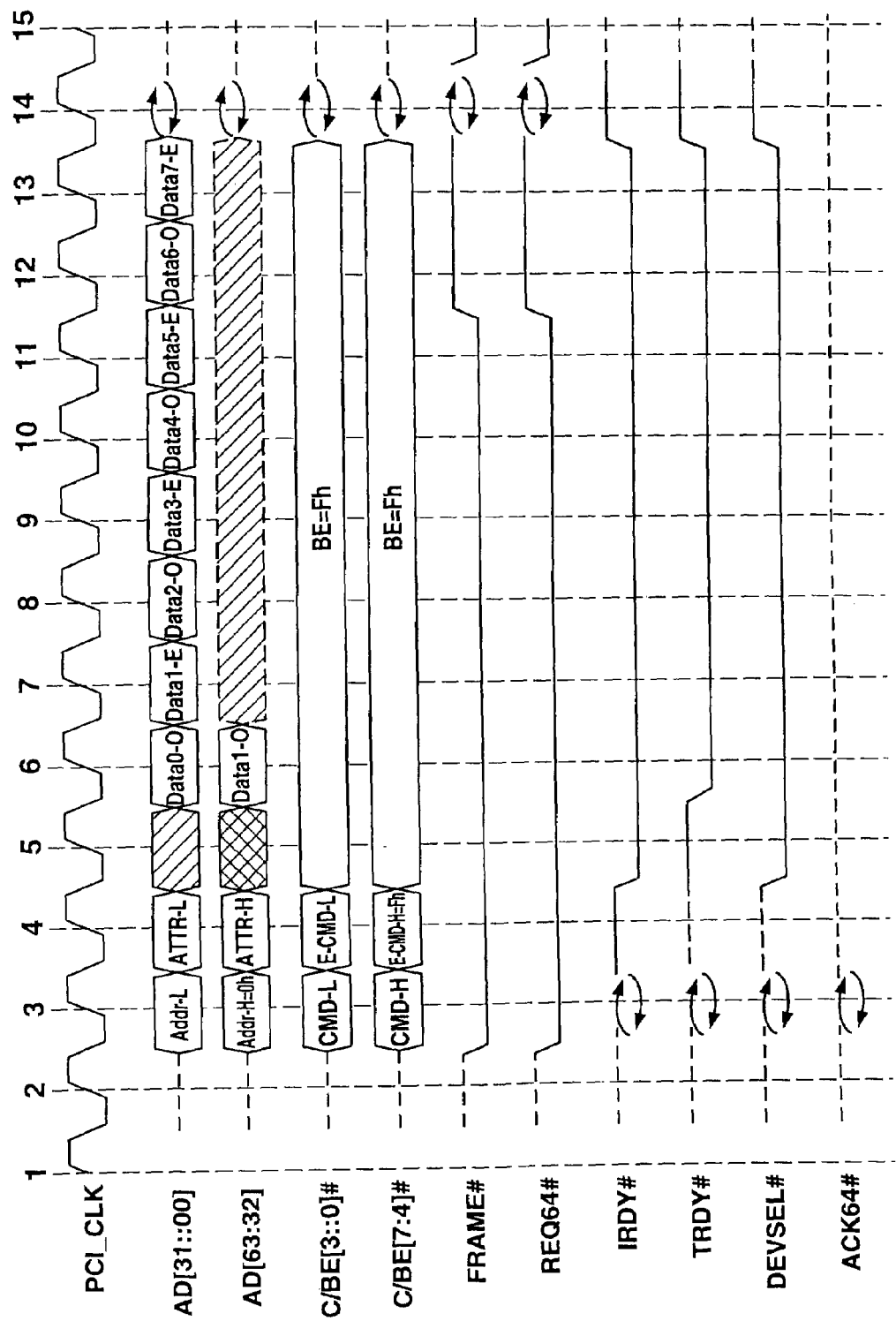
FIG. 46 is a schematic timing diagram of a 64-bit Write Request with 32-bit Transfer Starting on Odd DWORD according to the present invention.

FIG. 43 illustrates a schematic timing diagram of a 64-bit Read Request with 32-bit Transfer Starting on Even DWORD. FIG. 44 illustrates a schematic timing diagram of a 64-bit Read Request with 32-bit Transfer Starting on Odd DWORD. FIG. 45 illustrates a schematic timing diagram of a 64-bit Write Request with 32-bit Transfer Starting on Even DWORD. FIG. 46 illustrates a schematic timing diagram of a 64-bit Write Request with 32-bit Transfer Starting on Odd DWORD. The timing diagram of FIG. 46 illustrates the data steering that is required by a 64-bit initiator when supporting 32-bit devices. This data steering need only occur when the 64-bit initiator is negotiating a 64-bit data transaction with a odd DWORD starting address. To satisfy the steering requirement, the initiator shall duplicate the high DWORD data onto the lower AD bus lanes [31:0] in preparation for a 32-bit target claiming the transaction. The initiator confirms a 32-bit target has claimed the transaction in the Target Response Phase of the transaction, when DEVSEL# assertion is detected without ACK64# assertion. Note that FIG. 46 illustrates an initiator termination on an even DWORD, which can only occur if the byte count is satisfied in that DWORD. (An ADB occurs after an odd DWORD.)

2. Address Width

The Registered PCI invention supports varying the address width. This minimizes the changes required for Registered PCI from the corresponding support in conventional PCI. Additional requirements for Registered PCI permit timing optimization for the case in which all devices on the bus have a 64-bit data path.

The following requirements for Registered PCI are the same as for conventional PCI:

1. If the address of a transaction is less than 4 GB, the following are all true:
   a. The transaction uses a single address cycle.
   b. During the address phase AD[63:32] are zero, and AD[31:0] contain the address.
   c. During the address phase C/BE[3:0]# contain the transaction command, and C/BE[7:4]# are reserved.
2. * If the address of a transaction is greater than 4 GB, the initiator uses a dual address cycle in two cases. The first is if the initiator has a 32-bit bus. The second is if the initiator has a 64-bit bus and its Use Dual Address Cycle bit in the Registered PCI Command register is set. In the first case (32-bit device) the following are all true:
   a. The transaction uses a dual address cycle.
   b. In the first address phase AD[31:0] contain the lower half of the address. In the second address phase AD[31:0] contain the upper half of the address.
   c. In the first address phase C/BE#[3:0] contain the Dual Address Cycle command. In the second address phase C/BE#[3:0] contain the actual transaction command In the second case (64-bit device with Use Dual Address Cycle bit set) the following are all true:
   a. The transaction uses a dual address cycle.
   b. In the first address phase AD[63:32] contain the upper half of the address, and AD[31:0] contain the lower half of the address. In the second address phase AD[63:32] and AD[31:0] contain duplicate copies of the upper half of the address.
   c. In the first address phase C/BE[3:0]# contain the Dual Address Cycle command and C/BE[7:4]# contain the transaction command. In the second address phase C/BE[3:0]# and C/BE[7:4]# contain duplicate copies of the transaction command.
3. * DEVSEL# timing designations are delayed one clock for transactions with a dual address cycle. For example, decode speed A after a dual address cycle is the same as decode speed B after a single address cycle, just as in conventional PCI Fast decode speed after a dual address cycle is the same as Medium decode speed after a single address cycle. Note that it is theoretically possible for a 64-bit target to decode its address after only the first address phase of a dual address cycle and be ready to assert DEVSEL# sooner than decode speed A. However no device is permitted to assert DEVSEL# sooner than the first clock after the attribute phase.
4. The rest of the transaction proceeds identically after either a single address cycle or a dual address cycle.

The following requirements for Registered PCI are different from conventional PCI:

1. All addresses are preferably 64-bits long.
2. * 32-bit Registered PCI devices shall support 64-bit addressing. All 32-bit initiators shall generate a dual address cycle for addresses greater than 4 GB. All 32-bit targets that include memory Base Address Registers shall implement the 64-bit versions. All memory range registers in 32-bit PCI-to-PCI bridges shall support the 64-bit versions of those registers. It is contemplated and within the scope of the invention that system configuration software may assign all non-prefetchable memory ranges below 4 GB. Non-prefetchable memory ranges are typically used for control operations, which are often accessed from time-critical software routines. Such accesses will be faster if the address is below 4 GB, so a single address cycle is used.
3. All Registered PCI devices support a status bit indicating the size of their bus.
4. * 64-bit Registered PCI devices include an bit in the Registered PCI Command register, called Use Dual Address Cycle, that controls generation of dual address cycles. If this bit is set, the device uses a dual address cycle when initiating any transaction with an address greater than 4 GB. If the bit is reset, the device uses a single address cycle for all addresses. System configuration software sets this bit in all devices that reside on a bus containing at least one 32-bit device.

Figure 47:
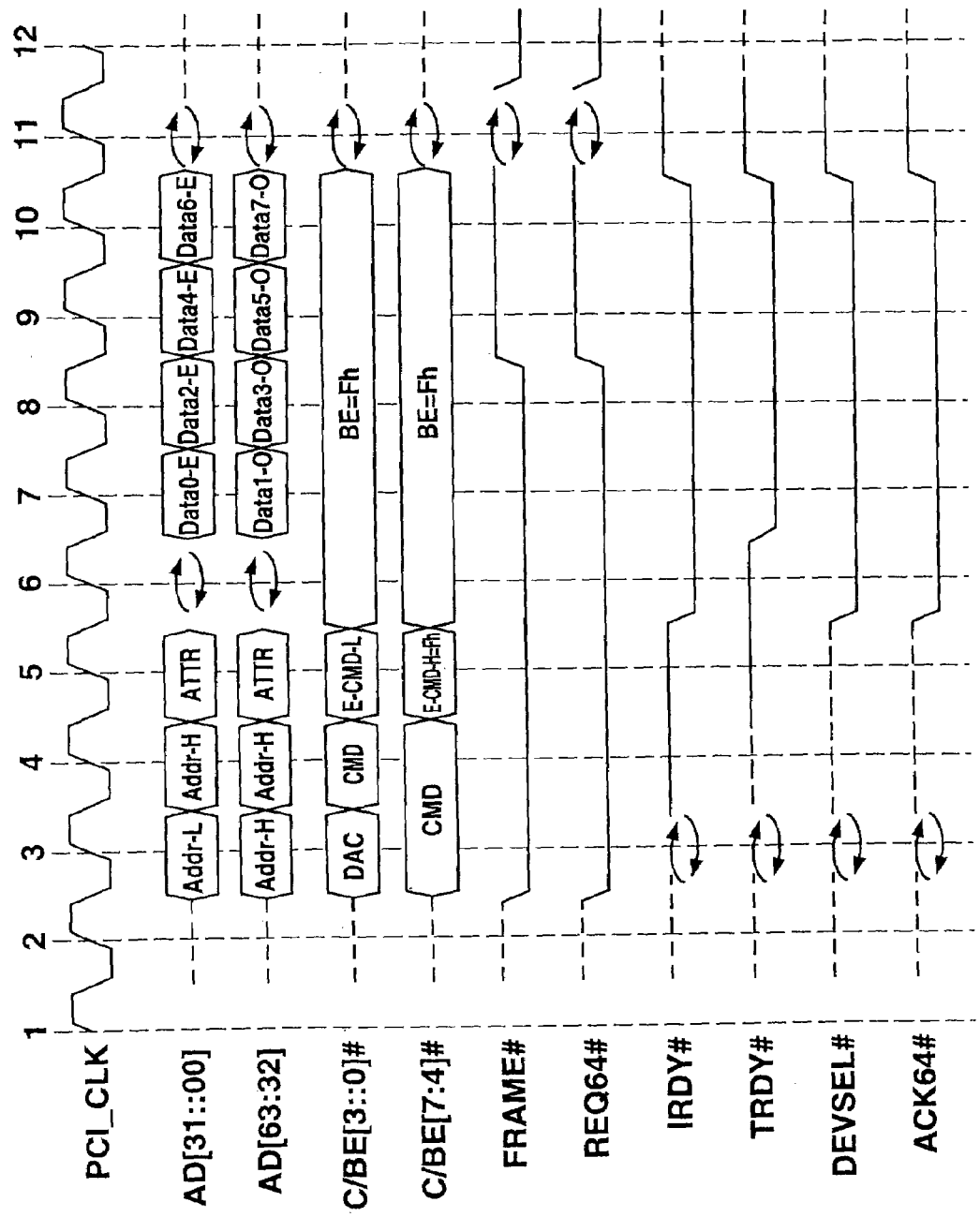
FIG. 47 is a schematic timing diagram of a Dual Address Cycle 64-bit Memory-Read Transaction according to the present invention.

FIG. 47 illustrates a 64-bit initiator executing a Dual Address Cycle for a 64-bit Byte-Count Memory-Read transaction. The initiator drives the entire address (lower address on AD[31:00] and upper address on AD[63:32]) and both commands (DAC "1101" on C/BE[3:0]# and the actual bus command on C/BE[7:4]#) all during the initial address phase at clock 3. On the second address phase, the initiator drives the upper address on AD[31:0] (and AD[63:32]) while the bus command is driven on C/BE[3:0]# (and C/BE[7:4]#). The initiator immediately follows the second address phase with the one clock attribute phase in clock 5, all the upper attribute bits AD[63:32] are set to 0, to prevent Sequence ID aliasing when supporting 32-bit devices. Unlike conventional PCI 64-bit targets, Registered PCI 64-bit targets when supporting DAC, adjust their DEVSEL# assertion by one clock since DEVSEL# is not asserted any earlier than the clock after the attributed phase, as shown in clock 6 for device timing A.

Q. Transaction Ordering and Deadlock-Avoidance

According to the Registered PCI invention, two features are introduced that affect transaction ordering and deadlock-avoidance that are not present in conventional PCI. The rest of the ordering and deadlock-avoidance rules are the same as conventional PCI.

1. Ordering and Passing Rule

According to the Registered PCI invention, the first new feature that affects ordering rules is the Relaxed Ordering attribute bit. If this attribute bit is set for a memory-write transaction, that transaction is permitted to pass previously posted memory-write transactions. If this attribute is set for a read transaction, the completion for that transaction is permitted to pass previously posted memory-write transactions. Refer to Section IX., Relaxed Ordering Rules hereinbelow for a description of the application of this bit.

The second new feature is Split Transaction. Split Transaction ordering and deadlock-avoidance rules are almost identical to the rules for Delayed Transactions. In all cases the requirements for Split Read Request are identical to those for Delayed Read Requests. The order of memory read transactions is established when the transaction completes. Split Read Requests can be reordered with other Split Read Requests and with Delayed Requests. If an initiator is concerned about the order in which two Split Read Requests are completed, the initiator shall not issue the second request until the first one completes.

A Split Read Completion has the same ordering requirements as a Delayed Read Completion, except that Split Read Completions with the same Sequence ID (that is, Split Read Completion transactions that originate from the same Split Read Request) shall stay in address order. The completer shall supply the Split Read Completions on the bus in address order, and any intervening bridges shall preserve this order. This guarantees that the requester will always receive the data in its natural order. Split Read Completions with different Sequence IDs have no ordering restrictions. In this sense such Split Read Completions are like Delayed Read Completions.

Table 14 hereinbelow lists the ordering requirements for all Split Transactions, Delayed Transactions and posted memory-write transactions. The columns represent the first of two transactions, and the rows represent the second. The table entry indicates what a device operating on both transactions is required to do. The preferred choices are:

Yes—the second transaction shall be allowed to pass the first to avoid deadlock.

Y/N—there are no requirements. The device may optionally allow the second transaction to pass the first or be blocked by it.

No—the second transaction shall not be allowed to pass the first transaction. This is required to preserve strong write ordering.

The following is a list of definitions for abbreviated terms used when describing transaction ordering.

| Abbreviation | Definition |
| --- | --- |
| PMW | Posted Memory Write |
| DRR | Delayed Read Request |
| SRR | Split Read Request |
| DWR | Delayed Write Request |
| DRC | Delayed Read Completion |
| SRC | Split Read Completion |
| DWC | Delayed Write Completion |
| DR | Delayed Read |
| DC | Delayed Completion |
| RR | Read Request |
| RC | Read Completion |

TABLE 14

Transactions Ordering and Deadlock-Avoidance Rules

| Row pass | PMW (Col 2) | DRR & SRR (Col 3) | DWR (Col 4) | DRC & SRC (Col 5) | DWC (Col 6) |
| --- | --- | --- | --- | --- | --- |
| PMW (Row A) | a) No b) Y/N | Yes | Yes | Yes | Yes |
| DRR & SRR (Row B) | No | Y/N | Y/N | Y/N | Y/N |
| DWR (Row C) | No | Y/N | Y/N | Y/N | Y/N |
| DRC & SRC (Row D) | a) No b) Y/N | Yes | Yes | a) Y/N b) No | Y/N |
| DWC (Row E) | Y/N | Yes | Yes | Y/N | Y/N |

A2a In general, PMW shall stay in order. (Same a conventional PCI.)

A2b If Relaxed Ordering attribute is set, then that PMW is permitted to pass other PMW. Also, subsequent PMW (i.e. PMW in which the Initial Sequence bit is cleared) is permitted to pass other PMW with different Sequence ID.

A3-A6 PMW shall be allowed to pass DRs and DCs to avoid deadlocks. (Same as conventional PCI.) SRR and SRC have the same requirements as DRR and DRC.

B2 Read Requests cannot can pass a PMW (strong smite ordering). (Same as conventional PCI.)

B3-B6 DRR can be blocked or pass other DRs and DCs. (Same as conventional PCI.) SRR and SRC have the same requirements as DRR and DRC.

C2 DWR cannot pass a PMW (strong write ordering). (Same as conventional PCI.) Although in theory, the Relaxed Ordering attribute could be used to enable DWR to pass a PMW, there would be little application for such a feature, so it is not allowed.

C3-C6 DWR can be blocked or pass other DRs and DCs. (Same as conventional PCI.) SRR and SRC have the same requirements as DRR and DRC.

D2a In general, Read Completions cannot pass a PMW (strong write ordering). (Same as conventional PCI.)

D2b If Relaxed Ordering attribute bit is set, then that DRC or SRC is permitted to pass PMW.

D3-D4 DRC shall be allowed to pass DRs to avoid deadlocks. (Same as conventional PCI.) SRC has the same requirements as DRC.

D5a DRC can be blocked or pass other DCs. (Same as conventional PCI.) SRCs with different Sequence ID have the same requirements as DRC.

D5b SRCs with the same Sequence ID shall remain in address order. No deadlock here because they will all eventually complete.

D6 DRC can be blocked or pass other DCs. (Same as conventional PCI.) SRC has the same requirements as DRC.

E2 Writes moving in opposite direction have no ordering relationship. (Same as conventional PCI.)

E3-E4 DWC shall be allowed to pass DRs to avoid deadlocks. (Same as conventional PCI.) SRR has the same requirements as DRR.

E5-E6 DWC can be stalled or pass other DCs. (Same as conventional PCI.) SRC has the same requirements as DRC.

2. Required Acceptance Rules

The Registered PCI invention has the same requirement for accepting transactions as conventional PCI, with one exception described hereinbelow. Using the terminology of the PCI Specification incorporated by reference herein, a "simple device" (i.e. one that does not do outbound write posting) can never (with the exception described hereinbelow) make the acceptance of a transaction as a target contingent upon the prior completion of another transaction as an initiator. A "bridge device" (i.e. one that does outbound write posting) can never make the acceptance (posting) of a memory-write transaction as a target contingent on the prior completion of a transaction as an initiator on the same bus. Furthermore, to provide backward compatibility with PCI-to-PCI bridges designed to revision 1.0 of the PCI-to-PCI Bridge Architecture Specification, incorporated by reference herein, all devices are required to accept memory-write transactions even while executing a previously enqueued Delayed Transaction. A device is permitted to terminate a memory-write transaction with Retry only for temporary conditions that are guaranteed to resolve over time (as limited by the Max Completion ECR). Bridge devices are permitted to refuse to accept non-posted transactions as a target until the device completes its memory-write transactions as an initiator.

Split Completions are the exceptions to these conventional rules for Registered PCI devices. Any Registered PCI device that is completing a Split Transaction (a completer) is also permitted to refuse to accept a non-posted transaction as a target until it finishes its Split Completion as an initiator.

The requester can not make the acceptance of a Split Completion as a target contingent on the prior completion of a transaction of any kind (posted or non-posted) as an initiator on the same bus. The requester is permitted to terminate a Split Completion with Retry for temporary conditions that are guaranteed to resolve with time (as limited by Section I (N) (2), Requirements for Accepting Split Completions hereinabove). Otherwise, a deadlock may occur.

R. Transaction Sequence Combining and Re-Ordering

A Buffer managers is allowed to re-order subsequent byte-count memory-write transaction (transactions with the Initial Sequence Request bit not set). If the Initial Sequence Request bit is not set for a byte-count memory write transaction, the buffer manager is then allowed to re-order the transaction allowing it to pass all transactions that do not match the byte-count memory-write transaction's Sequence ID. This allows buffer manager to combine and re-order subsequent byte-count memory-write transaction with byte-count memory-write transactions having the same Sequence ID, while maintaining address order relative to the Sequence ID. The following rules shall be applied when supporting transaction sequence combining and re-ordering:

1. Buffer managers on detecting a byte-count memory-write transactions with the Initial Sequence Request attribute bit set and the Relax Ordered attribute not set shall follow the same ordering rules as in conventional PCI.
2. Buffer managers on detecting a subsequent byte-count memory-write transaction (Initial Sequence Request bit not set) and the Relax Ordered attribute not set are allowed to combine the subsequence byte-count memory-write transaction with buffered transactions having the same Sequence ID, while maintaining address order relative to the Sequence ID.
3. Transaction sequence combining is allowed regardless of the number of transactions that has occurred after the transaction sequence was disconnected and before the initiator is able to continue the transaction sequence with a subsequent transaction.
4. Buffer managers on detecting a subsequent byte-count memory-write transaction (Initial Sequence Request bit not set) and the Relax Ordered attribute not set are allowed to re-order the subsequent byte-count memory-write transaction relative to any other transaction as long as the Sequence ID does not match.

It is contemplated and with the scope of the Registered PCI invention that All Split Completions follow identical ordering and combining rules for subsequent byte-count memory-write transactions. That is, Split Completions are allowed to pass other transactions that have a different Sequence ID and are therefore only required to maintain ordering relative to its Sequence ID. Any memory-writes transaction with the Relax Ordered attribute set is allowed to pass any other transactions, including other transactions with the same Sequence ID.

II. Arbitration

The following are requirements for bus arbitration that effect initiators and the central bus arbiter, according to the Registered PCI invention.

A. Arbitration Signaling Protocol

The following Registered PCI arbiter characteristics remain the same as for conventional PCI:

No arbitration algorithm is specified. The arbiter is permitted to assign priorities using any method that fairly grants each initiator access to the bus.

The arbiter uses the same REQ# and GNT# signals defined in the PCI Local Bus Specification, incorporated by reference herein.

Initiators that require access to the bus are allowed to assert their REQ# signal on any clock.

An initiator can issue any number of transactions (including zero) as long as its GNT# remains asserted. The same back-to-back transaction timing rules apply. If GNT# is deasserted, the initiator must not start a new transaction. (In Registered PCI mode the GNT# input is registered. When comparing Registered PCI transactions to conventional transactions, the relevant clock for GNT# is one clock earlier in Registered PCI mode than in conventional mode.)

While a transaction from one initiator is in progress on the bus, the arbiter is permitted to deassert GNT# to the current initiator and to assert and deassert GNT# to other initiators (with some restrictions listed below). The next initiator may not start a transaction until the current transaction completes.

Unlike conventional PCI, a Registered PCI arbiter is assumed to monitor bus transactions to determine when a transaction has been terminated by the target. Consequently, Registered PCI initiators do not deassert REQ# after a target termination.

1 Starting a New Transaction

Preferably an initiator starts a transaction by driving the AD and C/BE buses and asserting FRAME# on the same clock. However, if an initiator is starting a Configuration transaction, the initiator drives the AD and C/BE buses for four clocks and then asserts FRAME#. The phrase "start a transaction," used hereinafter, indicates the first clock in which the device drives the AD and C/BE buses for the pending transaction.

In Registered PCI mode the GNT# input is registered in the initiator. When comparing Registered PCI transactions to conventional (non-registered) PCI transactions, the relevant clock for GNT# is one clock earlier in Registered PCI mode than in conventional mode. In general, GNT# must be asserted two clocks prior to the start of a transaction. This also means that the initiator is permitted to start a transaction one clock after GNT# deasserts.

If an initiator has more than one transaction to run, and GNT# is asserted on the last clock of the preceding transaction (that is, one clock before the idle clock, and two clocks before the start of the subsequent transaction), the initiator is permitted to start a subsequent transaction with a single idle clock between the two transactions. If an initiator has to run a fast back-to-back transaction, the initiator is subject to all the same restrictions for turning around the bus as for conventional PCI, and GNT#t must be asserted on the next to last clock of the preceding transaction (that is, two clocks before the start of the subsequent transaction).

An initiator acquiring the bus is permitted to start a transaction in any clock N in which the initiator's GNT# was asserted on clock N−2, and any of the following three conditions is true:

Case 1. The bus was idle (FRAME# and IRDY# are both deasserted) on clock N−2.

Case 2. The previous transaction was a byte-count transaction that did not use a reserved command or a reserved validated extended command, and FLAME# was deasserted on clock N−3.

Case 3. The previous transaction was a byte-enable transaction that did not use a reserved command or a reserved validated extended command, and TRDY# or STOP# was asserted on clock N−3.

In the first case above, there is a minimum of two idle clocks between transactions from different initiators. In the second and third cases above, the number of idle clocks is generally reduced to one by monitoring the transaction of the preceding bus owner and observing whether it is a byte-count or a byte-enable transaction and determining when it is about to end.

2. REQ# and GNT# Requirements

The Registered PCI invention shall satisfy setup and hold time requirements for REQ# and GNT# regardless of whether the bus is operating in Registered PCI mode or conventional mode. One alternative embodiment is for the arbiter of a bus that is capable of operating in Registered PCI mode to clock all REQ# signals directly into registers and clock all GNT# signals directly from registers, regardless of whether the bus is operating in Registered PCI mode or conventional mode. Another alternative embodiment is to monitor the state of DEVSEL# at the rising edge of RST#, and to register REQ# and GNT# only if the bus is operating in Registered PCI mode.

As in conventional PCI a device can assert and deassert REQ# on any clock. Unlike conventional PCI there is no requirement in Registered PCI mode for the device to deassert REQ# after a target termination. (It is assumed that the arbiter is monitoring bus activity and can tell that a transaction is target terminated, if that is important to the arbitration algorithm.)

If no GNT# signals are asserted, the arbiter can assert a GNT# on any clock. After the arbiter asserts GNT# the arbiter is permitted to deassert it on any clock. However, the arbiter shall fairly provide opportunities of for all devices to execute Configuration transactions. A device that intends to run a Configuration transaction preferably requires GNT# to remain asserted for five clocks while the bus is idle in order to have time to assert FRAME#.

Each initiator shall have a fair opportunity to execute a Configuration transaction. Various arbiter arrangements meet this requirement. Preferably, always leave GNT# asserted until the bus has been idle for three clocks or the new bus owner asserts FRAME#. This allows the next bus owner to be determined and the next GNT# to be asserted as soon as REQ# is asserted, or as soon as the previous initiator acquires the bus. If another higher priority initiator asserts its REQ#, that device will be third in line to own the bus, after the current initiator and the initiator whose GNT# was just asserted.

Another alternative embodiment is to guarantee that each device has an opportunity to be the highest priority device (e.g. a rotating priority such as round-robin or hierarchical round-robin) and to guarantee for the current highest priority device that GNT# remains asserted until it asserts FRAME#. The GNT# signals to all devices other than the current highest priority device can be asserted and deasserted as higher priority devices assert their REQ# signals while the bus is busy. Then the device with GNT#r asserted when the current transaction completes is allowed to start the next transaction. If every device has an opportunity to be the highest priority device, each device would eventually find that its GNT# remains asserted until the current transaction completes and the new device asserts FRAME# for its Configuration transaction.

If the arbiter deasserts GNT# to one initiator, it shall not assert another GNT# until the next clock. (The first initiator is permitted to sample its GNT# on the last clock it was asserted and assert FRAME# one clock after GNT# deasserts. In this case GNT# to the next initiator asserts on the same clock as FRAME# from the current initiator.)

Figure 48:
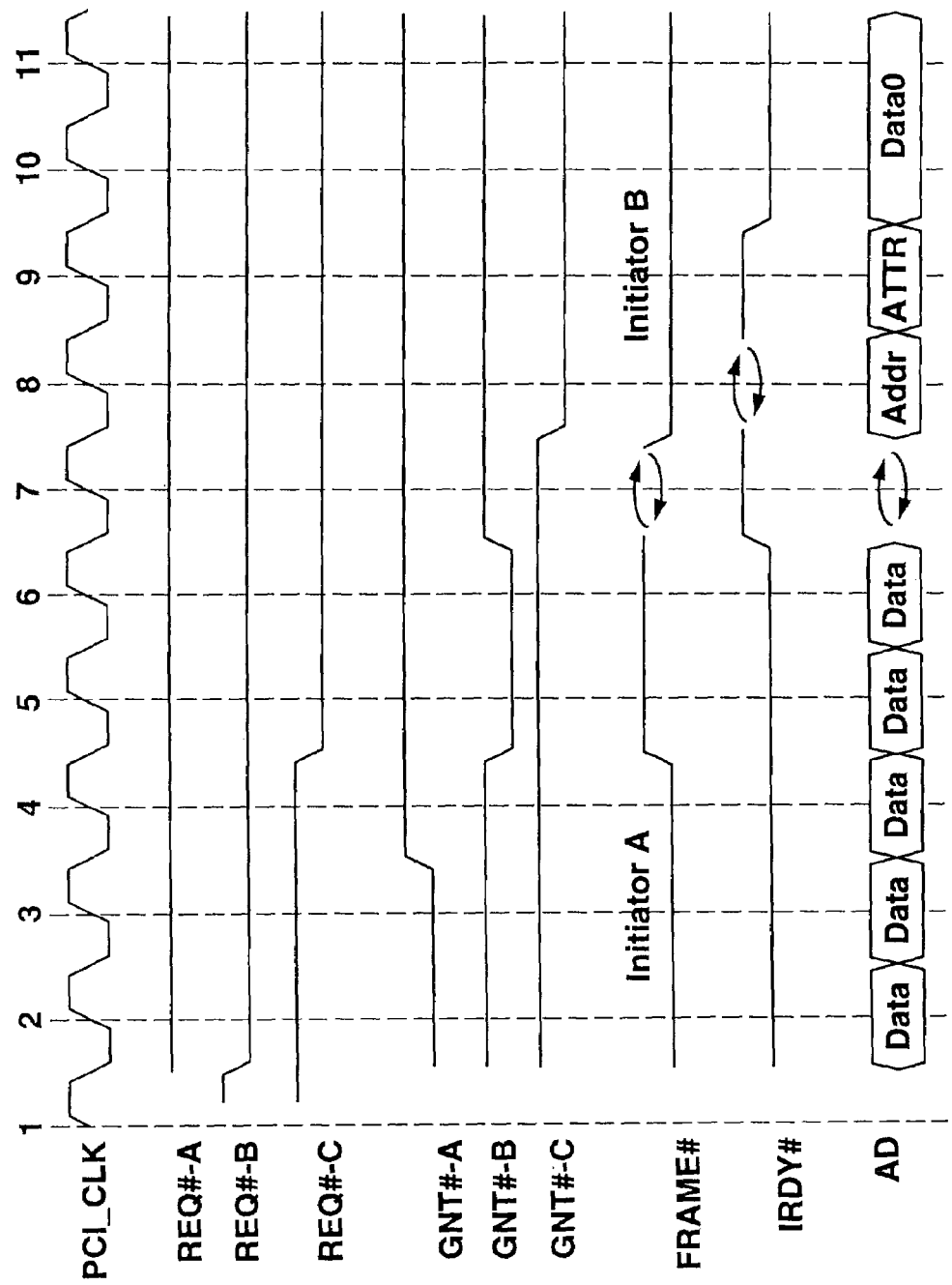
FIG. 48 is a schematic timing diagram of a Comprehensive Arbitration Example according to the present invention.

Referring now to FIG. 48, a schematic timing diagram of a Comprehensive Arbitration Example of an arbiter switching between several initiators is illustrated. The FIG. 48 shows that the initiator (B in the figure) shall wait for the current bus transaction to end before it can actually start its transaction. The FIG. 48 also shows that an initiator can start that transaction as late as 1 clock after its GNT# is deasserted.

FIG. 48 illustrates three initiators, A, B, and C. Initiator A is shown owning the bus and wanting to keep ownership by keeping its REQ#-A asserted. At clock 2, initiator B requests bus ownership and the arbiter starts preemption of initiator A at clock 4 by deasserting GNT#-A and asserting GNT#-B one clock later. At clock 5, initiator A responds by deasserting FRAME# because the byte-count or an ADB has been reached. Also in clock 5, initiator C requests bus ownership by asserting its REQ#-C. The arbiter deasserts the GNT# to initiator B to grant ownership of the bus to initiator C. Notice at clock 8, bus ownership changes from initiator A to initiator B with one idle clock. GNT#-B is asserted on clock 6 and the previous transaction ended on clock 6, so initiator B starts a transaction in clock 8, even though GNT#-B is deasserted in clock 7.

B. Arbitration Parking

Preferably, as in conventional protocol, if no initiators request the bus, the arbiter may park the bus at any initiator to prevent the bus signals from floating. The arbiter parks the bus by asserting GNT# to an initiator even though its REQ# is not asserted. If GNT# is asserted and the bus is idle for four consecutive clocks, the device shall actively drive the bus on the next subsequent clocks. (Note: Conventional PCI requires the device to drive the bus after 8 clocks, and recommends driving after only two to three clocks.) Preferably, the device shall stop driving the bus two clocks after GNT# is deasserted.

Preferably as in conventional PCI, if the parked initiator has to run a transaction, the initiator is not required to assert REQ#. The parked initiator shall assert REQ# if it intends to run more than a single transaction, otherwise, it could loose the bus after only a single transaction. A parked registered PCI initiator can start a transaction up to two clocks after any clock in which its GNT# is asserted, regardless of the state of REQ# (the bus is idle since it is parked).

The same Registered PCI rules apply for deasserting GNT# after a bus-parked condition that apply other times. The arbiter cannot assert GNT# to another initiator until one clock after it deasserts GNT# to the parked initiator. There is only one clock reserved for bus turn-around when the bus transitions from a parked initiator to an active initiator.

Based on the above, the minimum arbitration latency (that is, the delay from REQ# asserted to GNT# asserted) achievable from a Registered PCI arbiter on an Idle PCI bus is as follows:

1) Parked: 0 clocks for parked agents, 3 clocks for others.

2) Not Parked: 2 clocks for every agent.

Figure 49:
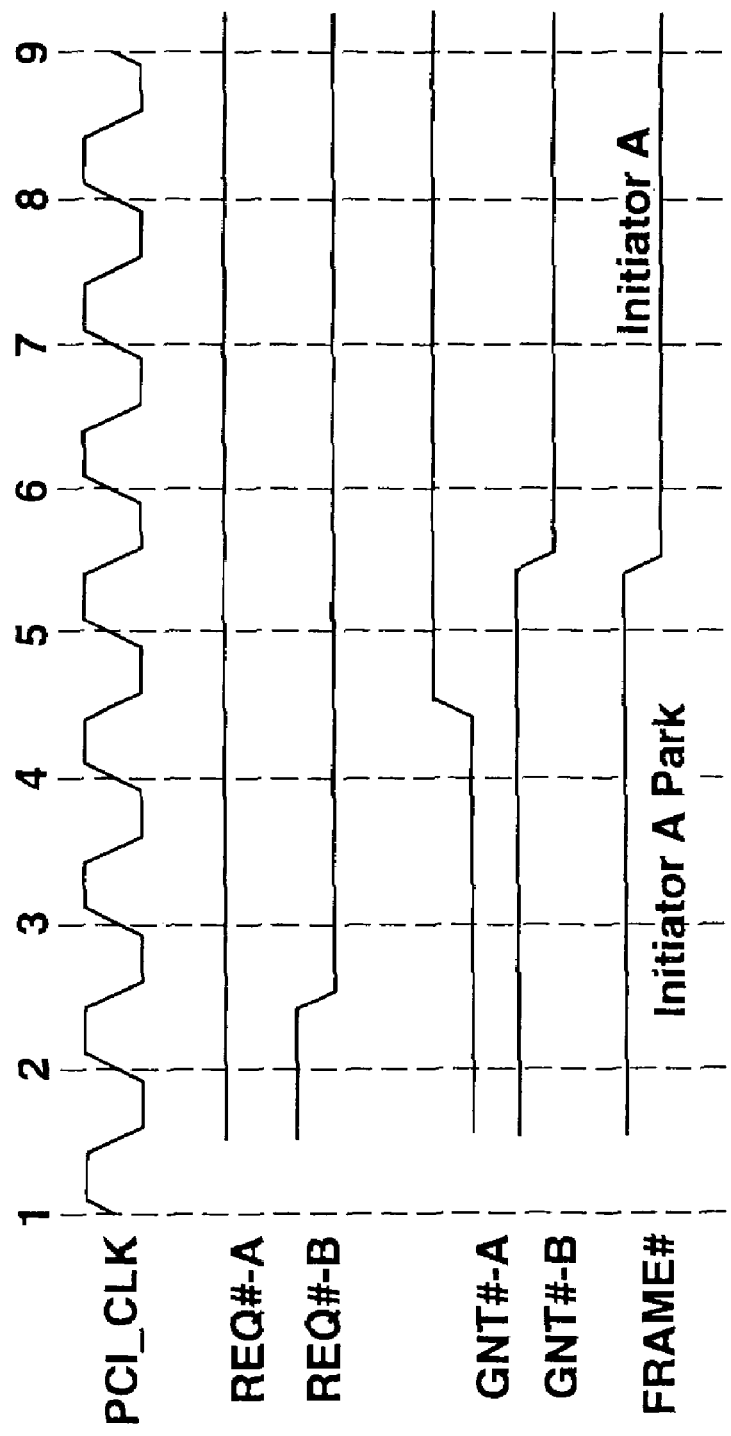
FIG. 49 is a schematic timing diagram of Bus Parking according to the present invention.

FIG. 49 illustrates a schematic timing diagram of Bus Parking.

III. Registered PCI Bridge Design Issues

In the preferred embodiment of the present invention, Registered PCI bridge designs are required to bridge the following transactions:

1) Registered PCI transactions; and
2) Conventional PCI transactions.

The bridge functions that are covered in other sections of this specification are listed in Table 15 as a reference.

TABLE 15

List of Bridge Design Issues Cross References

| Description | Section |
| --- | --- |
| Frequency and Mode Initialization Sequence in the Host/PCI-to-PCI Bridges | I. (A), V. (C)(2), and V. (E) |
| Reset | V. (A) and V. (C) |
| Config Registers | VI. (D) through VI. (G) |
| Deadlock Avoidance/Transaction Ordering | I. (Q)(1) |
| Split Transactions | I. (M) |
| Buffer Size | I. (C)(2) |
| 32-64 bit bus interface bridging | I. (P) |
| Central agent arbitration for downstream bus | II. |
| Error Handling | IV. |
| Transaction Sequence Combining and Re-ordering | I. (R) |

In the context of the present invention, the terms "upstream" and "downstream" are used to describe the direction of the transactions relative to the host bridge. Upstream transactions are transactions that are moving towards the host bridge, i.e., transactions originating from a PCI device that is accessing system memory, commonly flow upstream. Downstream transactions are transactions that are moving away from the host bridge, i.e., transactions originating form the CPU that access PCI devices.

In the preferred embodiment, the most common operating mode for the Registered PCI bridge designs are as "transparent bridges." Transparent bridges are bridges that reflect their upstream bus configuration mode onto the downstream bus. Consequently, if the upstream bus segment exit resets in Registered PCI mode then the downstream bus segment would also exit reset in Registered PCI mode if no conventional PCI devices were preset. The resultant transparent mode of operation, when applied to frequency, would also result in the downstream bus operating at a frequency equal to, or a frequency lower than, the operating frequency of the upstream bus. Notice that the transparent bridges always operate with the upstream bus segments that always operate in a superset mode, relative to the downstream bus segment. It is also important to note that the speed differential between the upstream bus segment and the downstream bus segment could vary from 33 MHz to 133 MHz. Additional description of the reset requirement for Registered PIC bridges can be found, supra, under the sections of this specification covering Section V. (C)(1), Frequency and Mode Initialization Sequence in a Host Bridge and Section V. (C)(2), Frequency and Mode Initialization Sequence in a PCI-to-PCI Bridge.

As a result of the Registered PCI's wide operating frequency range of 33 MHz to 133 MHz, bridge devices can not count on utilizing flow-through speed matching techniques. One of the design considerations for the implementation of the present invention is the need to accommodate potential frequency differences that could result between the upstream bus segments and the downstream bus segments.

In the preferred embodiment, upon entering Registered PCI mode after the initial power on reset, the bridge agent is required to protect the Enter Register PCI Mode bit in the Registered PCI Bridge Control register. This can be done by detecting the 10 clock DEVSEL# assertion on an idle bus, prior to RST# being asserted. See FIG. 66 and Table 23. This requirement is described more fully in Section V.(C), Frequency and Mode Initialization Sequence.

A. Design Requirements for a Registered-PCI-To-Registered-PCI Bridge

The Registered PCI bridges must terminate all Byte-Count memory read transactions with a Split Response. This Split Response termination communicates to the initiator that the requested read data will be returned as a Split Completion transaction. The Split Completion transaction is guaranteed by the bridge, regardless of the response received by the bridge when forwarding the transaction. The forwarded transaction uses the original Initiator Bus Number, Initiator Number, and Sequence Number. When responding to a Split Completions claim, the Registered PCI bridges claim the transaction base on the Initiator Bus Number. The PCI target on the destination bus then finally claims the forwarded Split Completion transaction by decoding Initiator Bus Number and Initiator Device Number.

B. Design Requirements for a Registered PCI to a Conventional PCI Bridge

Registered PCI to conventional PCI bridges must apply all of the rules of a Registered PCI to Registered PCI bridge. However, to aid in translating between bus protocol, the following design guidelines are provided below.

For transactions going downstream, the translation of address requires AD[2:0] to reflect conventional PCI burst ordering rules. The translation of the command is not required and can be used directly. The bridge may optimize the command by using the transaction Byte-Count and applying conventional PCI cache line rules to upgrade the command to PCI Memory Read Multiple, Memory Read Line, and Memory Write and Invalidate. Multi-data phase transactions result in a conventional PCI burst transaction, with the BE# being generated to compliment the lower 3-bits of the starting address AD[2:0], along with the transaction Byte-Count.

The Delayed Completion items that are moving upstream, and that are promoted to Split Completion on the upstream bus segment, must follow the ordering rules as described in Section I. (Q)(1), Ordering and Passing Rules.

For conventional PCI transactions going upstream, a new attribute field must be built. The new attribute field must include the Initial Sequence Request, Initiator Bus Number, Initiator Number, Sequence Number, and Sequence Byte-Count. The following guidelines are recommended when constructing this particular attribute field.

For the Initial Sequence Request—set this bit for every buffer that is in the initial state. That initial state is a buffer that has not yet delivered data successfully for writes transaction or has not yet received any data for reads transactions.

For Initiator Bus Number—use the bus number of the downstream bus segment.

For Initiator Numbers—use the bridge device number or monitor the GNT# signal and assign a different Initiator Number for each GNT#.

For Sequence Number—use a hard coded Sequence Number for all conventional PCI agents or monitor the GNT# signal and assign a different sequence number for each transaction being buffered.

For write transaction sequence Byte-Count—use the number of consecutive/contiguous bytes already buffered. Notice that non-contiguous bytes must be forwarded as individual 4-byte single data phase Byte-Enable transactions in order to identify valid data lanes using the byte enable bus.

For read transactions sequence Byte-Count in read transactions—use conventional pre-fetch rules to generate the byte count.

Conventional PCI address and command translation to Registered PCI is more direct, requiring only the lower address lines, AD[2:0], to be generated and memory commands translated based on Byte-Count and Byte-Enable transaction rules.

C. Bridge Error Handling

Since Registered PCI bus requires full support of PERR# assertion, intervening bridges are no longer required to log this exception, but instead must forward the failing condition to the owning initiator. The only exception to this rule is a posted write transaction, which must continue to be serviced as in conventional PCI.

Although it is allowable for a bridge device to assert SERR# on the detection of a error condition (usually as the first point of failure), this action is not encouraged for bridge designs that are optimized for error recovery. A bridge design that is optimized for error recovery is also designed to forward bad parity dust like conventional PCI), and will not interrupt any transactions as a result of a data parity exception. This results in transaction running to completion on Byte-Count even if a PERR# is asserted. When this condition occurs, the bridge must forward the exact data including the PAR and PERR# status for the data. In addition, the bridge must update its PCI Status register to reflect its detection of the exception. However, no further action must be taken by the bridge, which allows the error condition to be handled by the original initiator of the transaction (i.e., the originating device).

A bridge designed for error recovery operates as transparently as possible, allowing transactions to flow through the bridge seamlessly, including PAR and PERP#. It should be noted that Split Completion transactions flow through the bridge as a posted write transaction would. However, data parity exceptions are treated like read transactions and therefor flow transparently to the requester for error handling.

IV. Error Functions

A. Parity Generation

Registered PCI parity generation operates identically to that of conventional PCI, i.e., even parity is generated to include all the AD lines and C/BE# lines. All of the rules of conventional PCI parity generation must be followed by Registered PCI compliant devices.

On any given bus phase, PAR is driven by the agent that drives the AD byte lanes, and the corresponding address or data by one clock. FIG. 10 illustrates a write transaction with parity and FIG. 51 illustrates a read transaction with parity.

Figure 50:
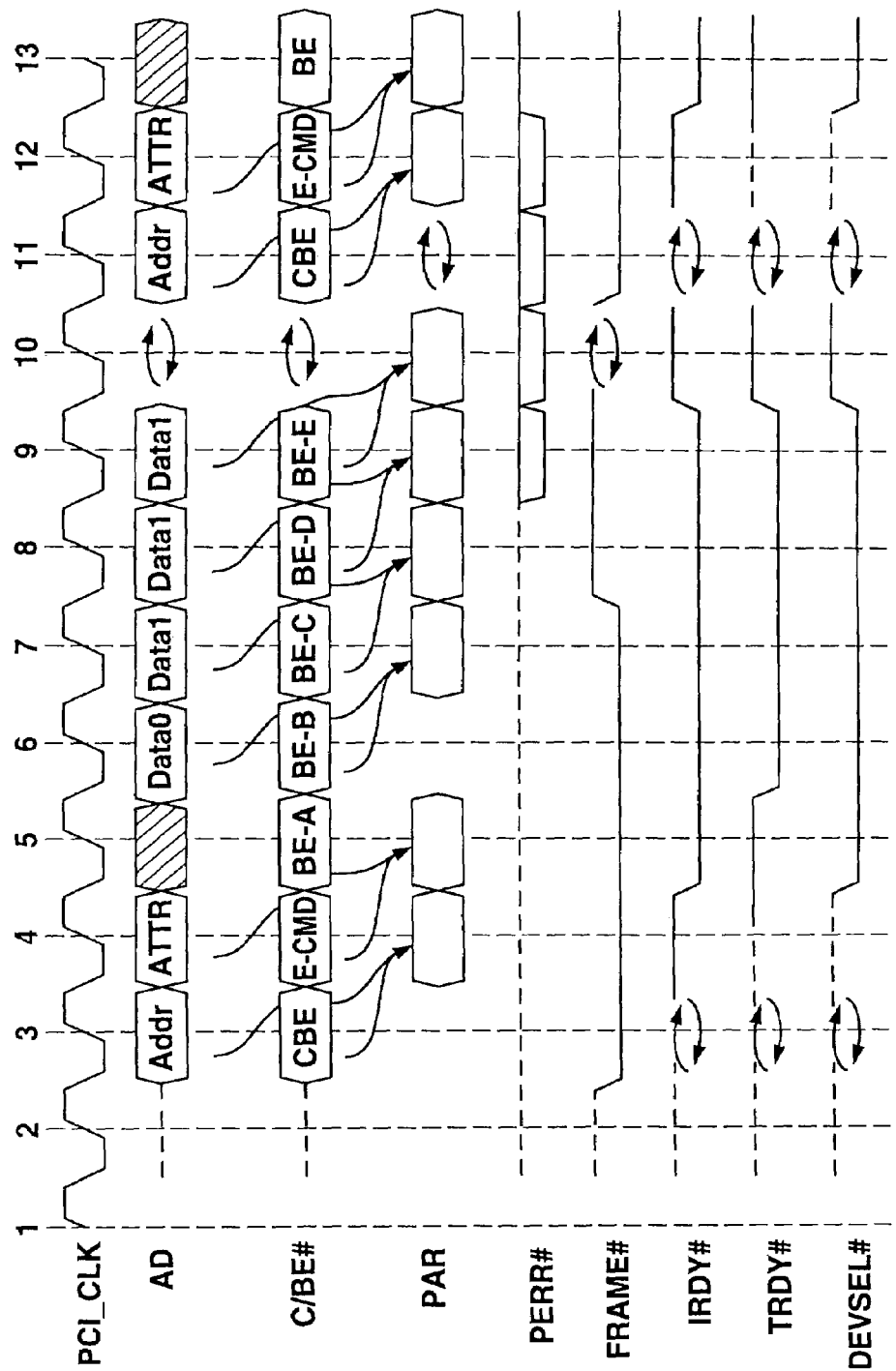
FIG. 50 is a schematic timing diagram of a Write Transaction Parity Operation according to the present invention.
Figure 51:
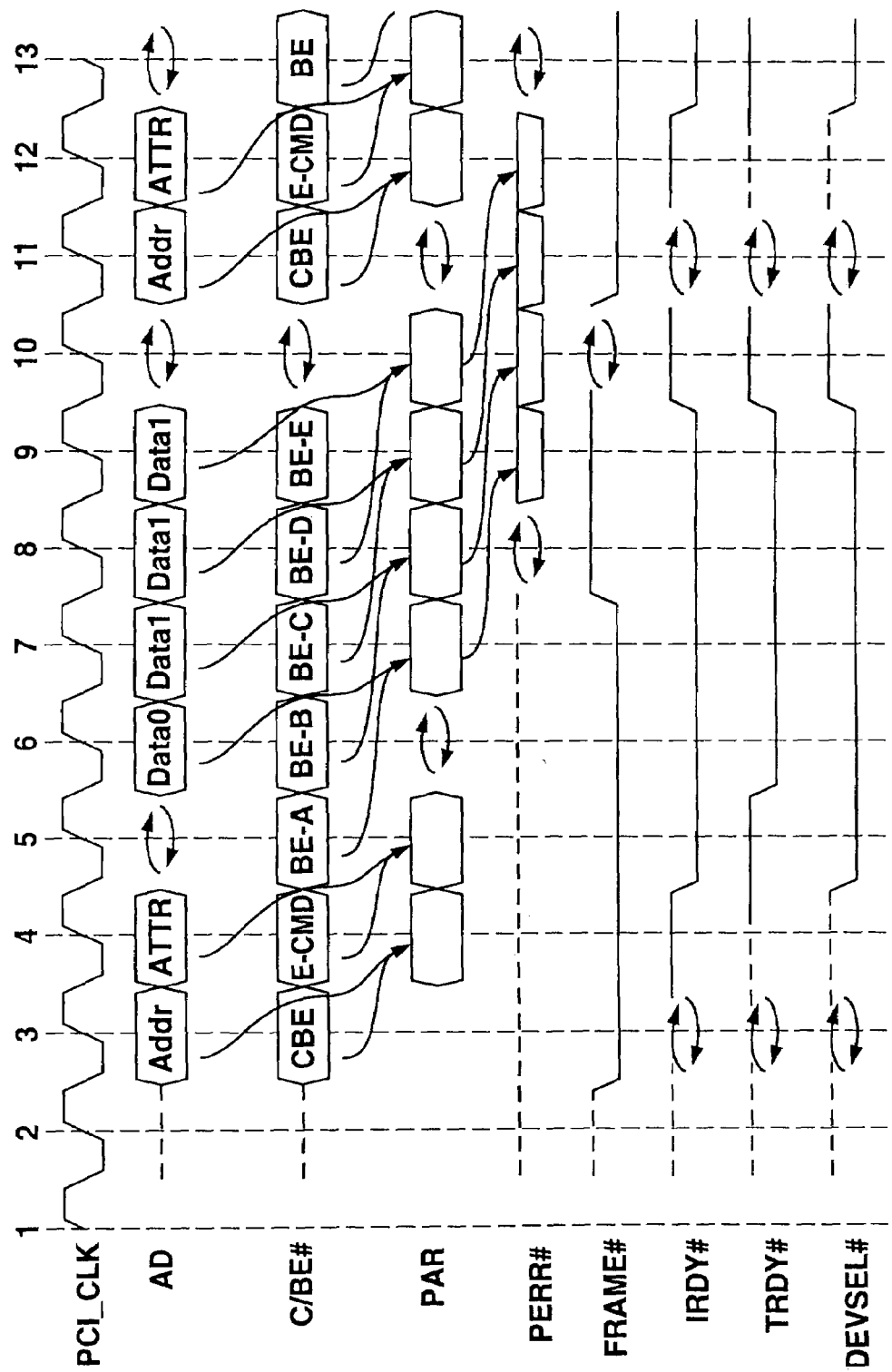
FIG. 51 is a schematic timing diagram of a Read Transaction Parity Operation according to the present invention.

For the write transaction in FIG. 51, the initiator drives PAR for the address phase on clock 4 and for the attributed phase on clock 5. For the write transaction, the response phase in clock 5 carries no parity and therefore must not be checked by the target device. The data phase for the write transaction follows with the parity for each data transfer, lagging by one clock as shown in clock 7, 8, 9, and 10 of FIG. 50.

The read transaction illustrated in FIG. 51 starts off identically to the write transaction, with the initiator driving PAR for the address phase on clock 4 and for the attribute phase on clock 5. Again, as in the write transaction, no parity is generated for the response phase, which is also the turn-around cycle for the read transaction. Parity generation for the data phase, however, is different for reads transaction when compared to write transactions. During a read transaction the target drives PAR on clock N+1 for the read-data it drove on clock N and the byte enables driven by the initiator on clock N−1. This is illustrated with the parity at clock 7 being generated using the AD byte lanes being driven by the target on clock 6 (Data 0) combined with the byte lanes being driven by the initiator on clock 5 (BE-A). Notice that the Byte lanes being driven by the initiator on clock 9 (BE-E) is not protected by any parity.

B. Parity Checking

If a device receiving data detects a data parity error, it must assert PERR# on the second clock after PAR is asserted as illustrated in FIGS. 50 and 51. Note that this is one clock later than conventional PCI. All Registered PCI device adapters are required to service PERR# conditions for their transactions. See the section titled "Error Handling and Fault Tolerance."

Whether a device decodes it address during the address phase or not, if that device detects a parity error on an attribute phase, the device asserts SERR#, if enabled. Other SERR# and status bit requirements for address-phase and data-phase errors are the same as for conventional PCI.

C. Error Handling and Fault Tolerance

This section describes error handling requirements for Registered PCI devices that are added to the requirements of conventional PCI devices. Refer to Section I. (N)(3), Split Completion Exception Message for special requirements for errors that occur during Split Transactions.

1. Data Parity Exception

Registered PCI error handling builds on conventional PC error functions in order to provide a more fault-tolerant system. All Registered PCI devices and their software device drivers are required either to recover from the data parity error or to assert SERR#. In conventional PCI systems, error-recovery mechanisms are only suggested. This optional error recovery support forces most systems to handle a data parity error condition as a catastrophic error that will bring the system down. Usually, the only service that is done by the system is to log the error, notify the user of the error condition, and execute a system halt instruction from the CPU to shut down the system. By requiring the device and device driver either to recover from the error or to assert SERR#, the system is freed from the assumption that all errors are catastrophic errors.

If a data parity error (calculated data parity error on a read or PERR# asserted on a write or Split Completion), is detected by a Registered PCI initiator, the Registered PCI initiator is required to provide one of the following levels of support for data parity error recovery:

1. Assert SERR#. Notice that no device driver support is required for this technique. This solution requires little or no change to the Registered PCI device or its device driver, only requiring an adapter to assert SERR#, which causes the system to handle the error as a catastrophic error as it would in a conventional PCI system.
2. Attempt hardware recovery by repeating the transaction. If a failure continues after attempting a maximum number of retries the hardware recovery terminates and SERR# is asserted. Notice that no device driver support is required for his technique. This solution builds on the first with a hardware recovery scheme to repeat the faulting transaction. If the error persist then SERR# is asserted, if enabled.
3. Attempt a software recovery by notifying the device driver of the error condition. The device driver may schedule a repeat of the transaction. If the device driver schedules a hardware recovery (repeat) and the repeat attempt is unsuccessful, the device driver must again be notified of the hardware recovery failure and the device driver must resolve the error condition in the OS. Notice here that once the error involves the device driver (OS) the error must never result in an SERR# assertion by the device. The device designer is allowed to combine #2 with #3 by attempting an automatic hardware recovery before notifying the device driver.

This solution could requires modifications to the device and the software device driver. This modification includes logic for the adapter to attempt to recover from the error by repeating the faulting condition, if supported. If the error persist the device must notify its device driver by some device-specific means (for example, a PCI interrupt). When servicing the error, the device driver is required to take at least one of the following actions:

Reschedule the failing transaction.
Notify the user of the faulting transaction.
Reinitialize the card and continue.
Take the card off-line.
Shut down the OS Notice that the device driver is not permitted to signal SERR# via its adapter, and must therefore resolve the exception from within the OS.

Since Registered PCI bus requires full support of PERR# assertion, intervening bridges are no longer required to log this exception, but instead must forward the failing condition to the initiator. The only exception to this rule is a posted write transaction, which must continue to be serviced as in conventional PCI see Section III. (C), Bridge Error Handling for a more detailed description.

2. Split Transaction Exceptions

Split Transaction Exceptions are discussed in Sections I. (N)(3), Split Completion Exception Message, and I. (N)(4), Unexpected Split Completion Exceptions.

V. Compatibility and System Initialization

This section explains the requirements for compatibility between Registered PCI and conventional PCI.

A. Device Requirements

Registered PCI devices enter conventional or Registered PCI mode based on the state of DEVSEL# at the rising edge of RST#. If DEVSEL# is deasserted, the device enters conventional mode. If DEVSEL# is asserted, the device enters Registered PCI mode. The device must select all state-machine and electrical differences between conventional and Registered PCI according to the state of DEVSEL# at the rising edge of RST#. When the system powers up, DEVSEL# may be indeterminate while power supply voltages are rising, but will be stable before the rising edge of RST#. When switching from conventional to Registered PCI mode, the source bridge guarantees that DEVSEL# is continuously asserted while RST# is asserted (with setup and hold time specified in Section VII. (D)(2), Timing Parameters). Devices are permitted combinatorially to set sequential logic to conventional mode if RST# is asserted and DEVSEL# is deasserted, and to set it to Registered PCI mode if RST# and DEVSEL# are both asserted.

Figure 66:
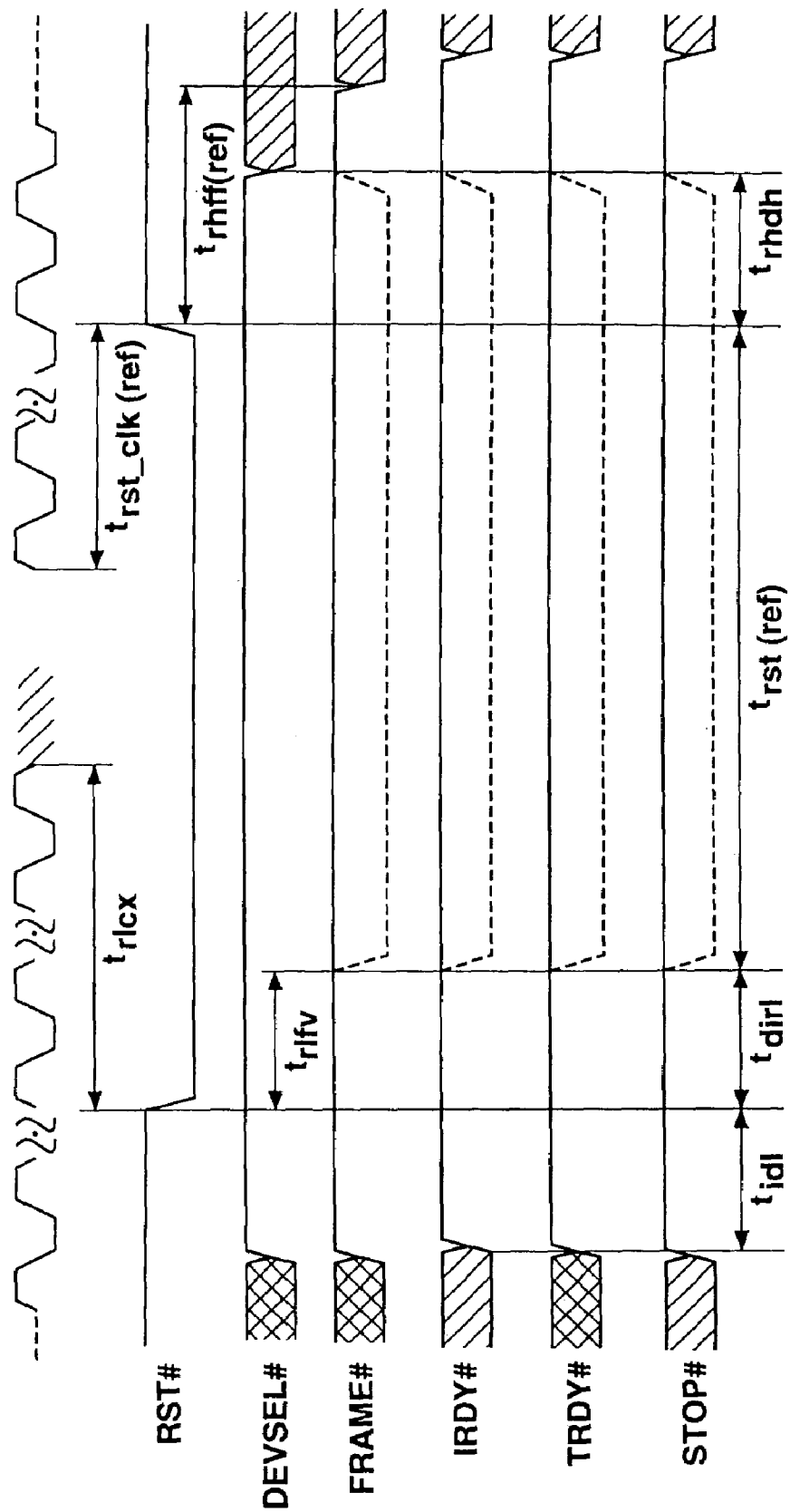
FIG. 66 is a schematic timing diagram of a RST# Timing for Switching to Registered PCI Mode according to the present invention.

While RST# is asserted, Registered PCI requires all state machines to reset and re-lock any PLLs if necessary as a frequency change is possible. FIG. 66 illustrates this mode switching reset condition and Table 23 list its timing requirements.

Figure 52:
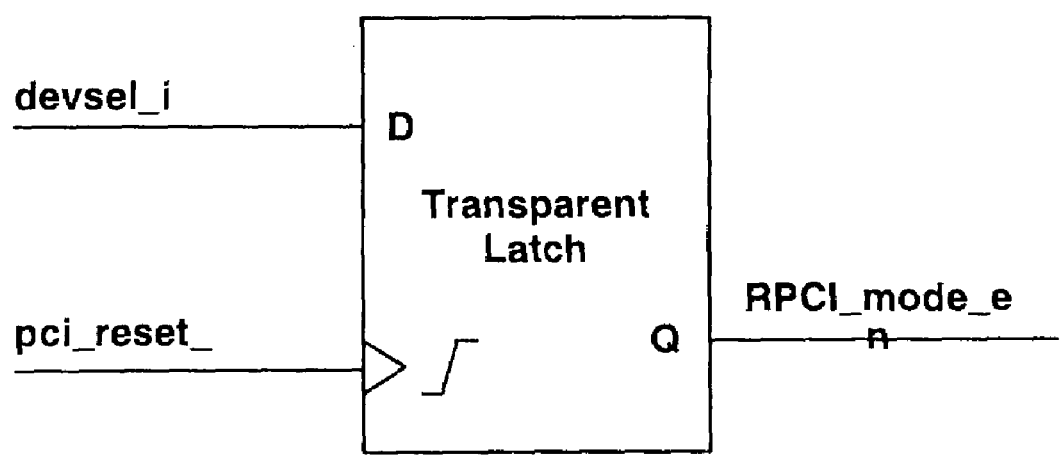
FIG. 52 is a schematic electrical diagram of a Registered PCI Mode Switching Reset Latch according to the present invention.

Registered PCI devices are required to provide a latching mechanism that will secure this mode switching event independent of the PCI clock being stable. FIG. 52 illustrates an example of the logic to support this requirement. The output of this latch is the device's Registered PCI enable signal. This signal is used to electrically mode the PCI I/O buffers into Registered PCI compliance, if needed, and to switch all PCI interface logic to supporting the Registered PCI protocol.

FIG. 52 shows a transparent latch that allows the Registered PCI enable signal to pass through the latch while under reset. This implementation removes any critical timing issues that a may arise as a result that the signal being heavily loaded, controlling all I/O buffers, clocking logic (PLL) and state machine. The figure also shows an asynchronous delay block on the DEVSEL# input, connected to the latch "D" input. This delay block provides ASIC register hold time pass RST# deassertion. This is needed because the timing relationship between RST# deassertion and DEVSEL# deassertion is 0 ns.

When a Registered PCI device enters Registered PCI mode, it is informed of the operating frequency range of the clock by the states of three other control signals at the rising edge of RST#, as shown in Table 17. The device uses this information to optimize internal options that are a function of the clock frequency, e.g. DEVSEL# decode timing, or PLL range parameters. PCI-to-PCI bridges are permitted to use this information to optimize the clock divider that generates the secondary clock frequency. (When in conventional mode the device uses M66EN as described in the PCI Local Bus Specification to determine operating frequency.) Registered PCI devices must meet the 33 MHz timing requirements of the PCI Local Bus Specification. Registered PCI devices may optionally meet the 66 MHz timing requirements of the PCI Local Bus Specification. Registered PCI devices are not required to perform their intended function, if installed in a conventional PCI system. Such devices are required to respond appropriately, if addressed by configuration transactions, however, they may optionally prevent their Bus Master, I/O Space, and Memory Space enable bits from being set.

As with conventional expansion boards, M66EN is used with Registered PCI expansion boards to enable PLLs on the card if the clock frequency is higher than 33 MHz, and to indicate to the system whether or not the card requires the clock to remain below 33 MHz. However, Registered PCI add-in cards must perform these two functions in a manner slightly different from a conventional PCI card as described below.

Registered PCI cards are permitted to use M66EN as an input to enable local clock-distribution PLLs when the clock frequency is above 33 MHz. If a Registered PCI add-in card supports conventional 66 MHz timing, it connects M66EN as described in the PCI Local Bus Specification (0.01 µF decoupling capacitor to ground to provide an AC return path). If the add-in card does not support conventional 66 MHz timing, the card must connect M66EN to ground through a 470-ohm resistor with a parallel 0.01 µF decoupling capacitor. The pull-down resistor allows the system to assert M66EN (to enable PLLs on the card) in Registered PCI mode at frequencies higher than 33 MHz, even if the card does not support conventional 66 MHz timing.

The electrical interface requires universal I/O buffers (as defined in the PCI Local Bus Specification) for all Registered PCI devices that support operation in 5V I/O, 33 MHz buses. Registered PCI devices may optionally operate only in 3.3V I/O buses.

Add-in cards indicate they are capable of Registered PCI operation by the connection of one pin on the PCI connector, RPCICAP. The following combinations of the M66EN and RPCICAP pins are defined in Table 16:

TABLE 16

M66EN and RPCICAP Encoding

| M66EN | RPCICAP | Conventional Bus Capability | Registered Bus Capability |
|---|---|---|---|
| deasserted | deasserted | 33 MHz | Not capable |
| asserted | deasserted | 66 MHz | Not capable |
| deasserted | asserted | 33 MHz | 133 MHz Registered PCI |
| asserted | asserted | 66 MHz | 133 MHz Registered PCI |

There are two choices for a pin for RPCICAP:
1) redefine a pin that is GND in conventional spec, like M66EN did. low=conventional, high=RPCI. Decoupling cap on RPCI card. Pull up resistor, decoupling cap, and logic input on RPCI system. GND on conventional system. There probably are plenty of GND pins left on the connector, but must be concerned about signal integrity and GND noise (DC and AC). Could use pin 3B, near the boundary scan pins; or
2) redefine SBO#, which is defined as an input to cards in the current spec, but nobody uses and rev 2.2 will change to "reserved." low=RPCI, high=conventional. GND on RPCI card. Pull-up resistor and logic input on RPCI system. Non-snooping conventional card is no-connect. Non-snooping conventional system is pull-up resistor. Snooping conventional card is input (if they exist). Snooping conventional system (if they exist) is output. Issue here is the advisability of redefining the PCI pin before SIG approval.

B. System Requirements

In the most general case, after power is initially applied to the system a Registered PCI bus must default to using conventional protocol and the clock must not be above 33 MHz or 66 MHz, depending on the state of M66EN. The system switches to higher clock frequencies and to Registered PCI protocol under the control of initialization software. See Section V. (C), Frequency and Mode Initialization Sequence. In some cases a hardware-only initialization sequence is possible. See Section V. (C)(3), Hardware-Only Mode Switching Model.

If only conventional 66 MHz devices are present in slots on the bus, a Registered PCI bus must support conventional 66 MHz operation. The PCI Local Bus Specification permits 66 MHz buses to operate at frequencies between 33 and 66 MHz (if required because of bus loading). It is recommended that Registered PCI buses that connect only to conventional 66 MHz devices operate at or close to 66 MHz to maximize bus bandwidth available to the devices. Registered PCI systems are permitted to limit bus frequency to a value lower than 133 MHz. This is generally done to support higher loading on the bus. If the clock frequency is set by system initialization software higher than 33 MHz, the system must assert M66EN to all devices on the bus. The system's M66EN output buffer must be capable of asserting M66EN even if each slot contains an add-in card with a pull-down resistor on M66EN. See Section V. (C)(3), Hardware-Only Mode Switching Model.

Attention is drawn to the effects of a conventional device on the Registered PCI devices within the computer system. Transparent PCI-to-PCI bridges do not allow their secondary bus to operate in Registered PCI mode unless their primary bus is in Registered PCI mode. If a conventional device is installed on a bus high in the hierarchy, it will limit the operation of all devices on the same bus and subordinate to that bus. If the user installs a conventional device in a poor location in that bus hierarchy, system configuration software can detect it and recommend alternatives.

C. Frequency Mode Initialization Sequence

Registered PCI devices operate in conventional or Registered PCI mode depending on the state of DEVSEL# at the rising edge of RST#. If DEVSEL# is deasserted at the rising edge of RST#, the device must operate in conventional mode. If DEVSEL# is asserted at the rising edge of RST#, the device must operate in Registered PCI mode.

When a Registered PCI device enters Registered PCI mode, it is informed of the operating frequency range of the clock by the states of three other control signals at the rising edge of RST#, as shown in Table 17.

TABLE 17

Operating Clock Frequency Encoding

| IRDY# | TRDY# | STOP# | Nominal Max Clock Frequency (MHz) | Minimum Clock Period (ns) |
|---|---|---|---|---|
| asserted | deasserted | deasserted | reserved | reserved |
| asserted | deasserted | asserted | 66 | 15 |
| asserted | asserted | deasserted | 100 | 10 |
| asserted | asserted | asserted | 133 | 7.5 |
| deasserted | deasserted | deasserted | reserved | reserved |
| deasserted | deasserted | asserted | reserved | reserved |
| deasserted | asserted | deasserted | reserved | reserved |
| deasserred | asserted | asserted | reserved | reserved |

The source bridge for each bus and the pull-up resistor on DEVSEL#, IRDY#, TRDY#, and STOP# provided by the central resource determine the states of these signals during RST#. The host bridge that begins a PCI bus hierarchy and a PCI-to-PCI bridge that extends it have slightly different requirements, which are presented separately.

1. Frequency and Mode Initialization Sequence in a Host Bridge

At power up the host bridge PCI interface and associated system logic must do the following as soon as the power supply indicates that power is good:

Set the clock frequency at or below 33 MHz.

Assert RST#.

Float DEVSEL#, IRDY#, TRDY#, and STOP#. The pull-up resistors will deassert them.

After the pulse width and other timing requirements for RST# have been met, the host bridge must deassert RST#. Since DEVSEL# is deasserted at the rising edge of RST#, the host bridge PCI interface and all devices on the bus enter conventional PCI mode.

Next, configuration software examines the Configuration Space of all devices in the PCI hierarchy under this host bridge to determine which buses contain conventional PCI devices. (See Section V. (C)(3) for an exception.) Only buses that contain no conventional PCI devices can be switched to Registered PCI mode.

All Registered PCI host bridges must provide special control hardware to switch the bus to Registered PCI mode with the assistance of system configuration software. (See Section V. (C)(3) for an exception.) After configuration software determines that no conventional PCI devices are present on the bus, the control hardware and software switches to Registered PCI mode and changes the clock frequency of the first PCI bus with the following sequence:

1. Stop all PCI bus activity.
2. Assert DEVSEL#. Assert or float IRDY#, TRDY#, and STOP# according to the operating frequency of the bus as shown in Table 17.
3. Assert RST#.
4. Change clock frequency.
5. Deassert RST#.
6. Deassert DEVSEL#, IRDY#, TRDY#, and STOP# and float them one clock later.

Since DEVSEL# is asserted at the rising edge of RST#, the host bridge PCI interface and all devices on the bus enter Registered PCI mode. The operating frequency is latched and stored by all Registered PCI devices. Normal bus activity will then resume in Registered PCI mode. The timing requirements of the transition from conventional PCI mode to Registered PCI mode are shown in FIG. 66. Timing parameter values are shown in Table 23 along with the other RST# timing parameters. The programming model and the allocation of responsibilities to software or hardware in the host bridge are not specified.

2. Frequency and Mode Initialization Sequence in a PCI-to-PCI Bridge

This section describes the behavior of a transparent Registered PCI-to-PCI bridge. Transparent PCI-to-PCI bridges are permitted to operate in either conventional or Registered PCI mode on their secondary interface while their primary interface is in Registered PCI mode. However, if their primary interface is in conventional mode, their secondary interface must also be in conventional mode. Special-application bridges are possible that use Registered PCI for embedded or other self-contained applications (that is, applications that do not include slots for expansion cards on the secondary side of the bridge.) Such implementations are permitted but not specified here. The bridge designer is free to implement device-specific hardware and software to set the clock frequency and operating mode of the secondary bus of such devices.

At power up the host bridge at the top of the PCI bus hierarchy asserts RST# and deasserts DEVSEL# as described in Section V. (C)(1). If RST# is asserted and DEVSEL# is deasserted on the primary interface of a transparent PCI-to-PCI bridge, the bridge must do the following:

Clear all internal state machines and registers, including the Enter Registered PCI Mode bit in the Registered PCI Bridge Control register [see Section VI. (C)].
Set the secondary clock frequency at or below 33 MHz or 66 MHz, depending on the state of secondary M66EN.
Assert secondary RST#.
Float secondary DEVSEL#, IRDY#, TRDY#, and STOP#. The pull-up resistors will deassert them.

When the host bridge deasserts primary RST#, the PCI-to-PCI bridge deasserts secondary RST#. Since DEVSEL# was deasserted at the rising edge of RST# on both the primary and secondary interfaces, both interfaces and all devices on the secondary bus enter conventional PCI mode.

After configuration software finishes examining the capabilities of all devices in the hierarchy, the software can initiate the switch to Registered PCI mode for any buses that has no conventional devices on that bus or any higher bus in the hierarchy. The software sets the Enter Registered PCI Mode bit in the Registered PCI Bridge Control register for all devices in the PCI bus hierarchy that meet this requirement. The configuration software then uses the host-bridge control hardware described in Section V. (C)(1), Frequency and Mode Initialization Sequence in a Host Bridge to switch modes. The following table shows the behavior of all PCI-to-PCI bridges in the hierarchy for each step of the host-bridge sequence.

TABLE 18

| Step | Host Bridge | Transparent PCI-to-PCI Bridge |
|---|---|---|
| 1. | Stop all PCI bus activity. | — |
| 2. | Assert DEVSEL#. | If the Enter Registered PCI Mode bit is set, asynchronously assert secondary DEVSEL#. |
| 3. | Assert RST#. | Asynchronously assert secondary RST#. If the Enter Registered PCI Mode bit is set, the bridge changes the secondary clock to the proper frequency at this time. If the bridge generates the secondary clock frequency based on the primary clock frequency, the bridge determines the frequency range of the primary clock from the states of primary IRDY#, TRDY#, and STOP# according to Table 17 and picks the appropriate multiplier to generate the secondary clock. The bridge indicates the frequency of the secondary clock by asserting or floating secondary IRDY#, TRDY#, and STOP# according to the same table. If the Enter Registered PCI Mode bit is cleared, the bridge sets the secondary clock frequency less than or equal to the appropriate conventional PCI clock frequency (33 MHz or 66 MHz) for the programmed value of the primary clock frequency. |
| 4. | Change clock frequency. | Secondary clock frequency tracks primary clock frequency, with multiplier set in step 3. |
| 5. | Deassert RST#. | Deassert secondary RST# (either asynchronous or synchronous, at bridge's option). |
| 6. | Deassert DEVSEL#, IRDY#, TRDY#, and STOP# and float them one clock later. | Deassert secondary DEVSEL#, IRDY#, TRDY#, and STOP# and float them one clock later. (If RST# was deasserted synchronously, the bridge must guarantee the minimum hold time after deasserting RST#. See Section VII. (D)(2), Timing Parameters.) |

Since DEVSEL# is asserted at the rising edge of RST# on the primary bus, the PCI-to-PCI bridge primary interface enters Registered PCI mode. If secondary DEVSEL# is asserted on the rising edge of secondary RST#, the secondary bridge interface and all devices on the secondary bus also enter Registered PCI mode. If secondary DEVSEL# is deasserted on the rising edge of secondary RST#, the secondary interface of the bridge and all devices on the secondary bus remain in conventional PCI mode.

If the software asserts secondary RST# for a PCI-to-PCI bridge by setting the Secondary Bus Reset bit in the Bridge Control register (see PCI-to-PCI Bridge Architecture Specification), the bridge must guarantee that the Registered PCI mode and operating frequency of secondary devices is not lost. If software sets the Secondary Bus Reset bit in the Bridge Control register and the Enter Registered PCI Mode bit is set, the bridge must keep secondary DEVSEL# asserted, and keep IRDY#, TRDY#, and STOP# asserted as appropriate, before and after secondary RST# is asserted, according to the timing for mode switching described above.

3. Hardware-Only Mode Switching Model

The dual reset sequence, requiring Registered PCI bus segment to power up in conventional mode and requiring software assistance when queering device capability, before entering Registered PCI mode can be circumvented with a hardware only single power up reset sequence. Supporting hardware only mode switching requires the host bride and PCI bridges to identify that Registered PCI only devices are installed on the downstream bus segment via sampling the RPCICAP (Registered PCI capability) signal.

The host bridge, on detecting that all of the devices on the PCI bus segment are Registered PCI capable, while under power up reset, will assert DEVSEL# and signal its bus segment encoded frequency on IRDY#, TRDY# and STOP#. For a more detail description on host bridge reset requirement. See Section V. (C)(1), Frequency and Mode Initialization Sequence in a Host Bridge. When RST# is deasserted the system would be in Registered PCI mode.

PCI bridges, while under power on reset and detecting Registered PCI reset sequence on the upstream bus segment and identifying the Registered PCI capability of the downstream devices, asserts DEVSEL# and the encoded bus segment frequency on IRDY# TRDY# and STOP#, to enter Registered PCI mode. Fore a more detain description on PCI bridge reset requirement. See Section V. (C)(2), Frequency and Mode Initialization Sequence in a PCI-to-PCI Bridge. When RST# is deasserted the downstream bus segment would be in Registered PCI mode.

D. Interoperability Matrix

FIG. 53 shows the interoperability matrix for variations of system and add-in card operation mode and frequency capability. Notes regarding FIG. 53:

1. Unless otherwise specified, all cases use an I/O supply voltage of 3.3 V.
2. Time indicates maximum value of $T_{prop}$ for the system shown. 33 MHz and 66 MHz values are taken from the PCI Local Bus Specification. Registered PCI values come from Section VII. (I)(1), Timing Budget.
3. Most of today's systems fall into this row. 5V I/O and Universal I/O cards work here but not 3.3V I/O cards.
4. Registered PCI systems must operate at 66 MHz when only 66 MHz conventional PCI cards are installed.
5. Registered PCI devices must support conventional 33 MHz timing, and optionally support conventional 66 MHz timing.

The most common operation cases are those in which the expansion card and the slot are designed to operate at the same frequency. If at least one card is a conventional 66 MHz card and all cards are capable of 66 MHz conventional mode operation, then the system must operate in 66 MHz conventional mode. The system bus frequency may be slower to support more loads. This is expected to be a common case, since 66 MHz devices are becoming available in the same high-bandwidth applications that Registered PCI systems are intended to support.

System designer are always allowed to make trade off between the number of slots on a bus segment versus the frequency of the bus segment when supporting 66 MHz PCI 2.1 or Registered PCI.

E. Hot Plug Events in a Registered PCI System

As described in the PCI Hot-Plug Specification, expansion cards cannot be connected to a bus whose clock is operating at a frequency higher than the card can handle. Without connecting the card to the bus, the Hot-Plug System Driver must determine the maximum frequency at which the card will operate. (Applying power to the card is acceptable, but not connecting it to the bus.)

The expansion card uses the M66EN pin (as described in the PCI Local Bus Specification) and the RPCICAP pin (as described in Section V. (A) to indicate its capabilities to the system. Hot-plug systems must enable the Hot-Plug System Driver to read these two inputs for each hot-plug slot. The Hot-Plug System Driver must not connect a slot to a bus, if the clock is too fast for the card or if the card does not support the current operating mode of the bus. Obviously, the description within this section is sensitive to the side-band scheme used, e.g., the events described herein A more elaborate side-band scheme for determining device capabilities, e.g. VPD on the PCI connector.]

If a Registered-PCI-capable card is connected to a bus that is already operating in Registered PCI mode, the Hot-Plug Controller has several requirements beyond those of a conventional Hot-Plug Controller. First, the Hot-Plug Controller must deassert (float) and then assert DEVSEL# while RST# is asserted. When RST# is asserted and DEVSEL# deasserted, all states in the device are guaranteed to be initialized, even those that are not initialized when RST# is asserted to enter Registered PCI mode (e.g. the Enter Registered PCI Mode bit in the Registered PCI Bridge Control register). After DEVSEL# has been deasserted [need some pulse width; add figure to clarify], DEVSEL# is asserted as it normally would to enter Registered PCI mode. Second, the Controller must assert and float (or deassert) IRDY#, TRDY#, and STOP# while RST# is asserted, according to the operating frequency of the bus and Table 17, to inform the device of the bus operating frequency.

VI. Configuration Space

Registered PCI devices include new status and control registers that are located in the extended capabilities list in configuration space. Attention is directed to the PCI significant interest group (SIG) web page for a copy of the "Capabilities" ECR dated May 20, 1996, for a detail description of this extension to PCI.

TABLE 18

Registered PCI Configuration Registers

| 31 24 | 23 16 | 15 8 | 7 0 |
|---|---|---|---|
| Registered PCI Bridge Control (bridge only) | | Next Capability | Reg. PCI Capability ID |
| Registered PCI Command | | | |
| reserved | | Registered PCI Status | |
| Memory Base Upper 32 Bits (PCI-to-PCI bridges only) | | | |
| Memory Limit Upper 32 Bits (PCI-to-PCI bridges only) | | | |

System configuration software determines whether a device supports Registered PCI by the presence of this item in the Extended Capabilities list. A multi-function device that implements Registered PCI must implement these registers in the Configuration Space of each function.

A. Registered PCI ID

This register identifies the Registered PCI ID in the extended capabilities list as a Registered PCI register set. It is read-only, returning a pre-defined value when read.

B. Next Capabilities Pointer

This register points to the next item in the extended capabilities list, as required by the PCI Local Bus Specification.

C. Registered PCI Bridge Control

This register is required only of Registered PCI-to-PCI bridges. It is reserved for other devices.

D. Registered PCI Command Register

This register controls various modes and features of the Registered PCI device.

E. Registered PCI Status Register

This register identifies the capabilities and current operating mode of the device, as listed in FIG. 56.

F. Memory Base Upper 32-Bits

Only used by PCI-to-PCI bridge (Header Type 01). Register locations not implemented in Extended Capabilities item of other devices. Extends addressing of Memory Base register to 64-bits.

G. Memory Limit Upper 32-Bits

Only used by PCI-to-PCI bridge (Header Type 01). Register locations not implemented in Extended Capabilities item of other devices. Extends addressing of Memory Limit register to 64-bits.

VII. Electrical Specification

A. DC Specifications

Table 19 shows the DC specifications for Registered PCI. Conventional 3.3V signaling DC specifications are included for reference.

TABLE 19

DC Specifications for 3.3 V Signaling

| Sym | Parameter | Condition | Registered PCI Min | Registered PCI Max | 3.3 V Conventional PCI (ref) Min | 3.3 V Conventional PCI (ref) Max | Units | Notes |
|---|---|---|---|---|---|---|---|---|
| $V_{cc}$ | Supply Voltage | | 3.0 | 3.6 | 3.0 | 3.6 | V | |
| $V_{ih}$ | Input High Voltage | | $0.5\,V_{cc}$ | $V_{cc} + 0.5$ | $0.5\,V_{cc}$ | $V_{cc} + 0.5$ | V | |
| $V_{il}$ | Input Low Voltage | | −0.5 | $0.3\,V_{cc}$ | −0.5 | $0.3\,V_{cc}$ | V | |
| $V_{ipu}$ | Input Pull-up Voltage | | $0.7\,V_{cc}$ | | $0.7\,V_{cc}$ | | V | 1 |
| $I_{il}$ | Input Leakage Current | $0 < V_{in} < V_{cc}$ | | ±10 | | ±10 | μA | 2 |
| $V_{oh}$ | Output High Voltage | $I_{out} = -500\,\mu A$ | $0.9\,V_{cc}$ | | $0.9\,V_{cc}$ | | V | |
| $V_{ol}$ | Output Low Voltage | $I_{out} = 1500\,\mu A$ | | $0.1\,V_{cc}$ | | $0.1\,V_{cc}$ | V | |
| $C_{in}$ | Input Pin Capacitance | | | 8 | | 10 | pF | 3 |
| $C_{clk}$ | CLK Pin Capacitance | | 5 | 8 | 5 | 12 | pF | |
| $C_{IDSEL}$ | IDSEL Pin Capacitance | | | 8 | | 8 | pF | 4 |
| $L_{pin}$ | Pin Inductance | | | 20 | | 20 | nH | 5 |
| $I_{off}$ | PME# input leakage | $V_o \leq 3.6\,V$ $V_{cc}$ off or floating | — | 1 | — | 1 | μA | 6 |

NOTES to Table 19:
1. This specification should be guaranteed by design. It is the minimum voltage to which pull-up resistors are calculated to pull a floated network. Applications sensitive to static power utilization must assure that the input buffer is conducting minimum current at this input voltage.
2. Input leakage currents include hi-Z output leakage for all bi-directional buffers with tri-state outputs.
3. Absolute maximum pin capacitance for a PCI inputs except CLK and IDSEL.
4. Lower capacitance on this input-only pin allows for non-resistive coupling to AD[xx] (conventional PCI only).
5. This is a recommendation, not an absolute requirement. The actual value should be provided with the component data sheet.
6. This input leakage is the maximum allowable leakage into the PME# open drain driver when power is removed from $V_{cc}$ of the component. This assumes that no event has occurred to cause the device to attempt to assert PME#.

B. AC Specifications

The AC specifications can be found in tables 20 and 21 below:

TABLE 20

AC Specifications

| Symbol | Parameter | Condition | Registered PCI Min | Registered PCI Max | 66 MHz Conventional PCI (ref) Min | 66 MHz Conventional PCI (ref) Max | Units | Notes |
|---|---|---|---|---|---|---|---|---|
| AC Drive Points | | | | | | | | |
| $I_{oh(AC,min)}$ | Switching Current | $V_{out} = 0.3\,V_{cc}$ | $-12\,V_{cc}$ | — | $-12\,V_{cc}$ | — | mA | 1 |

TABLE 20-continued

AC Specifications

| Symbol | Parameter | Condition | Registered PCI Min | Registered PCI Max | 66 MHz Conventional PCI (ref) Min | 66 MHz Conventional PCI (ref) Max | Units | Notes |
|---|---|---|---|---|---|---|---|---|
| $I_{oh(AC,max)}$ | High, minimum Switching Current | $V_{out} = 0.7 V_{cc}$ | — | $-20 V_{cc}$ | — | $-32 V_{cc}$ | mA | |
| $I_{ol(AC,min)}$ | High, maximum Switching Current Low, minimum | $V_{out} = 0.6 V_{cc}$ | $16 V_{cc}$ | — | $16 V_{cc}$ | — | mA | 1 |
| $I_{ol(AC,max)}$ | Switching Current Low, maximum | $V_{out} = 0.18 V_{cc}$ | — | $19 V_{cc}$ | — | $38 V_{cc}$ | mA | |
| Slew Rate | | | | | | | | |
| $t_r$ | Output rise slew rate | $0.3 V_{cc}$ to $0.6 V_{cc}$ | | 6 | 1 | 4 | V/ns | 2 |
| $t_f$ | Output fall slew rate | $0.3 V_{cc}$ to $0.6 V_{cc}$ | | 6 | 1 | 4 | V/ns | 2 |

Figure 63:
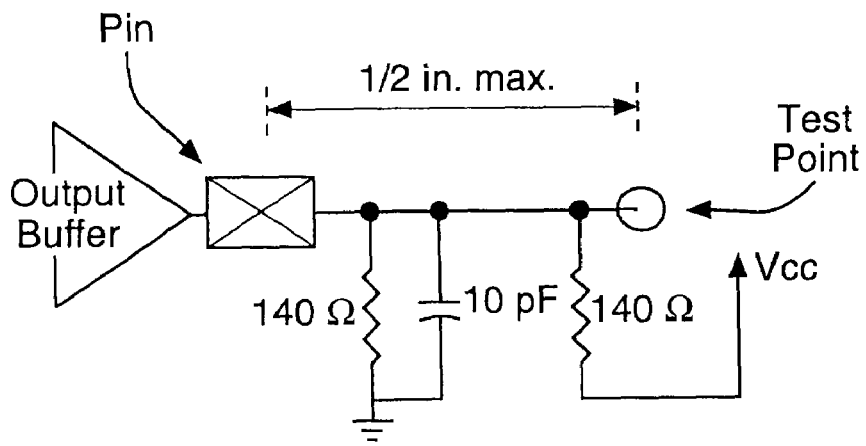
FIG. 63 is an electrical circuit schematic of an Output Slew Rate Test Load according to the present invention.

NOTES to Table 20:
1. Switching current characteristics for REQ# and GNT# are permitted to be one half of that specified here; i.e., half size drivers may be used on these signals. This specification does not apply to CLK and RST# which are system outputs. "Switching Current High" specifications are not relevant to SERR#, INTA#, INTB#, INTC#, and INTD# which are open drain outputs.
2. This parameter is to be interpreted as the cumulative edge rate across the specified range rather than the instantaneous rate at any point within the transition range. The test load is specified in FIG. 63 (66 MHz reference values use the test load in FIG. 63). The specified load is optional. The designer may elect to meet this parameter with an unloaded output per revision 2.0 of the PCI specification. However, adherence to both maximum and minimum parameters is required (the maximum is not simply a guideline). Rise slew rate does not apply to open drain outputs.

TABLE 21

Input Clamp Current

| Symbol | Parameter | Condition | Min | Max | Units | Notes |
|---|---|---|---|---|---|---|
| $I_{ch}$ | High clamp current | $V_{cc} + 4 > V_{in} \geq V_{cc} + 1$ | $25 + (V_{in} - V_{cc} - 1)/0.015$ | — | mA | |
| $I_{cl}$ | Low clamp current | $-3 < V_{in} \leq -1$ | $-25 + (V_{in} + 1)/0.015$ | — | mA | |
| 66 MHz Conventional PCI (ret) | | | | | | |
| $I_{ch}$ | High clamp current | $V_{cc} + 4 > V_{in} \geq V_{cc} + 1$ | $25 + (V_{in} - V_{cc} - 1)/0.015$ | — | mA | |
| $I_{cl}$ | Low clamp current | $-3 < V_{in} \leq -1$ | $-25 + (V_{in} + 1)/0.015$ | — | mA | |

C. Maximum AC Ratings and Device Protection

Maximum AC rating and device protection requirements are the same for Registered PCI devices as for conventional PCI devices in a 3.3 V signaling environment.

D. Timing Specification

1. Clock Specification

Clock measurement conditions are the same for Registered PCI devices as for conventional PCI devices in a 3.3 V signaling environment.

In the case of expansion boards, compliance with the clock specification is measured at the expansion board component, not at the connector. As with conventional PCI, devices used behind a PCI-to-PCI bridge on an expansion card operate using the clock output specification of the selected bridge rather than the specification shown here. Some PCI-to-PCI bridges will have different clock output specifications.

TABLE 22

Clock Specifications

| | | 133 MHz | | 100 MHz | | 66 MHz (ref) | | 33 MHz (ref) | | | |
|---|---|---|---|---|---|---|---|---|---|---|---|
| Symbol | Parameter | Min | Max | Min | Max | Min | Max | Min | Max | Units | Notes |
| $t_{cyc}$ | CLK Cycle Time | 7.5 | 15 | 10 | 15 | 15 | 30 | 30 | ∞ | ns | 1,3 |
| $t_{high}$ | CLK High Time | 3 | | 4 | | 6 | | 11 | | ns | |

TABLE 22-continued

Clock Specifications

| | | 133 MHz | | 100 MHz | | 66 MHz (ref) | | 33 MHz (ref) | | | |
|---|---|---|---|---|---|---|---|---|---|---|---|
| Symbol | Parameter | Min | Max | Min | Max | Min | Max | Min | Max | Units | Notes |
| $t_{low}$ | CLK Low Time | 3 | | 4 | | 6 | | 11 | | ns | |
| — | CLK Slew Rate | 3 | 6 | 2 | 4 | 1.5 | 4 | 1 | 4 | V/ns | 2,4 |

Figure 57:
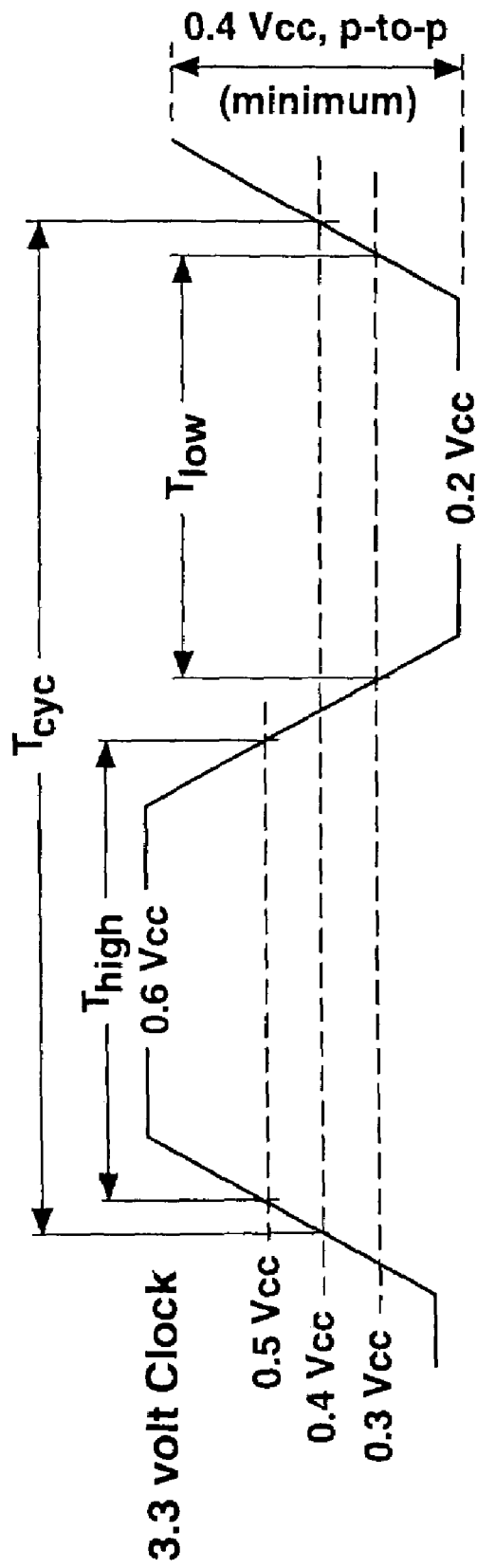
FIG. 57 is a plot of voltage versus time of a 3.3V Clock Waveform according to the present invention.
Figure 62:
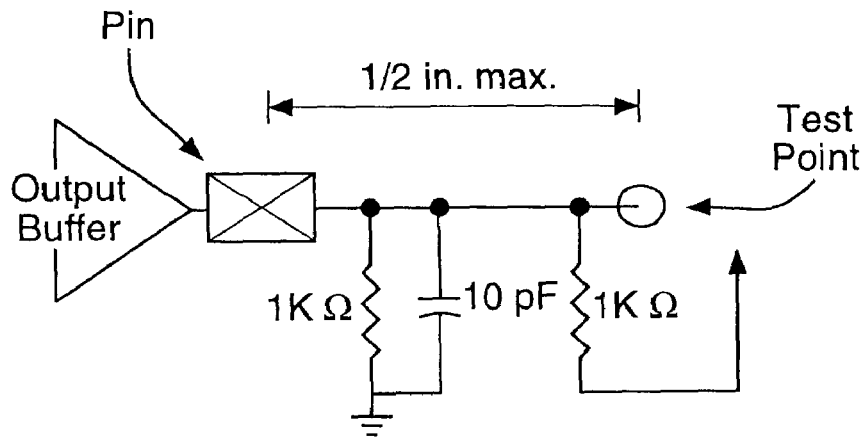
FIG. 62 is an electrical circuit schematic of a Tval (min) Test Load according to the present invention.

NOTES for Table 22:
1. For clock frequencies above 33 MHz the clock frequency may not change except while RST# is asserted.
2. This slew rate must be met across the minimum peak-to-peak portion of the clock waveform as shown in FIG. 57.
3. The minimum clock period must not be violated for any single clock cycle, i.e., accounting for all system jitter.
4. This parameter is to be interpreted as the cumulative edge rate across the specified range rather than the instantaneous rate at any point within the transition range. The test load is specified in FIG. 63 (66 MHz and 33 MHz reference values use the test load in FIG. 62). The specified load is optional. The designer may elect to meet this parameter with an unloaded output per revision 2.0 of the PCI specification. However, adherence to both maximum and minimum parameters is required (the maximum is not simply a guideline). Rise slew rate does not apply to open drain outputs.

2. Timing Parameters

Table 23 shows the timing specifications for all signals other than the clock.

TABLE 23

General Timing Parameters

| | | Registered PCI | | 66 MHz Conventional PCI (ref) | | 33 MHz Conventional PCI (ref) | | | |
|---|---|---|---|---|---|---|---|---|---|
| Symbol | Parameter | Min | Max | Min | Max | Min | Max | Units | Notes |
| $t_{val}$ | CLK to Signal Valid Delay - bused signals | 0 | 4 | 2 | 6 | 2 | 11 | ns | 1,2,3 |
| $t_{val}$(ptp) | CLK to Signal Valid Delay - point to point signals | 0 | 4 | 2 | 6 | 2 | 12 | ns | 1,2,3 |
| $t_{on}$ | Float to Active Delay | tbd | | 2 | | 2 | | ns | 1,7 |
| $t_{off}$ | Active to Float Delay | | tbd | | 14 | | 28 | ns | 1,7 |
| $t_{su}$ | Input Set up Time to CLK - bused signals | 1.5 | | 3 | | 7 | | ns | 3,4,8 |
| $t_{su}$(ptp) | Input Set up Time to CLK - point to point signals | 1.5 | | 5 | | 10,12 | | ns | 3,4 |
| $t_h$ | Input Hold Time from CLK | 0 | | 0 | | 0 | | ns | 4 |
| $t_{rst}$ | Reset Active Time after power stable | 1 | | 1 | | 1 | | ms | 5 |
| $t_{rst-clk}$ | Reset Active Time after CLK stable | 100 | | 100 | | 100 | | μs | 5 |
| $t_{rst-off}$ | Reset Active to output float delay | | 40 | | 40 | | 40 | ns | 5,6 |
| $t_{rrsu}$ | REQ64# to RST# setup time | $10T_{cyc}$ | | $10T_{cyc}$ | | $10T_{cyc}$ | | ns | |
| $t_{rrh}$ | RST# to REQ64# hold time | 0 | 50 | 0 | 50 | 0 | 50 | ns | |
| $t_{rhfa}$ | RST# high to first Configuration access | $2^{25}$ | | $2^{25}$ | | $2^{25}$ | | clocks | |
| $t_{rhff}$ | RST# high to first FRAME# assertion | 5 | | 5 | | 5 | | clocks | |
| $t_{idl}$ | Delay from bus idle to DEVSEL# low for mode switch | 5 | | | | | | clocks | |
| $t_{dlrl}$ | Delay from DEVSEL# low to RST# low for mode switch | 10 | | | | | | clocks | |
| $t_{rlcx}$ | Delay from RST# low to CLK frequency change | 0 | | | | | | ns | |
| $t_{rlfv}$ | Delay from RST# low to IRDY#, TRDY# and STOP# Operating Frequency encoding valid | 0 | 60 ns | | | | | ns | |

TABLE 23-continued

| | | General Timing Parameters | | | | | | |
|---|---|---|---|---|---|---|---|---|
| | | Registered PCI | | 66 MHz Conventional PCI (ref) | | 33 MHz Conventional PCI (ref) | | | |
| Symbol | Parameter | Min | Max | Min | Max | Min | Max | Units | Notes |
| $t_{rhdh}$ | Delay from RST# high to DEVSEL#, IRDY#, TRDY# and STOP# high for mode switch | 0 | | | | | | ns | 9 |

Figure 60:
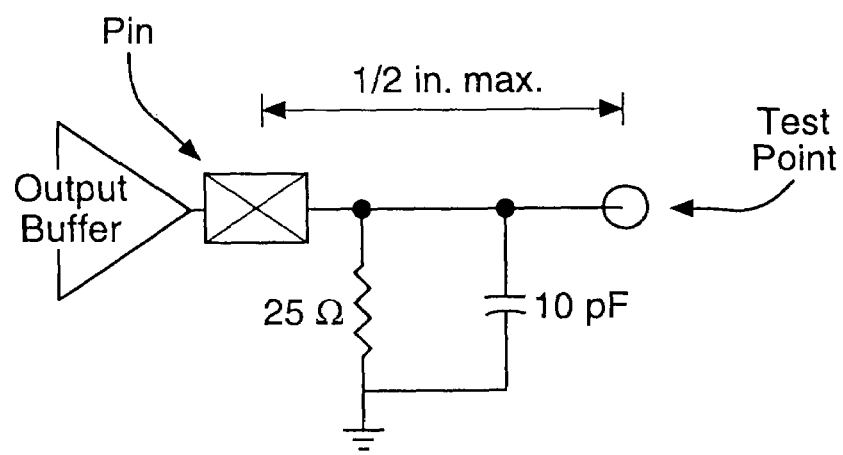
FIG. 60 is an electrical circuit schematic of a RST# Timing for Switching to Registered PCI Mode according to the present invention.
Figure 61:
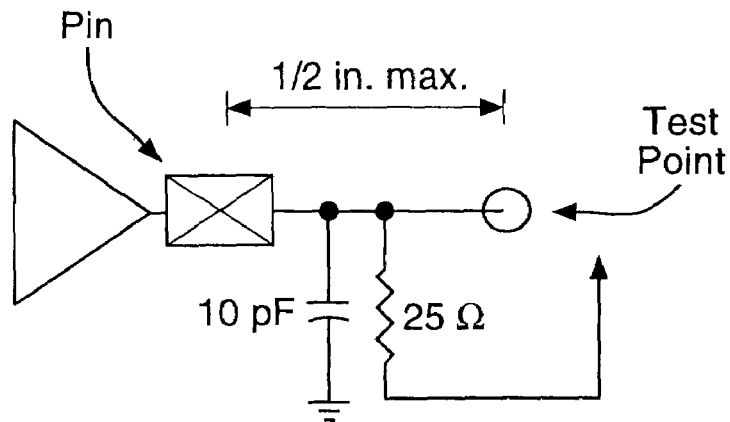
FIG. 61 is an electrical circuit schematic of a Tval (max) Falling Edge Test Load according to the present invention.

NOTES for Table 23:
1. See the timing measurement conditions in FIG. 58.
2. Minimum times are measured at the package pin with the load circuit shown in FIG. 62. Maximum times are measured with the load circuit shown in FIG. 61 and FIG. 60.
3. Setup time for point-to-point signals applies to REQ# and GNT# only. All other signals are bused.
4. See the timing measurement conditions in FIG. 59.
5. RST# is asserted and deasserted asynchronously with respect to CLK.
6. All output drivers must be floated when RST# is active.
7. For purposes of Active/Float timing measurements, the Hi-Z or "off" state is defined to be when the total current delivered through the component pin is less than or equal to the leakage current specification.
8. Setup time applies only when the device is not driving the pin. Devices cannot drive and receive signals at the same time.
9. DEVSEL# for a mode change must be deasserted no later than one clock before the first FRAME# and must be floated no later than the first clock FRAME# is asserted.

3. Measurement and Test Conditions

Figure 58:
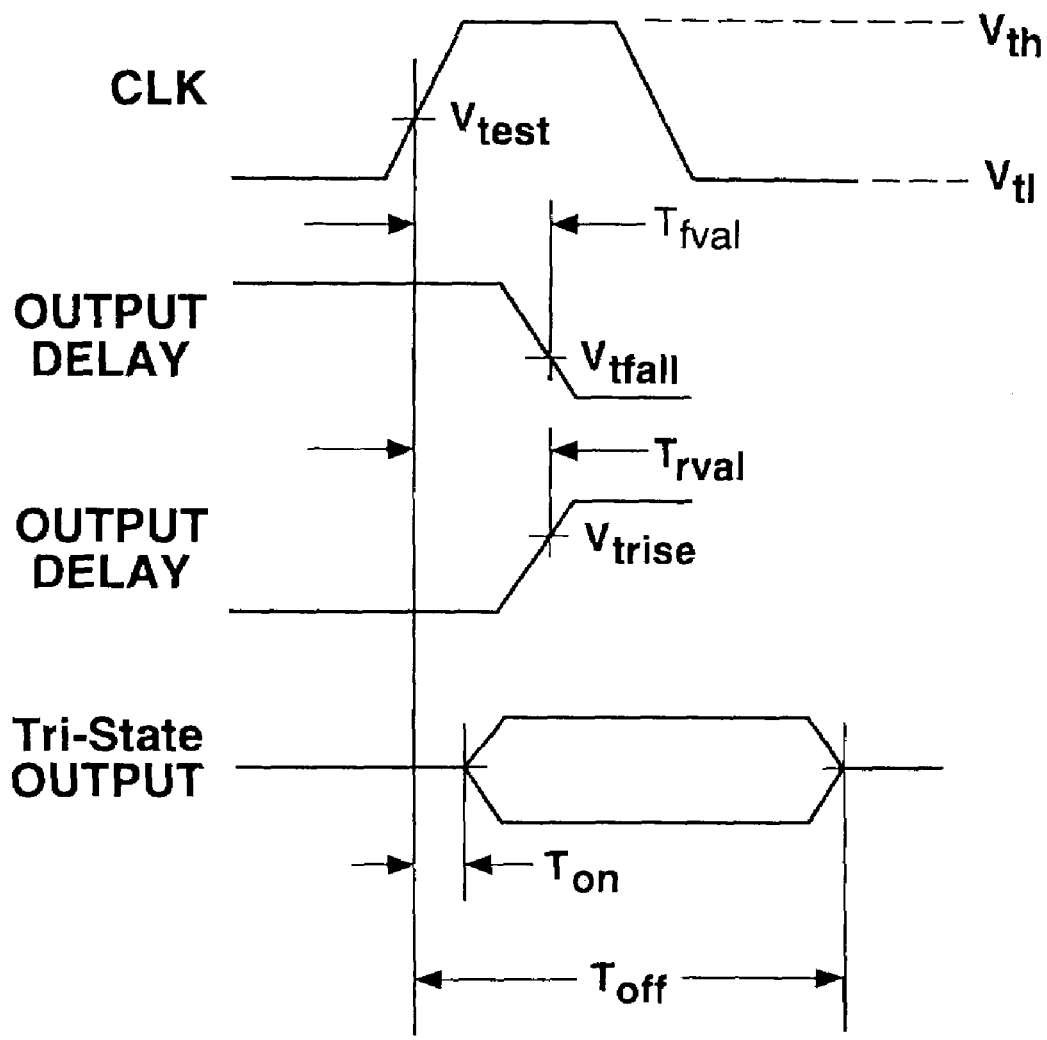
FIG. 58 is a schematic timing diagram of an Output Timing Measurement Conditions according to the present invention.
Figure 59:
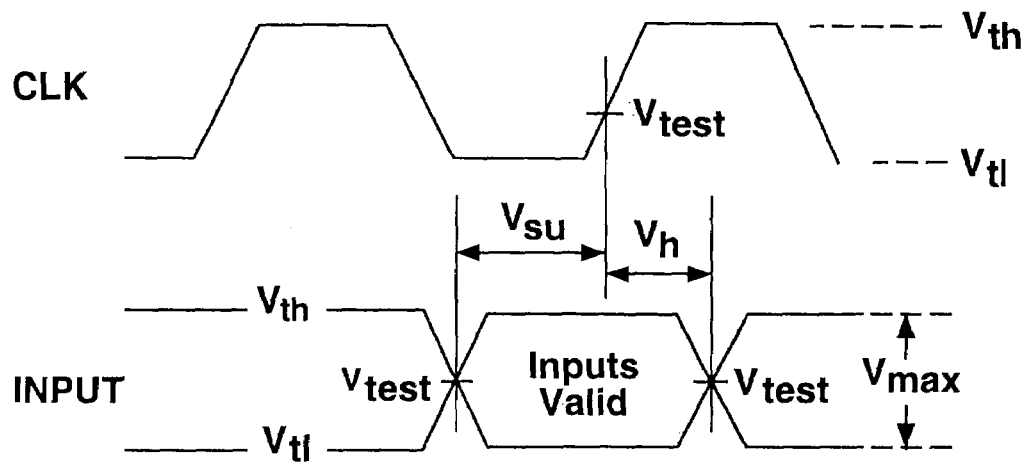
FIG. 59 is a schematic timing diagram of an Input Timing Measurement Conditions according to the present invention.

Timing measurement and test conditions are the same as for conventional PCI, except for the output slew rate test load, and the input signal slew rate. FIG. 58 shows the output waveform measurement conditions. FIG. 59 shows the input waveform measurement conditions.

TABLE 24

| | Measurement Condition Parameters | | | |
|---|---|---|---|---|
| | | 3.3 V Signaling 66 MHz | | |
| Symbol | Registered PCI | Conventional PCI (ref) | Units | Notes |
| $V_{th}$ | 0.6 $V_{cc}$ | 0.6 $V_{cc}$ | V | 1 |
| $V_{tl}$ | 0.2 $V_{cc}$ | 0.2 $V_{cc}$ | V | 1 |
| $V_{test}$ | 0.4 $V_{cc}$ | 0.4 $V_{cc}$ | V | |
| $V_{trise}$ | 0.285 $V_{cc}$ | 0.285 $V_{cc}$ | V | 2 |
| $V_{tfall}$ | 0.615 $V_{cc}$ | 0.615 $V_{cc}$ | V | 2 |
| $V_{max}$ | 0.4 $V_{cc}$ | 0.4 $V_{cc}$ | V | 1 |
| Input Signal Slew Rate | 2.0 | 1.5 | V/ns | 3 |

NOTES for Table 24:
1. The test for the 3.3 V environment is done with 0.1*$V_{cc}$ of overdrive. $V_{max}$ specifies the maximum peak-to-peak waveform allowed for measuring input timing. Production testing is permitted to use different voltage values, but must correlate results back to these parameters.
2. $V_{trise}$ and $V_{tfall}$ are reference voltages for timing measurements only.
3. Input signal slew rate is measured between 0.3 $V_{cc}$ and 0.6 $V_{cc}$.

4. Device Internal Timing Examples

Figure 64:
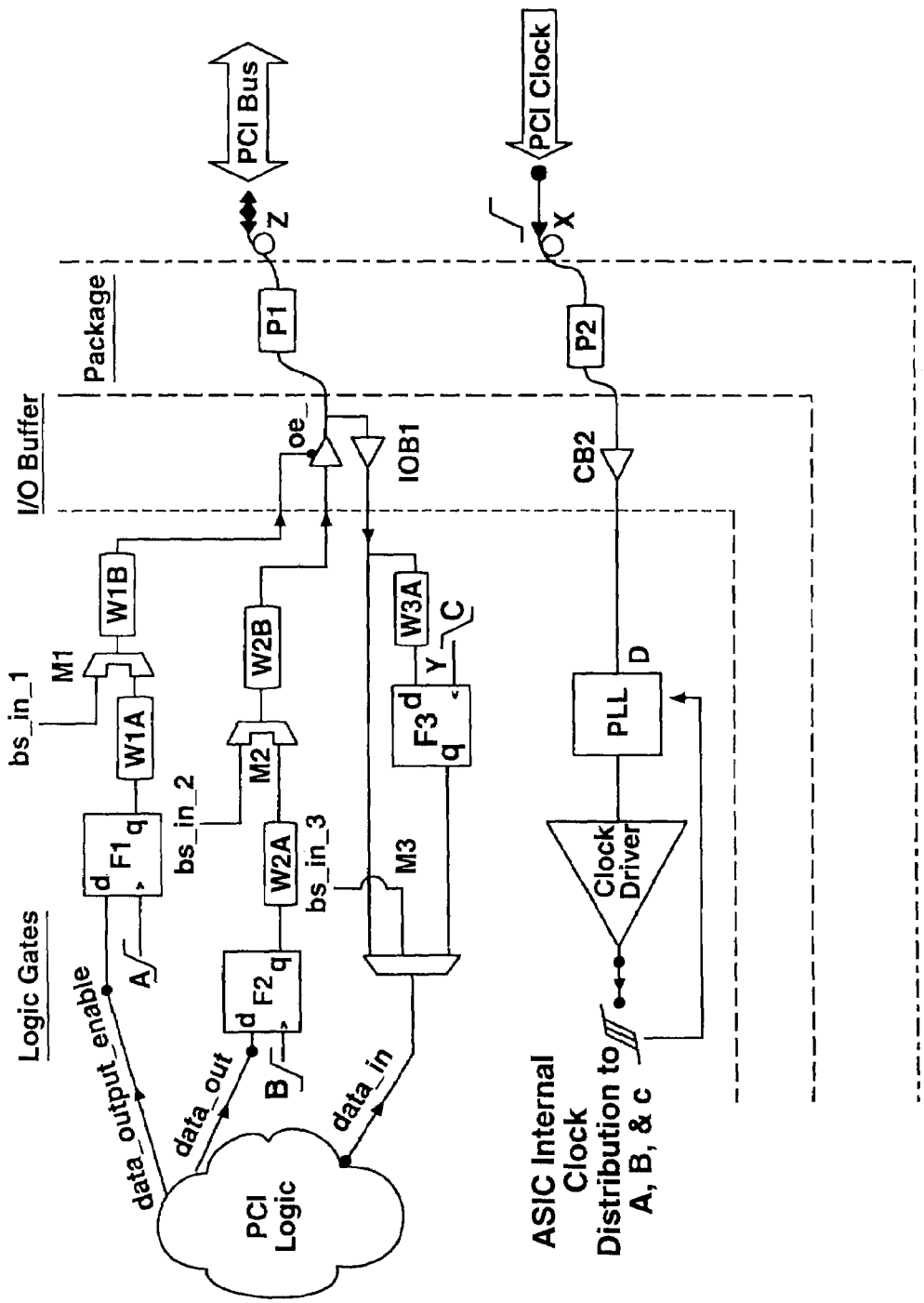
FIG. 64 is an electrical circuit schematic of a Device Internal Timing Examples according to the present invention.

FIG. 64 below shows a typical Registered PCI device implementation, including wire-delay elements. Table 25 and Table 26 show how the delay elements are combined to calculate $t_{val}$ $t_{su}$ and $t_h$ for this example device.

For this example the maximum value of $t_{val}$ is determined by the slower of two paths, the output enable path through flip-flop F1 and the data path through flip-flop F2. Table 25 shows both calculations.

TABLE 25

| $t_{val}$ Delay Paths | |
|---|---|
| Parameter | Description |
| X to A to Z | |
| P2 | Clock Input Package Delay |
| CB2 | Clock Input Buffer Delay |
| PLL | PLL Jitter/Phase Error/Clock Wire Delay |
| F1 | Flop-1 Clock to Q Delay |
| W1A | Wire Delay |
| M1 | Mux-1 Delay |
| W1B | Wire Delay |
| IOB1(oe_) | I/O Buffer Turn On Delay |
| P1 | Output Signal Package Delay |
| | Sum total is X → A → Z delay |
| X to B to Z | |
| P2 | Clock Input Package Delay |
| CB2 | Clock Input Buffer Delay |
| PLL | PLL Jitter/Phase Error/Clock Wire Delay |
| F2 | Flop-2 Clock to Q Delay |
| W2A | Wire Delay |
| M2 | Mux-2 Delay |
| W2B | Wire Delay |
| IOB1(output) | I/O Buffer Output Delay |
| P1 | Output Signal Package Delay |
| | Sum total is X → B → Z delay |

$t_{su}$ and $t_h$ are calculated with the following equations: $t_{val}$ $t_{su}$ and $t_h$ $$t_{su} = F3su + (Z \to Y)\max - (X \to Y)\min$$

$$t_h = F3hold - (Z \to Y)\min + (X \to Y)\max$$

where

F3su is the setup time for flip-flop F3

F3hold is the hold time for flip-flop F3

(Z→Y) is the delay from point Z to point Y in FIG. 64 as shown in Table 26; and (X→Y) is the delay from point X to point Y in FIG. 64 as shown in Table 26.

TABLE 26 t$_{su}$ and t$_h$ Delay Paths

| Parameter | Description |
|---|---|
| | Z to Y |
| P1 | Package Delay |
| IOB1(Input) | I/O Buffer Input Delay |
| W3A | Wire Delay |
| | Sum total is Z → Y delay |
| | X to Y |
| P2 | Package Delay |
| CB2 | Clock Input Butter Delay |
| PLL | PLL Jitter/Phase error |
| | Sum total is X → Y delay |

Notes to Table 26:
1. The clock spec that is used for simulation at point A, B & C is characterized by the ASIC technology specification and not by the Registered PCI specification.
2. The input flop F3 does not experience PLL skew (clock wire delay) as a result of clock insertion delay, since clock insertion delay only occurs between flops and the F3 flop is sourced directly from the I/O pad.

E. Clock Uncertainty

Figure 65:
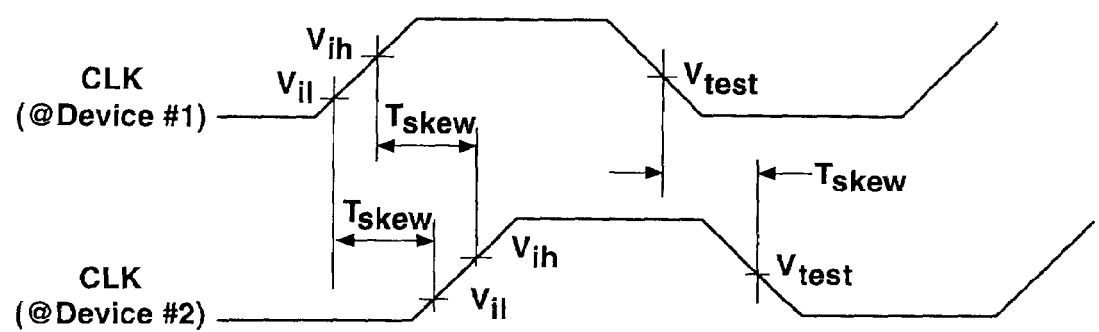
FIG. 65 is a schematic timing diagram of the Clock Uncertainty according to the present invention.

The maximum allowable clock uncertainty including jitter is shown in Table 27 and FIG. 65. This specification applies not only at a single threshold point, but at all points on the clock edge between V$_{il}$ and V$_{ih}$. For expansion boards, the maximum skew is measured between component pins, not between connectors.

TABLE 27

Clock Uncertainty Parameters

| Symbol | 133 MHz Registered PCI | 100 MHz Registered PCI | 66 MHz Conventional PCI (ref) | 33 MHz 3.3 V Signaling Conventional PCI (ref) | Units |
|---|---|---|---|---|---|
| V$_{test}$ | 0.4 V$_{cc}$ | 0.4 V$_{cc}$ | 0.4 V$_{cc}$ | 0.4 V$_{cc}$ | V |
| T$_{skew}$ | 0.5 (max) | 0.5 (max) | 1 (max) | 2 (max) | ns |

F. Reset

Registered PCI introduces one new timing case related to RST#. FIG. 66 shows the timing requirements for switching into Registered PCI mode.

G. Pull-ups

The only difference should be for ins used to identify the Registered PCI expansion board.

H. Noise Budget

Noise budgeting is the allocation of the minimum input noise immunity of a device. Device noise immunity is comprised of two components the DC noise and the transient noise. The following sections will describe Registered PCI budget allocation for device input noise immunity. For a more detail description on system design issues, refer to the Registered PCI Platform Design Guide.

1. DC Noise Budget

Figure 67:
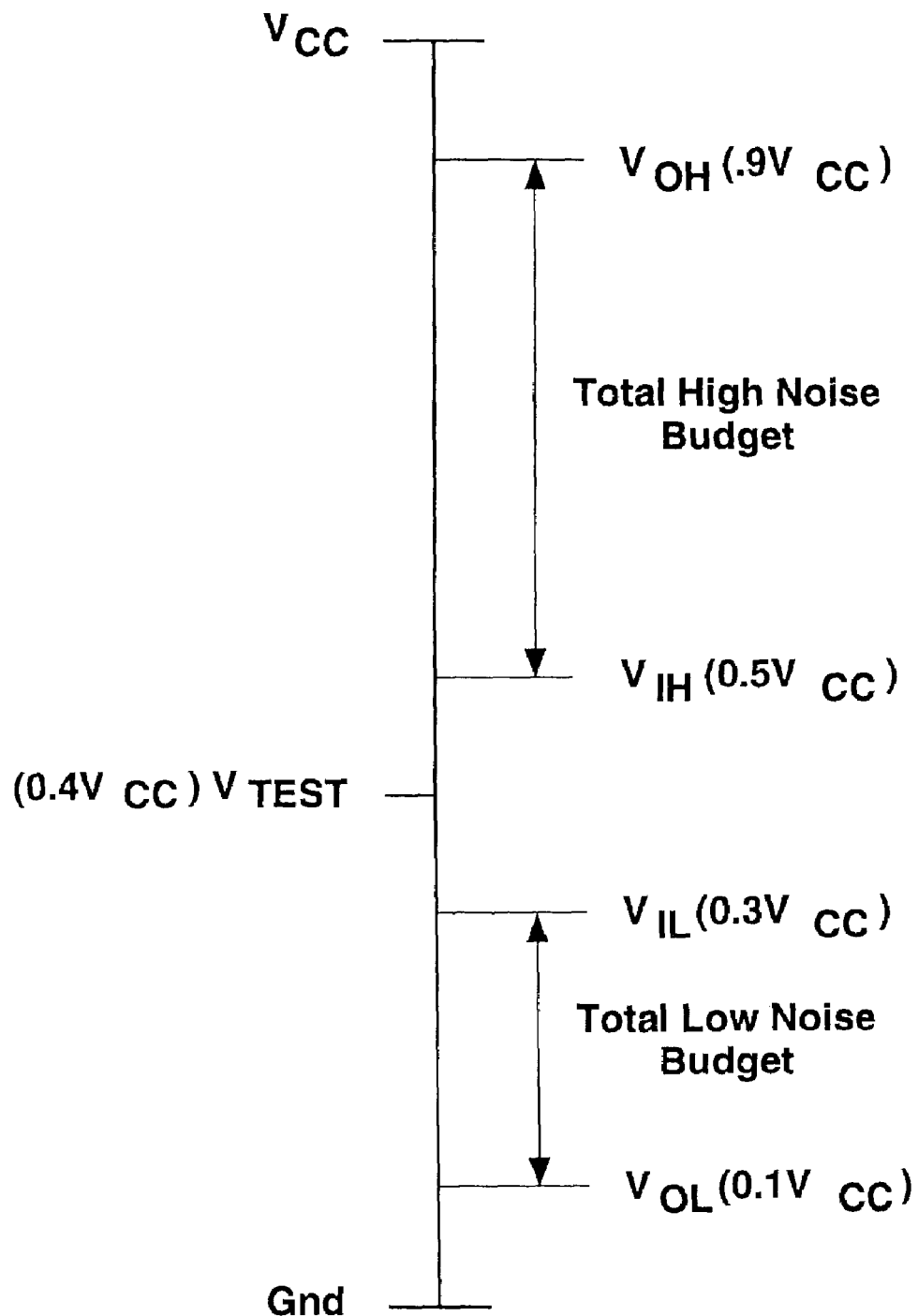
FIG. 67 is a diagram of a Registered PCI DC Noise Budget according to the present invention.

The total DC Noise allocated for Registered PCI is identical to convention PCI, with the low noise budget identified as the difference between V$_{OL}$ and V$_{IL}$, while the high noise budget identified as the difference between the V$_{OI}$ and V$_{IH}$ FIG. 67 graphically illustrates the total noise budget relative to V$_{CC}$, resulting in the high noise budget of 0.4 V$_{CC}$ and a low noise budget for 0.2 V$_{CC}$. The following shows the allocations for the Registered PCI device and the Registered PCI platform.

| | Low Noise | High Noise |
|---|---|---|
| Registered PCI Device | +0.04 V$_{cc}$ | −0.08 V$_{cc}$ |
| Board trace | +0.06 V$_{cc}$ | −0.12 V$_{cc}$ |
| Total System DC Noise Budget | +0.10 V$_{cc}$ | 0.20 V$_{cc}$ |

2. Transient Noise Budget

Registered PCI does not budget transient noise above the DC input noise immunity, however it is expected that system designer will layout system boards to reduce the impact of transient noise on devices.

I. System Timing

Registered PCI system timing is measured using the same techniques as 66 MHz conventional PCI. Platform designers are permitted to implement any system topology. Platform designers must guarantee that all devices designed to the specifications listed above will operate properly in any location in that topology. Platform designers are permitted to reduce the operating clock frequency to allow more time for signals to propagate and settle at all inputs with the specified setup time. For a more detail description on system design issues, refer to the Registered PCI Platform Design Guide.

1. Timing Budget

Table 28 shows the system-timing budget for the standard Registered PCI operating frequencies.

TABLE 28

Setup Time Budget

| Parameter (see Note 1) | 133 MHz Registered PCI | 100 MHz Registered PCI | 66 MHz Conventional PCI (ref) | 33 MHz Conventional PCI (ref) | Units |
|---|---|---|---|---|---|
| t$_{val}$ (max) | 4.0 | 4.0 | 6 | 11 | ns |
| T$_{prop}$ (max) | 1.5 | 4.0 | 5 | 10 | ns |
| T$_{skew}$ (max) | 0.5 | 0.5 | 1 | 2 | ns |
| t$_{su}$ (min) | 1.5 | 1.5 | 3 | 7 | ns |
| T$_{eye}$ | 7.5 | 10.0 | 15 | 30 | ns |

Note 1:
Designs that are sensitive to the timing budget, for T$_{val}$, T$_{prop}$ & T$_{su}$, needs to be aware that these values are not to be considered final, and could change prior to Revision 1.0.

TABLE 29

Hold Time Budget

| Parameter | Registered PCI | 66 MHz Conventional PCI (ref) | 33 MHz Conventional PCI (ref) | Units |
|---|---|---|---|---|
| t$_{val}$ (min) | 0 | 2 | 2 | ns |
| t$_{skew}$ (max) | 0.5 | 1 | 2 | ns |
| t$_h$ (min) | 0 | 0 | 0 | ns |

J. Connector Pin Assignments

K. Power

1. Power Requirements

Device and expansion board power supply voltages and tolerances and expansion board load limits are the same as for conventional PCI devices 2. Sequencing As for conventional PCI, Registered PCI devices have no power supply sequence requirements. The supply voltages are permitted to rise and fall in any order.

3. Decoupling

Same as conventional PCI.

L. Expansion Board Trace Length and Signal Loading

Same as conventional PCI with the following exception:
Minimum trace length on all signals that have a setup specification relative to CLK is 0.5 inches.

M. Transmission Line Characteristics

Platform characteristics are not specified. The platform designer is responsible for guaranteeing that expansion boards and component devices that conform to this specification function properly in any location. Characteristic impedance and propagation delay of signals on Registered PCI expansion cards is shown in Table 30.

TABLE 30

Platform Transmission Line Specifications

| Parameter | Registered PCI | Conventional PCI (ref) | Units |
|---|---|---|---|
| Board characteristic impedance | 50-70 | 60-100 | Ω |
| Signaling propagation delay | 150-190 | 150-190 | ps/inch |

VIII. Conventional PCI versus AGP 1.0 versus Registered PCI Protocol Rule Comparison Table 31 compares the protocol rules between conventional PCI, AGP (specification 1.0) and Registered PCI.

TABLE 31

Conventional PCI vs. AGP 1.0 vs. Registered PCI Protocol Rule Comparison

| Arbitration | Conventional PCI | AGP (Advanced Graphic Port) | Registered PCI |
|---|---|---|---|
| Arbiter Monitoring Bus Transactions | No | No | YES |

| Bus Clock Speed | Conventional PCI 32-bit bus, 64-bit bus | AGP (Advanced Graphic Port) | Registered PCI 32 bit bus, 64 bit bus (MB/sec) |
|---|---|---|---|
| 33 MHz | 133, 266 MB/sec | SDR-133, DDR-266 MB/sec | 133, 266 MB/sec |
| 66 MHz | 266, 533 MB/sec | SDR-266, DDR-533 MB/sec | 266, 533 MB/sec |
| 75 MHz | Not Supported | Not Supported | 300, 600 MB/sec |
| 100 MHz | Not Supported | Not Supported | 400, 800 MB/sec |
| 133 MHz | Not Supported | Supported as 66 MHz DDR | 533, 1066 MB/sec |

| Transaction Types | Conventional PCI | AGP (Advanced Graphic Port) | Registered PCI |
|---|---|---|---|
| Memory | Supported | Supported | Supported |
| I/O | Supported | Not Supported | Supported |
| Config | Supported | Not Supported | Supported |
| Interrupt Acknowledge | Supported | Not Supported | Supported |
| Special Cycle | Supported | Not Supported | Supported |
| Dual Address Cycle | Supported | Not Supported | Supported |
| Split Transactions | Not Supported | Supported | Supported |
| Priority Transactions | Not Supported | Supported | Not Supported |
| Non Coherent Transactions | Not Supported | Supported | Supported |
| No/Relax Ordering Rules | Not Supported | Supported | Supported |
| Address Re-mapping | Not Supported | Supported | Not Supported |
| Address & Data Bus | Multiplexed | De-Multiplexed | Multiplexed |
| # of new pins | N/A | 16 new pins | 1 new pin |
| Isochronous Transactions | Not Supported | Not Supported | Not Supported |

| Transaction Termination | Conventional PCI | AGP (Advanced Graphic Port) | Registered PCI |
|---|---|---|---|
| Initiator Termination | Supported | Supported | Supported |
| Initiator-Abort | Supported | Not Supported | Supported |
| Target Disconnect with data | Supported | Supported | Supported |
| Target Disconnect without data | Supported | Not Supported | Not Supported |
| Target Retry | Supported | Supported | Supported |
| Target-Abort | Supported | Not Supported | Supported |

| Burst Transaction | Conventional PCI | AGP (Advanced Graphic Port) | Registered PCI |
|---|---|---|---|
| # burst data clocks wait states | 2 or more data clocks Target and/or Initiator can inject wait states | 2 or more data clocks Target and/or Initiator can inject wait states only on Q'word boundaries | 2 or more data clocks Initiator can not inject wait states. Target can only insert |

TABLE 31-continued

Conventional PCI vs. AGP 1.0 vs. Registered PCI Protocol Rule Comparison

|  |  |  | initial wait states before data transfer starts |
|---|---|---|---|
| Cache Line Size | Programmable | Not used (Replaced with Q'word Boundaries) | Not used (Replaced with ADB) |
| Latency Timer | Programmable | Not Supported | Programmable |
| Memory Read | BE are valid | BE are reserved | BE only for byte-enable transactions |
| Memory Read Line | BE are valid (ignored by Target) | Not Supported | Replaced with byte-count transactions. |
| Memory Read Multiple | Yes | Not Supported | Not Supported |
| Memory Write | BE are valid | BE are valid | BE only for byte-enable transactions |
| Memory Write and Invalidate | BE are valid (ignored by Target) | Not Supported | Replaced with byte-count transactions |
| Burst Length | Conventional PCI | AGP (Advanced Graphic Port) | Registered PCI |
| Minimum data clocks | 2 Data Clocks | 2 Data Clocks | 32 clocks for 32 bit bus or Byte Count. 16 clocks for 64 bit bus or Byte Count. |
| 32 bit Bus | 8 Bytes | 8 Bytes | 8 Bytes |
| 32 bit Minimum Burst Length | 8 Bytes | 8 Bytes | 128 Bytes or Master Termination at Byte Count |
| 64 bit Bus | 16 Bytes | Not Supported | 16 Bytes |
| 64 bit Minimum Burst Length | 16 Bytes | Not Supported | 128 Bytes or Master Termination at Byte Count |
| Decode Speeds | Conventional PCI | AGP (Advanced Graphic Port) | Registered PCI |
| 1 clock after address phase | Decode Speed FAST | Supported | Not Supported |
| 2 clock after address phase | Decode Speed MED | Supported | Decode Speed A |
| 3 clock after address phase | Decode Speed SLOW | Not Supported | Decode Speed B |
| 4 clock after address phase | Decode Speed Subtractive | Not Supported | Decode Speed C |
| 6 clock after address phase | Not Supported | Not Supported | Decode Speed Subtractive |
| Config Access | Conventional PCI | AGP (Advanced Graphic Port) | Registered PCI |
| Address Stepping | Optional, System Dependent | Not Supported | Required, 4 clocks or system specific |
| Transaction Phase | Conventional PCI | AGP (Advanced Graphic Port) | Registered PCI |
| Address & Command Phase | Supported | Supported | Supported |
| Response Phase | Decode Speed | Not Supported | Decode Speed |
| Attribute & Ext. Command Phase | Not Available | Supported | Supported |
| Data Phase | Supported | Supported | Supported |
| Termination Phase | Initiator & Target | Initiator & Target | Initiator & Target |
| Turn-a-round | Required | Required | Required |
| Attribute Field | Conventional PCI | AGP (Advanced Graphic Port) | Registered PCI |
| Byte Count | Not Supported | Supported | Supported |
| Write Combining | Supported | Supported | Supported if all bytes written |
| Relax Ordering | Not Supported | Supported | Supported |
| Initiator # | Not Supported | N/A | Supported |
| Initiator Bus # | Not Supported | N/A | Supported |
| Initial Sequence Request | Not Supported | Not Supported | Supported |
| Transaction Sequence # | Not Supported | Supported | Supported |
| Bus Width | Conentional PCI | AGP (Advanced Graphic Port) | Registered PCI |
| Address | 32 or 64-bit | 32-bit | 64-bit (32-bit DAC architected but not supported) |

TABLE 31-continued

Conventional PCI vs. AGP 1.0 vs. Registered PCI Protocol Rule Comparison

| Data | 32 or 64-bit | 32-bit | 64-bit (32-bit architected but not supported) |
|---|---|---|---|

IX. Relaxed Ordering Rules

This section describes the various usage models for the transaction ordering rules with practical examples of each. The Relaxed Ordering attribute bit is shown to be usable in all but the most uncommon read transaction cases. Its application to write transactions is also presented.

The discussion concludes that the initiator is permitted to set the Relaxed Ordering attribute bit in the following cases summarized in Section IX. (D):

1. An initiator is permitted to set the Relaxed Ordering attribute bit when reading a data set (the Data), if the data set is protected by a control structure (the Trigger) that is accessed without setting the attribute bit.
2. A device other than the CPU is also permitted to set the Relaxed Ordering attribute bit when reading any location (data set or control structure), except in a rare case. This case is when the CPU prepares a new data set for the device and writes it to a target near the device in the bus hierarchy, and protects the data by writing to a control structure in another target near the CPU (e.g. main memory). The device finds the new work by reading the control structure (e.g. polling main memory). See Section IX. (B)(4), Data Near Reader, Trigger Near Writer.
3. Writing a data set can always set the Relaxed Ordering bit, if the data set is protected by a control structure (the Trigger) that is accessed without setting the attribute bit. Writing the control structure (Trigger) can never set the attribute bit.

A. Background

"Write posting" is the process whereby an intermediate device in the path to the final target accepts a write transaction on behalf of the final target and forwards the transaction later. This allows the initiator of the write transaction to proceed without waiting for the data to reach its final destination. Systems that post write transactions must also provide rules for the order in which transactions must be executed, so devices maintain a consistent view of data throughout the system. If one master writes to two locations in a particular order, these rules guarantee that no other master can observe the locations updated in the opposite order.

Conventional PCI requires memory-write transactions to be posted, and provides a strict set of ordering rules that all devices must follow. These hardware rules guarantee a consistent view of data without software intervention, no matter how many levels of posting exist in the system, and no matter where the two masters and the two data are located with respect to each other and the posting agents. The rules also prevent system deadlocks that can sometimes occur when the ordering rules require previously posted write data to be flushed before other transactions can proceed.

An example of a usage model illustrates the importance of write ordering. One common implementation for initiating an operation on a device is for the CPU to prepare in main memory a description of the desired operation (a descriptor), and then to write the address of the descriptor to a doorbell location in the device. The CPU-write to the doorbell register causes the device to read the descriptor from main memory and to perform the operation. The value that the device reads from the descriptor location must be the value written by the CPU prior to the write to the doorbell register. Since the CPU writes the descriptor value before it writes to the doorbell, the device must never be allowed to read an old value from the descriptor location after the new value has been written to the doorbell location.

Although the conventional PCI rules are completely general, they lead to some unfortunate side effects. In most cases the PCI ordering rules require memory-writes that were posted before other bus operations (Delayed Requests and Delayed Completions) moving in the same direction across a bridge to complete before the other operations. However, in many cases the posted memory-write (PMW) is unrelated to the other operation. That is, the PMW addresses a device that is working in a completely different area of memory and working on a completely different software procedure. If the PMW is not related to the other bus operation, blocking that operation until the PMW completes unnecessarily reduces system performance.

To illustrate the problem of unnecessary blocking of unrelated transactions, consider the case of a system containing a CPU, memory, a host bridge, and two PCI peripherals. The PCI peripherals are a graphics controller and a USB host adapter. The USB host adapter is instructed by its software device driver to begin fetching a stream of audio data from main memory. While the USB host adapter is reading this stream of data from main memory, the software driver for the graphics device determines that it must update a large area of the video memory behind the graphics device. To update the video memory the CPU executes a sequence of memory-write transactions addressing the video memory on the graphics device. These memory-write transactions can be posted in the host bridge to permit the CPU to proceed with other instructions. (If there were an intervening PCI-to-PCI bridge, the memory-write transactions could be posted there as well, as soon as they were executed by the host bridge.) These video memory-write transactions are totally unrelated to the audio data the USB host adapter is attempting to read from main memory. However, the PCI ordering rules require the host bridge (and any intervening PCI-to-PCI bridges) to block the delivery of all data read from main memory until the PMW transactions moving in the same direction are completed. The problem is particularly acute if the graphics device delays processing the memory-writes, e.g. during screen updates. Limiting the time a device can refuse to accept a memory-write limits the impact of the problem, but does not remove it.

A complete solution to the problem of unnecessary blocking of unrelated transactions requires knowledge of the kind of procedure that is occurring. Software device drivers have intimate knowledge of the devices they control and the sequence of bus operations being used to control them. In some cases the device driver can inform the device that some of the ordering restrictions are unnecessary. The device can then mark those transactions so ordering agents can avoid the unnecessary restrictions.

The following discussion presents a comprehensive treatment of system topologies and identifies those cases in which the software driver and the device can use the Relaxed Ordering bit in the Registered PCI attribute field to alleviate the most common occurrences of unnecessary blocking. The ordering rules are independent of the completion mechanism used by the target, so this discussion applies equally to Delayed Transactions and Split Transactions. In the following discussion the term Read Request includes both Delayed Read Request and Split Read Request, and Read Completion includes both Delayed Read Completion and Split Read Completion.

B. System Topologies

The system components related to transaction ordering can be reduced to the following elements: one initiator that writes two data locations, another initiator that reads the two locations, and an intervening device that posts the write transactions.

Figure 68:
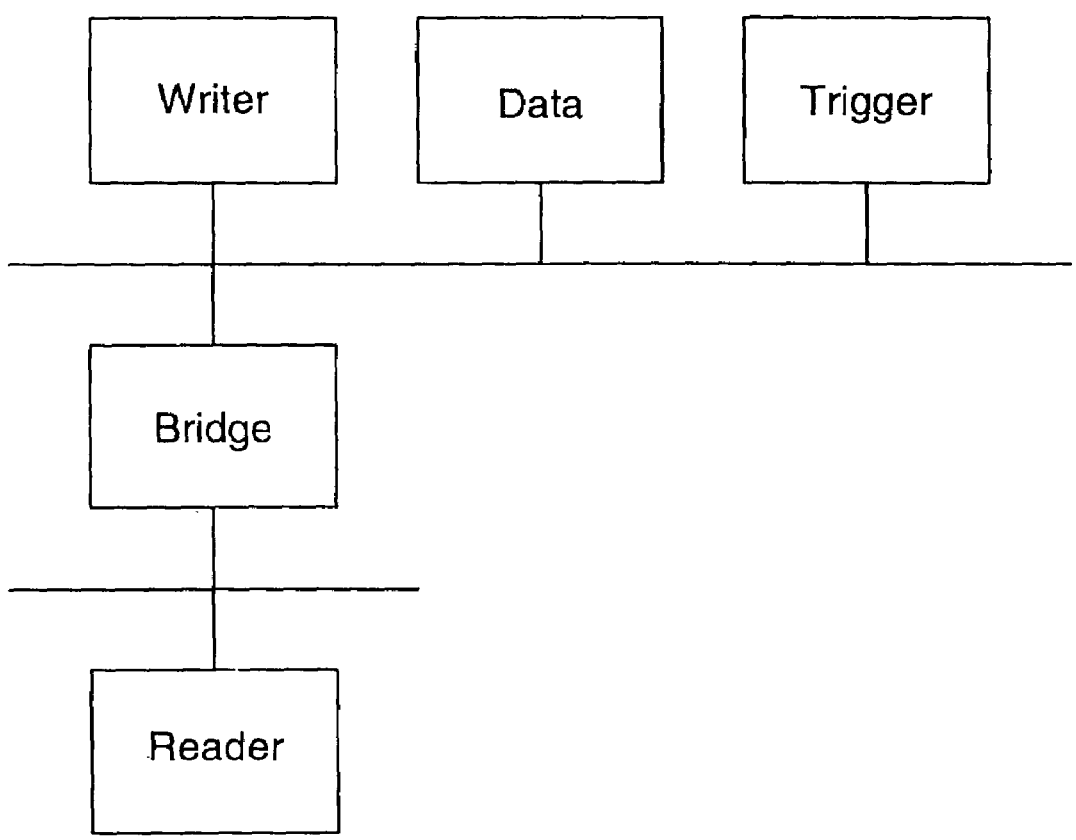
FIG. 68 is a block diagram of a Simple Write Ordering System according to the present invention.

FIG. 68 shows a simple example of these components. The two initiators and the two data locations are shown strictly in their roles as they relate to the write ordering issue. Real devices generally change roles from time to time as the software device driver and the device progress through an operation. The initiator that is writing the two locations is labeled the Writer. The initiator that is reading the locations is labeled the Reader. The first location to be written is labeled the Data. (This would correspond to the descriptor in the example given earlier.) The second location to be written is labeled the Trigger, because the write to this location triggers the Reader to begin the operation that includes reading the Data. The device that is capable of posting write transactions is the Bridge.

The PCI Local Bus Specification, Appendix E defines two initiators called the Producer and Consumer that roughly correspond to the Writer and the Reader, and two targets called the Data and the Flag that roughly correspond to the Data and the Trigger. The names used in this discussion reflect the narrower focus on the fundamental ordering issue, that is, a single sequence of writing the Data and the Trigger.

Figure 69:
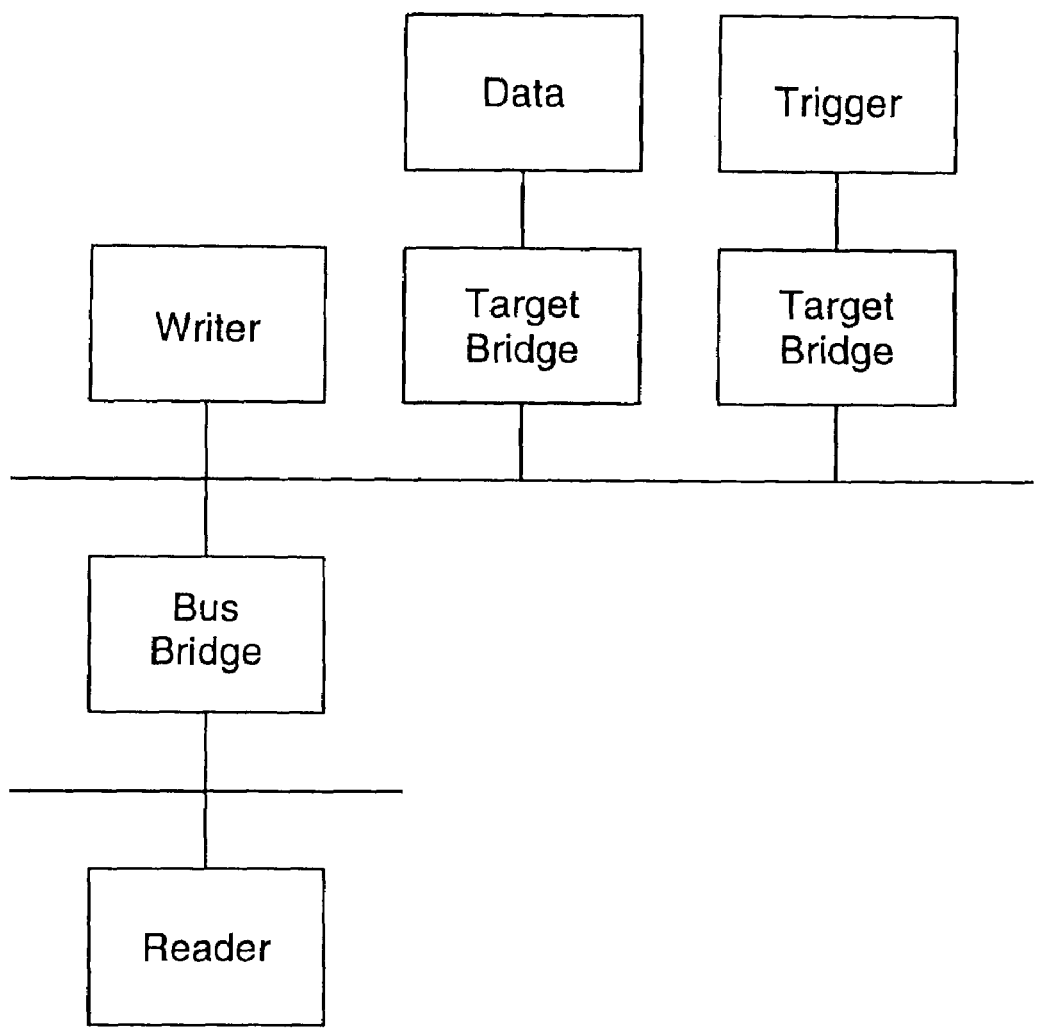
FIG. 69 is a block diagram of a Data and Trigger Near Writer example according to the present invention.

Devices that post write transactions can occur in other locations in the system as well. FIG. 69 illustrates the two classes of locations that pertain to this discussion. The first class is labeled Target Bridge. This label applies to any device that posts write transactions and is in a path to the target that is common to both initiators. The transactions from both the Writer and the Reader must cross the Target Bridge in the same direction. For example, if the device containing the Data includes a mechanism for posting writes to the Data, such a posting mechanism would be called a Target Bridge in this discussion. If the device containing the data were located behind a separate PCI-to-PCI bridge, that bridge would also be called a Target Bridge in this discussion. If the Data and Trigger are located in main memory and the Writer and Reader are on the PCI bus, the host bridge would be considered a Target Bridge in this discussion.

The second class of bridge locations is labeled Bus Bridge. This label applies to any device that posts write transactions and is located in the path between the Writer and the Reader. Host bridges and PCI-to-PCI bridges can both meet this definition, depending upon the location of the Writer and the Reader.

A system can contain multiple instances of both classes of bridges arranged such that transactions must pass sequentially through them. For purposes of transaction ordering such systems are identical to systems containing a single bridge of the same class. This discussion will describe only the case of a single bridge in each location with no loss of generality. Furthermore, the Writer could be implemented to include write posting logic. Since this discussion focuses on the write sequence as it appears leaving the Writer, and since the Writer is not a target, the discussion will show the Writer as a simple initiator with no loss of generality. The Reader in this discussion is not a target, so nothing can be posted in the path to the Reader.

Figure 70:
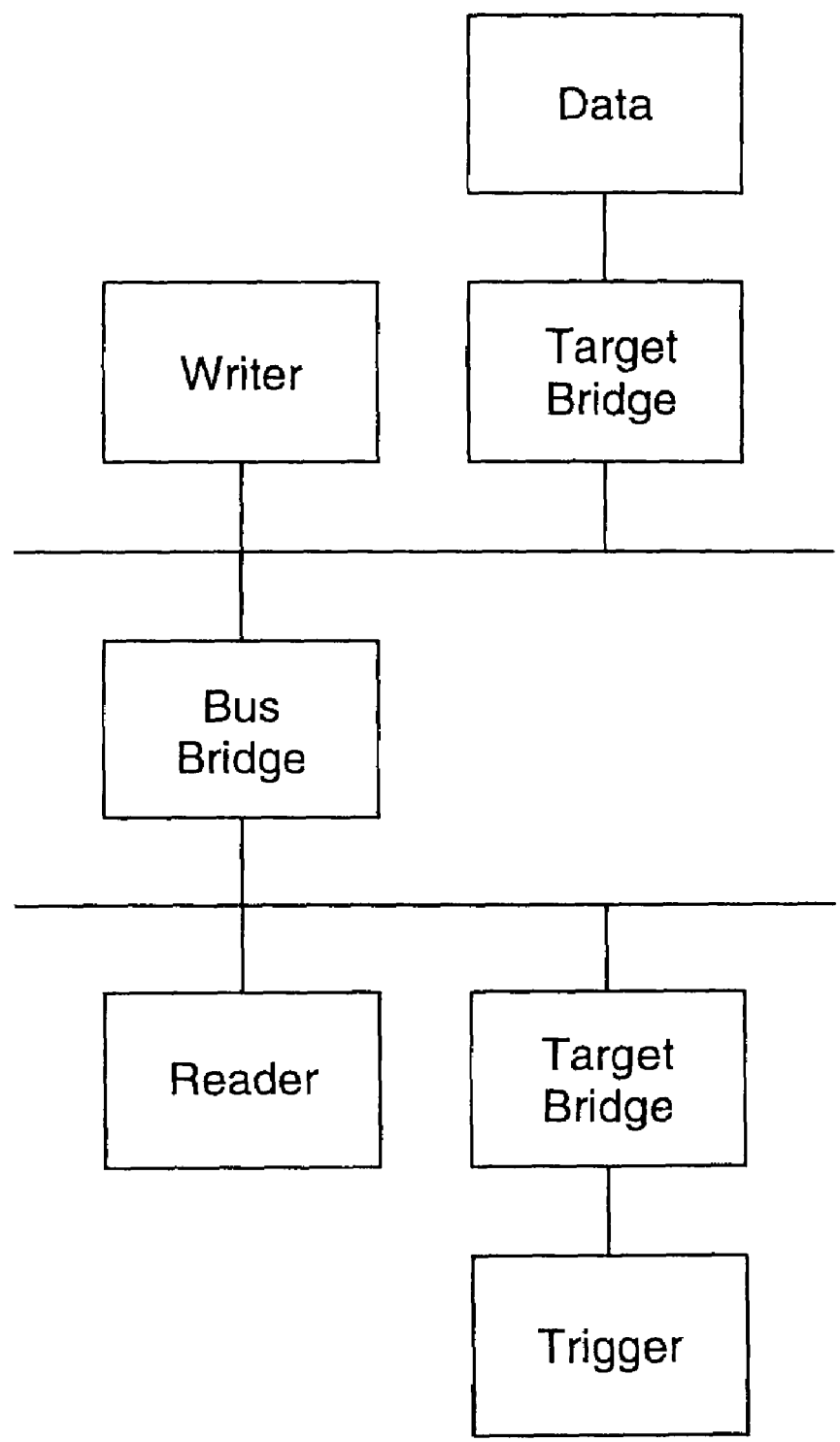
FIG. 70 is a block diagram of a Data Near Writer, Trigger Near Reader example according to the present invention.
Figure 71:
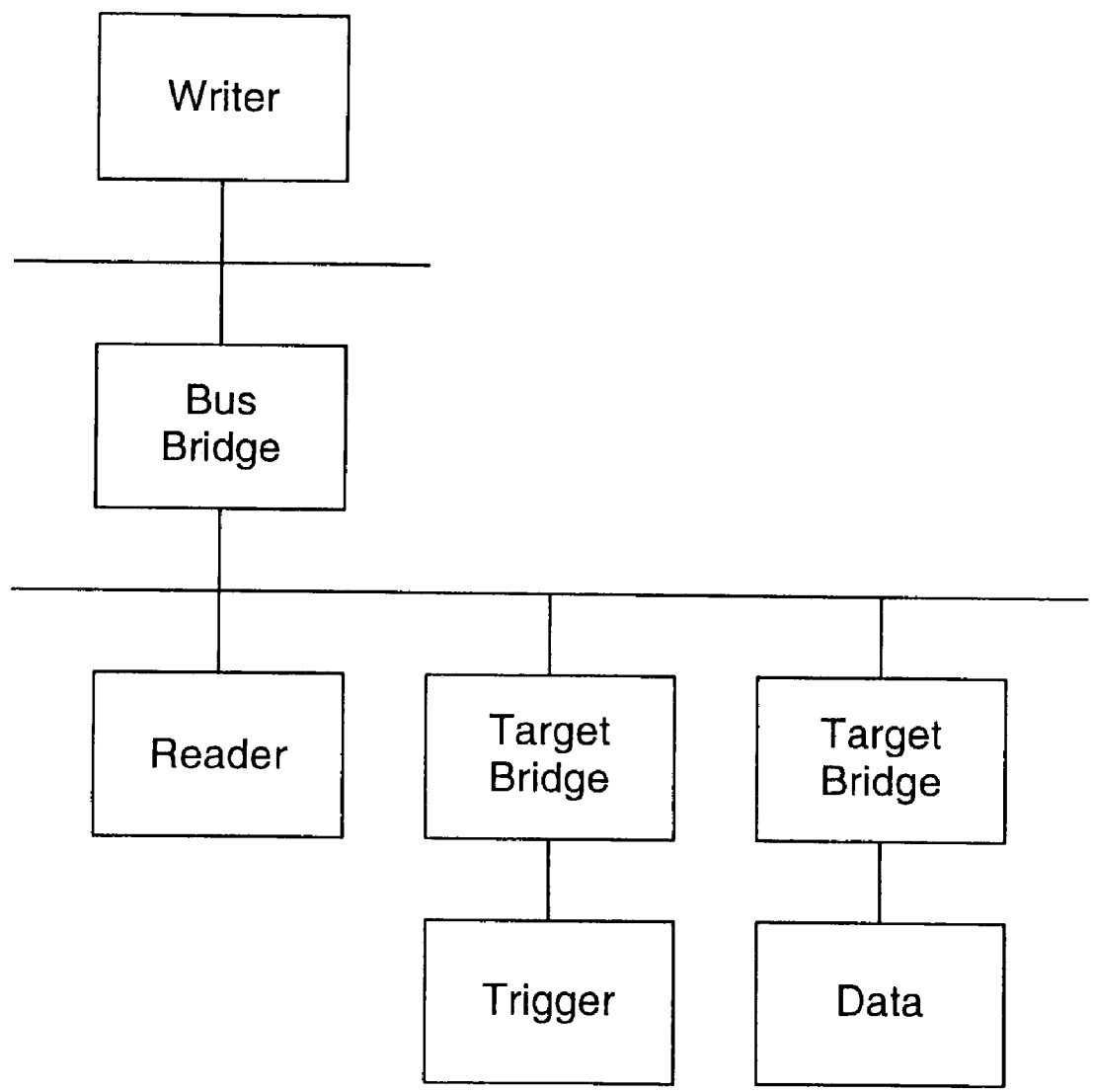
FIG. 71 is a block diagram of a Data and Trigger Near Reader according to the present invention.
Figure 72:
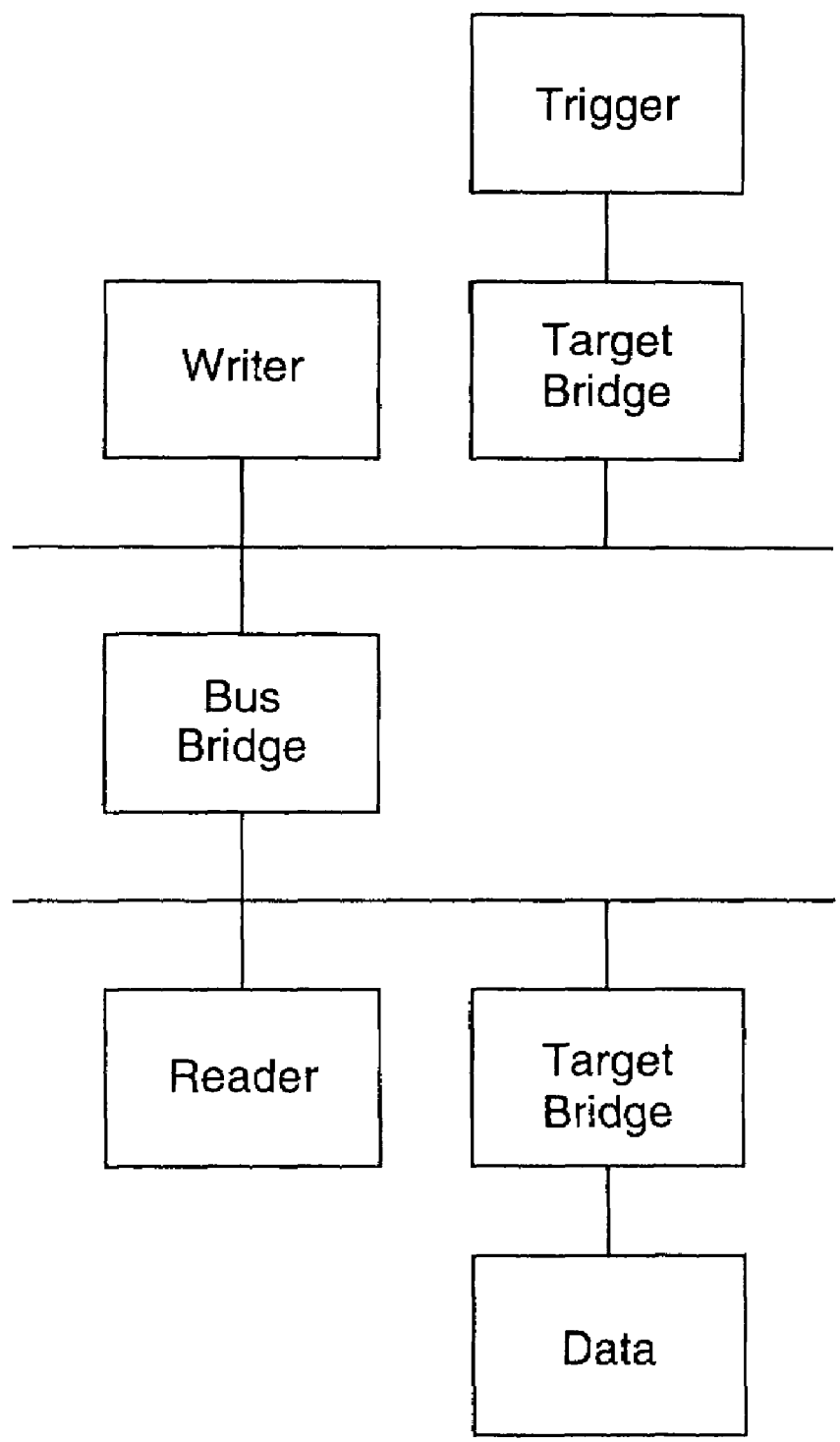
FIG. 72 is a block diagram of a Data Near Reader, Trigger Near Writer according to the present invention.

FIG. 69 shows the Data and the Trigger located on the same side of the Bus Bridge as the Writer. FIGS. 70-72 show the three other arrangements of the two target locations. Ordering requirements for each of these cases is presented separately.

1. Case 1: Data and Trigger Near Writer

In FIG. 69, the transactions from the Writer that update the Data and Trigger do not cross the Bus Bridge, but the transactions from the Reader to discover the new values of the Data and Trigger do.

The path from the Writer to the Data and Trigger do not share a common bridge in this case, so there are no ordering requirement for one write transaction relative to another.

The order of the read of the Trigger relative to the write of the Trigger is irrelevant. Since the synchronizing event is the write of the new value to the Trigger, the Reader is unaffected by reading an old value and continues reading until it finds a new one. When the Reader completes the read that discovers the new value of the Trigger, the Reader begins the read of the Data.

The request to read the Data must push ahead of it the prior write to the Data, so the Reader is guaranteed to observe the new value of the Data. This case illustrates the need for the PCI ordering rule that Read Requests cannot pass posted memory-writes moving in the same direction. The completion of the read of the Data moves in the opposite direction through the Target Bridge from that of the write. Therefore, this case has no requirements for ordering of Read Completions with respect to posted writes.

Since the writes to neither the Data nor the Trigger are posted in the Bus Bridge, the Bus Bridge has no ordering requirement in this case. If other write transactions were posted in the Bus Bridge, they are of no concern to the Reader. The completion of the read of the Data could pass these posted transactions without consequence.

In summary, the system in FIG. 69 has no ordering requirements for one write transaction relative to another requires Read Requests of the Data not to pass posted writes, but permits all Read Completions to pass posted writes in either bridge class. Devices following this usage model are permitted to set the Relaxed Ordering attribute bit when writing the Trigger or the Data, and when reading the Trigger or the Data. (The bit allows Read Completions (but not Read Requests) to pass posted memory-writes.)

A typical example of this topology is a system in which the CPU (the Writer) prepares a descriptor in main memory (the Data), and then adds the descriptor to a list of work for a device (the Reader) by writing a new value to a queue pointer (the Trigger). The queue pointer is also located in main memory. The memory controller posts write transactions from the CPU (Target Bridge). The device discovers that it has new work by reading the queue pointer and then fetches the new descriptor. Reading the descriptor must return the new value, if reading the queue pointer returns the new value. Any other memory-writes that the CPU might execute to other PCI devices are unrelated to this device and its reading of the queue pointer and the descriptor, so the order of such writes in either the host bridge or intervening PCI-to-PCI bridges is irrelevant.

2. Case 2: Data Near Writer, Trigger Near Reader

FIG. 70 illustrates a different arrangement of Data and Trigger. In this case the Data is located on the same side of the Bus Bridge as the Writer, but the Trigger is on the same side of the Bus Bridge as the Reader. The write to the Data can be posted in the Target Bridge, and the write to the Trigger can be posted both in the Bus Bridge and the Target Bridge.

As in FIG. 69 the path from the Writer to the Data and Trigger do not share a common bridge in this case, so there are no ordering requirement for one write transaction relative to another.

Since the ordering issues don't begin until the Reader has discovered the new value of the Trigger, the Reader ordering requirements for this case are identical to those of FIG. 69 as well. Even though the write to the Trigger can be posted differently than FIG. 69, the write to the Trigger must complete before the Reader can discover its new value. Reading the Data proceeds exactly as in FIG. 69.

In summary, the ordering requirements for the system in FIG. 70 are identical to those of FIG. 69, namely there are no ordering requirements for one write transaction relative to another, Read Requests of the Data cannot pass posted writes, but all Read Completions are permitted to pass posted writes. Devices following this usage model are permitted to set the Relaxed Ordering attribute bit when writing the Trigger or the Data, and when reading the Trigger or the Data.

A typical example of this topology is a system in which the CPU (the Writer) prepares a descriptor in main memory (the Data), and then adds the descriptor to at list of work for a device (the Reader) by writing to a doorbell register (the Trigger) located inside the device. The write to the doorbell register could include a pointer to the new descriptor, or the descriptor could be stored in a predefined location known to the device. The write to the doorbell register causes the device to fetch the new descriptor. Reading the descriptor must return the new value, if the read is a result of the write to the doorbell register. Any other writes that the CPU might execute to other PCI devices are unrelated to this device and its reading of the descriptor, so the order of such writes in either the host bridge or intervening PCI-to-PCI bridges is irrelevant.

3. Case 3: Data and Trigger Near Reader

FIG. 71 illustrates another arrangement of Data and Trigger. In this case both the Data to and the Trigger are on the same side of the Bus Bridge as the Reader. The writes to both locations can be posted both in the Bus Bridge and the Target Bridges.

As in the two previous cases the order of the read of the Trigger relative to the write of the Trigger is irrelevant. Since the synchronizing event is the write of the new value to the Trigger, the Reader is unaffected by reading an old value and continues reading until it finds a new one. When the Reader completes the read that discovers the new value of the Trigger, it begins the read of the Data.

Since the read of the data will remain on the Reader's side of the Bus Bridge, the write of the Data must already have completed on this bus before the read begins. This case illustrates the need for two PCI ordering rules that prevent writes moving in the same direction from passing each other. First, a posted memory-write cannot pass another posted memory-write moving in the same direction, in case both the Data and the Trigger use memory address space. Second, a Delayed Write Request cannot pass a posted memory-write moving in the same direction, in case the Data uses a memory address and the Trigger uses an I/O address. (PMW can pass DWR because Writer of DWR won't advance to next item until DWR completes, no requirement to stay in order) The write of the Data and the Trigger must complete on the destination bus in the same order they completed on the source bus. It should be noted that if there were other initiators in the system writing to other locations, the order of these writes with respect to the writes to the Data and Trigger is irrelevant.

As in FIG. 69, the request to read the Data must also push ahead of it through the Target Bridge the prior write to the Data.

Since the read of neither the Data nor the Trigger pass through the Bus Bridge, the Bus Bridge has no additional ordering requirement for reads in this case. If other write transactions were posted in the Bus Bridge, they are of no concern to the Reader.

In summary, the system in FIG. 71 requires posted writes of the Trigger not to pass other posted writes from the same initiator, requires Write Requests of the Trigger not to pass posted writes from the same initiator, and requires Read Requests of the Data not to pass posted writes. Whether any Read Completions pass posted writes is of no consequence. Devices following this usage model are permitted to set the Relaxed Ordering attribute bit when writing the Data and when reading the Trigger or the Data.

Some I$_2$O systems illustrate this type of system topology. In such a system the CPU (the Writer) prepares a descriptor in I$_2$O local memory (the Data), and then adds the descriptor to a list of work for a device (the Reader) by writing to an I$_2$O posting queue (the Trigger) located inside the I$_2$O device. The write to the posting queue causes the local processor to fetch the new descriptor. The write transaction to the posting queue must push ahead of it the write to the descriptor, so the descriptor is accurate when the write to the posting queue completes. The descriptor must contain the new value, when the device attempts to read it as a result of the write to the posting queue.

In the above example CPU writes from other device drivers addressing their devices could also be posted in the host bridge and intervening PCI-to-PCI bridges. The order of these writes with respect to the writes to the descriptor and posting queue is irrelevant. If the bridge could determine which writes were associated with a single device driver, writes from one device driver could be allowed to pass writes from another. This could benefit system throughput in cases where one target temporarily refuses to accept posted writes (e.g. video screen refresh). Unfortunately for transactions originating from the CPU it is generally not possible to determine which "initiator" (in this case a device driver) initiated the write transactions. Writes from multiple device drivers can all originate from the same CPU. Furthermore, it is not possible to assume that writes from different CPUs in a multi-CPU system are unrelated, since it is generally possible for a routine to be preempted and rescheduled for a different CPU.

Reordering writes moving in the other direction has a similar limited usefulness, but for a different reason. Writes moving upstream often have the same destination, host memory. In many systems if one write transaction is blocked (e.g. because the posted write buffers are full), all write transactions will be blocked. Allowing a write from one initiator to pass a write from another accomplishes little, if they have the same target. Allowing one write to pass another could be effective if they address different targets, for ex-ample, in systems with multiple host memory controllers. As peer-to-peer operations become more common, this capability could become more important.

4. Case 4: Data Near Reader, Trigger Near Writer

FIG. 72 shows the fourth and final alternative for the locations of the Data and the Trigger with respect to the Writer, Reader, and Bus Bridge. In this case the Data is on the same side of the Bus Bridge as the Reader, and the Trigger is on the same side as the Writer.

As in FIG. 69 and FIG. 70, the path from the Writer to the Data and Trigger do not share a common bridge in this case, so there are no ordering requirement for one write transaction relative to another.

As in the three previous cases the order of the read of the Trigger relative to the write of the Trigger is irrelevant. Since the synchronizing event is the write of the new value to the Trigger, the Reader is unaffected by reading an old value and continues reading until it finds a new one. However, in this case when the Reader discovers the new value of the Trigger and attempts to read the Data, the transaction writing the new value of the Data could still be posted in the Bus Bridge. To guarantee that the write to the Data is complete before the Reader attempts to read it, the Bus Bridge must guarantee that the read of the Trigger does not complete until the posted write moving in the same direction has completed. This is the only case that requires the PCI ordering rule that Read Completions not pass posted memory-writes moving in the same direction. As in all the previous cases, the request to read the Data must also push ahead of it through the Target Bridge the prior write to the Data.

In summary, the system in FIG. 72 has no ordering requirements for one write transaction relative to another, and requires Read Requests of the Data and Read Completions of the Trigger not to pass posted writes. A device following this usage model is permitted to set the a Relaxed Ordering attribute bit when writing the Trigger or the Data, and when reading the Data but not the Trigger. It is believed that such Readers in this location other than the CPU are rare.

A possible implementation of this topology would be a system in which a device (the Writer) writes a descriptor (the Data) to main memory, and uses local registers for recording pointers (the Trigger) to the descriptors or completion status. The device could also generate an interrupt to the CPU. When the CPU (the Reader) reads the pointer to the descriptor from the status register, this CPU Read Completion must pull ahead of it the write of the descriptor so the CPU will never see an old value of the descriptor.

It is also possible to implement this topology in a system in which the CPU is the Writer and the device is the Reader. In that case the device includes local storage into which the CPU (the Writer) writes descriptors (the Data). To add the descriptor to the list of work for the device the CPU writes to a pointer location in main memory. The device discovers the new work by periodically polling the list in main memory. There is some question as to whether such a system topology is practical because polling of lists in memory can have a negative impact on system performance (but see the example in the next section). However, such a topology is legal, and is accommodated by the ordering rules.

While the Case 4 configuration for a CPU Writer and device Reader might appear non-optimal, there are real-life examples that demonstrate why Case 4 needs to be supported, as well has how some devices actually employ multiple distinct ordering cases concurrently, some of which are not obvious.

Figure 73:
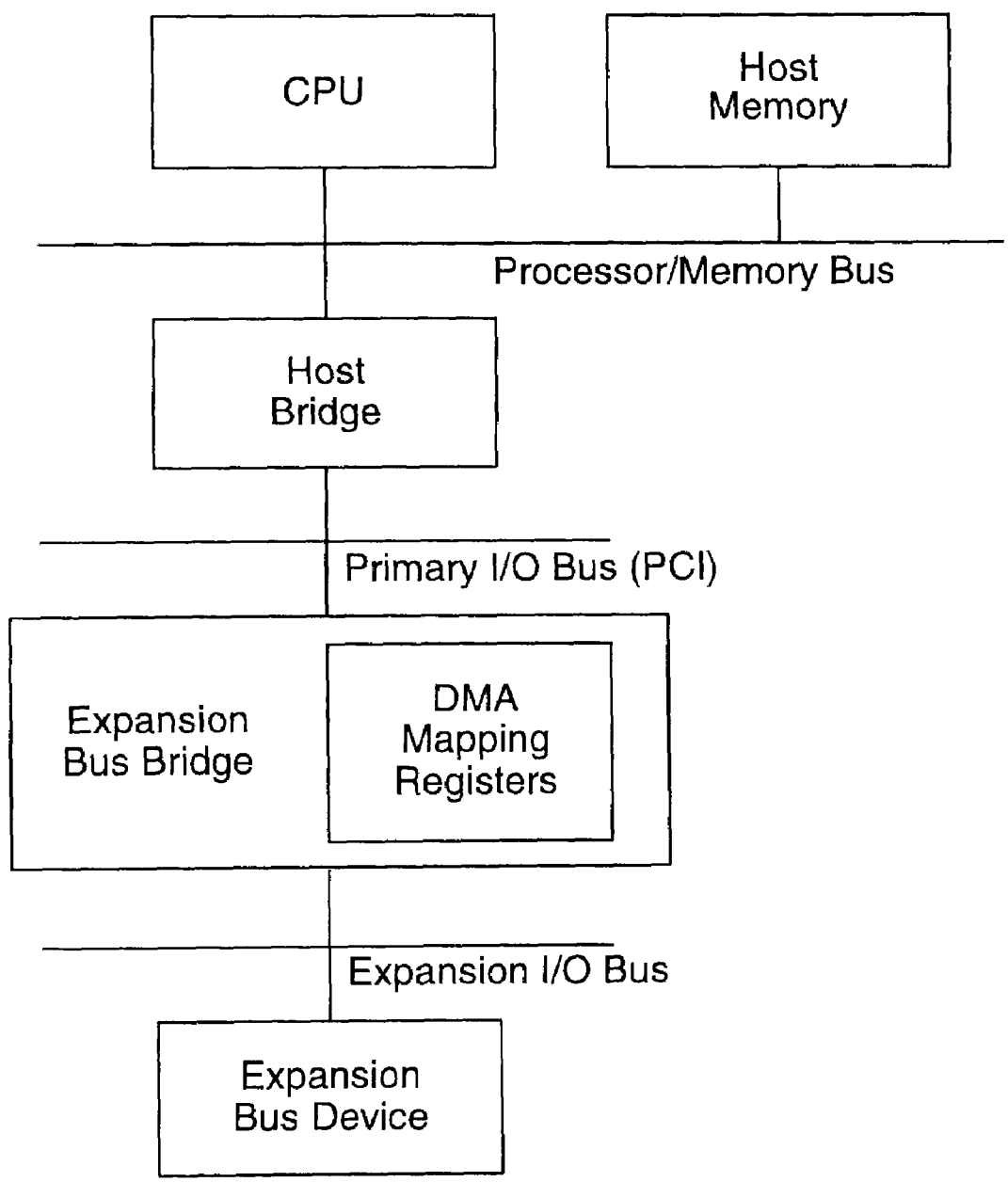
FIG. 73 is a block diagram of a computer system of the fourth application example according to the present invention.

Consider the system illustrated in FIG. 73. The software device driver of a expansion-bus device places device requests (Data) in a queue in host memory and informs the device of their presence via programmed I/O (PIO) writes (Trigger) to the device. This is the usage model presented by Case 2, in which the Data is near the Writer and the Trigger is near the Reader.

However, before the expansion-bus device can read or write payload to or from host memory, OS services must set up appropriate DMA mapping registers in the expansion-bus bridge. This is done with PIO writes, which can be posted inside the host bridge. The OS services write the new values to the expansion-bus bridge mapping registers, and then the driver posts the write request to the host memory queue. Since the mapping registers must be updated before the device finds the new request, the mapping registers and the request have their own Data-Trigger relationship. The mapping registers are the Data, and the request in host memory is the Trigger. Since the mapping registers are near the device, this usage model follows Case 4.

In the Case 4 model problems can occur, if the device's read from memory (the Trigger) is allowed to pass PIO writes to the mapping registers (the Data) posted in the host bridge (Bus Bridge in FIG. 73). Since polling main memory is inefficient, normally the device would not discover a new request in its request queue until the CPU has updated the mapping registers and executed the PIO write to the device. However, if the device prefetches a new request while working on an older one, the device can discover a new request before its associated trigger arrives, and in fact before the associated PIO writes to the mapping registers in the expansion-bus bridge have arrived. If the device acts on the new request before the expansion-bus bridge mapping registers are set properly, the I/O will fail. The failure is caused by the device (the Reader) observing the new request (the Trigger) and invoking the expansion-bus bridge mapping registers (the Data) before they are valid. Thus, the PCI ordering rule for Read Completions not to pass (PIO) posted memory-writes must be enforced for this case.

C. $I_2O$ Usage Models

The introduction of the $I_2O$ specification for intelligent peripherals has made certain system topologies more likely to be used. Three common implementations of $I_2O$-based peripherals will be presented and identified as one or another of the previously studied system topologies affecting transaction ordering.

Figure 74:
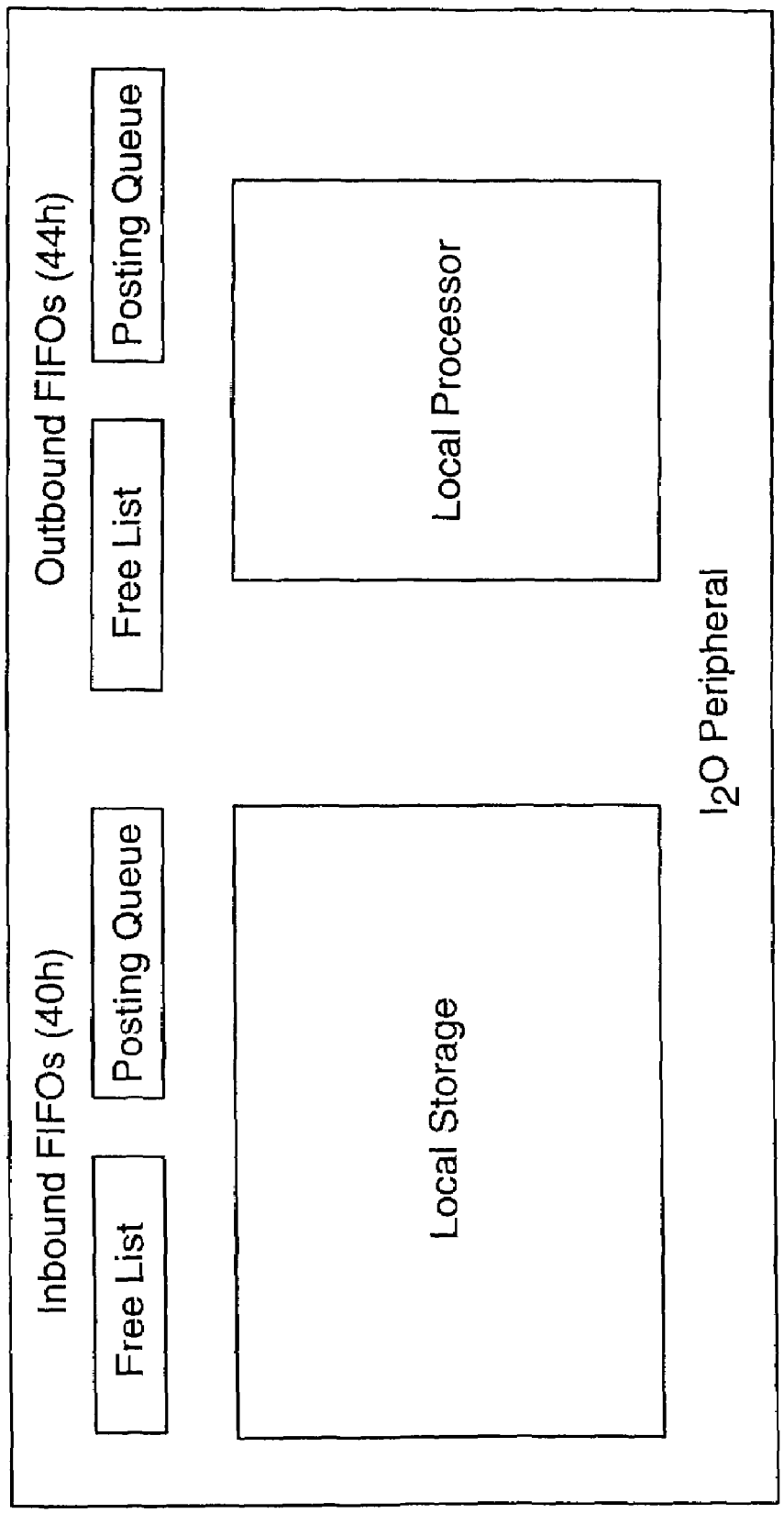
FIG. 74 is a block diagram of the $I_2O$ Standard Components according to the present invention.
Figure 75:
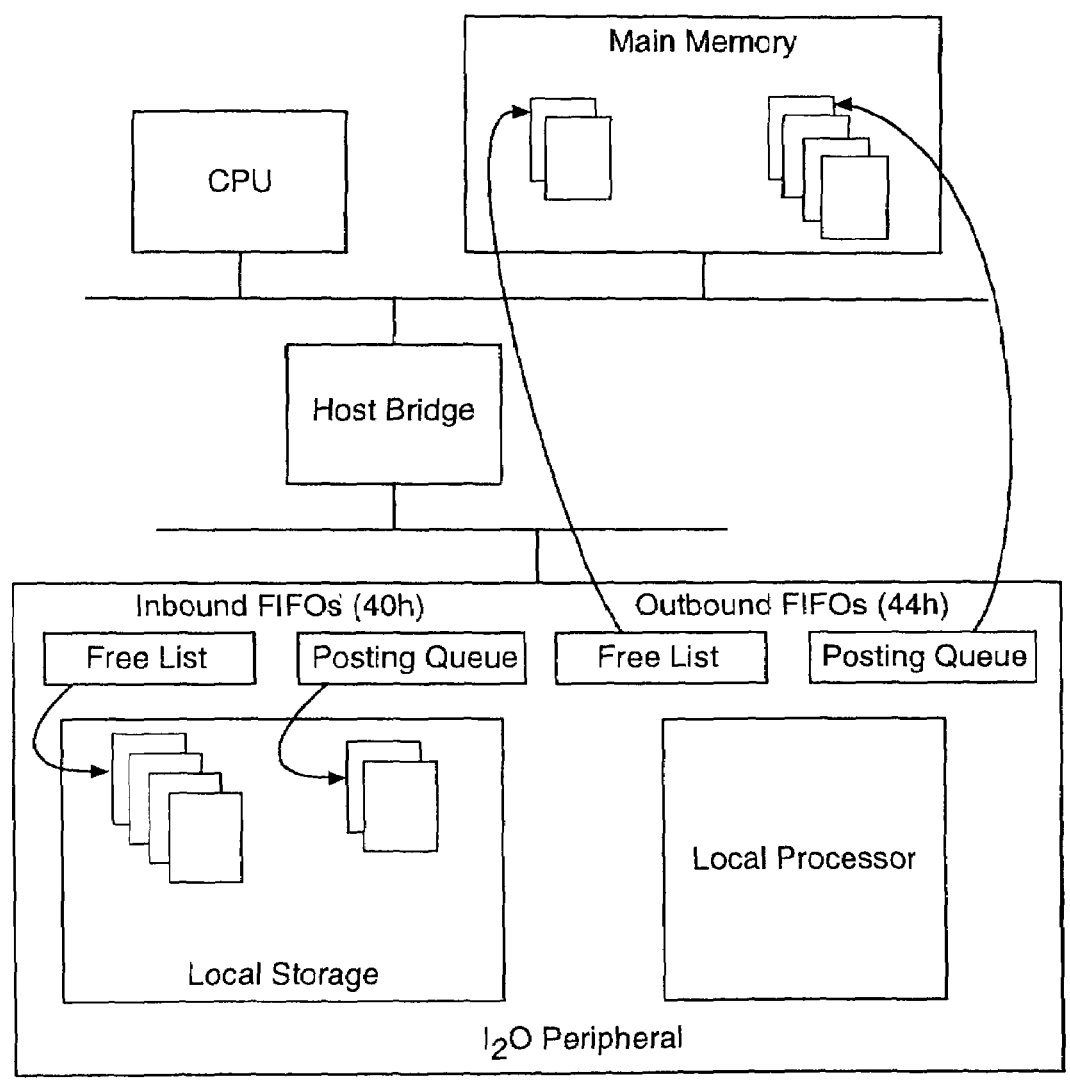
FIG. 75 is a block diagram of an $I_2O$ Push Model according to the present invention.
Figure 76:
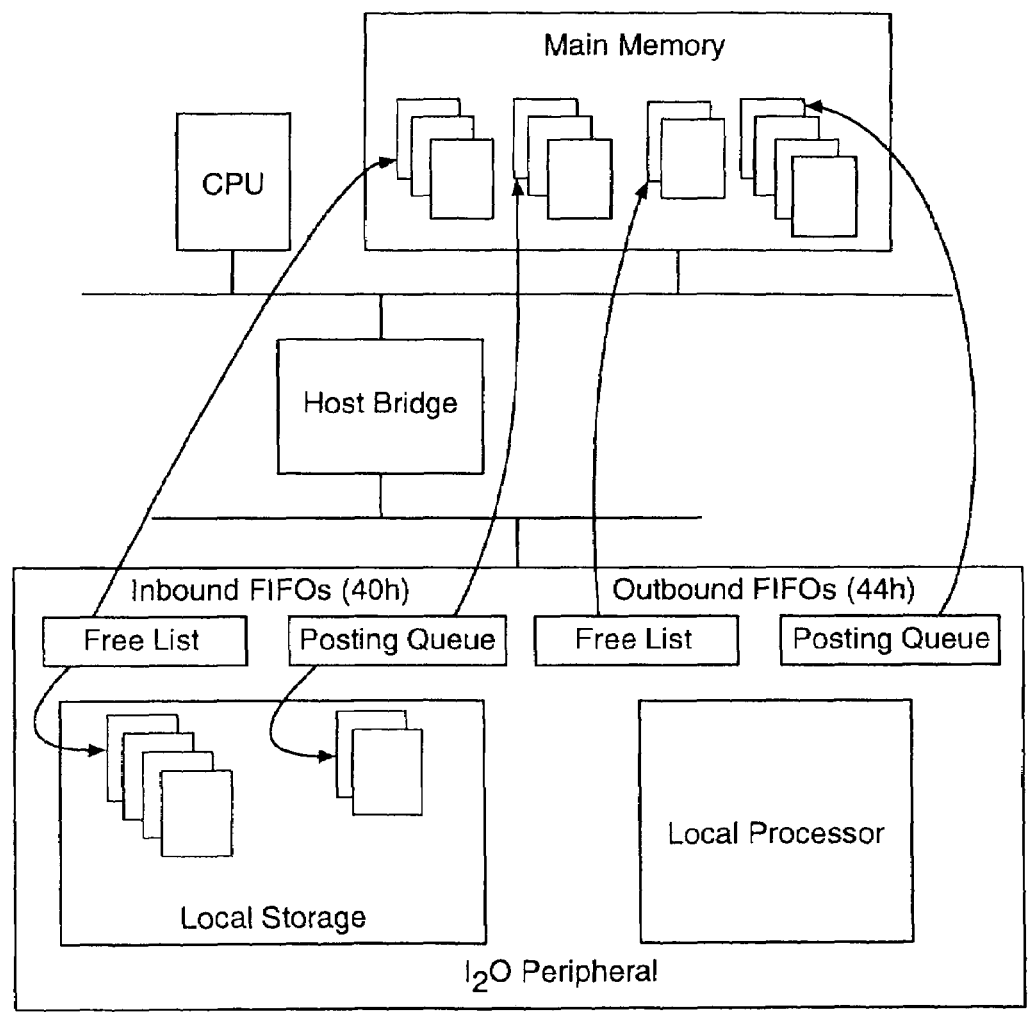
FIG. 76 is a block diagram of The $I_2O$ Pull Model according to the present invention.

Every $I_2O$ device implements a standard programming interface shown in FIG. 74. When the system is initialized, memory locations are reserved as buffers for messages moving both to and from the I/O platform (IOP). Pointers to these message buffers are managed by various free lists and posting queues contained either in the IOP or in host memory, depending upon the messaging protocol in use.

The original $I_2O$ messaging protocol places all free lists and posting queues in the IOP, allocates all message buffers at the receiver, and relies on the sender always pushing (writing) message buffer contents towards the receiver destination.

A different usage model called the "Pull Capability" allows message buffers used for host-to-IOP communication to reside in host memory and be pulled (read) from host memory by the IOP when needed. In addition, the free list for these host-resident inbound message buffers is also kept in host memory.

Another usage model called the "Outbound Option" allows the posting queue for outbound message buffers to reside in host memory. (Outbound message buffers themselves reside in host memory for all of these models, and are used strictly for IOP-to-host communication.)

1. $I_2O$ Messaging Protocol Operation

For the CPU to send a message to the IOP, the CPU acquires a message buffer by reading an entry from the Inbound Free List. The value either points to the next available buffer or indicates that no buffers are available. If a buffer is available, the CPU fills it with the message and writes the value of the pointer to the Inbound Posting Queue, which notifies the local processor that new work has arrived. The local processor reads the message from the buffer and processes it. When the local processor finishes using the buffer, it returns the buffer pointer to the Inbound Free List.

For the local processor to send a message to the CPU, the local processor acquires a buffer pointer from the Outbound Free List. If a buffer is available, the local processor fills it with the message and writes the value of the pointer onto the Outbound Posting Queue. This operation generates an interrupt to the CPU. The CPU then reads the pointer to the buffer from the Outbound Posting Queue, and begins work on the buffer. When the CPU finishes using the buffer, it returns it to the Outbound Free List.

The actual location of the Inbound Free List and Outbound Posting Queue vary according to the protocol option in use, but their logical operation remains the same.

2. Message Delivery with the Push Model

Original $I_2O$ messaging usage model is called the "push model" because data for both inbound and outbound messages are pushed (written) to the destination.

Delivery of inbound messages under the push model follows the ordering model presented in Case 3 (FIG. 71). Both the message data (the Data) and the Inbound Posting Queue (the Trigger) are located in the IOP (the Reader). The CPU is the Writer. Delivery of outbound messages follows the ordering model presented in Case 4 (FIG. 72). The message data (the Data) is located close to the CPU (the Reader), and the Outbound Posting Queue (the Trigger) is located in the IOP (the Writer).

3. Message Delivery with the Pull Model

With the Pull Capability inbound message buffers are placed in host memory and the local processor pulls (reads) message data from them. In addition, the Free List is likewise placed in host memory. Outbound messaging is not affected by use of the Pull Capability feature. Delivery of inbound messages under the pull model follows the ordering model presented in Case 2 (FIG. 70). The message data (the Data) is located close to the CPU (the Writer), and the Inbound Posting Queue (the Trigger) is located in the IOP (the Reader).

In contrast to the push model, the Inbound Free List is placed close to the Writer as opposed to the Reader. However, since accesses to the Free List don't serve as the Trigger, they don't fall under any particular ordering model.

4. Message Delivery with the Outbound Option

With the Outbound Option, the Outbound Posting Queue is placed in host memory. Inbound messaging is not affected by use of the Outbound Option feature.

Delivery of outbound messages under the Outbound Option follows the ordering model presented in Case 3 (FIG. 71). The message data (the Data) and the Outbound Posting Queue (the Trigger) are both located close to the CPU (the Reader).

5. Message Delivery with Peer to Peer

As the $I_2O$ specification is expanded to make peer-to-peer operations practical, many messages will move directly from one IOP to another, rather than between an IOP and main memory.

Messages between IOPs are always handled as inbound messages with respect to the destination IOP, and follow the original $I_2O$ messaging protocol for inbound messages.

D. Rule Summary and Simplification

Table 32 summarizes the conclusions from each of the system topology cases. Table 33 and Table 34 show simplified rules that also satisfy the requirements.

The following is a list of definitions for abbreviated terms used when describing transaction ordering.

| Abbreviation | Definition |
|---|---|
| PMW | Posted Memory Write |
| DRR | Delayed Read Request |
| SRR | Split Read Request |
| DWR | Delayed Write Request |
| DRC | Delayed Read Completion |
| SRC | Split Read Completion |
| DWC | Delayed Write Completion |
| DW | Delayed Write |
| RR | Read Request |
| RC | Read Completion |

TABLE 32

Usage Model Ordering Summary

| | Trigger RR pass PMW | Data RR pass PMW | Trigger RC pass PMW | Data RC pass PMW | Trigger PMW & DW pass PMW | Data PMW & DW pass PMW |
|---|---|---|---|---|---|---|
| Case 1 | Don't care | No | Don't care | Don't care | Don't care | Don't care |
| Case 2 | Don't care | No | Don't care | Don't care | Don't care | Don't care |
| Case 3 | Don't care | No | Don't care | Don't care | No | Don't care |
| Case 4 | Don't care | No | No | Don't care | Don't care | Don't care |

TABLE 33

Simplified Rules for Read Transactions

| | RR pass PMW | Trigger RC pass PMW | Data RC pass PMW |
|---|---|---|---|
| Simplified Rule Set Alternative #1 | Never | Never | Always |
| Simplified Rule Set Alternative #2 | Never | CPU Never, Device Almost Always | Always |

For read transactions several simplifications are possible. First, the majority of the possible performance improvement comes from allowing Read Completions of the Data to pass posted memory-writes moving in the same direction. This addresses the common case of a device reading from main memory while the CPU executes writes to a target on the bus. Therefore, the fourth column of both simplified read rule sets shows the Read Completion of the Data always passing Posted Memory-Write transactions.

Allowing a Read Request of the Trigger to pass posted memory-writes moving in the same direction doesn't help as much for several reasons. First, this commonly occurs when both the Read Request and posted memory-write address main memory. Allowing one to pass the other when they both address the same target is of limited value. Second, the Trigger is read far less often than the Data. Third, providing Trigger Read Requests with special passing capability would require an additional attribute bit to distinguish Trigger reads from Data reads (which can't allow Read Requests to pass posted memory-writes). Therefore, the second column in Table 33, for all simplified rule sets, shows all Read Requests maintaining strict order with respect to posted memory-write transactions. The Relaxed Ordering attribute bit allows Read Completions but not Read Requests to pass posted memory-writes.

Two alternative simplifications are possible for Trigger Read Completions. The simplest alternative (Rule Set #1) is never to allow Read Completions of the Trigger to pass posted memory-write transactions. Additional performance enhancement can be achieved with the slightly less simple rule #2 that improves the performance of the most common cases. First, no CPU transactions allow ordering relaxations. This is the most natural implementation since host bridges generally can't distinguish between Data and Trigger operations. The most common devices other than the CPU are permitted to use relaxed ordering for reads of the Trigger as well as reads of the Data. The only exception is the case in which the CPU prepares new Data for the device and writes it to a target near the device in the bus hierarchy, and the device finds the new work by reading another target near the CPU in the bus hierarchy (Case 4).

In summary, reading the data can always set the Relaxed Ordering bit. Reading the control structures (Trigger) can also set the Relaxed Ordering bit, except in Case 4.

TABLE 34

Simplified Rule for Write Transaction

| | Trigger PMW & DW pass PMW | Data PMW & DW pass PMW |
|---|---|---|
| Simplified Rule Set | Never | Always |

Table 34 shows the simplified rule for relaxed ordering on a write transaction. Since writes of the Data never have any ordering requirement, Data writes always are allowed to pass other writes to other writes. Since Case 3 illustrated a common case in which writes to the Trigger must stay in order, the simplest approach for writing the Trigger is never to allow reordering.

In summary, writing the data can always set the Relaxed Ordering bit. Writing the control structures (Trigger) generally cannot set it.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

The invention claimed is:

1. A device that is adapted to send information in accordance with a communication protocol, comprising:
    a structure that is adapted to issue a command representative of a default handling of a transaction; and
    a structure that is adapted to issue an attribute associated with the command to provide information that modifies the default handling of the transaction, wherein the attribute and a sequence identifier are issued during an attribute phase.

2. The device set forth in claim 1 wherein the attribute and a byte count are issued in the attribute phase.

3. The device set forth in claim 1, wherein the communication protocol defines communication between peripheral devices in a computer system.

4. The device set forth in claim 1, wherein the communication protocol comprises a peripheral component interconnect protocol.

5. The device set forth in claim 1, wherein the default handling comprises a snoop operation and the attribute comprises an indication that the snoop operation is not to be performed.

6. The device set forth in claim 1, wherein the device comprises an integrated circuit.

7. The device set forth in claim 1, wherein the default handling comprises a strongly ordered scheme and the attribute comprises an indication that the strongly ordered condition is to be replaced by a relaxed ordering scheme.

8. The device set forth in claim 5, wherein the snoop operation is performed in support of a hardware-enforced cache coherency requirement.

9. The device set forth in claim 5, wherein the default handling of the transaction requires the snoop operation to be performed in support of a hardware-enforced cache coherency requirement.

10. The device set forth in claim 6, wherein the integrated circuit comprises an application-specific integrated circuit.

11. A device that is adapted to send information according to a communication protocol, comprising:
    a structure that is adapted to issue a command representative of a default handling of a transaction; and
    a structure that is adapted to selectively issue an attribute that augments the default handling of the transaction, wherein the attribute and a sequence identifier are issued during an attribute phase.

12. The device set forth in claim 11 wherein the attribute and a byte count are issued in the attribute phase.

13. The device set forth in claim 11, wherein the communication protocol defines communication between peripheral devices in a computer system.

14. The device set forth in claim 11, wherein the communication protocol comprises a peripheral component interconnect protocol.

15. The device set forth in claim 11, wherein the default handling comprises a snoop operation and the attribute comprises an indication that the snoop operation is not to be performed.

16. The device set forth in claim 11, wherein the default handling comprises a strongly ordered scheme and the attribute comprises an indication that the strongly ordered condition is to be replaced by a relaxed ordering scheme.

17. The device set forth in claim 11, wherein the device comprises an integrated circuit.

18. The device set forth in claim 15, wherein the default handling of the transaction requires the snoop operation to be performed in support of a hardware-enforced cache coherency requirement.

19. The device set forth in claim 17, wherein the integrated circuit comprises an application-specific integrated circuit.

20. A method of operating a device in compliance with a defined communication strategy, the method comprising:
issuing a command that represents a default handling of a transaction; and
issuing an attribute and a sequence identifier during an attribute phase, wherein the attribute provides information to modify the default handling of the transaction.

21. The method set forth in claim 20 comprising issuing a byte count during the attribute phase.

22. The method set forth in claim 20, wherein the defined communication strategy defines communication between peripheral devices in a computer system.

23. The method set forth in claim 20, wherein the defined communication strategy comprises a peripheral component interconnect protocol.

24. The method set forth in claim 20, comprising:
performing a snoop operation if the default handling of the transaction is not modified by the attribute, and;
refraining from performing the snoop operation if the attribute indicates that the default handling of the transaction is to be modified.

25. The method set forth in claim 20, comprising:
performing the transaction according to a strongly ordered scheme if the default handling of the transaction is not modified by the attribute, and
performing the transaction according to a relaxed ordering scheme if the attribute indicates that the default handling of the transaction is to be modified.

26. The method set forth in claim 24, wherein the default handling of the transaction requires the snoop operation to be performed in support of a hardware-enforced cache coherency requirement.

27. A tangible computer-readable medium providing instructions for sending information in accordance with a communication protocol, the instructions being executed on a computer and comprising:
issuing a command in accordance with a communication protocol, the command being representative of a default handling of a transaction; and
issuing an attribute and a sequence identifier during an attribute phase, wherein the attribute provides information to allow modification of the default handling of the transaction.

28. A device that is adapted to send information in accordance with a communication protocol, comprising:
means for issuing a command that represents a default handling of a transaction; and
means for issuing an attribute and a sequence identifier during an attribute phase, wherein the attribute provides information to modify the default handling of the transaction.

29. A device that is adapted to send information in accordance with a communication protocol, comprising:
a structure that is adapted to issue a command representative of a default handling of a transaction; and
a structure that is adapted to issue an attribute associated with the command to provide information that modifies the default handling of the transaction, wherein the attribute and a byte count are issued during an attribute phase.

30. A device that is adapted to send information in accordance with a communication protocol, comprising:
a structure that is adapted to issue a command representative of a default handling of a transaction; and
a structure that is adapted to issue an attribute associated with the command to provide information that modifies the default handling of the transaction, wherein the default handling comprises a snoop operation and the attribute comprises an indication that the snoop operation is not to be performed.

31. A device that is adapted to send information in accordance with a communication protocol, comprising:
a structure that is adapted to issue a command representative of a default handling of a transaction; and
a structure that is adapted to issue an attribute associated with the command to provide information that modifies the default handling of the transaction, wherein the default handling comprises a strongly ordered scheme and the attribute comprises an indication that the strongly ordered condition is to be replaced by a relaxed ordering scheme.

* * * * *